United States Patent [19]

Hosogai

[11] Patent Number: 5,404,433

[45] Date of Patent: Apr. 4, 1995

[54] IMAGE PROCESSING APPARATUS HAVING IMPROVED FUNCTION FOR CREATING IMAGE USING A PLURALITY OF ORIGINAL IMAGES

[75] Inventor: Takashi Hosogai, Tokyo, Japan

[73] Assignee: Ricoh Company, Ltd., Tokyo, Japan

[21] Appl. No.: 109,582

[22] Filed: Aug. 20, 1993

[30] Foreign Application Priority Data

Aug. 20, 1992 [JP] Japan .................. 4-221168
Feb. 16, 1993 [JP] Japan .................. 5-027024

[51] Int. Cl.⁶ .................................. G06F 15/62
[52] U.S. Cl. .......................... 395/144; 395/145; 395/148
[58] Field of Search ............... 395/144, 157, 146, 145, 395/148, 149, 161

[56] References Cited

U.S. PATENT DOCUMENTS

| 4,931,957 | 6/1990 | Takagi et al. | 395/157 X |
| 4,942,542 | 7/1990 | Yamakawa | 395/145 X |
| 5,161,214 | 11/1992 | Addink et al. | 395/145 |
| 5,208,905 | 5/1993 | Takakura et al. | 395/145 X |
| 5,235,681 | 8/1993 | Masuzaki et al. | 395/145 X |

OTHER PUBLICATIONS

Microsoft Windows (Trademark of Microsoft Corporation), 1990, pp. 272–273, 279–280, 296–304.

Primary Examiner—Heather R. Herndon
Assistant Examiner—Cliff Nguyen Vo
Attorney, Agent, or Firm—Popham, Haik Schnobrich & Kaufman, Ltd.

[57] ABSTRACT

An image reading unit reads a plurality of original images so as to provide the corresponding image information. An input size specifying unit specifies input sizes according to which the image reading unit respectively reads the plurality of original images so that the resulting image information represents the specified input sizes of the plurality of original images, wherein the input sizes may be identical to one another. A first storing unit stores the resulting image information therein. A first image indicating unit indicates the image represented by the image information stored in the first storing unit. A image processing unit appropriately processes the image information stored in the first storing unit so as to create image information representing at least one finished image. An output size specifying unit specifies an output size according to which the image processing unit processes the image information so that the finished image has the specified output size. A second storing unit stores the image information representing the finished image therein. A second image indicating unit indicates the finished image using the corresponding image information stored in the second storing unit. A recording unit records the image information representing the finished image on a recording medium after extracting the image information from the second storing unit.

15 Claims, 122 Drawing Sheets

SPECIFY READING PARAMETER.

READING PARAMETER SPECIFICATION

| READING DENSITY | LOW | 1 | 2 | 3 | 4 | 5 | 6 | 7 | HIGH | AUTO |

DRAFT TYPE: CHARACTER | CHARACTER・PHOTO | PHOTO

PAPER SIZE: A3 VERTICAL / B4 VERTICAL | A4 VERTICAL / B5 VERTICAL | A4 HORIZONTAL / B5 HORIZONTAL | AUTO.

FIXED SIZE VARIATION:

| 400 | | | SPACE GENERATION |
| 200 | A5 > A3 B6 > B4 | 93 | A3 > B4 A4 > B5 |
| 141 | A4 > A3 B5 > B4 | 87 | B4 > A4 |
| 122 | A4 > B4 A5 > B5 | 82 | A3 > A4 B4 > B5 |
| 115 | B4 > A3 B5 > A4 | 71 | A3 > B5 |
| SAME SIZE | | 61 | |
| | | 50 | |
| | | 25 | |

READ    DELETE    SET

SPECIFY READING PARAMETER.

READING SPECIFICATION

| READING DENSITY | LOW | 1 | 2 | 3 | 4 | 5 | 6 | 7 | HIGH | AUTO |

DRAFT TYPE: CHARACTER | CHARACTER•PHOTO | PHOTO

PAPER SIZE: A3 VERTICAL | B4 VERTICAL | A4 VERTICAL | B5 VERTICAL | A4 HORIZONTAL | B5 HORIZONTAL | AUTO

FIXED SIZE VARIATION:

| 400 | | 93 | SPACE GENERATION |
| 200 | A5 > A3 B6 > B4 | 87 | A3 > B4 A4 > B5 |
| 141 | A4 > A3 B5 > B4 | 82 | B4 > A4 |
| 122 | A4 > B4 A5 > B5 | 71 | A3 > A4 B4 > B5 |
| 115 | B4 > A3 B5 > A4 | 61 | A3 > B5 |
| SAME SIZE | | 50 | |
| | | 25 | |

[READ]  [DELETE]  [SET]

FIG. 121
| ROTATION MODE | |
|---|---|
| 90° ROTATION |  OR  |
| 180° ROTATION |  OR 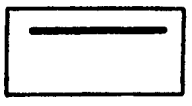 |
| 270° ROTATION |  OR 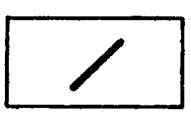 |
| Y-AXIS REVERSAL | 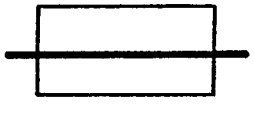 OR 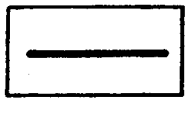 |
| Y-AXIS REVERSAL 90° ROTATION | 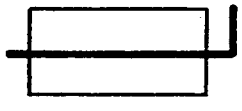 OR 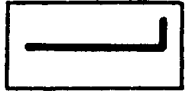 |
| X-AXIS REVERSAL | 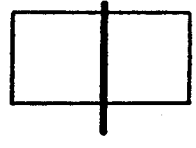 OR  |
| X-AXIS REVERSAL 90° ROTATION | 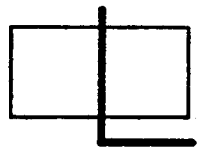 OR  |
( NOTE: 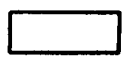 OUTPUT RECTANGLE INDICATION    ——— SPECIFICATION WITH TOUCHPEN )

FIG. 122

| LOGICAL OPERATION | SPECIFICATION WITH TOUCH PEN | LOGICAL OPERATION | SPECIFICATION WITH TOUCH PEN |
|---|---|---|---|
| OVER WRITE | ⊙ | NOT WRITE | ⌀ |
| OR WRITE | ⊖ | NOT OR WRITE | ⌀ |
| EXOR WRITE | ⌀ | NOT EXOR WRITE | ⌀ |
| AND WRITE | ⌀ | NOT AND WRITE | ⌀ |

(NOTE: "SPECIFICATION WITH TOUCH PEN" HAS TO BE REALIZED IN CENTER OF OUTPUT RECTANGLE.)

IMAGE PROCESSING APPARATUS HAVING IMPROVED FUNCTION FOR CREATING IMAGE USING A PLURALITY OF ORIGINAL IMAGES

BACKGROUND OF THE INVENTION

The present invention relates to an image processing apparatus for processing a plurality of original images so as to create a final image, which final image is then recorded in a recording medium.

An image processing apparatus having a function for composing a plurality of original images may be considered. In this considered image processing apparatus, a scanner reads a plurality of original images so as to provide corresponding image information. Then, the provided image information is stored in a memory and also indicated on an indicating screen. Then, the image information stored in the memory is processed as a result of the operator specifying contents of the processing using a touch pen. In this operator's specification, the operator appropriately touches the indicating screen with the touch pen so as to make the specification.

Then, as a result of the processing, the processed part of the image information is extracted from the memory so as to again store the extracted part of the image information in another memory. Such a series of operations is executed for the plurality of original images. As a result, the processed and extracted parts of the image information about the plurality of original images are respectively stored in the other memory.

Consequently, the stored image information, which corresponds to a final image such as mentioned above, is then recorded on a recording medium by means of a printer.

However, an image processing apparatus such as mentioned above has drawbacks. That is, an input size according to which an original image is read so as to provide corresponding image information representing the original image in the input size cannot be detected. Further, an output size in which a final image is recorded on a recording medium cannot be detected.

(Hereinafter, the term "size" will be expanded in meaning so that variation in "size" may also mean variation in "shape")

Further, each of various images, which have been read, cannot be indicated on the indicating screen in a manner in which the size of the image is varied so that the image may be indicated on the entire area of the screen. Thus, the processing of the image may not be executed efficiently nor precisely nor well because, for example, the image indicated in the screen is too small in its size on the screen.

Further the following image processing cannot be performed. There may be a case where desired parts are respectively extracted from a plurality of original images, which images respectively have different sizes thereof. Respectively varying the sizes, in desired different scales, of the extracted parts so as to compose the size-varied extracted parts, cannot be executed.

THE SUMMARY OF THE INVENTION

An object of the present invention is to provide an image processing apparatus in which the above-mentioned drawbacks may be eliminated. Thus, each of various images, which have been read, can be indicated on the indicating screen in a manner in which the size of the image is varied so that the image may be indicated on the entire area of the screen. This may be achieved by spreading a small sized image so as to coincide with the size of screen. Thus, the processing of the image may be executed efficiently or precisely or well because, for example, the image indicated in the screen is appropriately large in its size on the screen.

Further, the following image processing can be performed. There may be the above-mentioned case where desired parts are respectively extracted from a plurality of original images, which images respectively have different sizes thereof. A process to respectively vary the sizes, at desired different scales, of the extracted parts so as to compose the size-varied extracted parts can be executed.

Further, in the image processing apparatus according to the present invention, a so-called interactive system is utilized through the indicating screen. Thus, reliability in composing a plurality of original images may be improved. Further, in the size variation of the plurality of images, it is possible to refer to correspondence between the actual sizes of the input image areas and the size of the final image indicated on the screen. This referring to the correspondence between the actual size of the input image areas and the size of the final image will be explained as follows. That is, in this referring, the dimensional relationship between the size of the input image area and the size of the final image is the same as if the input image area were cut out from the original image represented on, for example, a sheet of paper, and put on the final image represented on another sheet of paper.

Further, it is possible to improve accuracy and efficiency in operations performed by the operator in respectively extracting of desired parts from the plurality of original images.

To achieve this object of the present invention, the image processing apparatus according to the present invention comprises the following means which will now be described with reference to FIG. 1.

This image processing apparatus comprises:

an image reading means A for reading a plurality of original images so as to provide the corresponding image information;

input size specifying means B for specifying input sizes according to which said image reading means A respectively reads said plurality of original images so that the resulting image information represents said specified input sizes of said plurality of original images, wherein said input sizes may be identical to one another;

first storing means C for storing said resulting image information therein;

first image indicating means E for indicating, through the indicating screen device D, for indicating the image represented by the image information stored in said first storing means C;

image processing means F for appropriately processing the image information stored in said first storing means C so as to create image information representing at least one finished image;

output size specifying means G for specifying an output size according to which said image processing means F processes said image information so that said finished image has said specified output size;

second storing means H for storing said image information representing said finished image therein;

second image indicating means I for indicating, on the indicating screen device D, said finished image using the corresponding image information stored in said second storing means H; and recoding means J for recording said image information representing said finished image on a recording medium after extracting said image information from said second storing means H.

Thus, it is possible to respectively indicate the various input images on the indicating screen device in the entire size of the screen. Further, the input image areas extracted from the input images may be used for image composing process. In this process, the input image areas may be used after varying the sizes thereof desirably.

By the above mentioned construction according to the present invention, each of a plurality of input images respectively having different sizes may be displayed so as to fill the screen with it by appropriately setting an input size. Further, it is also possible to display a final image so as to fill the screen with it by appropriately setting an output size. The final image is obtained as a result of performing Various processes on the plurality of input images. Thus, it is possible to observe the final image with high accuracy, and thus to determine whether or not the performed processes have been appropriate before it is printed out. If the performed processes include an inappropriate one, an appropriate process may be performed for modifying the final image and/or for canceling undesired process and/or for again performing an appropriate one. Thus, after an appropriate final image, on which appropriate processes have been performed, has been obtained, then the final image is transferred to the printing out means while it becomes a desired size. Thus, the final image is printed out.

As a result, various advantages may be offered such as enabling the following operations. Images can be read which respectively have various sizes, a final image can be obtained in a desired size, and image processing can be performed in correspondence to an output size.

Further, it is preferable that the image processing apparatus further comprises:

extracting area specifying means for specifying, as an input image area, a part of the image indicated by said first image indicating means E so that corresponding part of image information stored in said first storing means C is accordingly specified as an input image information area;

allocation manner specifying means for specifying an allocation manner in which the input image information area is allocated in the storing area associated with said second storing means H; and image information transferring means for transferring said input image information area to an allocation area in said storing area of said second storing means H.

Thus, a so-called interactive system may be applied through the indicating screen device. As a result, reliability in composing the various images may be improved.

Further, it is preferable that said allocation manner specifying means also comprises:

means for indicating, on the image indicated by said second indicating means I, the actual size of the input image area on the final image, wherein indicating the actual size of the input image area on the final image means that the dimensional relationship between the size of the input image area and the size of the final image is as if the input image area were cut out from the original image represented on, for example, a sheet of paper and the cut part of the sheet of paper were then put on the final image represented on another sheet of paper; and means for specifying movement or size variation for said input image area on said indicated image.

Thus, the various images may be composed after performing size variation on the images with different scales while referring to correspondence between the indicated sizes and the actual sizes.

Further, in the construction according to the present invention, various image processing operations such as moving a part of the plurality of input images and variations in size and/or shape of a part of the plurality of input images can be realized in correspondence with an actual size of the images. Then, the processing-performed image can be combined to a part of the input image having another size.

Further, it is preferable that said input area specifying means B comprises means for varying the size of the image indicated by said first indicating means E where the size variation is performed about a fixed point specified on said image.

Further it is preferable that said input area specifying means comprises means for varying the size of the image indicated by said second indicating means I where the size variation is performed about a fixed point specified on said image.

Thus, by spreading the image by varying the size thereof in indicating the image on the screen, accuracy and efficiency may be improved in specifying areas from which the input image areas are respectively extracted.

Further it is preferable that said image information transferring means comprises resolution converter means for performing, on the image represented by the image information to be transferred thereby, at least one of size variation, movement, and rotation.

Thus, improvement in the processing speed with which the image information is transferred as mentioned above may be possible. This is because, by using such a resolution converter, the transfer speed may be improved in comparison to that in DMA (direct memory accessing) transference or that in software size-variation.

Further it is preferable that said image information transferring means comprises logical operation means for performing, before transferring, logical operations on the input image information area and other image information stored in said allocation area.

Thus, various composition functions may be achieved.

Further it is preferable that said allocation manner specifying means comprises means for performing rotation or reversal on the input image area as the allocation manner.

Thus, various allocation functions may be achieved.

Further it is preferable that the image processing apparatus further comprises means for indicating a scale of size variation, according to in which rate size variation is performed on the input image area according to the allocation manner.

Thus, correspondence between the original size and the corresponding varied size may be easily referred to. Thus, the composition operations may be efficiently performed with such an easy reference.

Further it is preferable that the image processing apparatus further comprises means for giving notice when the allocation area exceeds a predetermined area. The excess may occur as a result of a process being performed on the input image area according to the allocation manner, wherein said performed process may comprise movement, size variation or rotation.

Thus, the operator will surely acknowledge the impossibility of the allocation. As a result, efficient allocation operations may be realized.

Further it is preferable that the image processing apparatus further comprises means for giving notice when the allocation area exceeds the area associated with the finished image. The excess may occur as a result of a process being performed on the input image area according to the allocation manner, wherein said performed process comprises allocating the input image area on the center of said finished image.

Thus, efficient allocation operations are also realized.

Further it is preferable that the image processing apparatus further comprises means for canceling the processing executed with said image processing means.

Thus, so-called trial and error operations may be executed in the image processing. As a result, the optimum finished image may be selected from among many trials and then the selected image may be recorded.

Further it is preferable that said recording means further comprises means for recording the image information stored in said first storing means C.

Thus, reading operation by means of the image reading means A may be executed according to a specified reading parameter. Then, the operator may examine the read by the means A and then store the read in the storing means C by reference with the corresponding image on the screen. Then, after the operator approves the image as a result of the examination, the approved image may be then recorded in the recording medium.

Further it is preferable that the image processing apparatus further comprises specification inputting means for inputting a specification concerning at least one of said input size specification means B, output size specification means G, and image processing means F, wherein an input device such as a touch pen is used to draw a symbol and said drawn symbol is then read as said specification.

Thus, convenience in the various specification operations may be achieved.

Further it is preferable that said specification inputting means reads the symbol, as the specification, drawn on the image represented by the image information stored in the allocation area wherein the reading is executed by referring to at least a position, a shape and a number of drawn strokes of said drawn symbol.

Thus, speediness in the various specification operations may be achieved. Such a symbol reading technique is superior to other character reading techniques. Another character reading technique may comprise standardizing the size of the written symbol and/or applying a probability technique and/or converting the read symbol to vectors and/or performing a stroke matching process on the vectors and/or performing a pattern matching process on the result of the stroke matching and/or applying a correlation method and/or applying a multi-stage construction analyzing method and/or applying graph theory.

Further it is preferable that said specification inputting means displays a symbol corresponding to the symbol drawn therewith in a case where said specification inputting means could read said drawn symbol; and wherein in a case where said specification inputting means could not read said drawn symbol, said specification inputting means gives notice indicating the unreadableness.

Thus, the operator may easily acknowledge the result of the symbol reading by the apparatus. This is particularly effective in a case where, for example, the operator specifies 180° image rotation and the object-image has characteristics in which the result of the rotation may not be clearly read in the resulting image indicated on the screen.

Other objects and further features of the present invention will become more apparent from the following detailed description when read in conjunction with the accompanying drawings.

BRIEF DESCRIPTION OF THE DRAWINGS

FIG. 4 shows an example of an original image to be processed in the apparatus shown in FIG. 2;

FIGS. 47 to 75 show other examples of the menu pages and the image display parts respectively used in the process in which the finished image shown in FIG. 46 is obtained from the original images shown in FIGS. 4 and 5 in the apparatus shown in FIG. 35;

FIGS. 90 to 120 show other examples of the menu pages and the image display parts respectively used in the process in which the finished image shown in FIG. 89 is obtained from the original images shown in FIGS. 4 and 5 in the apparatus according the fourth embodiment of the present invention;

FIG. 121 shows a method of specification, in the apparatus according the fourth embodiment of the present invention, by means of a touch pen in a case where various rotation-mode operations may be performed through the controller;

FIG. 122 shows a method of specification, in the apparatus according the fourth embodiment of the present invention, by means of a touch pen in a case where various logical-operations may be performed through the controller.

DESCRIPTION OF THE PREFERRED EMBODIMENTS

Figure 1:
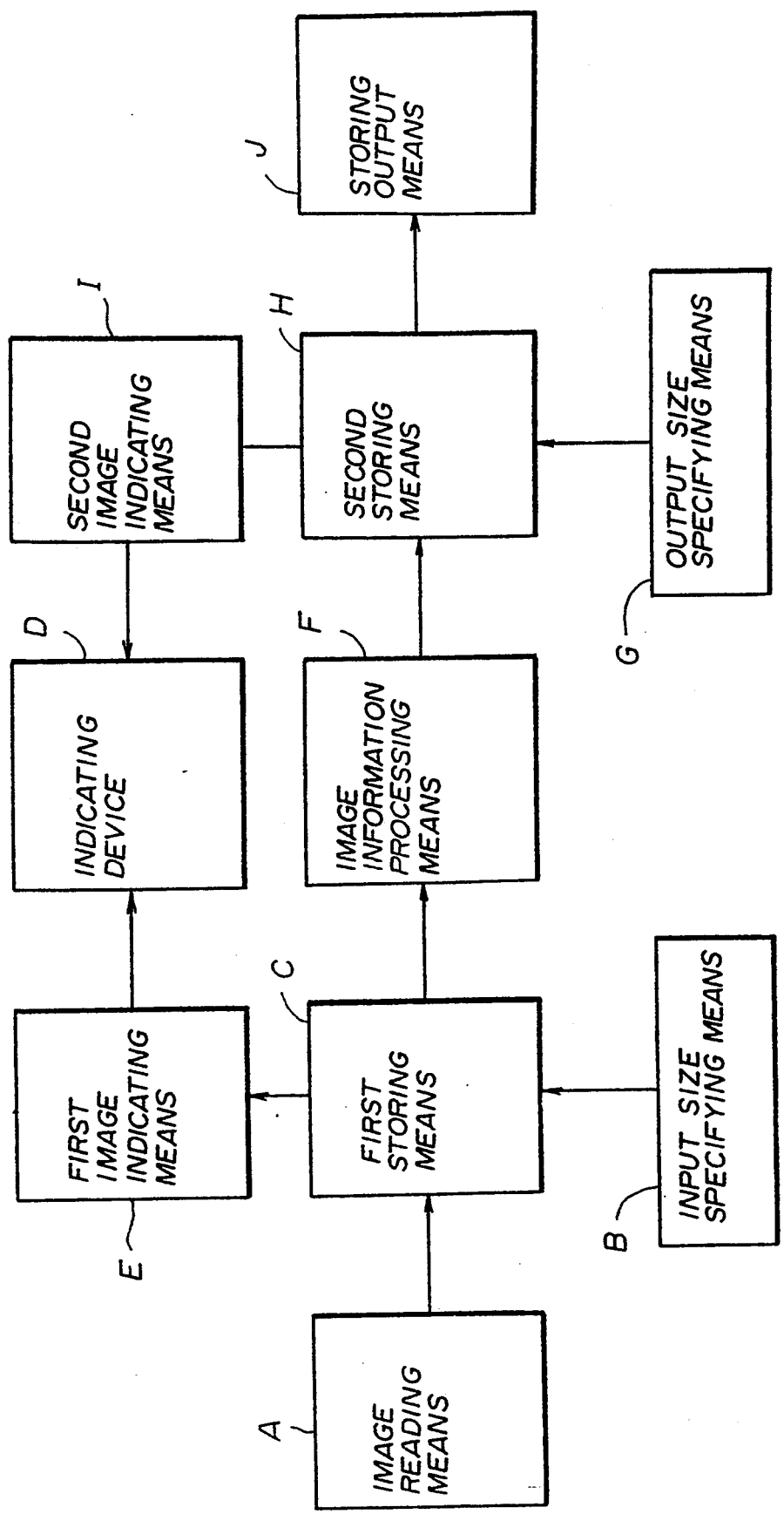
FIG. 1 shows a function block diagram indicating a basic construction of the present invention.
Figure 2:
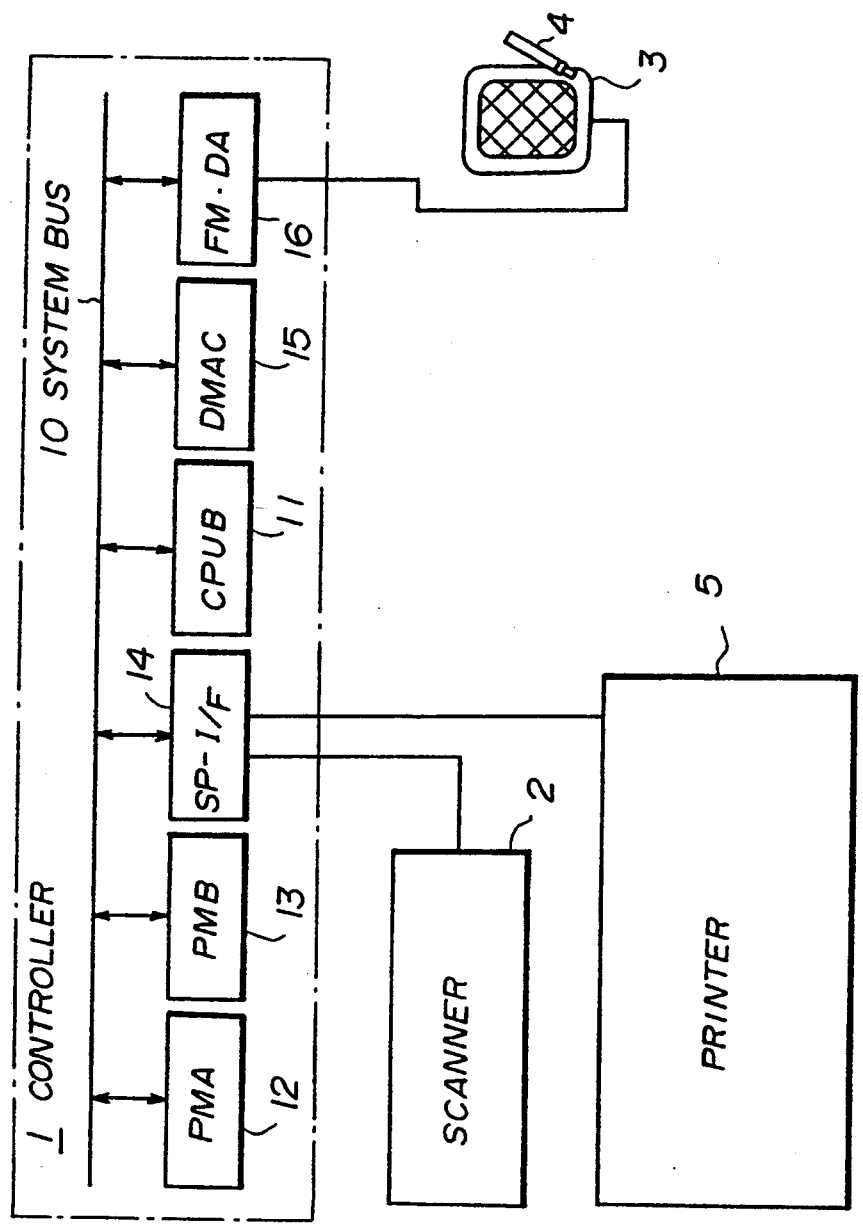
FIG. 2 shows a block diagram of a image processing apparatus according to a first embodiment of the present invention.

An image processing apparatus according to a first embodiment of the present invention will now be described with FIG. 2.

The image processing apparatus comprises a controller 1, a scanner 2, an LCD 3, a touch pen 4, and a printer 5.

The controller 1 comprises a system bus 10 and boards 11–16 respectively having various functions.

The CPU board (it will be referred to as simply CPUB) controls the other boards 12–16 via the system bus 10.

The first memory board (it will be referred to as simply PMA) 12 and the second memory board (it will be referred to as simply PMB) 13, which respectively acts as the above-mentioned first and second storing means, respectively have image buffer memories, each of which buffer memories has a memory capacity corresponding to one page of image.

Each of these page memory boards 12 and 13 may be connected with the scanner 2 and the printer 5 via the scanner interface board (it will be referred to as simply SP-I/F) 14.

The DMA (direct memory access) controller board (it will be referred to as simply DMAC) 15 reads image information (image data) from the image buffer memories in the first and second page memory boards 12 and 13. Then, the DMAC 15 transfers and then writes the read image information in a frame memory in the frame memory board (it will be referred to as simply FMDA) 16. The FMDA 16 will be used for monitoring information stored therein. In this writing, a so-called thinning process is performed on the image information read from the image buffer memories in the first and second page memories 12 and 13. By the thinning process, a number of pixels representing the image is reduced. Thus, the image information representing the pixel-reduced image is written in the FMDA 16.

The FMDA 16 has LCD timing controller (it will be referred to as simply LCTC) other than the frame memory. As a result, the FMDA 16 may indicate the image information stored in the frame memory on the screen of the LCD 3.

A tablet is provided on the screen of the LCD 3. This tablet may read a coordinate position specified with the touch pen 4. The tablet provides the read coordinate position via the FMDA 16.

The touch pen 4 may be replaced with another pointing device such as, for example, a so-called mouse. If the mouse is used, the LCD 3 is also replaced with a liquid crystal display device. Further, the LCD 3 may be replaced with a combination of a CRT display device and a tablet.

An operation flow of a process performed by the controller 1 and an operation sequence performed by an operator will now be described with reference to FIG. 3. Descriptions for corresponding operations in one example will be also described alternately with the description for the steps. In the example, a final image to be recorded or printed out (so as to obtain the corresponding so-called hard copy) is obtained from an original image shown in FIG. 4 and having a size and orientation of the vertical A4 and another original image shown in FIG. 5 and having a size and orientation of the vertical B5. FIGS. 7–21 will be referred to in the description of the example.

Step S1: In response to "power on" of the image processing apparatus, a menu page is displayed on the LCD screen. A plurality of select buttons: "read", "output size", "print", "reading page", "output page" and "transfer" are indicated on the menu page.

Figure 7:
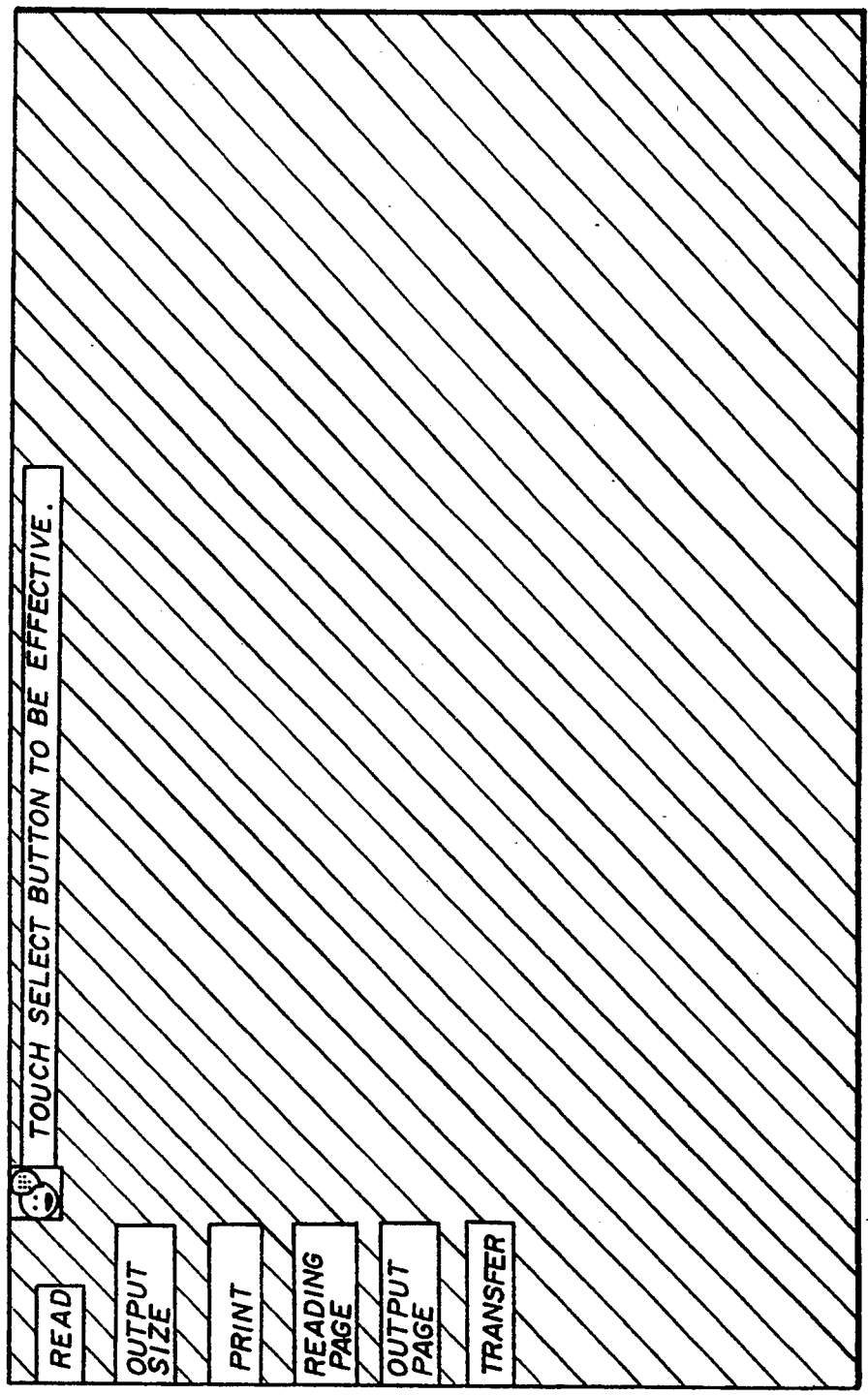
FIG. 7 shows an example of a menu page used in the process in which the finished image shown in FIG. 6 is obtained from the original images shown in FIGS. 4 and 5 in the apparatus shown in FIG. 2.

In the above-mentioned example, the menu page further includes another message "Touch a select button to be effected." as shown in FIG. 7.

Step S2: In response to the select button "read" on the menu page is specified through the touch pen 4, a submenu is then displayed on a image display part of the indicating screen. The submenu is used for executing a reading specification. This reading specification comprises a plurality of parameter specifications: "reading density", "draft (the term "draft" will mean, for example, a sheet of paper on which an original image is represented, hereinafter) type", "paper size" and "fixed size variation". According to the specification, the scanner 2 reads an original image represented on a draft set in the scanner 2 when a button "set" displayed at the bottom of the submenu is specified. Then, the corresponding image information (input image information) is provided by the scanner 2.

Step S3: The read input image information is then written on the image buffer memory in the first page memory board 12.

Step S4: The written input image information is then transferred, through the DMA controller board 15, to the memory in the frame memory board 16. Then, the transferred input image information is displayed on the image display part on the LCD 3.

Step S5: In response to two points in the image displayed on the image display part being specified through the touch pen 4, a rectangle is then indicated in the image on the image display part. The rectangle has two diagonally opposite corners coinciding with the specified two points. The rectangle indicates a frame of a specified area.

Step S6: According to the results of the step S5 (the term "step" will be omitted so that, for example, the step S5 may be replaced by simply S5), an input area is calculated. The input area is an area in the image buffer memory in the first page memory board 12 and an area corresponding to the above-mentioned specified area. Then, the calculated input area of information is stored in a memory which is not shown in the figures and which memory may be a memory provided in the CPU board 11.

Figure 8:
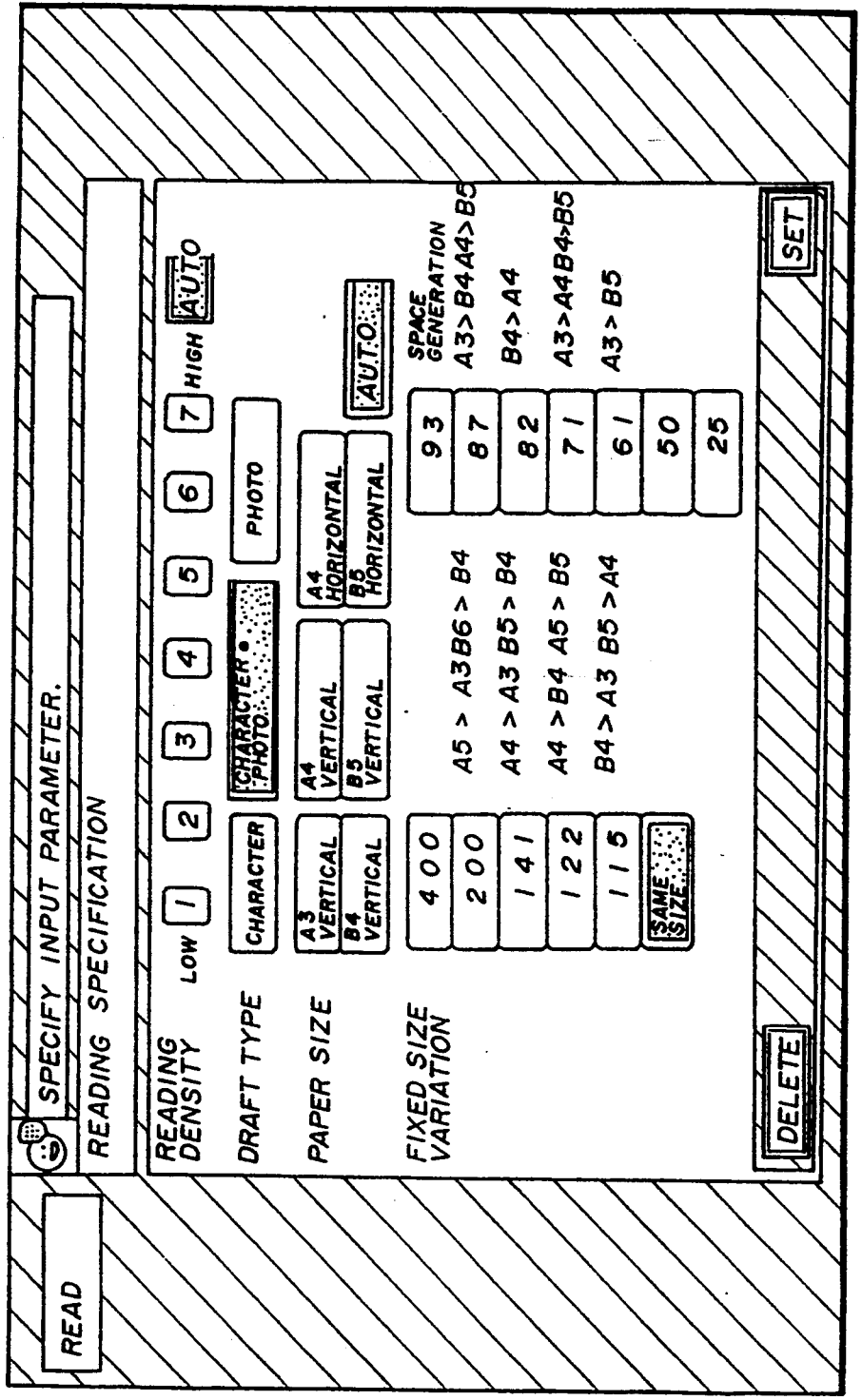
FIGS. 8 to 21 show other examples of the menu pages and image display parts respectively used in the process in which the finished image shown in FIG. 6 is obtained from the original images shown in FIGS. 4 and 5 in the apparatus shown in FIG. 2.

In the example, after the operator sets the draft representing the original image shown in FIG. 4 in the scanner 2, the button "read" may be specified through the touch pen 4. Then, the controller 1, as shown in FIG. 8, displays, on the image display part, the submenu of the reading specification. Simultaneously, the message "Specify input parameter." is indicated in the menu page. (In FIGS. 8-21, the image display parts respectively duplicate the menu pages.)

Predetermined default parameters (they are parameters which specify choices made by a program when the user does not specify an alternative) have been set for the items "reading density", "draft type", "paper size" and "fixed size variation". The set default parameters are indicated on the screen with reversed white-on-black states, that is, a state reversed from the normal black-on-white state. (In the drawings, these reversed white-on-black states of buttons are indicated so that the letters are written in dotted backgrounds, so that, in the example of FIG. 8, the letters "SAME SIZES" in the button located around the bottom left of the image display part.) The operator may specify the alternative parameter by touching the corresponding button on the screen with the touch pen 4. Then, letters written on the specified button are then reversed to the reversed white-on-black state and letters written on the button corresponding to the default parameter is reversed to be the normal black-on-white state.

Figure 9:
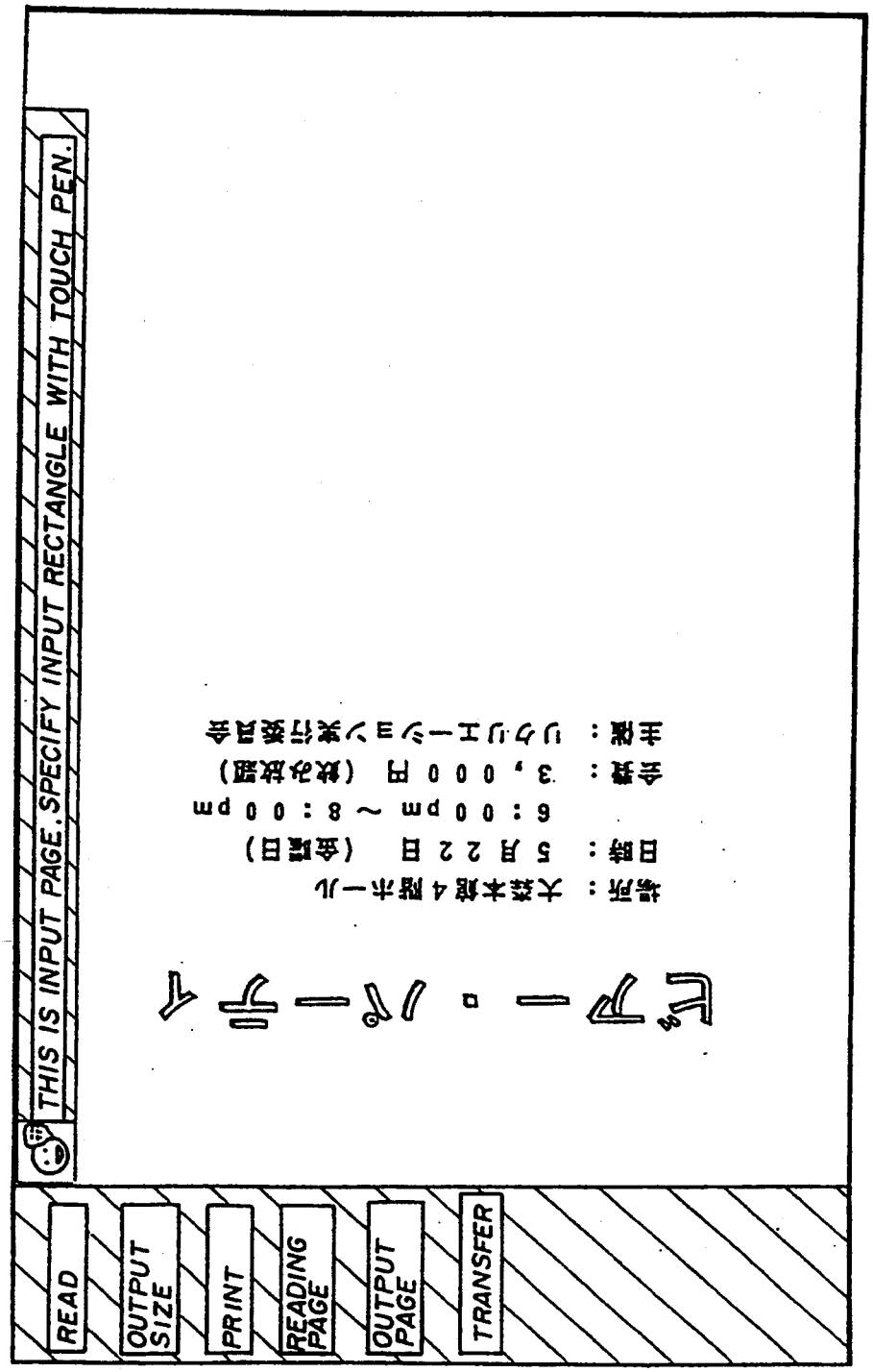
Figure 10:
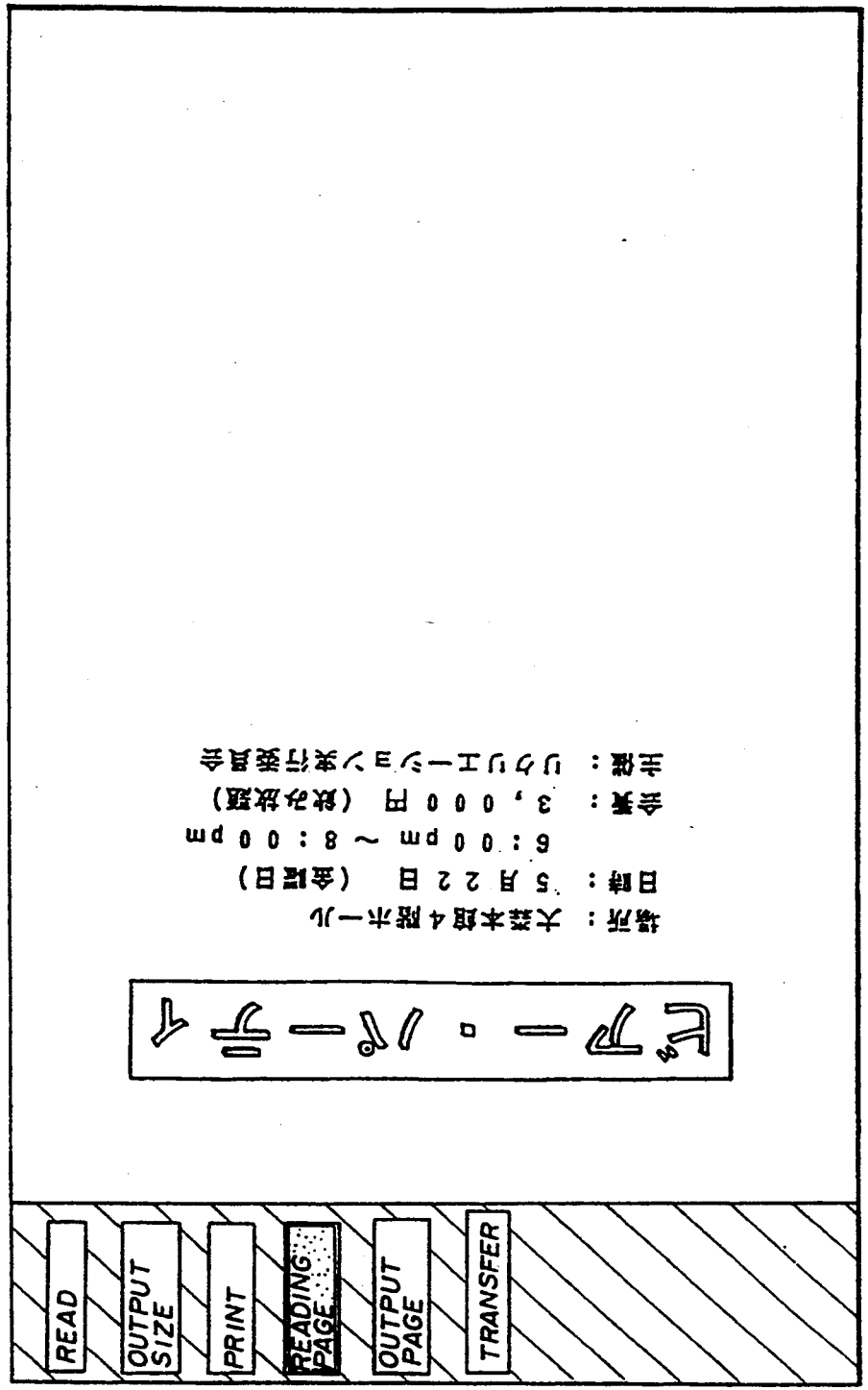

After the operator determines all parameters, the operator may specify the button "set" through the touch pen 4. As a result, the controller 1 deletes the indication of the reading-specification submenu from the image display part. Then, the controller 1 initiates the scanner 2 so as to make the scanner 2 start reading the set original image so as to provide the corresponding input image information. Then, the controller 1 writes the provided input image information in the image buffer memory in the first page memory board 12. Then, the controller 1 transfers the written information to the memory in the frame memory board 16 through the DMA controller 15. Then, as shown in FIG. 9, the transferred image information is represented on the image display part of the LCD 3. The controller also indicates a message "This is an input page. Specify an input rectangle through the touch pen." on the menu page.

The operator may then specify, in a manner such as mentioned above, as shown in FIG. 10, a desired area on the image display part. As a result, the controller 1 stores, in the unshown-in-the-figure memory, the part of the image information defined by the specified desired area (input area). Before this storing, the controller 1 extracts the corresponding image information from the image buffer memory in the first page memory board 12.

Step S8: In response to the select button "output size" being specified through the touch pen 4, another submenu is displayed on the image display part. The other submenu is for executing an output size specification. After the output size is specified, then in response to the button "set" being specified, the specified size is then prepared in the image buffer memory in the second page memory board 13. Then, blank is displayed on the image display part of the LCD 3.

Step S9: In response to the button "output page" on the menu page being specified through the touch pen 4, output image information stored in the image buffer memory in the second page memory board 13 is displayed on the image display part.

Step S10: A rectangle is then displayed on the center of the image display part. This rectangle is used for allocating the input area of the input image information. Further, this rectangle has a size which has been specified in S8 and in this display, this rectangle has the corresponding actual size. Indicating the actual size on the final image means that the dimensional relationship between the size of the input image area and the size of the final image is as if the input image area were cut out from the original image represented on, for example, a sheet of paper and the cut part of the sheet of paper were then put on the final image represented on another sheet of paper.

Step S11: The operator may appropriately move the displayed allocation rectangle on the image display part by touching on an edge of the rectangle with the touch pen 4 and by sliding, on the screen, the touch pen 4 touched on the edge. As a result of sliding the touch pen 4 in the desired direction, the rectangle has been moved in the desired direction accordingly.

Further, the operator may vary the size of the displayed allocation rectangle by touching a vertex of the rectangle with the touch pen and by sliding the touch pen 4 on the screen. One of the vertexes has a position which follows the movement of the sliding touch pen 4 while the diagonally opposite vertex has a fixed position. Thus, a desired size variation may be achieved.

Step S12: An area on the image buffer memory in the second page memory board 13 is calculated. The area to be calculated is referred to as "output area" and the area corresponds to the position, on the image display part, of the allocation rectangle, which position has been determined in S11. The calculated area position on the buffer memory is then stored in the unshown-in-the-figures memory.

Step S13: The operator may specify the button "transfer" with the touch pen 4. As a result, a size-variation operation is performed on the input area of the image information stored in the buffer memory in the first page memory board 12. Then, the output area of image information stored in the image buffer memory in the second page memory board 13 is replaced by the size-variation-performed image information. Thus, the output area of image information in the buffer memory in the board 13 is renewed by the size-varied image information.

Here, this size variation is as follows. The lengths, in X and Y directions, of the input area in the buffer memory in the board 12 are respectively referred to as X1 and Y1. The lengths, in X and Y directions, of the output area which has been calculated in S12, in the buffer memory in the board 13 are respectively referred to as X2 and Y2. In the size variation operation, the lengths of the input area are respectively multiplied by X2/X1 in the X direction and multiplied by Y2/Y1 in Y the direction so as to obtain the output area.

Step S14: The output area of the image information is then transferred to the memory in the frame memory board 16 via the DMA controller 15 and then displayed on the image display part. This output area of image information has been obtained as a result of the above-mentioned processing and has been then stored in the image buffer memory in the second page memory board 13.

Figure 11:
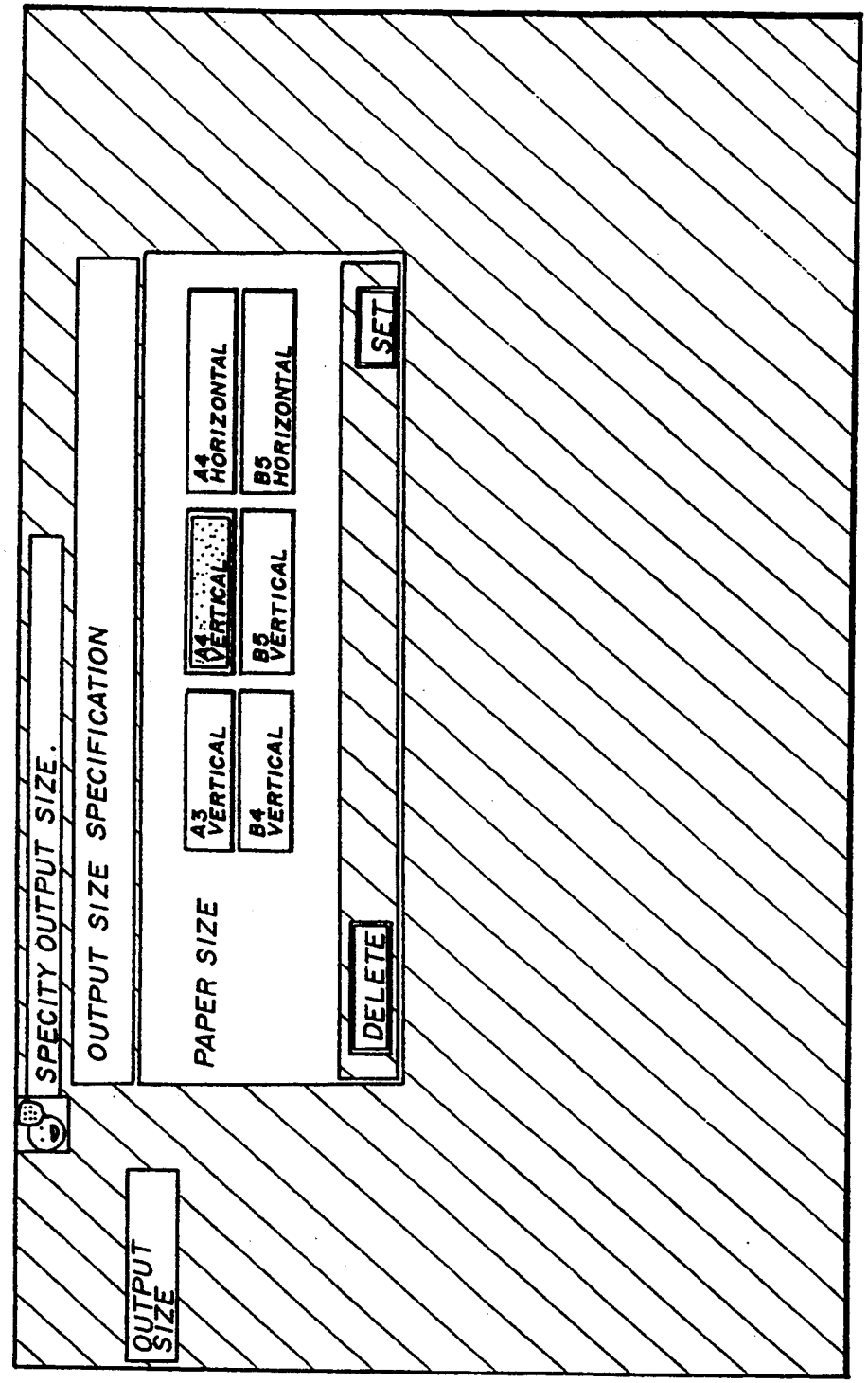

In the example, in response to the specification of the button "output size", the controller 1 then displays as shown in FIG. 11: on the image display part, the output-size-specification submenu; and on the menu page, a message "Specify output size.". Then, the default output size is indicated as "A4 vertical" in its reversed white-on-black state.

The operator may specify any alternative output-size parameter by touching the corresponding button on the screen with the touch pen 4. Then, letters written on the specified button are then reversed to the reversed white-on-black state and letters written on the button corresponding to the default parameter is reversed to be the normal black-on-white state.

Figure 12:
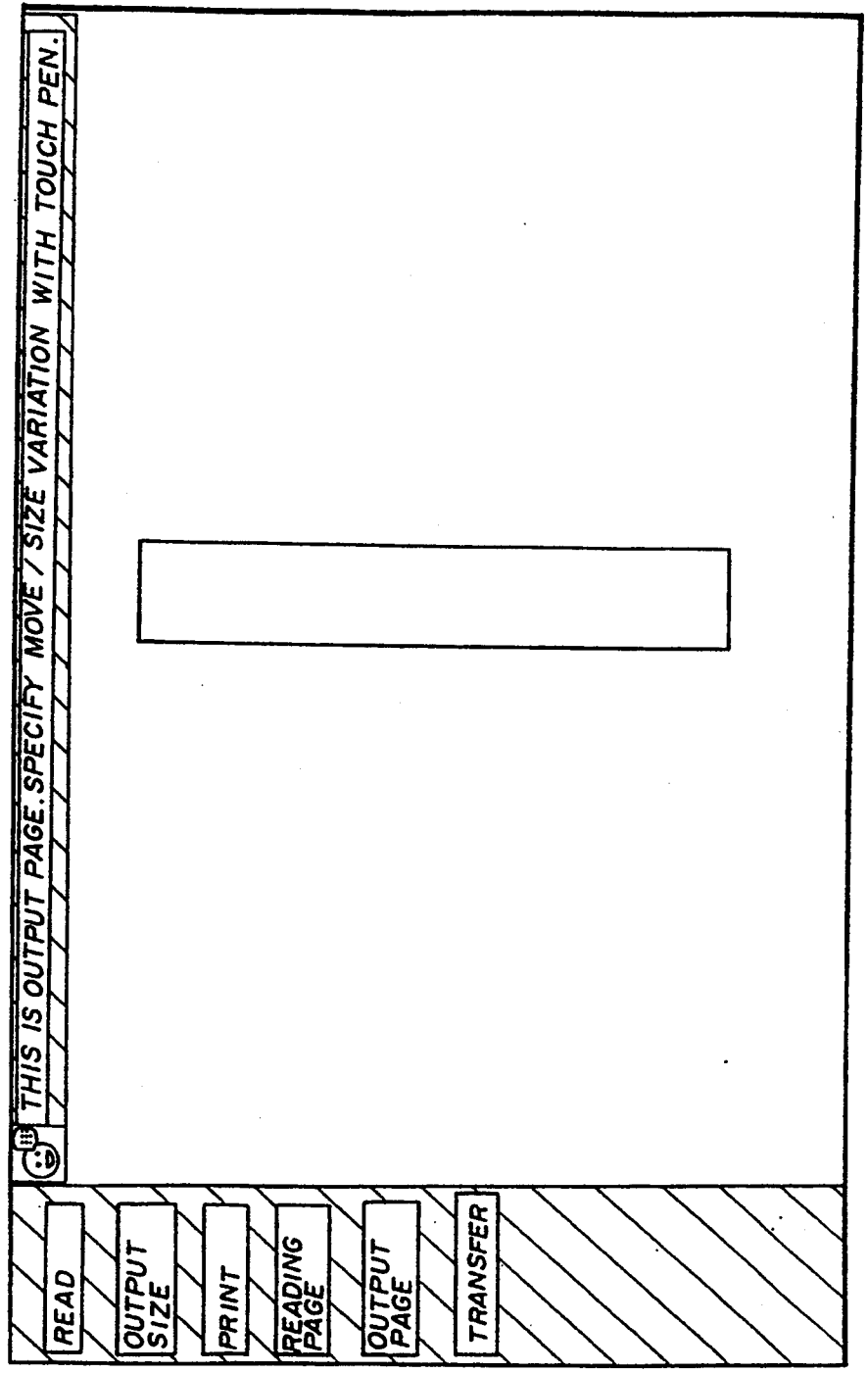
Figure 13:
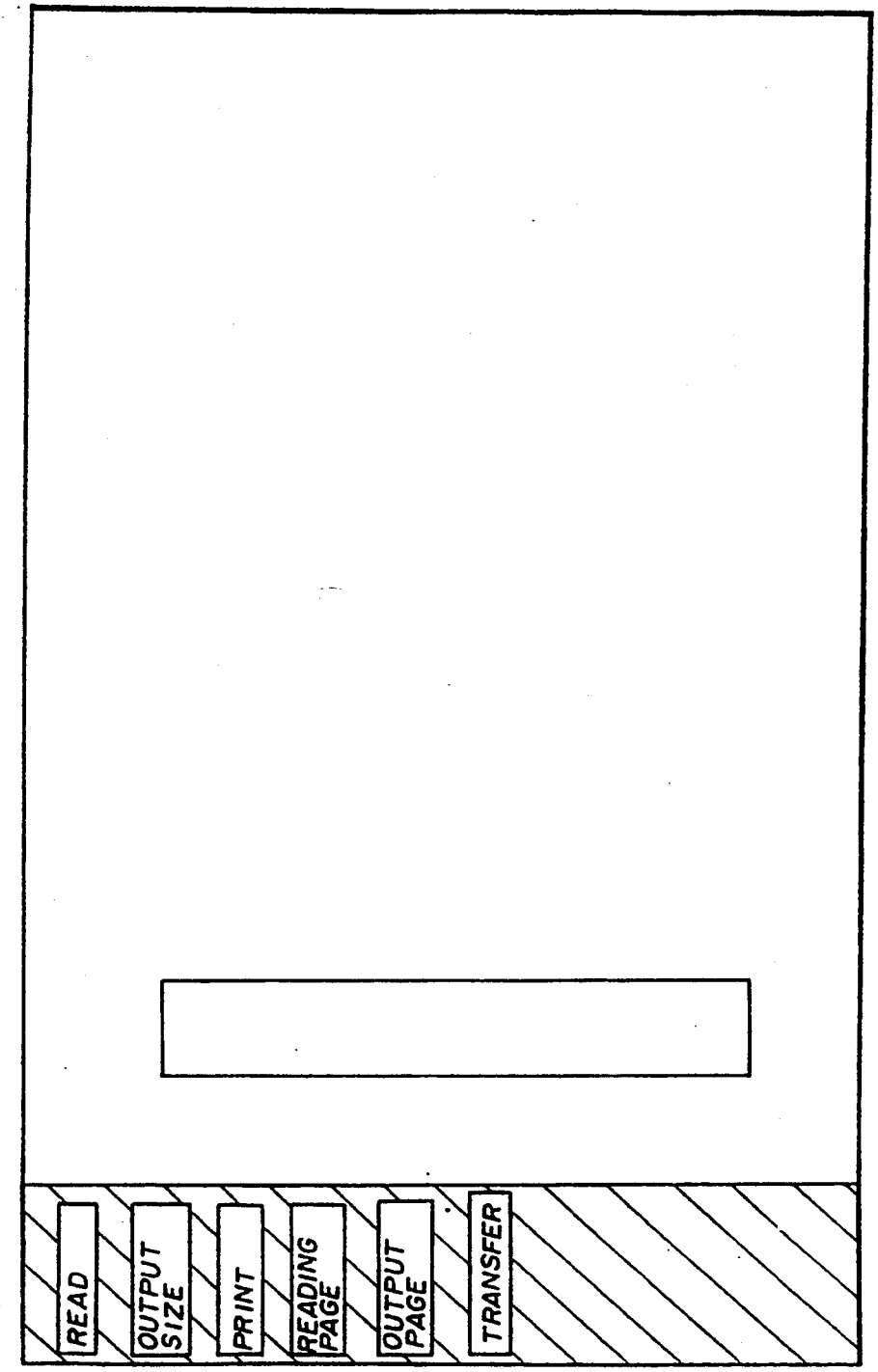

The operator may specify the button "set" of the submenu displayed at the bottom of the submenu. As a result, the controller 1 deletes the output-size-specification submenu from the image display part so as to display blank thereon. Then, the controller 1 converts the size of the rectangle corresponding to the input area previously specified for the input image information corresponding to the image shown in FIG. 4. The controller 1 converts the size of the rectangle to the size corresponding to the specified output size for output image information. As a result of the conversion, the rectangle indicating the input area is displayed as shown in FIG. 12. In this display, the rectangle indicating the input area has been converted into the size corresponding to the specified output size in the actual size. The rectangle indicating the actual size on the final image means that the dimensional relationship between the size of the input image area and the size of the final image is as if the input image area were cut out from the original image represented on, for example, a sheet of paper and the cut part of the sheet of paper were then put on the final image represented on another sheet of paper. This displayed rectangle is displayed on the center of the image displayed part as shown in FIG. 12. This displayed rectangle is referred to as the application default rectangle or the output rectangle. The controller 1 then indicates the message "This is the output page. Specify move/size variation through the touch pen." as shown in FIG. 12.

The operator may move the displayed output rectangle on the image display part by touching on an edge of the rectangle with the touch pen 4 and by sliding, on the screen, the touch pen 4 touched on the edge. As a result sliding the touch pen 4 leftward, the rectangle has been moved leftward accordingly so as to result in the state shown in FIG. 13. Thus, the specified input area of the input image information is allocated in the desired area. The controller 1 stores, in the unshown-in-the-figures memory, the output area on the image buffer memory in the second page memory board 13. This output area corresponds to the area allocated as a result of movement of the output rectangle by sliding the touch pen 4 on the screen.

Then, the operator may specify the button "transfer" with the touch pen 4. As a result, the controller 1 reverses the letters represented on the "transfer" button. Then, the controller 1 extracts the above-mentioned input area of the image information stored in the image buffer memory in the first page memory board 12. Then, the controller 1 writes the extracted image information in the above-mentioned specified output area, by updating the corresponding image information, in the image buffer memory in the second page memory board 13. In this example, the sizes are identical between the input area and the output area because no size variation operation has been performed.

Figure 14:
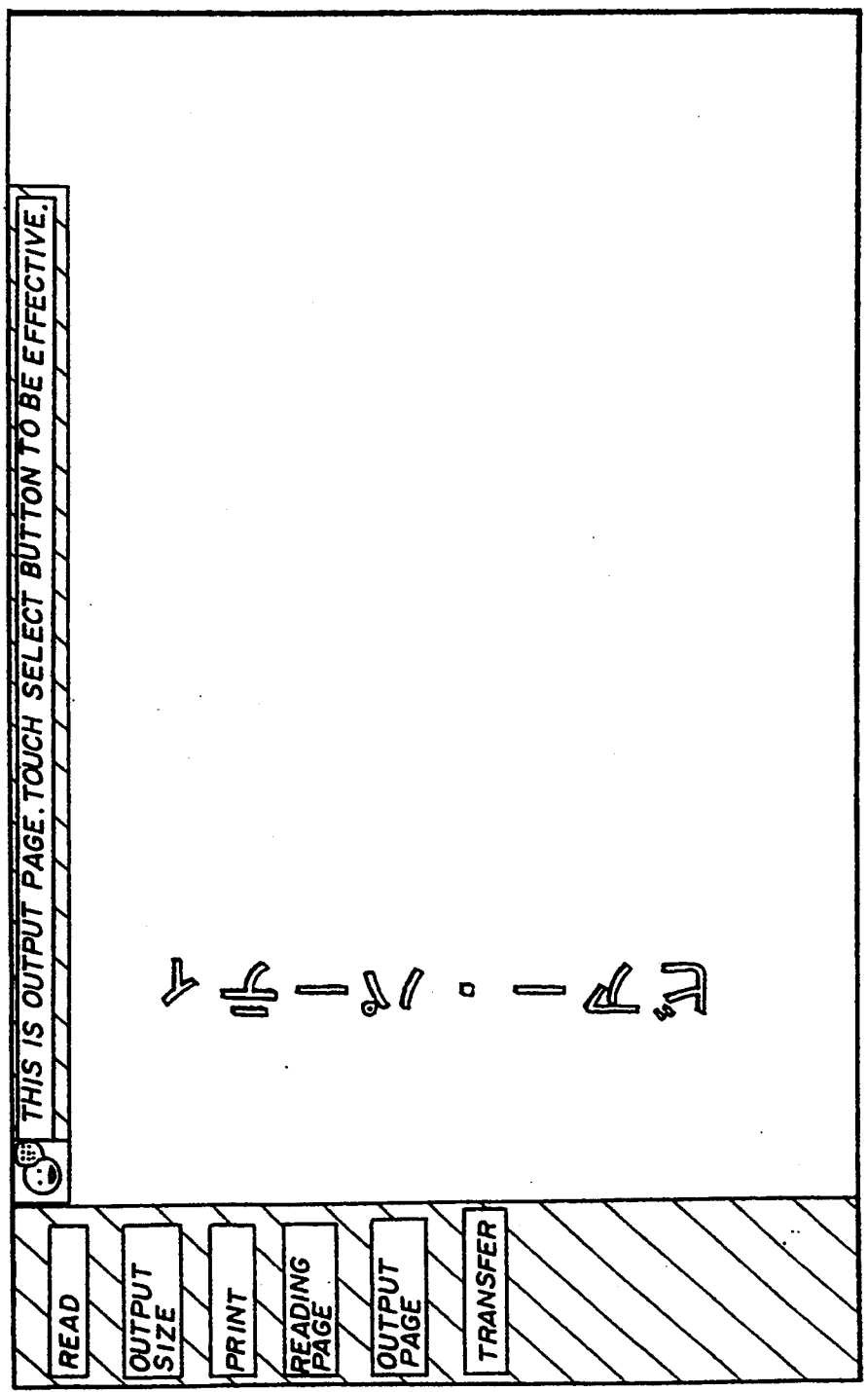

Then, the controller 1 transfers the output area of the output image information written in the image buffer memory in the second page memory board 13 to the memory in the frame memory board 16 via the DMA controller 15. Then, as shown in FIG. 14, the transferred image information is displayed on the image display part. Then, the controller 1 again reverses the letters of the "transfer" button so as to be the normal black-on-white state and the output rectangle displayed on the image display part is deleted. This deleted rectangle has been used for allocating the input area of the image on the output page. Then, the controller 1 displays a message "This is the output page. Touch a select button to be effective. (This phrase or "TOUCH SELECT BUTTON TO BE EFFECTIVE" will mean "Touch a select button to make a selection.", hereinafter and in the drawings)" as shown in FIG. 14.

Step S16: In response to the button "reading page" displayed on the menu page being specified with the touch pen 4, the image information is then transferred to the memory in the frame memory board 16. The transferred image information has been stored in the image buffer memory in the first page memory board 12. This transferring is executed via the DMA controller board 15. The transferred image information is then represented on the image display part in the LCD 3.

Figure 15:
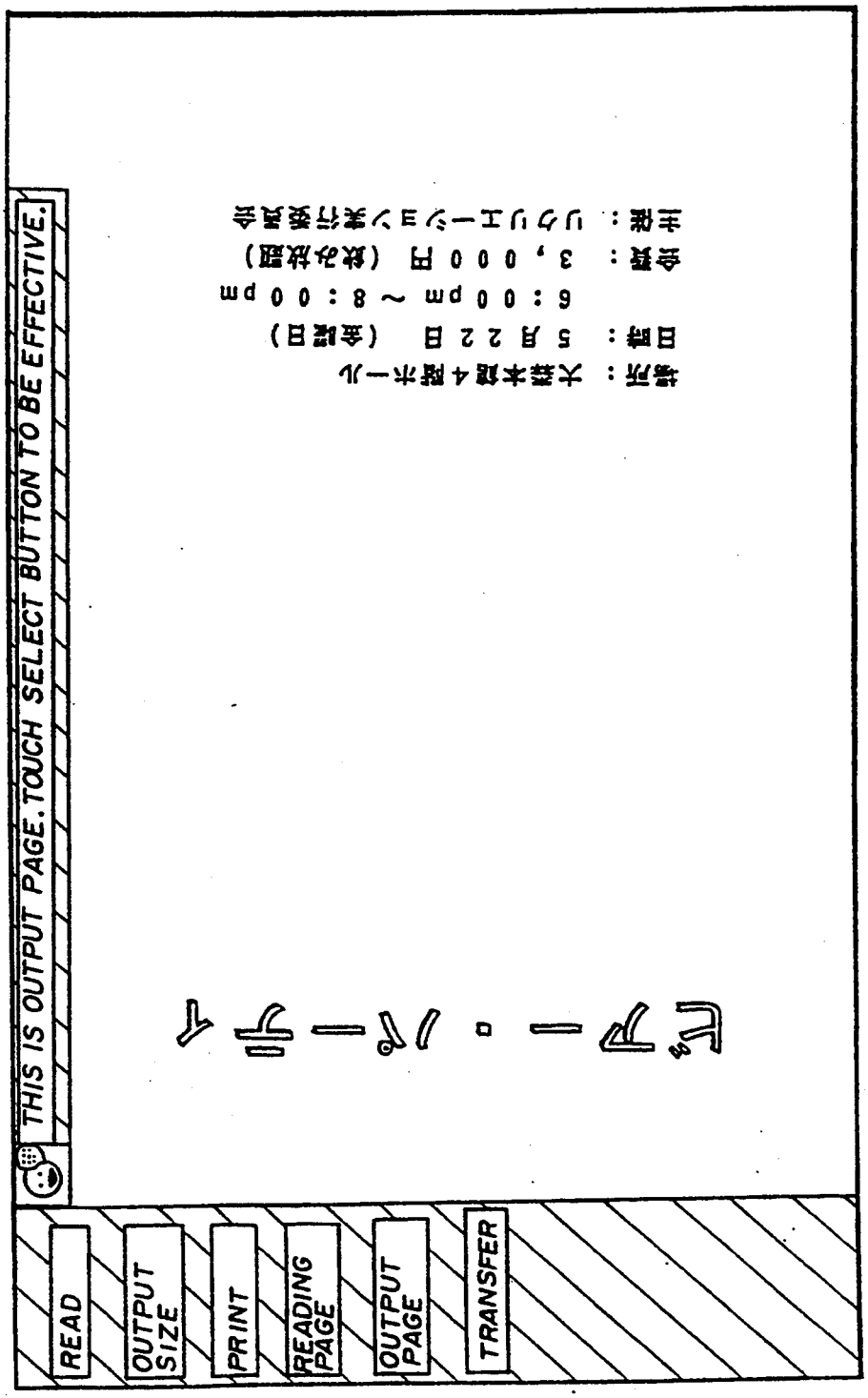

In the example, there may be a case where the above-mentioned extracting of the input area from the input image information shown in FIG. 4 stored in the image buffer memory in the first page memory board 12 has been performed inappropriately. Further, there may be another case where further extracting is needed. In such a case, the operator may specify the button "reading page" with the touch pen 4. Thus, the original image shown in FIG. 4 is then displayed again on the image display part. Then, the operator may again process image information, using the displayed original image, similarly to the above-mentioned processing so as to obtain a desired final image. FIG. 15 shows an example obtained as a result of such processing.

Figure 3:
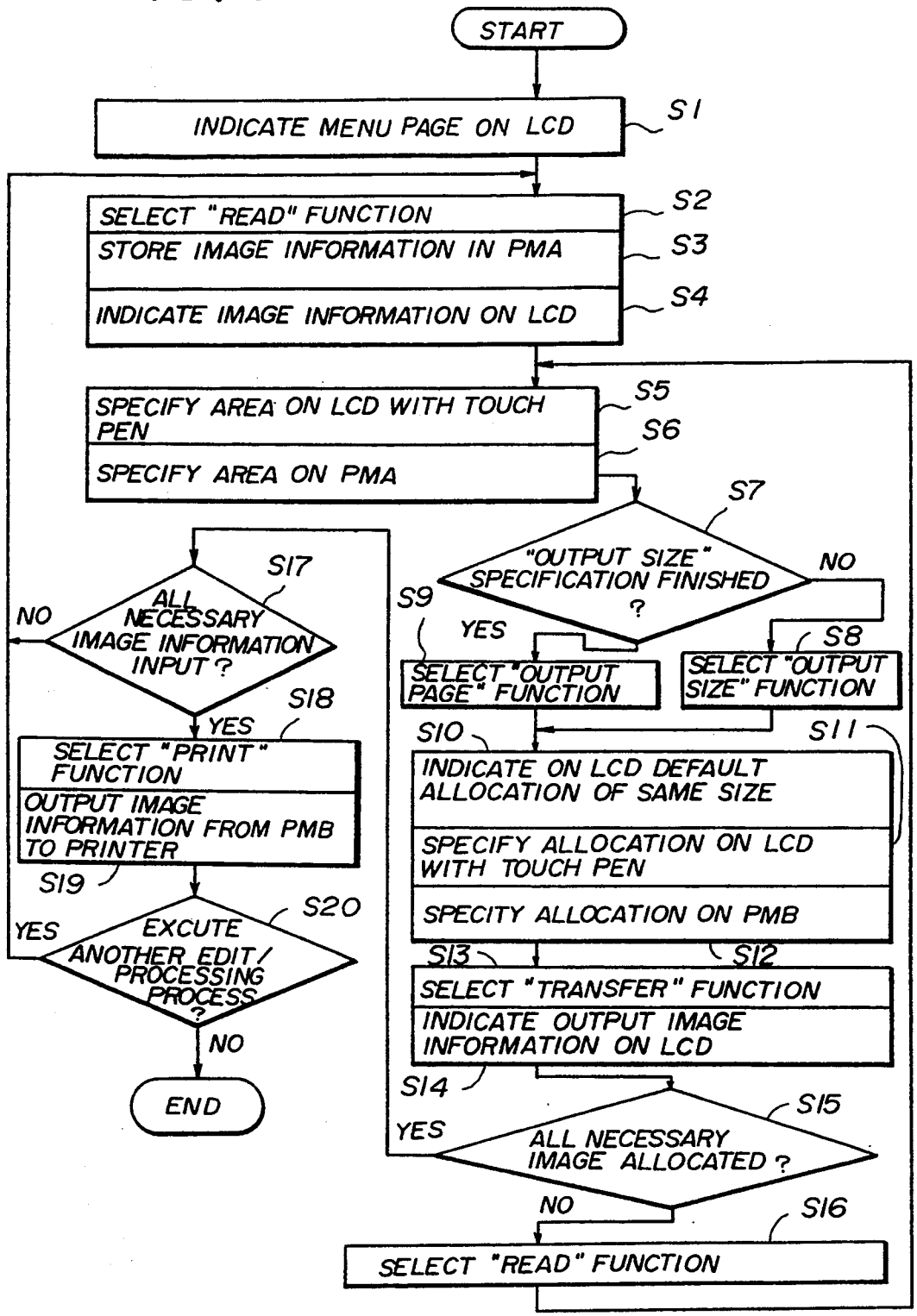
FIG. 3 shows an operation flow chart concerning a process performed by a controller and an operation sequence performed by an operator in the apparatus shown in FIG. 2.
Figure 5:
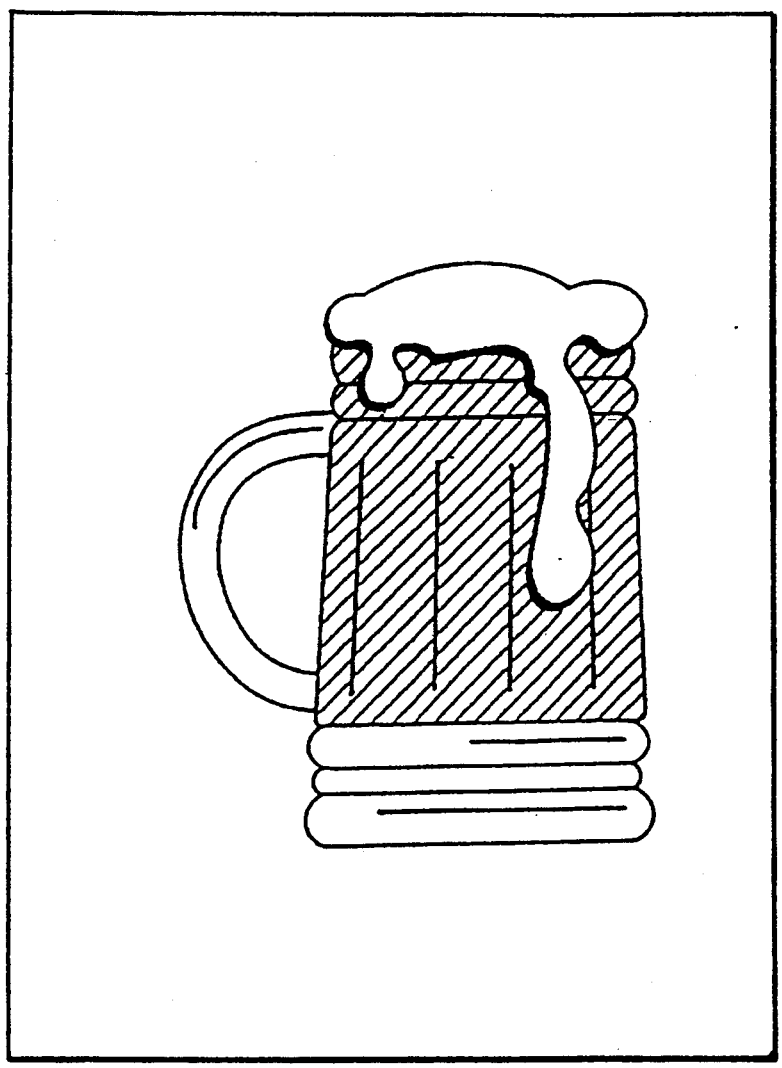
FIG. 5 shows another example of an original image to be processed in the apparatus shown in FIG. 2.

The operator then has to perform a determination in S17 shown in FIG. 3. However, before the determination, the original image, which has a B5 vertical size and is shown in FIG. 5, is to be processed. Then, the operator has to set the draft of this original image in the scanner 2. Then, the operator has to specify the button "read" in the menu page. As a result, the controller 1 displays the reading-specification submenu on the image display part as shown in FIG. 8.

Figure 16:
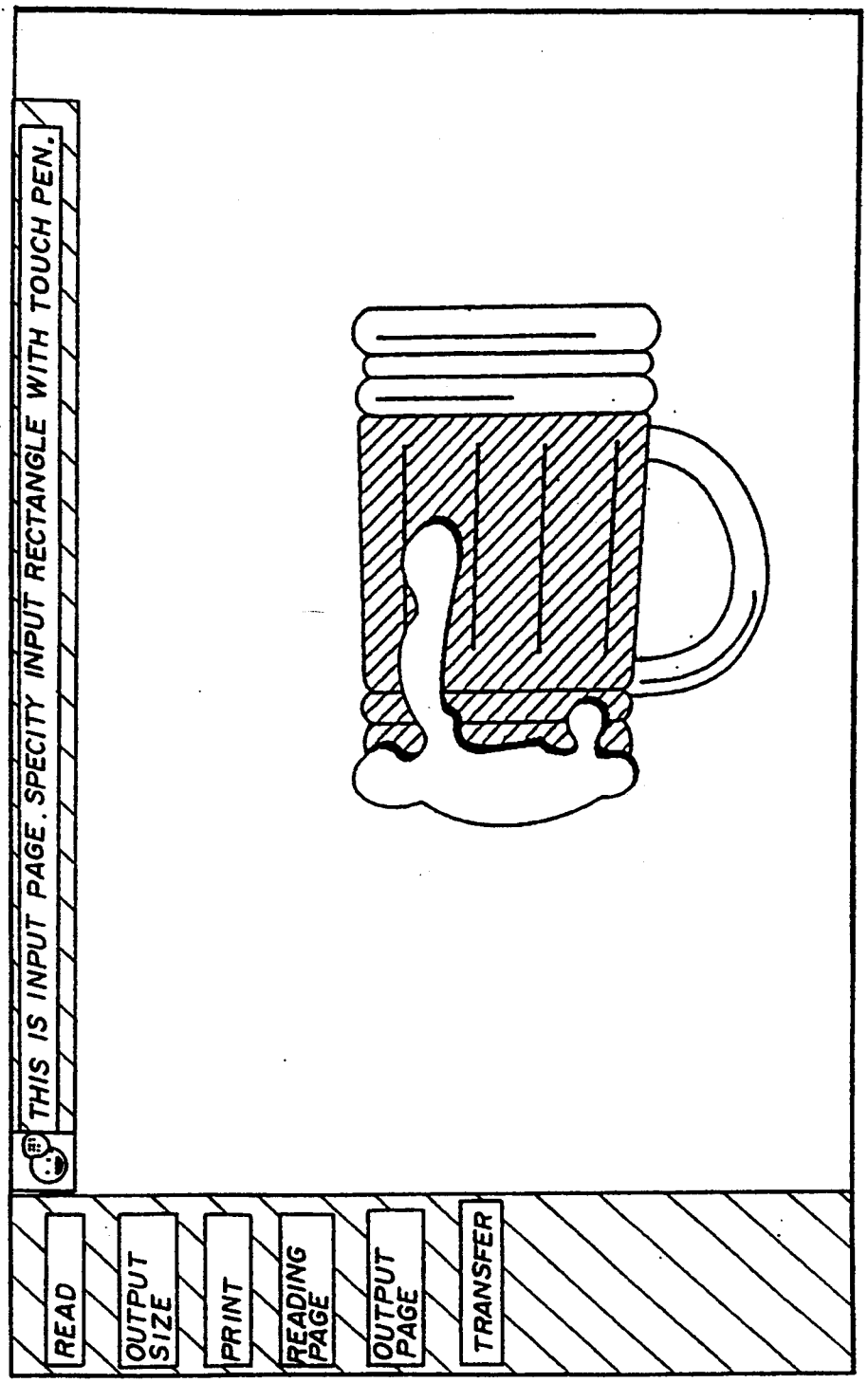

After specifying all parameters associated with the reading-specification submenu, the operator may specify the button "set" displayed at the bottom of the submenu. As a result, the controller 1 then deletes the reading-specification submenu. Then, the controller 1 makes the scanner 2 start reading the set draft. The controller 1 then receives the corresponding image information from the scanner 2. The controller 1 then writes the received image information into the image buffer memory in the first page memory board 12. Then, the controller 1 transfers the stored image information to the memory in the frame memory board 16 via the DMA controller 15. Subsequently, the transferred image information is represented on the image display part as shown in FIG. 16. The message "This is input page. Specify an input rectangle with the touch pen." is simultaneously displayed on the menu page.

Figure 17:
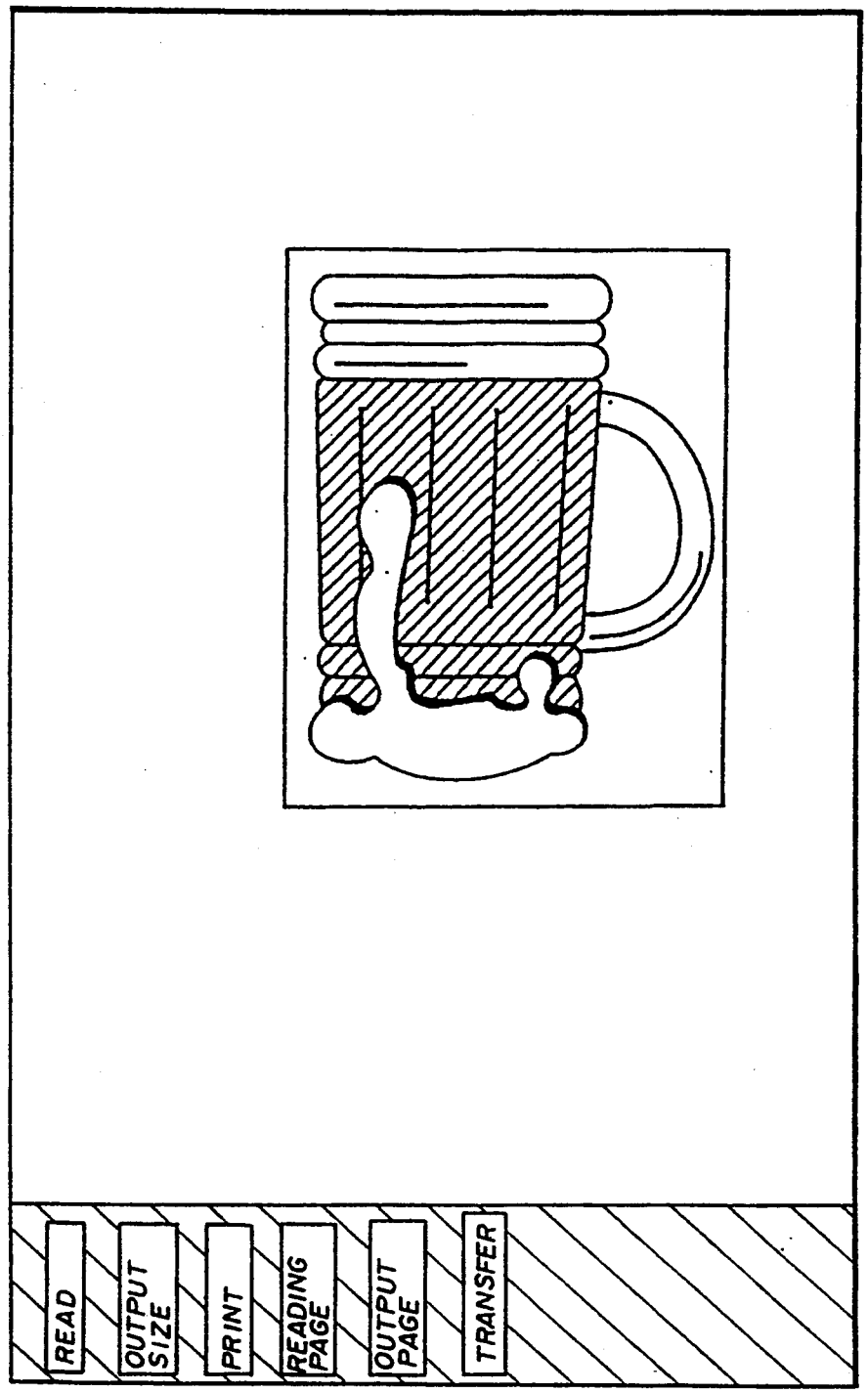

The operator may then specify, as shown in FIG. 17, an input area in the represented image, which input area of the image is to be extracted from the image so as to be allocated in a final image. As a result, the controller 1 stores, in the unshown-in-the-figures memory, an input area included in the image information which has been stored in the image buffer memory in the first page memory board 12. The stored input area corresponds to the specified input area of the image, which specified input area is shown as the rectangle shown in FIG. 17.

Figure 18:
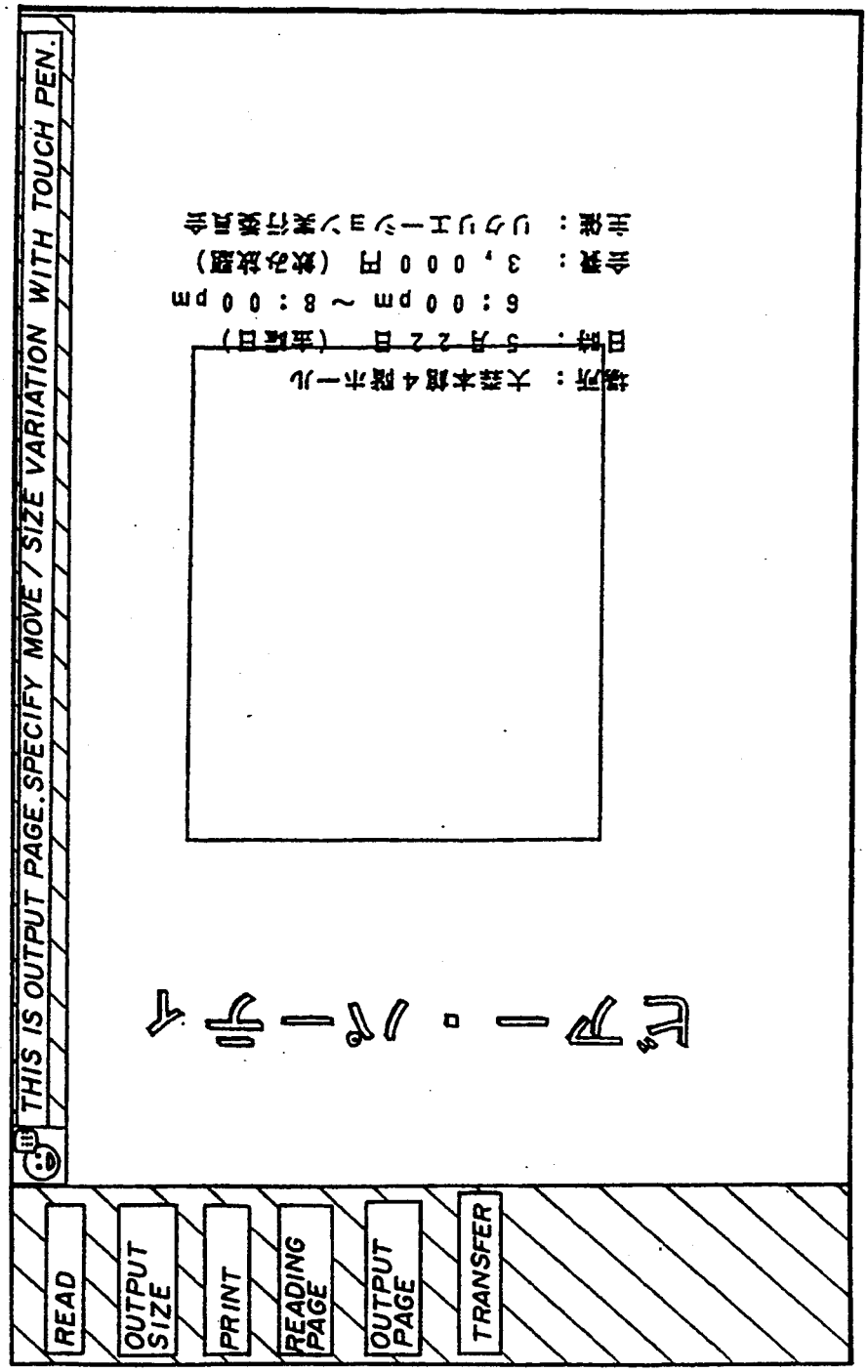

Then, the operator may specify the button "output page" displayed in the menu page. As a result, the controller displays, on the image display part, as shown in FIG. 18, the output image information stored in the image buffer memory in the second page memory board 13. Simultaneously, the controller 1 displays a rectangle on this displayed image as shown in FIG. 18. The displayed rectangle corresponds to the rectangle indicating the above-mentioned specified input area. In this display, the controller 1 previously has converted the size of the rectangle so that the input area is displayed in the output image with the actual size, such as mentioned above, of the input area in the output image. Further, this display is performed in the center of the image display part as shown in FIG. 18. This displayed rectangle is referred to as a default rectangle for allocation. Further, simultaneously, the message "This is output page. Specify move/size variation with the touch pen." is displayed in the menu page.

Figure 19:
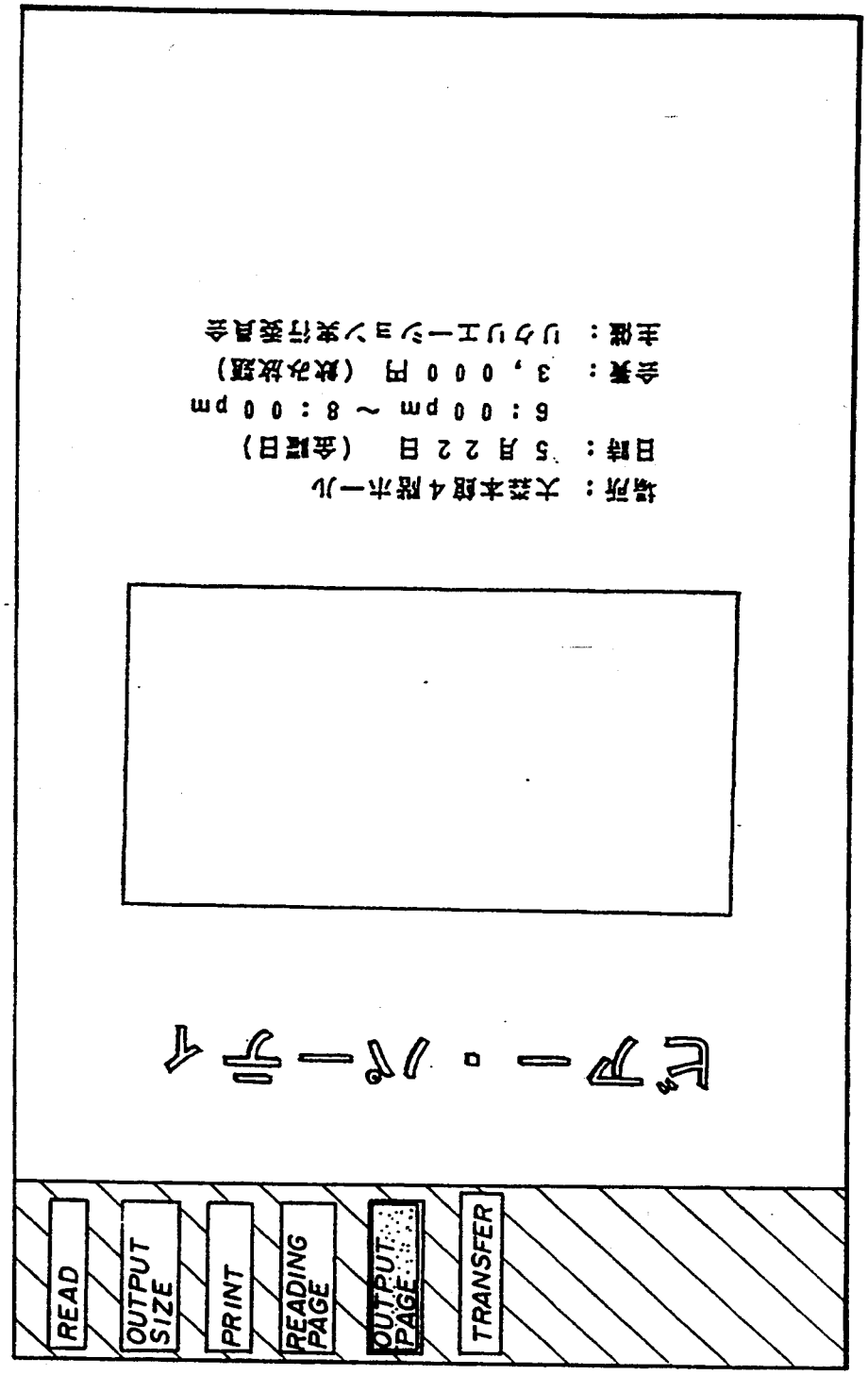

Then, as described above, the operator may desirably move and/or vary the size of the displayed rectangle. In this size variation, the vertical and horizontal sizes of the rectangle may be respectively individually varied. As a result of such operations, the allocation of the rectangle, shown in FIG. 19, may be achieved. Then, the controller 1 correspondingly stores, in the un-shown-in-the-figures memory, an output area included in the image information stored in the image buffer memory in the second page memory board 13. This output area to be stored corresponds to the allocated area with the rectangle as shown in FIG. 19.

Then, the operator may specify the button "transfer" with the touch pen 4. As a result, as mentioned above, the controller 1 reverses the lettering of "transfer" and then varies the size of the input area of image information stored in the image buffer memory of the first page memory board 12. In this size variation, the size in the X-direction is multiplied by X2/X1 while the size in the Y-direction is multiplied by Y2/Y1. Then, the controller 1 replaces the output area of the image information stored the image buffer memory in the second page memory board 13 by this size-converted area of input image information. Thus, the output area of the image information in the image buffer memory in the board 13 is updated.

Figure 20:
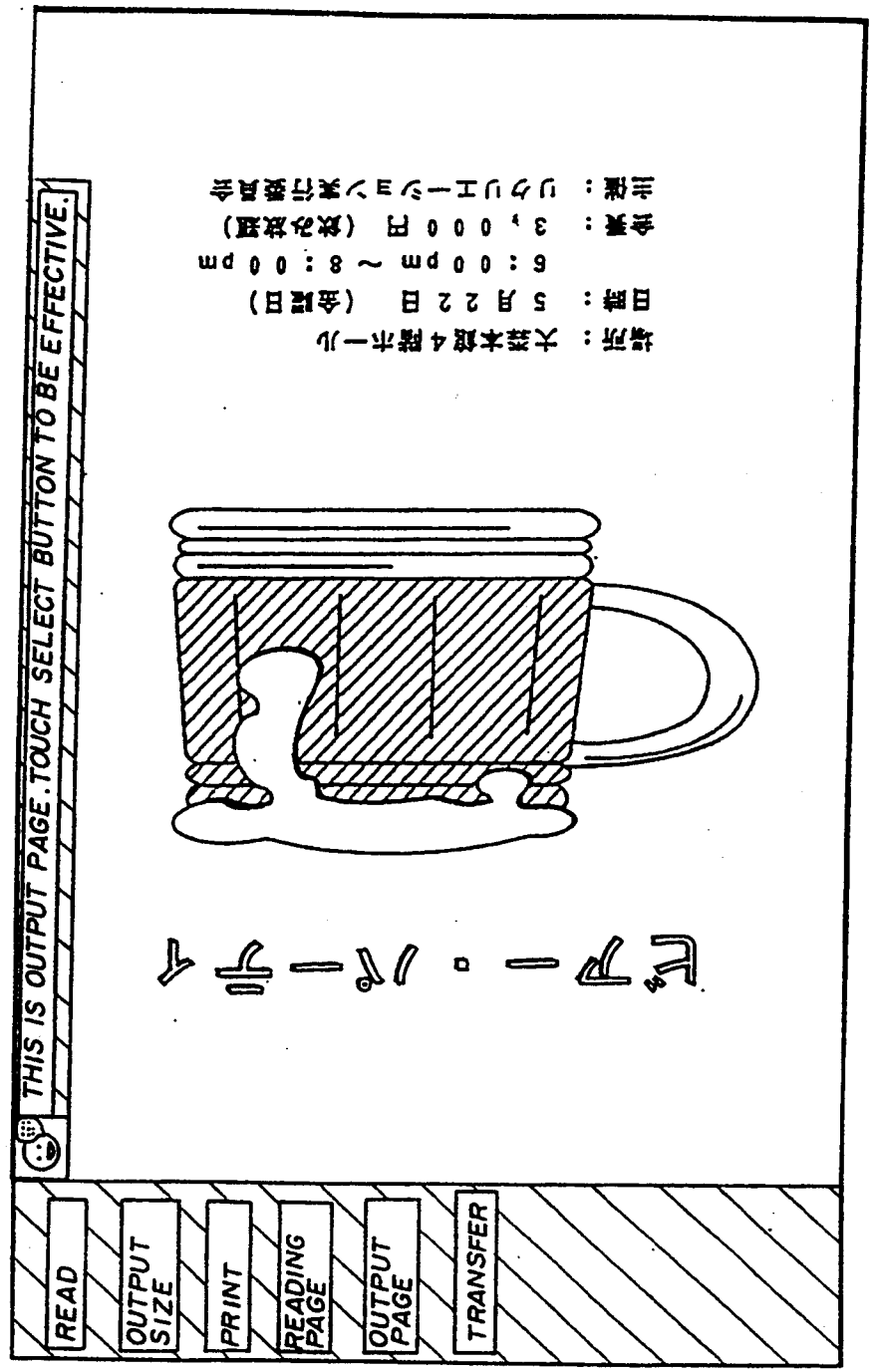
Figure 21:
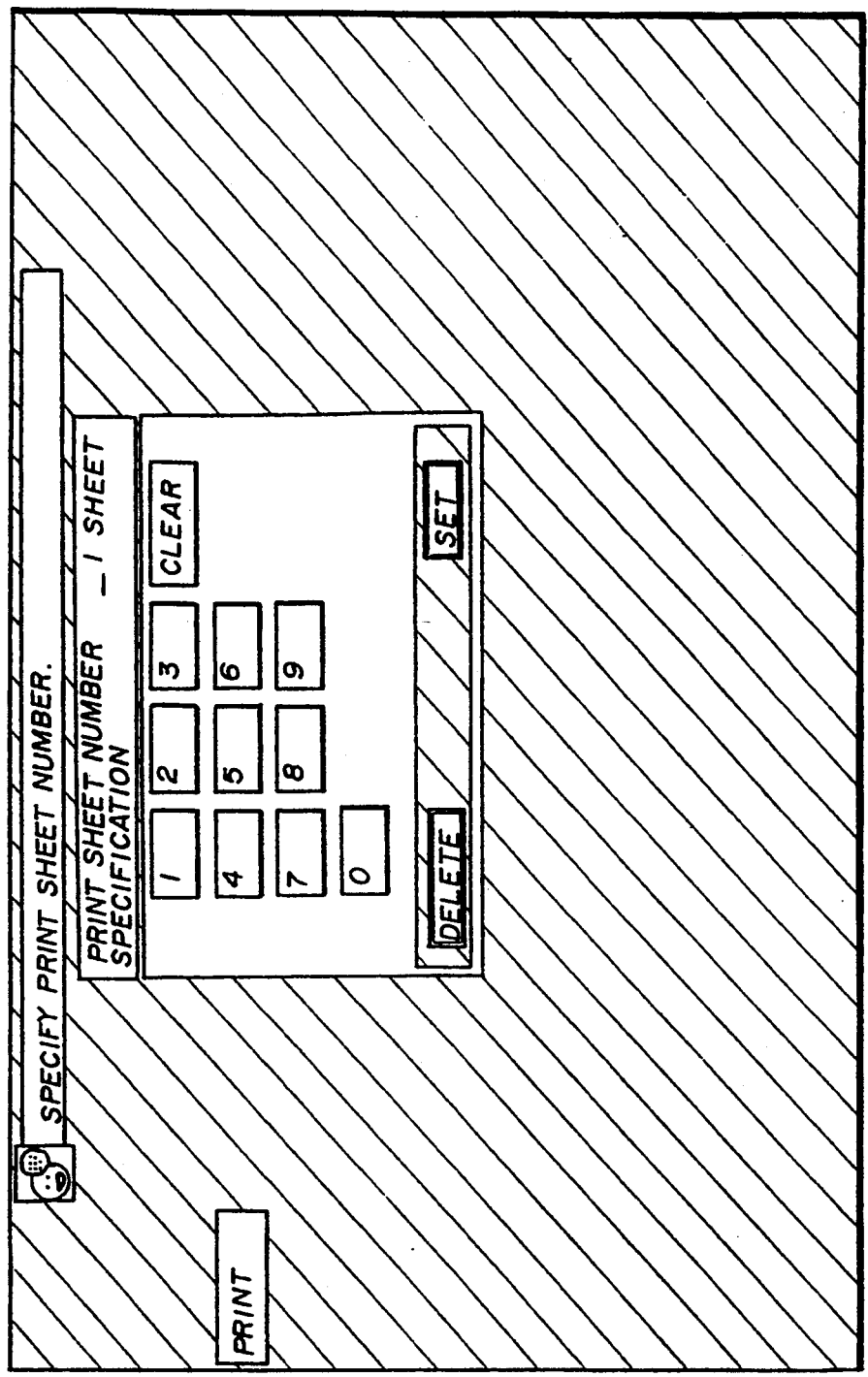

The image information including this updated part, stored in the image buffer memory in the board 13 is then transferred to the memory in the frame memory board 16 via the DMA controller 15. Then the transferred image information is represented on the image display part as shown in FIG. 20. In this display, the input area of image information in the specified allocation is represented as shown in FIG. 20. Thus, the two parts respectively extracted from the two original images have been combined. Then, the reversed white-on-black state of the letters of "transfer" is reversed again so as to be the normal black-on-white state. Further, the display of the allocation rectangle is deleted. Further, a message "This is an output page. Touch a select button to be effective." is displayed as shown in FIG. 20.

Step S18: In response to the button "print" displayed in the menu page being specified with the touch pen 4, another submenu is then displayed in the image display part. This other submenu is for performing a print specification. According to the submenu, then after specifying how many copies are to be obtained of the final image, the operator may specify the button "set" As a result, the printer 5 is initiated. Further, the image information stored in the image buffer memory of the second page memory board 13 is then represented on the image display part of the LCD 3.

Step S19: The output image information stored in the image buffer memory in the board 13 is then provided to the printer 5 via the scanner printer interface (SP-I/F) 14. As a result, the output image information stored in the buffer memory is obtained as the corresponding hard copy.

In the example, there may be a case where the above-mentioned extracting of the input area from the input image information shown in FIG. 5 stored in the image buffer memory in the first page memory board 12 has been performed inappropriately. Further, there may be another case where further extracting is needed. In such a case, the operator may specify the button "reading page" with the touch pen 4. Thus, the original image shown in FIG. 5 is then displayed again on the image display part. Then, the operator may again process image information, using the displayed original image, similarly to the above-mentioned processing so as to obtain a desired final image.

As a result the above-mentioned image processing using the two original images read, after a desired final image has been obtained, the operator may specify the button "print". Further, the operator may specify how many copies are needed according to then-displayed print-specification submenu. In this submenu, a message "Specify printing number" is also displayed.

In this submenu, a default printing number has been preset as "one sheet". The operator may reset a desired alternative printing number and then may specify the button "set". As a result, the controller 1 transfers the image information stored in the image buffer memory in the board 13 to the printer 5. Thus, the specified printing number of hard copies of the final images, which have been obtained as a result of the above-mentioned image processing, are obtained in the specified output size. The image processing includes combination of the two original images read.

Figure 6:
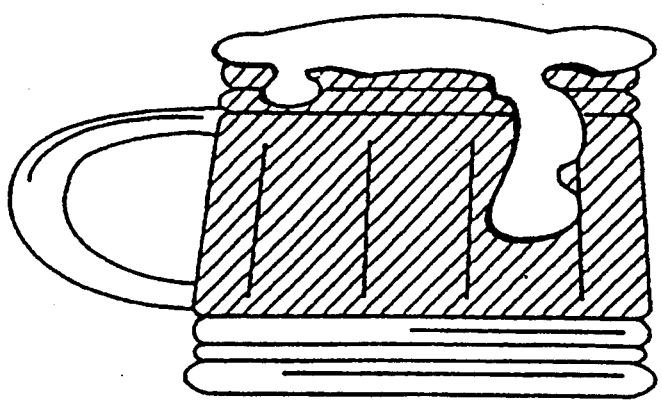
FIG. 6 shows an example of a finished image realized as a result of printing out thereof as a result of processing the original images shown in FIGS. 4 and 5 in the apparatus shown in FIG. 2.

As a result, the final image shown in FIG. 6 has been obtained. In this example, the final image represented has an A4 vertical size.

Another original image may be also used by processing it together with the final image similarly to the processing mentioned above.

An image processing apparatus according to a second embodiment of the present invention will now be described.

Points in this second embodiment different from the above-mentioned first embodiment exist in the above-mentioned steps S5 and S11. In S5, an area is set with the touch pen 4 while in S11, an allocation is set.

Figure 22:
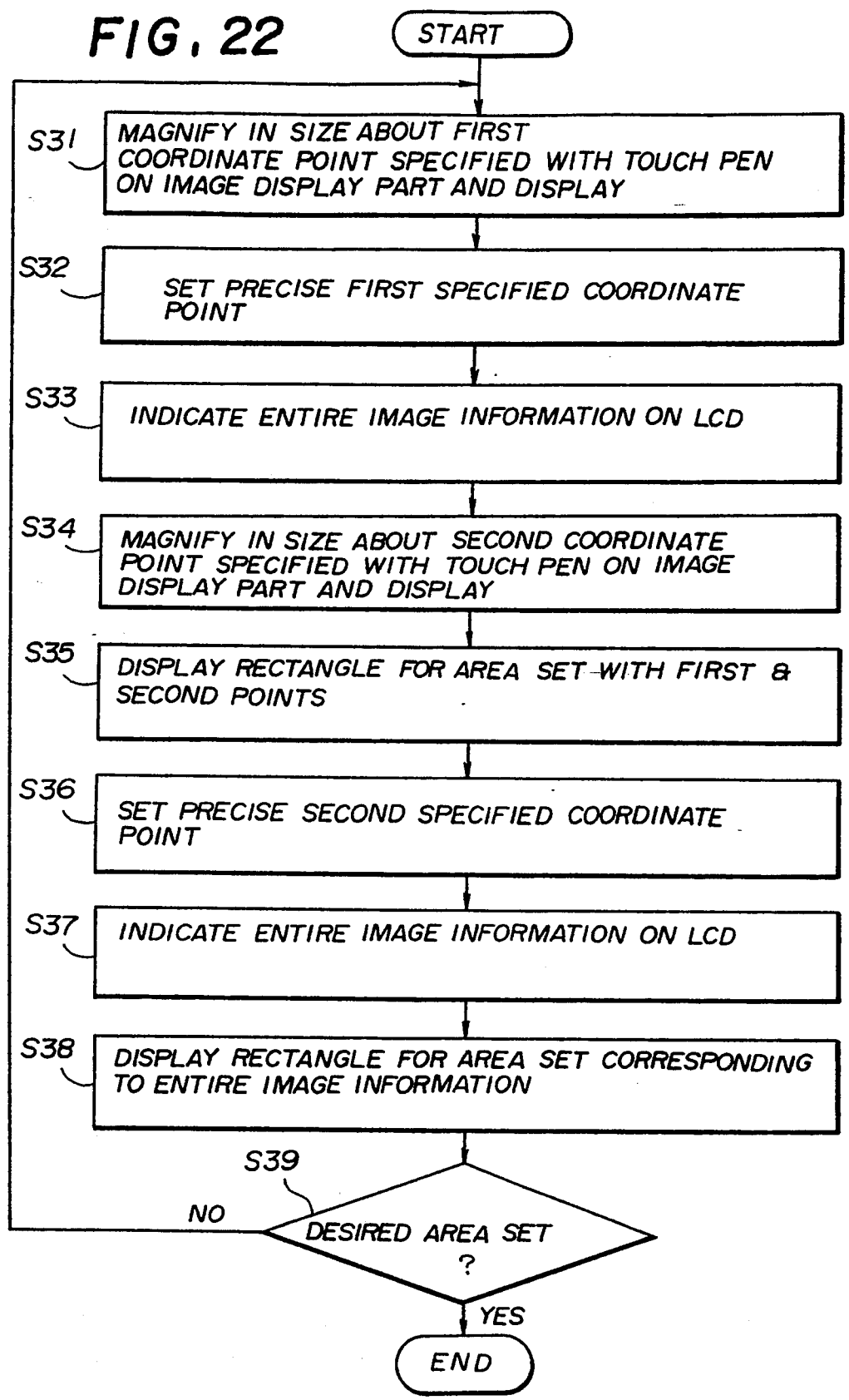
FIG. 22 shows an operation flow chart concerning a process performed by a controller and an operation sequence performed by an operator in a case where area setting is performed by means of a touch pen to be touched on a liquid crystal display (it will be abbreviated as LCD hereinafter) tablet in the image processing apparatus according to a second embodiment of the present invention.
Figure 24:
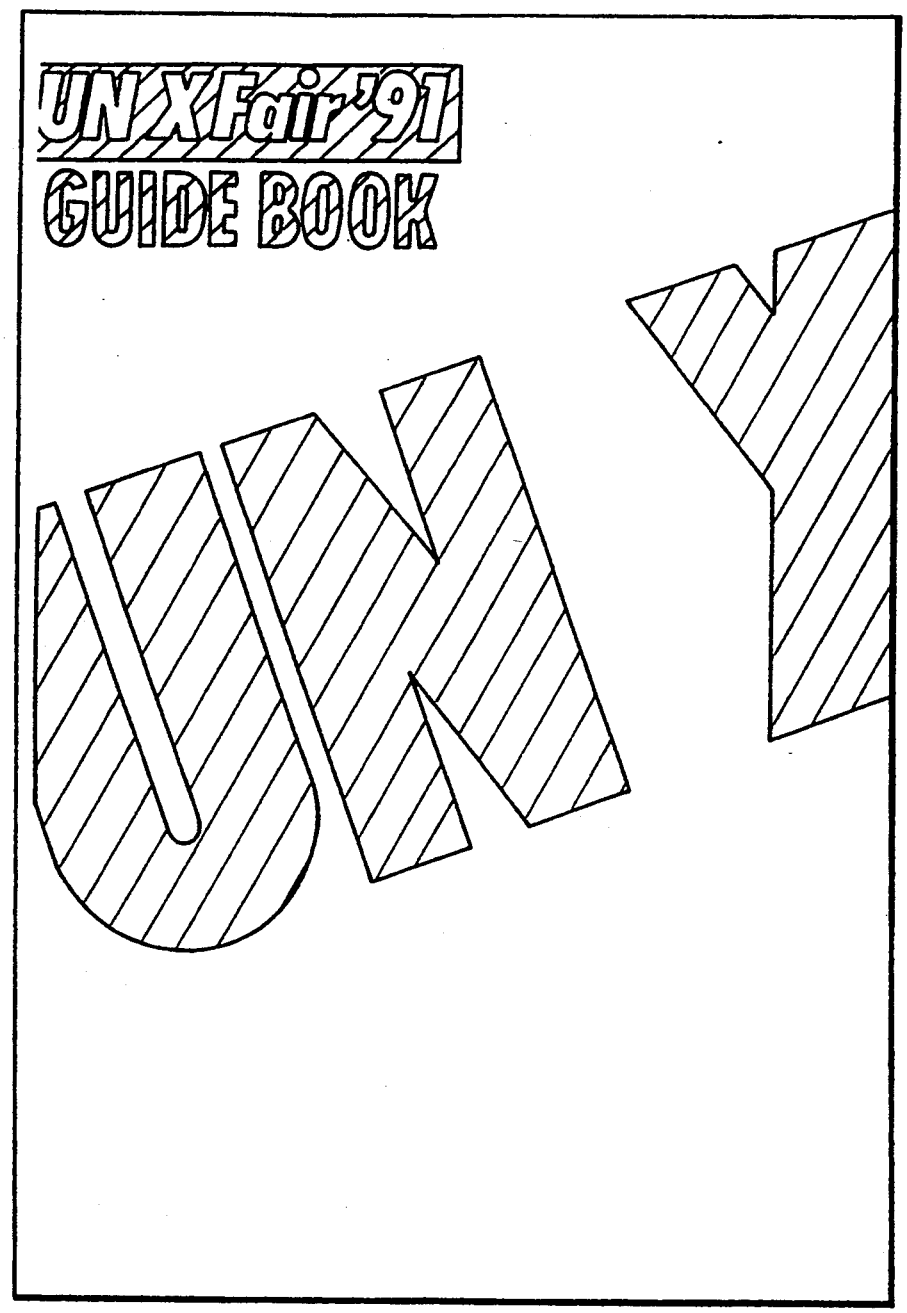
FIG. 24 shows another example of an original image to be processed in the apparatus according to the second embodiment of the present invention.
Figure 25:
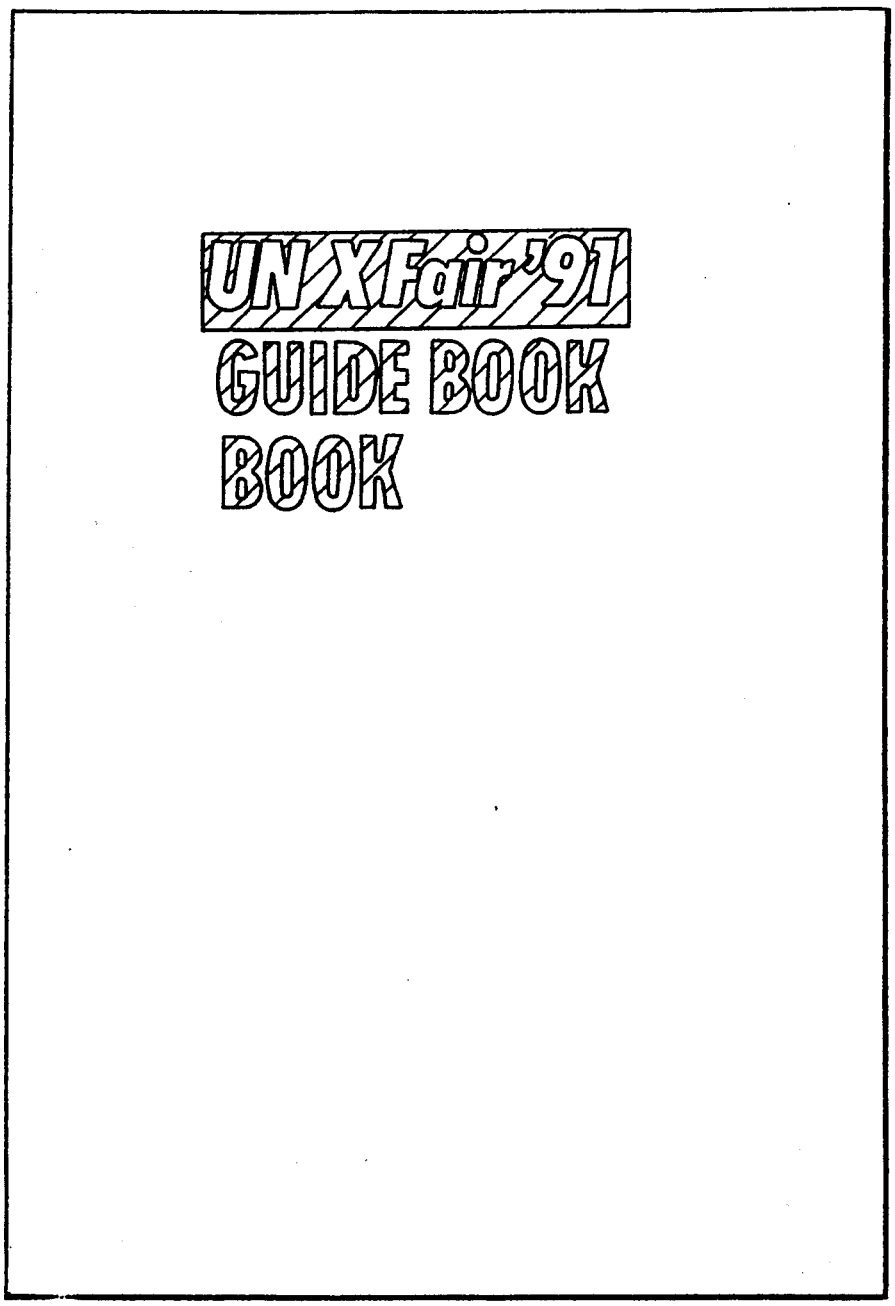
FIG. 25 shows another example of a finished image realized as a result of printing out thereof as a result of processing the original images shown in FIGS. 24 in the apparatus according to the second embodiment of the present invention.

A process executed by the controller 1 and a sequence of operations executed by an operator in the second embodiment will now be described with reference to FIG. 22. An area is set with the touch pen 4 in the process. Descriptions for corresponding operations in one example will be also described alternately, with the descriptions for the steps, with reference to FIGS. 26 to 29. In this example, the final image shown in FIG. 25 is to be obtained from the original image shown in FIG. 24 having a B5 vertical size.

Step S31: The operator may touch, with touch pen 4, a point, as a first point, in the input image, all of which image is displayed on the image display part of the LCD 3. The first point where the operator has to touch is a point which the operator specifies as the input area. As a result, the controller 1 magnifies the displayed image so that by the magnification, the first point in the image where the touch pen has been touched has not moved.

In the above-mentioned example, the operator may cause the reading-specification submenu shown in FIG. 8 to be displayed in the image display part by specifying the button "read" in the menu page displayed on the LCD 3 with the touch pen 4. Then, after the operator has determined all parameters associated with the submenu, the operator may specify the button "set". As a result, the controller 1 initiates the scanner 2 so as to cause the scanner 2 to read the draft representing the original image shown in FIG. 24. Then, after the controller 1 writes all image information representing the read image in the image buffer memory in the first page memory board 12, the controller 1 transfers the written image information to the memory in the frame memory board 16 via the DMA controller 15. Then, the controller 1 displays the image on the image display part of the LCD 3 as shown in FIG. 26.

Figure 26:
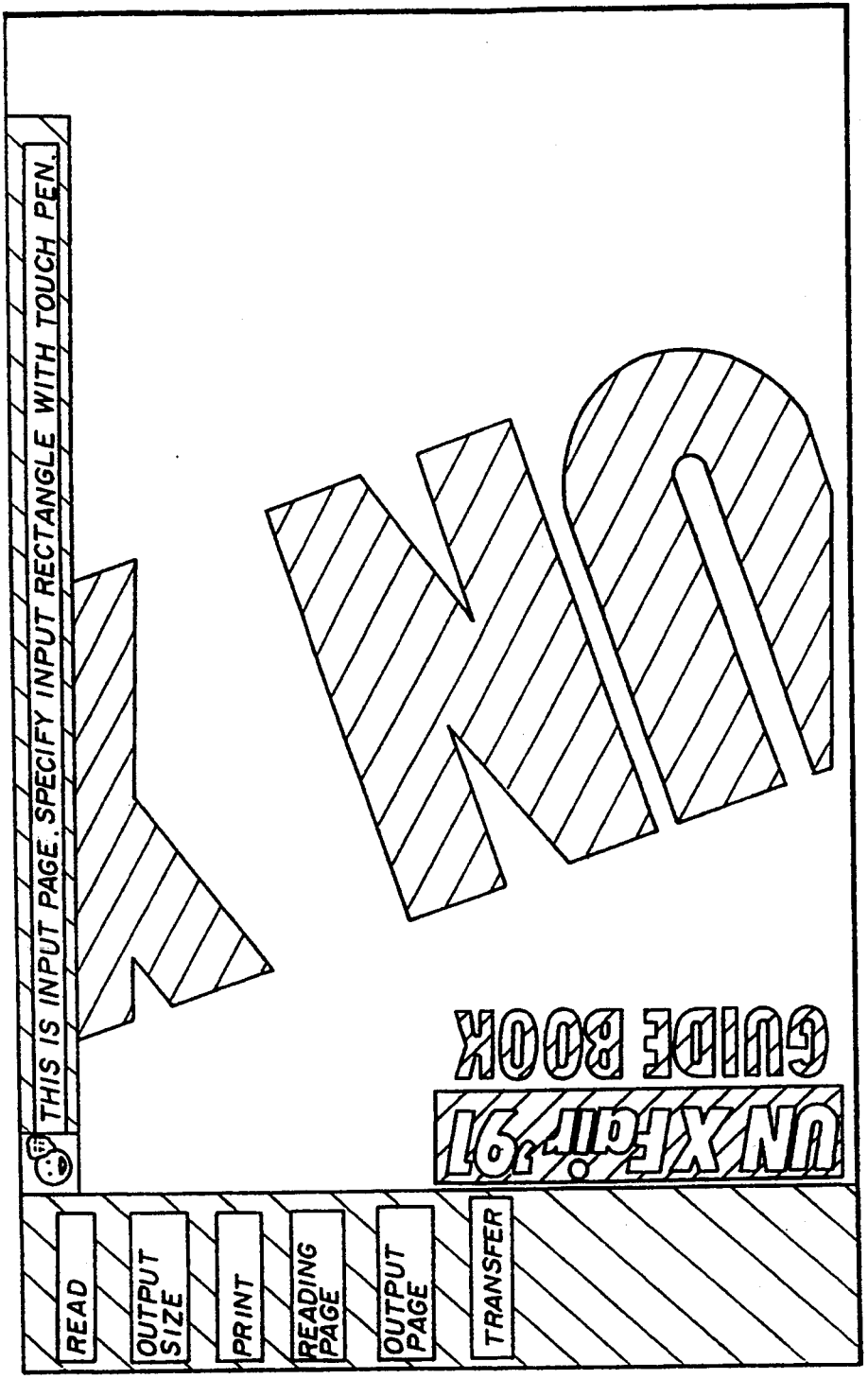
FIGS. 26 to 34 show other examples of the menu pages and the image display parts respectively used in the process in which the finished image shown in FIG. 25 is obtained from the original images shown in FIG. 24 in the apparatus according to the second embodiment of the present invention.
Figure 27:
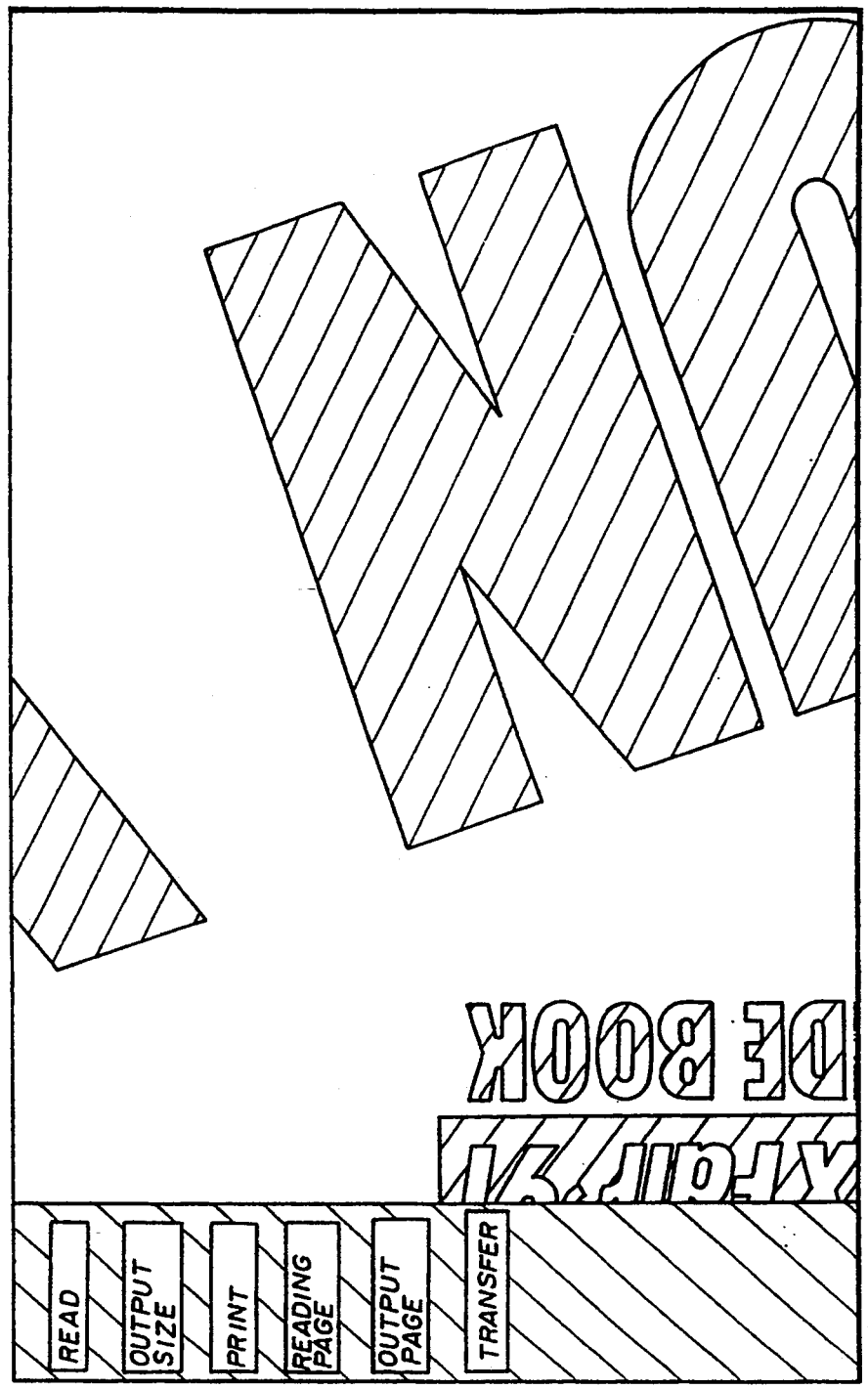

In this example, an area comprising the series of letters "BOOK" in the image shown in FIG. 26 is to be specified as the input area. Then, the operator may touch, with the touch pen 4, a point located at the top-right of the letter "K" of the series of letters "BOOK" on the screen. Thus, the touched point has been specified as a first point. As a result, the controller 1 magnifies the displayed image so that, as mentioned above, the touched first point has not moved as a result of the magnification. The resulting magnified image is shown in FIG. 27.

Step S32: The operator may drag the touch pen 4 on the screen, which displays the magnified image, so as to determine a desired point thereon. The point to be determine is a first point to be used to determine the rectangle to define the input area. After the operator determines the first point, then the operator may remove the touch pen 4 from the screen. As a result, the controller 1 reads as the first point, the point the touch pen 4 was positioned at when it was removed.

Step S33: Then, the controller 1 displays the entire input image on the image display part of the LCD 3 so that the displayed size of the entire image coincides with the entire size of the image display part. This display is the same as the above mentioned display before S31 was performed.

In the example, after the operator has dragged the touch pen 4 on the screen and then removed the touch pen 4 therefrom so as to determine the first point, the controller 1 again displays the entire input image as shown in FIG. 26.

Step S34: Again, the operator may specify a point, as a second point, on the image displayed on the image display part. As a result, the controller 1 magnifies the displayed image so that the specified second point does not move on the image display part during the magnification.

Step S35: The controller 1 displays the rectangle, the vertexes of which include two diagonally opposite vertexes or corners which respectively correspond to the above-specified first point and the currently-specified second point. This displayed rectangle is the above-mentioned rectangle to define the input area. There may be another case, which case is not the case shown in FIG. 28, where the first point is not included in the current magnified image. In this other case, the rectangle is to be partially displayed as if the first point existed out of the image display part.

Figure 28:
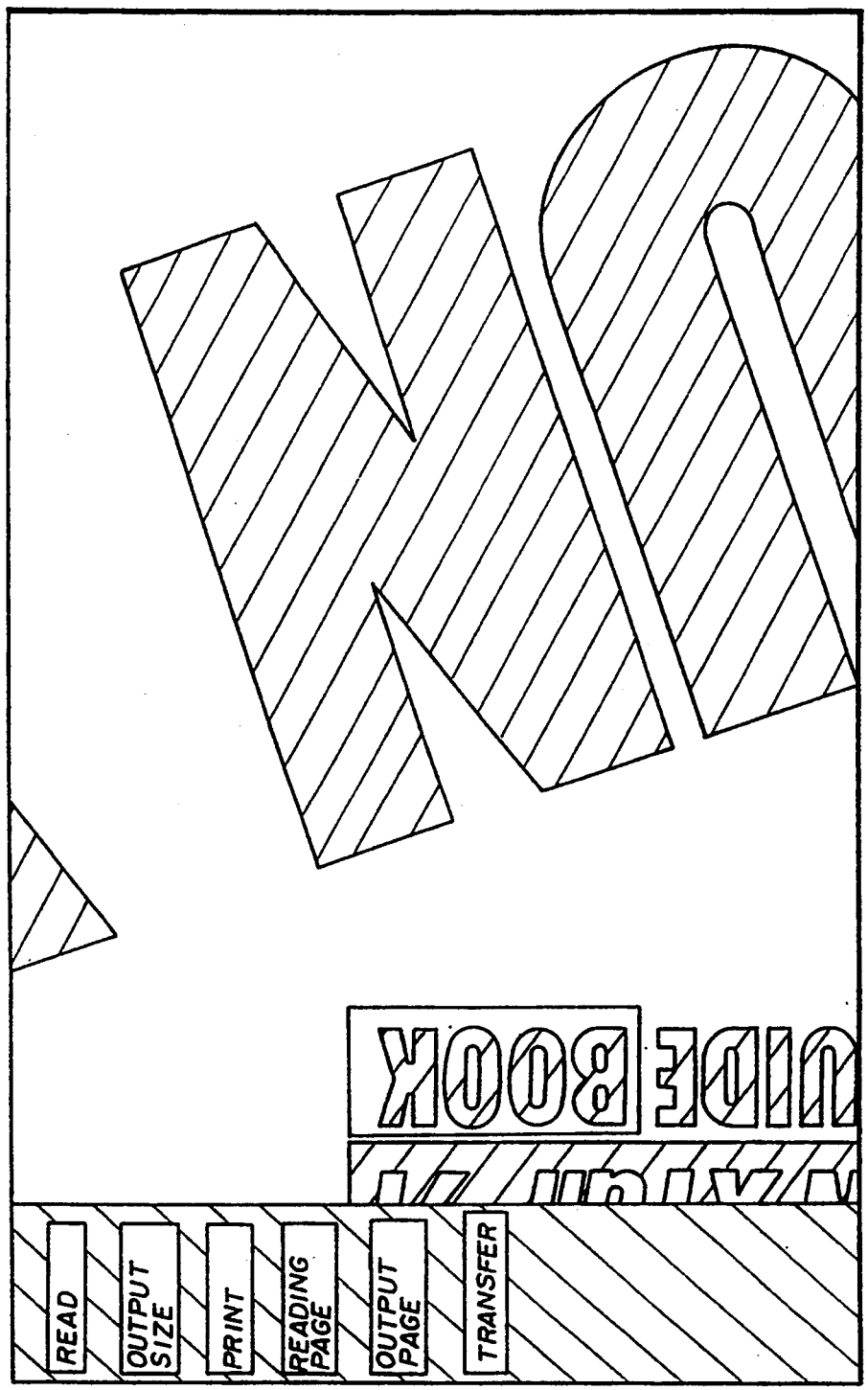

In the example, the operator may touch a point so as to specify it as the second point to be used to determine the rectangle defining the input area. The touched and then specified point is a point located in the bottom-left of the letter "B" of the series of the letters "BOOK". As a result, the controller magnifies the displayed input image with the specified second point having not moved during the magnification. The resulting magnified image is shown in FIG. 28. As shown in FIG. 28, the rectangle is also displayed so as to define the input area comprising the series of letters "BOOK". The vertexes of this rectangle include two diagonally opposite vertexes or corners respectively corresponding to the specified first point and second point.

Step S36: The displayed rectangle may be varied in response to dragging of the touch pen 4 on the displayed image. In this variation, the first point, as the first vertex of the rectangle, is fixed while the second point, as the second vertex of the rectangle follows the dragging touch pen 4. The first and the second vertexes respectively correspond to the diagonally opposite vertexes or corners of the rectangle. As a result of the variation or without such variation, then the second point is fixed by the operator removing the touch pen 4 from the screen. The fixed second point is located where the touch pen 4 existed when the operator removed the touch pen 4. Thus, the operator may determine a desired rectangle as the rectangle defining the input area.

Step S37: Then, the controller 1 displays the entire input image on the image display part of the LCD 3 so that the displayed size of the entire image coincides with the entire size of the image display part. This display is the same as the above mentioned display before S31 was performed.

Step S38: The controller 1 converts the size of the specified rectangle for defining the input area so that the resulting converted size corresponds to the entire input image information. Then, the controller 1 displays the rectangle having a size resulting from the size conversion.

Figure 29:
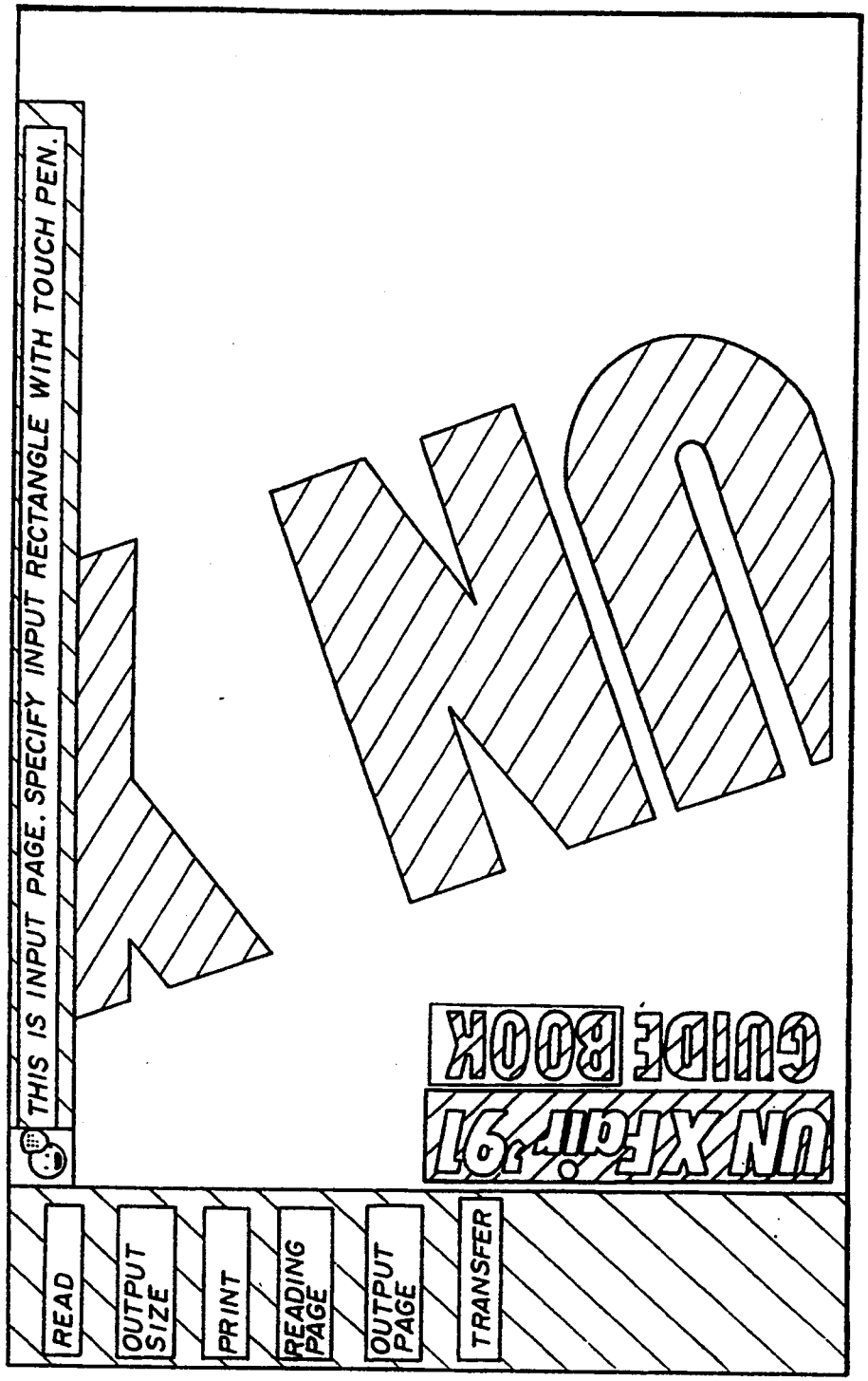

In the example, the operator drags the touch pen 4 on the screen so as to determine the second point of the rectangle and removes the touch pen 4 as mentioned above. As a result, the controller 1 displays, as shown in FIG. 29, the entire input image in the image display part. As shown in FIG. 29, in this display, the rectangle is also displayed. The displayed rectangle corresponds to the displayed input image. Then, the controller i stores, in the unshown-in-the-figures memory, the input area included in the image buffer memory in the second page memory board 12. The stored input area corresponds to the input area which is displayed in the image display part together with the input image.

Figure 23:
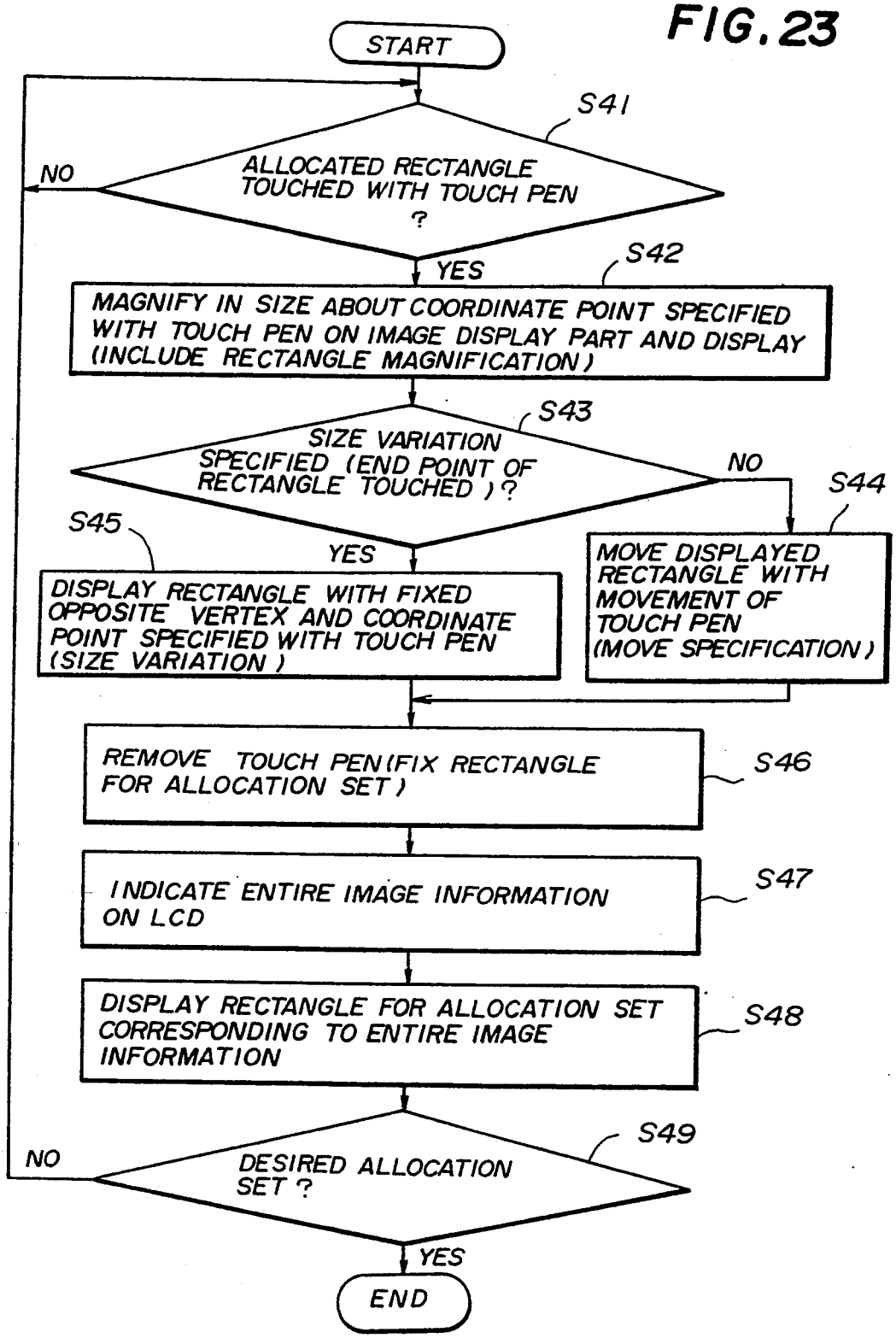
FIG. 23 shows an operation flow chart concerning a process performed by the controller and an operation sequence performed by the operator in a case where allocation setting is performed by means of a touch pen to be touched on a liquid crystal display tablet (it will be abbreviated as LCD hereinafter) in the apparatus according to the second embodiment of the present invention.

Another process executed by the controller 1 and a sequence of operations executed by an operator in the second embodiment will now be described with reference to FIG. 23. An allocation is set with the touch pen 4 in the process. Descriptions for corresponding operations in the above-mentioned example will be also described alternately, with the descriptions for the steps, with reference to FIGS. 30 to 34. In this example, the final image shown in FIG. 25 is to be obtained from the original image shown in FIG. 24 having a B5 vertical size, as mentioned above.

Step S41: If the operator touches the allocation rectangle, which corresponds to the above-mentioned rectangle defining the input area), with the touch pen 4 so as to specify it, the allocation may be moved and/or the size of the allocation may be varied as follows. If the operator does not touch the allocation rectangle, the following steps will not be executed.

Step S42: Then, the controller 1 magnifies the displayed image without movement of the touched point thereon while the magnification. In this magnifying of the display, the allocation rectangle is also magnified by converting coordinates associated with the rectangle.

Figure 30:
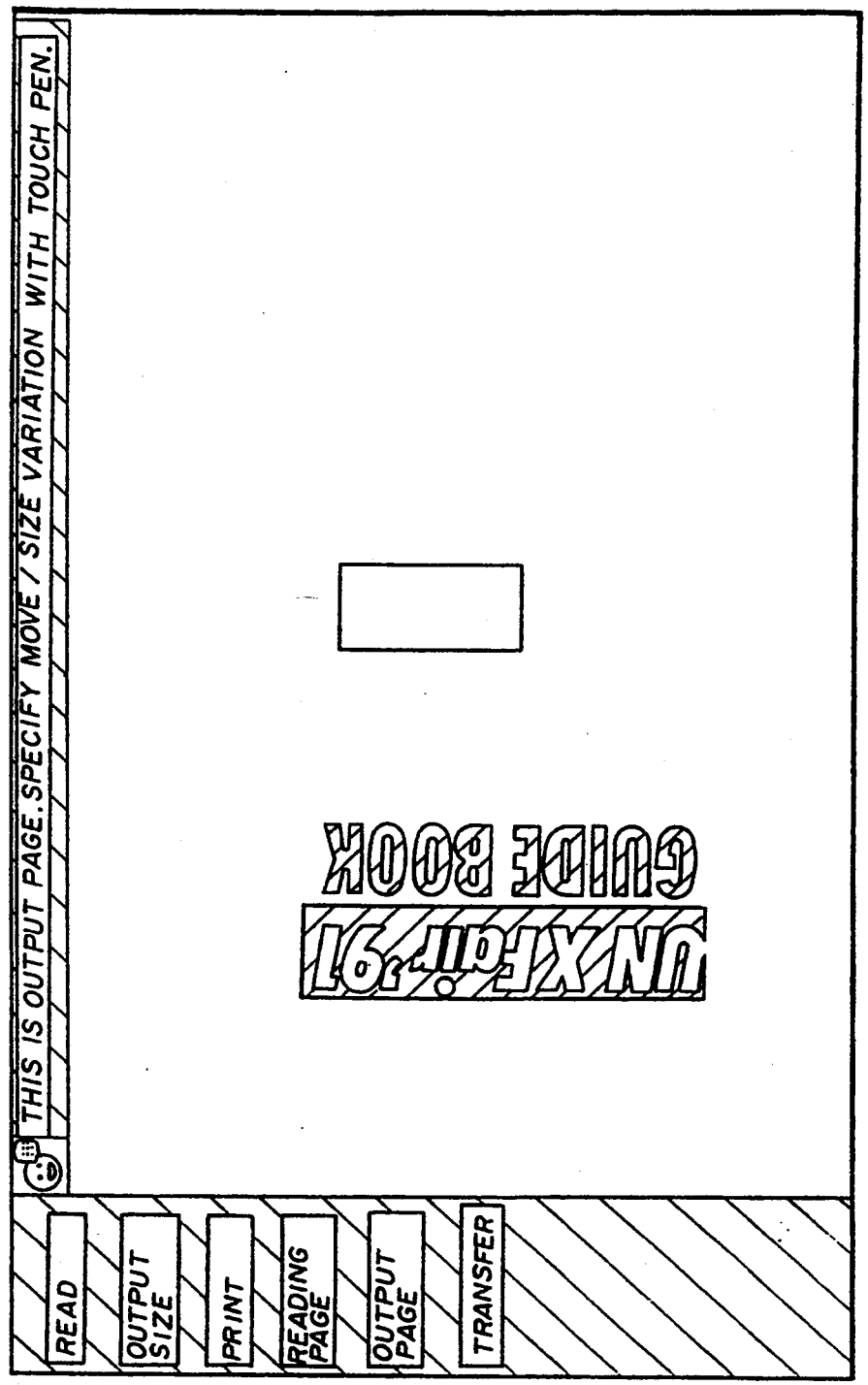

In the above-mentioned example, then the operator may specify, with the touch pen 4, the button "output page" in the menu page displayed on the LCD 3. Then, the controller 1 represents, as shown in FIG. 30, information of an entire output image stored in the image buffer memory in the second page memory board 13 so as to display the corresponding output image. As shown in FIG. 30, a rectangle is also displayed on the displayed output image. The output image information was previously prepared as including, on the left side of the page thus on the left side of the image display part as shown in FIG. 30, the series of the reversed white-on-black letters "UNXFair'91" and the other series of letters "GUIDE BOOK". Further, the displayed allocation rectangle is located in the center of the page thus in the center of the image display part. This displayed allocation rectangle corresponds to the above-mentioned rectangle defining the input area and the size of the displayed rectangle corresponds to the actual size on the output image. The term "actual size" has a meaning such as mentioned above. To achieve this size of the displayed rectangle, the controller 1 converts coordinates associated with the rectangle appropriately. The displayed allocation rectangle is for a default allocation.

Figure 31:
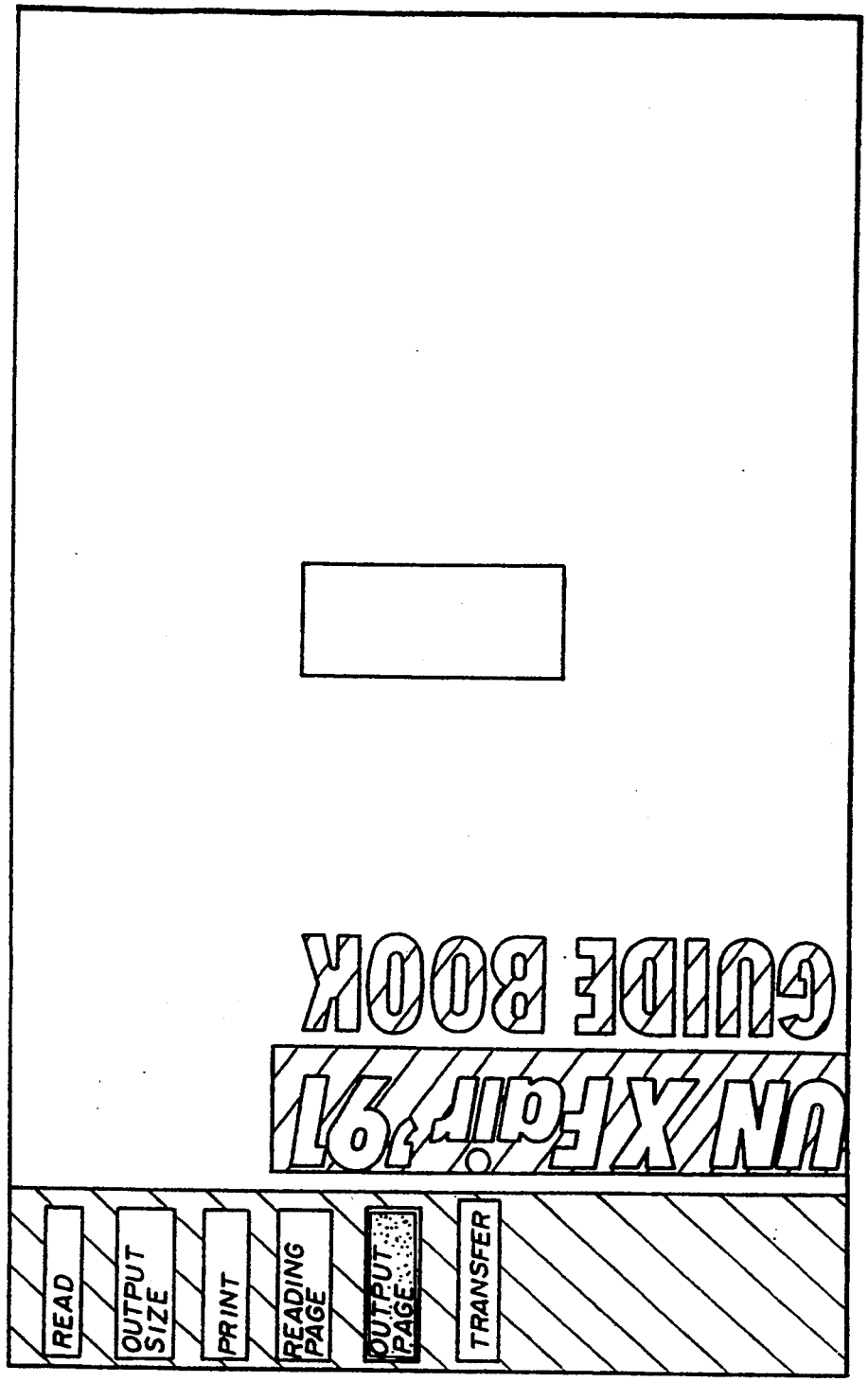

Then, if the operator specifies, the displayed allocation rectangle by touching it with the touch pen 4, the controller 1 magnifies the displayed image resulting in the page as shown in FIG. 31. In this magnification, as mentioned above, the touched point of the image is fixed on the image display part. Further, as mentioned above, the allocation rectangle is also magnified correspondingly. Thus, in this magnification, magnification rate is identical between in the image comprising the above-mentioned letters "UNXFair'91" and "GUIDE BOOK" and the allocation rectangle.

Step S44: Then, if the operator touches, with the touch pen 4, an edge of the allocation rectangle, the controller i reads that the moving specification is being done. Then, while the operator drags the touch pen 4 on the screen, the controller 1 responds to the dragging so as to cause the displayed rectangle to follow the dragging touch pen 4 and thus move. In this moving no size variation occurs in the rectangle.

Step S45: On the other hand, if the operator touches, with the touch pen 4, a vertex of the allocation rectangle, the controller 1 reads that the size-variation specification is being done. Then, while the operator drags the touch pen 4 on the screen, the controller I responds to the dragging so as to cause the size of the displayed rectangle to vary. In this size variation, the size of the rectangle varies so that the touched vertex follows the dragging and thus moves while another vertex opposite to the touched one is fixed thereon.

Figure 32:
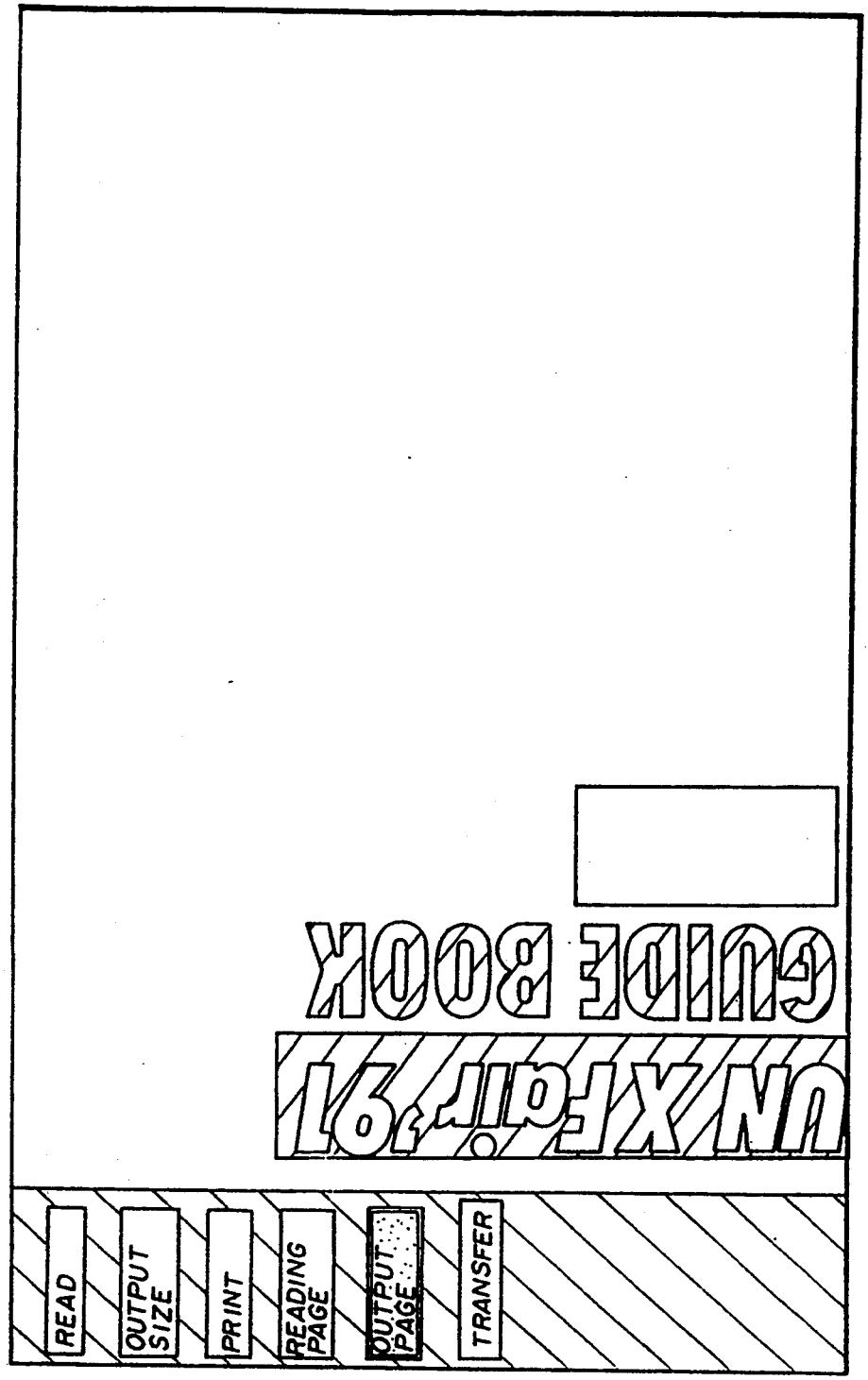

In the example, by touching, with the touch pen 4, an edge of the rectangle and then dragging it, the operator may move the displayed allocation rectangle on the image display part with the controller 1. As a result, the page shown in 31 has been changed to the page shown in FIG. 32. In this change, as shown in FIGS. 31 and 32, the displayed rectangle moves bottom-left-ward. In this example, no size variation is performed on the allocation rectangle.

Step S46: If the operator removes the touch pen 4 from the screen, the controller 1 terminates the move or size variation in the allocation rectangle. Thus, the controller determines the coordinates associated with the allocation rectangle which has a position and a size as displayed when the touch pen 4 was finally removed.

Step S47: Then, the entire output image is displayed in the image display part on the LCD 3 identically to the display before the S31 was executed.

Step S48: Then, the determined allocation rectangle is also displayed together with the displayed entire output image. Before this display of the rectangle, the size of the rectangle has been obtained from converting the coordinates associated with the rectangle so as to correspond to the displayed entire output image.

Figure 33:
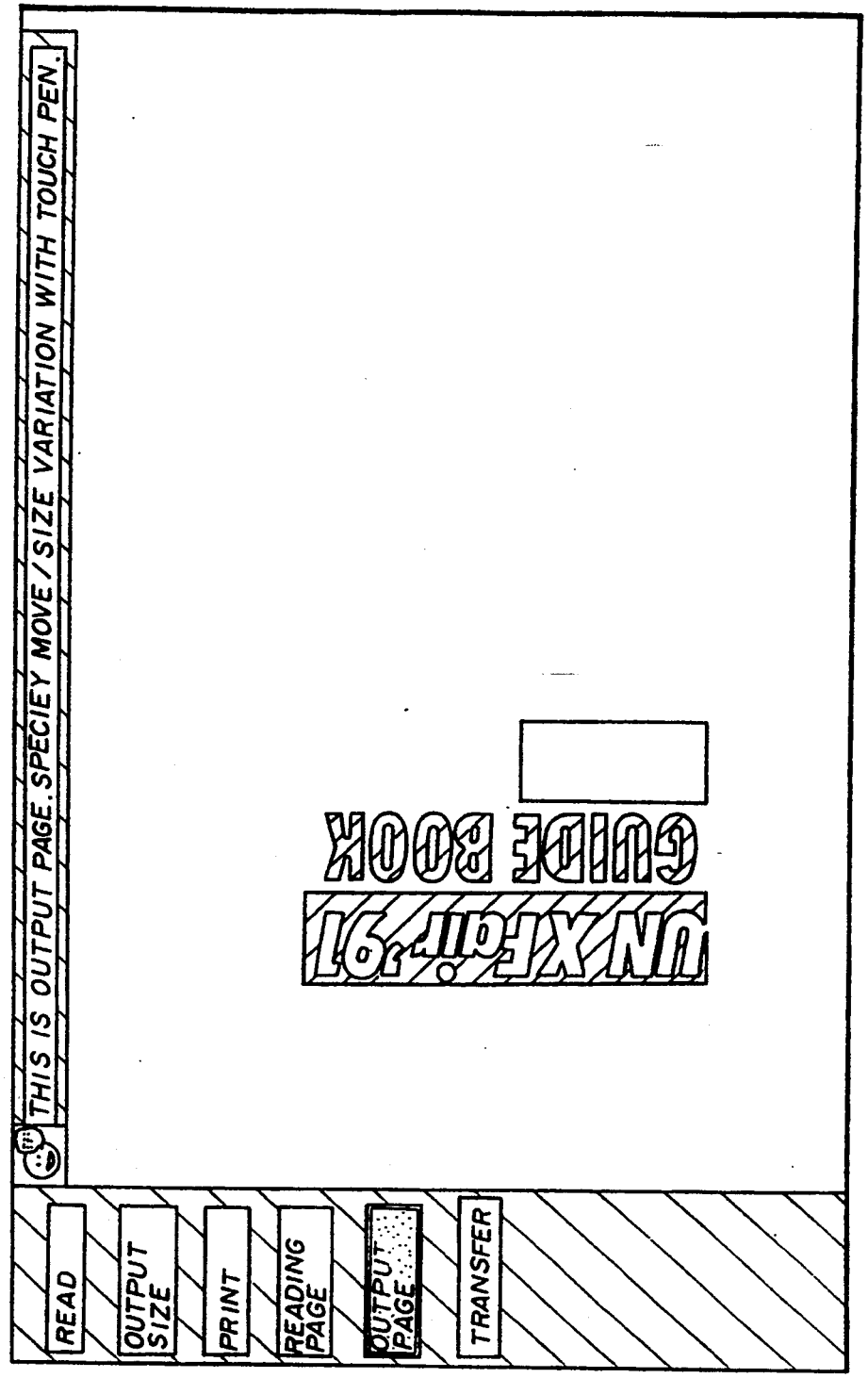

In the example, the operator removes the touch pen 4 so as to finalize the allocation rectangle displayed on the image display part. As a result, the controller 1 displays the entire output image on the image display part together with the determined allocation rectangle corresponding to the entire output image as shown in FIG. 33. Then, the controller 1 stores, in the unshown-in-the-figures memory, an output area included in the image buffer memory in the second page memory board 13. This output area corresponds to an area defined by the displayed rectangle in the entire output image.

Figure 34:
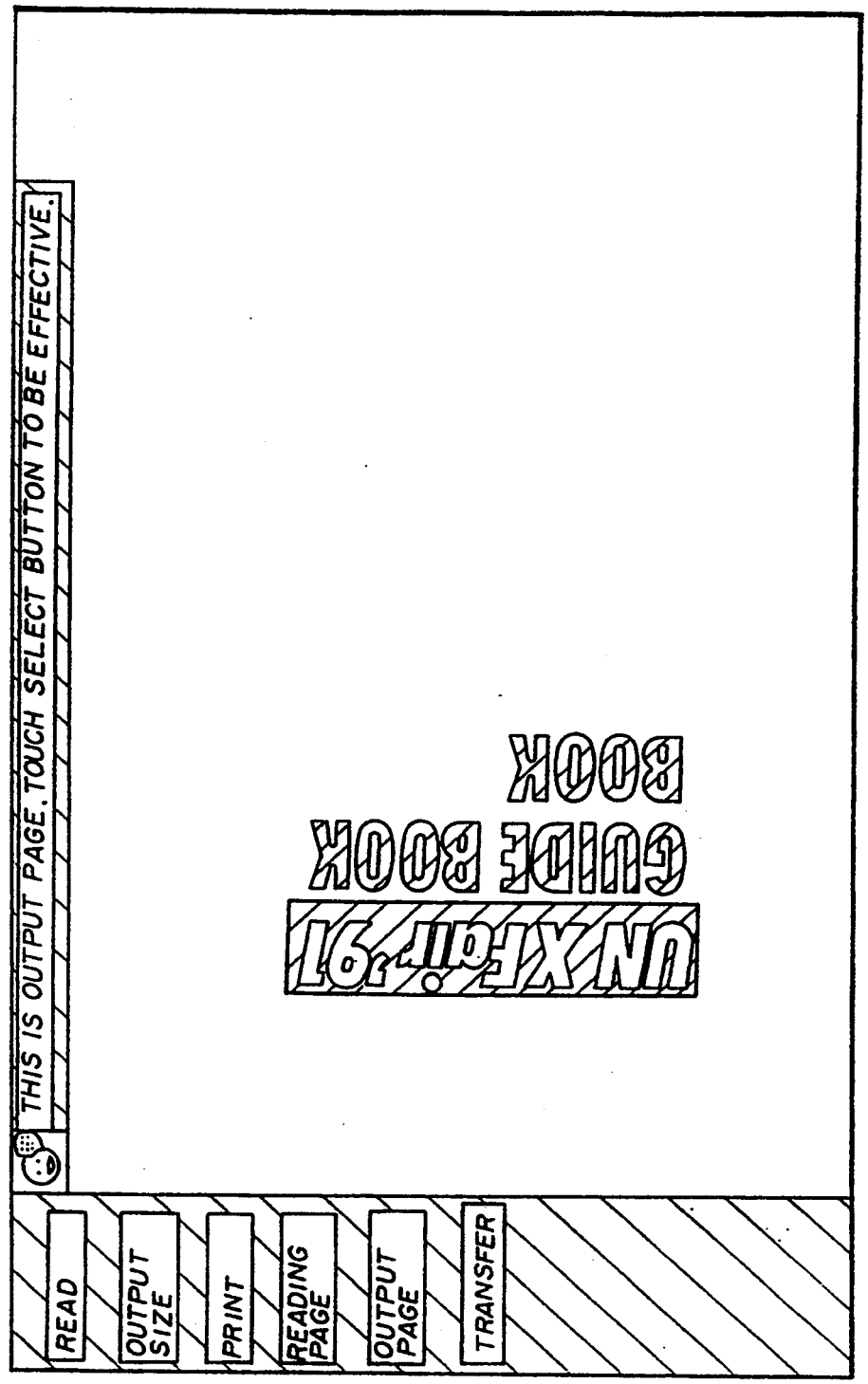

Then, after the operator specifies, with the touch pen 4, the button "transfer", the controller 1 extracts the above-determined input area of the image information stored in the image buffer memory in the first page memory board 12. Then, the controller 1 writes the extracted image information into the above-determined output area of the image information stored in the image buffer memory in the second page memory board 13. In-this writing, the output area of the image information in the buffer memory in the board 13 has been updated. Further, in this extracting and writing, no coordinate conversion for size variation has been executed because in this example, no size variation was performed so as to determine the output area from the input area as mentioned above. The output image information, including the updated part and stored in the image buffer memory in the board 13 is then transferred to the memory in the frame memory board 16 via the DMA controller 15. Then, the transferred image information is represented on the image display part of the LCD 3 as shown in FIG. 34.

Then, the operator, after finishing the determinations of S15 and S17 shown in FIG.3, may specify the button "print" in the menu page. As a result, the controller 1 provides, to the printer 2, the output image information stored in the image buffer memory in the board 13 so as to cause the printer to print out the final image shown in FIG. 34. In this example, the resulting printed out image is represented as a hard copy having a size of vertical B5.

Figure 35:
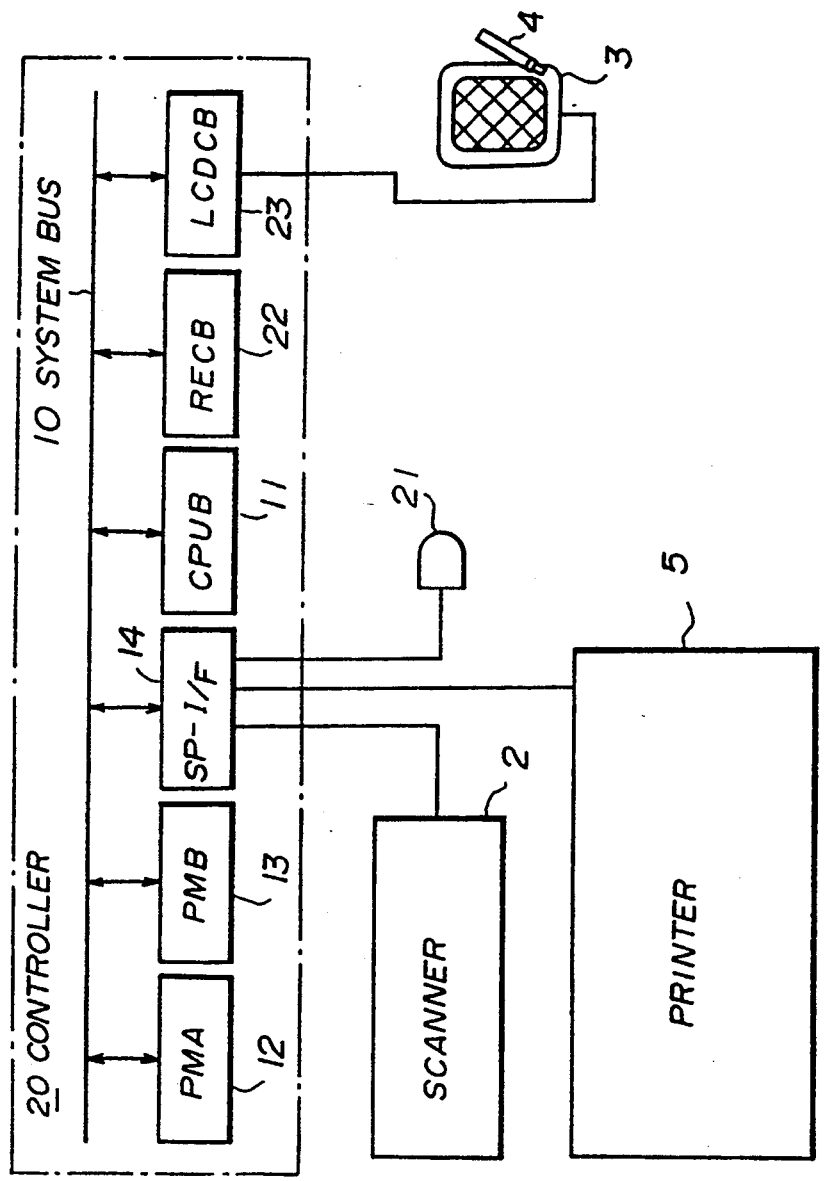
FIG. 35 shows a block diagram of a image processing apparatus according to a third embodiment of the present invention.

An image processing apparatus according to a third embodiment of the present invention will now be described with reference to FIG. 35. In FIG. 35, the same numerals are designated for the components respectively corresponding to the components shown in FIG. 2.

This image processing apparatus comprises a controller 11, the scanner 2, the LCD 3, the touch pen 4, the printer 5 and a buzzer 21.

A controller 11 comprises the system bus and a plurality of boards 11–14, 22 and 23 which boards respectively have various functions.

The CPU board 11 (CPUB) controls the other boards 12–14, 22 and 23 via the system bus 10.

The first page memory board (PMA) 12 and the second page memory board (PMB) 13 respectively act, similar to those in the above-mentioned first embodiment, the first and second storing means. Each of the boards 12 and 13 is an image buffer memory having a capacity of one page. These boards 12 and 13 are respectively connected with the buzzer 21 for alerting as well as with the scanner 2 and printer 5 via the scanner/printer interface board (SP-I/F).

The resolution converter (REC) board (RECB) 22 reads, in response to the corresponding command being given by the CPU board 11, image information. The image information to be read has been stored in the image buffer memory in the first page memory board 12. The RECB 22 then transfers the read image information so as to write it into the image buffer memory of the second page memory board 13. The RECB 22 also reads image information stored in either the image buffer memory of the first or second page memory board 12 or 13. The RECB 22 then transfers the read image information so as to write it into the LCD controller board (LCDCB) 23.

Here, the following operations are possible. The image information stored in the image buffer memory in the first page memory board 12 is processed. This processing may comprise magnifying, reducing in size, rotation, or inverting the image represented by the image information. Then, the processed image information is then written in the image buffer memory in the second page memory board 13. Further, the image information stored in either of the image buffer memory of the first or second page memory board 12 or 13 is processed. This processing may comprise size reduction of the corresponding image. The processed image information is then written into a video RAM associated with the LCD controller board 23.

Then, the LCD controller board 23 makes the image information which has been written in the video RAM be displayed on the screen of the LCD 3.

Processes preformed by the controller 20 and sequences of operations performed by an operator will now be described with reference to FIGS. 36–45. Here, a code "OP" represents an operator.

Further, together with the description of the above processes, a process example will be alternately described with reference to FIGS. 47–75. In this process example, the above processes are used to obtain a final image shown in FIG. 46 as a hard copy thereof from the original images shown in FIGS. 4 and 5. The original image shown in FIG. 4 is represented on the vertical A4 size sheet of paper while the original image shown in FIG. 5 is represented on the vertical B5 (The edge rectangles respectively shown in FIGS. 4 and 5 respectively indicate outer edges of the sheets of paper.)

Main Process

Step S51 (in FIG. 36): After an operator switches a power of the image processing apparatus on, the menu page is then displayed on the screen of the LCD 3, which page including various-function select buttons: "read", "allocation size", "print", "reading page", "allocation page", "image transfer", "rotation mode" and "undo".

Figure 47:
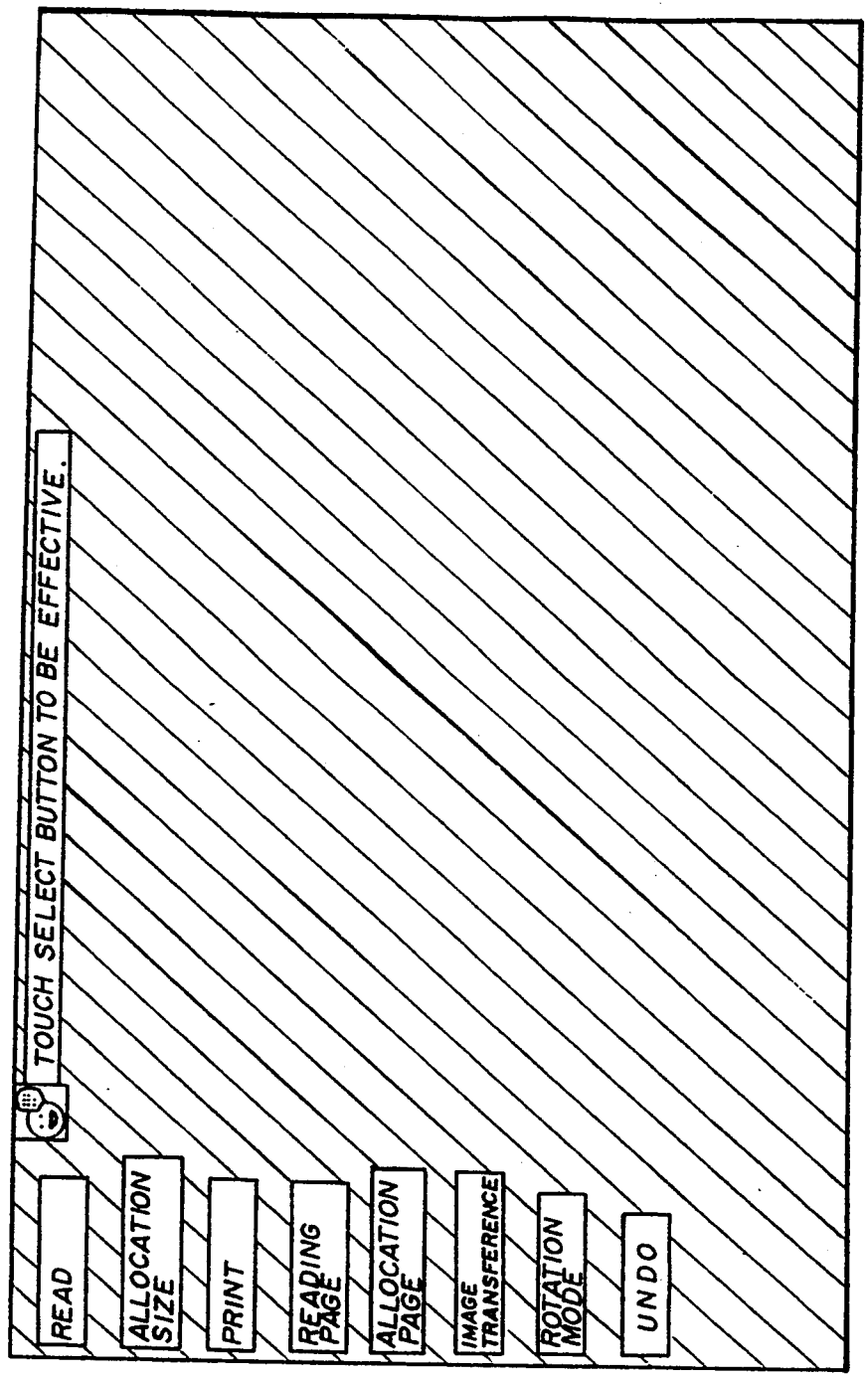

In the above-mentioned process example, by the switching on of the image processing apparatus, the controller 20 indicates, as shown in FIG. 47, on the screen of the LCD 3, the above-mentioned menu page which also includes a message "Touch a select button to be effective.".

Reading Process

Figure 37:
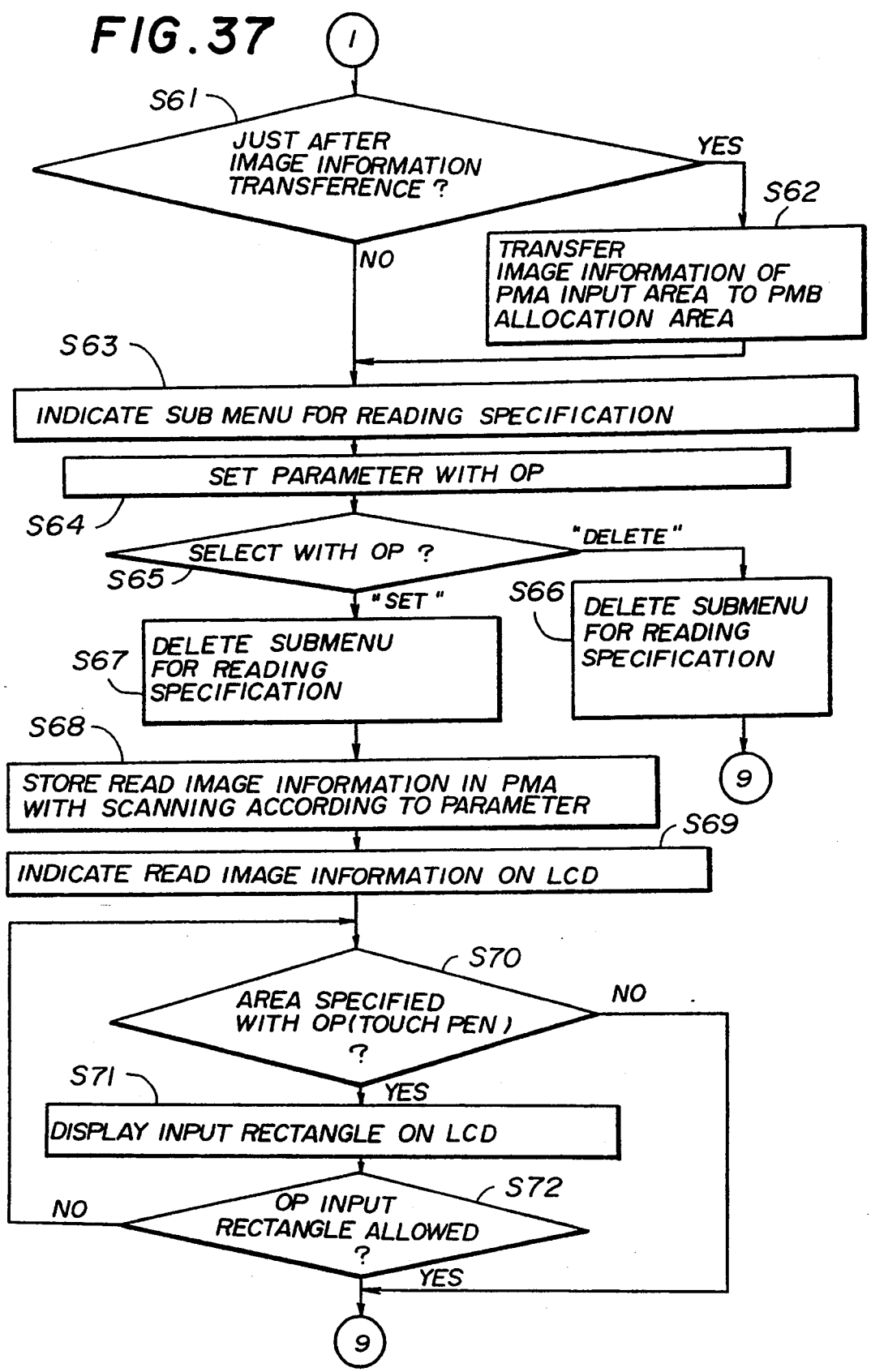
FIG. 37 shows an operation flow chart concerning a reading process performed by the controller and an operation sequence performed by the operator in the apparatus shown in FIG. 35.

A main menu function is specified in S52 by the operator with the touch pen 4 being touched on the displayed button, from among the above-mentioned buttons displayed in the menu page, to be specified. As a result, the corresponding process from among the processes respectively shown in FIGS. 37–44 is executed. For example, if the operator specifies the button "read", the process shown in FIG. 37 is started from S61.

Step S62: If it is determined in S61 that it is just after the time when image information has been transferred, the operation described below is executed. Here, there is an area defined with an input rectangle (described below) in image information stored in the image buffer memory in the first page memory board 12. This area will be referred to as "input area" The lengths in the X- and Y-directions of the image represented with the input area of image information are respectively referred to as X1 and Y1. Further, there is an area defined with an output rectangle (described below) in image information stored in the image buffer memory in the second page memory board 13. This area will be referred to as "output area" or "allocation area". The lengths in the X- and Y-directions of the image represented with the allocation area of image information are respectively referred to as X2 and Y2.

The above-mentioned operation is as follows. The REC board 22 varies the size of the image information in the above-mentioned input area in the image buffer memory of the first page memory board 12. In this size variation, if the rotation-mode specification comprises either "no rotation" or "180° rotation", the length in the X-direction is multiplied by X2/X1 while the length in the Y-direction is multiplied by Y2/Y1. On the other hand, if the rotation-mode specification comprises either "90° rotation" or "270° rotation", the length in the X-direction is multiplied by X2/Y1 while the length in the Y-direction is multiplied by Y2/X1. Further, the REC board 22 performs, in the specified rotation mode, the specified logical operation between the size-varied image information and the allocation area of the image information stored in the image buffer memory in the second page memory board 13. Then, the REC board 22 writes the resulting image information into the same allocation area so as to update the allocation area of image information.

Step S63: If it is determined in S61 that it is not just after the time when image information has been transferred, the operation described below is executed. A submenu for reading specification is then displayed on the image display part of the LCD 3. In this submenu, each of the following parameters is to be specified from among the corresponding selective ones: "reading density", "draft type", "paper size" and "fixed size-variation".

In the above process example, the operator may set the draft representing the image shown in FIG. 4 in the scanner 4. Then, the operator may specify the button "read" in the displayed menu page with the touch pen 4 (as in S52 in FIG. 36). As a result, the controller 20 displays the above-mentioned submenu for reading specification with a message "Specify input parameters." as shown in FIG. 48 (as in S63 in FIG. 37).

Default selections such as mentioned above are preset for each parameter among the parameters "reading density", "draft type", "paper size" and "fixed size-variation". Similarly to the before mentioned, buttons corresponding to the preset choice are in the reversed white-on-black states.

Then, the operator may specify another choice with the touch pen 4 for each parameter. As a result of the other specification, the controller 20 then changes the display manner of the button corresponding to the then-specified choice. As a result, the button is given in the reversed white-on-black state while the button corresponding to the preset choice is then retuned to the normal display state (as in S64 in FIG. 37).

In S65, if it is determined that either "set" or "delete" button is specified with the touch pen 4, the displayed submenu for the reading specification is then deleted and then the former page is displayed again, in S66 and S67.

Step S68: Then, the scanner 2, according to the above-mentioned specified parameters, scans the set draft so as to read the corresponding original image. Then, the read image information is written into the image buffer memory in the first page memory board 12 as input image information.

Step S69: Then, the REC board 22 transfers the read input image information stored in the image buffer memory in the board 12 to the video RAM in the LCD controller board 23. As a result, the transferred image information is then represented on the image display part of the LCD 3.

In the process example, after the operator determines all the parameters and thus specifies with the touch pen 4 the displayed "set" button in S65 in FIG. 37, the controller 20 deletes the reading-specification submenu from the screen in S67. Then, the controller 2 initiates the scanner 2 so as to make the scanner 2 start reading the original image information represented on the set draft shown in FIG. 4.

Figure 49:
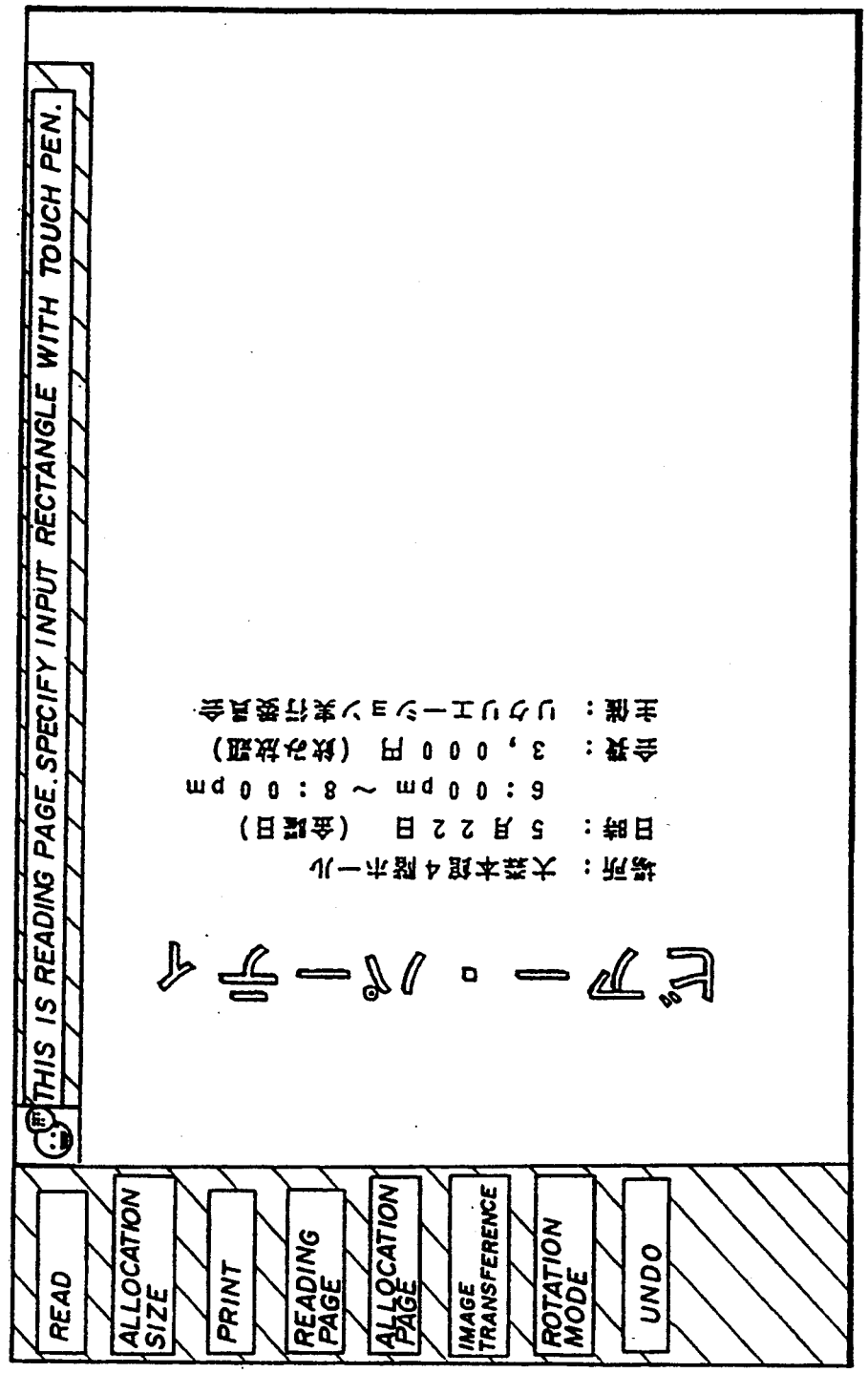

Then, the read input image information is written into the image buffer memory of the board 12 in S68. Then, the REC board 22 transfers the stored image information to the video RAM of the board 23. Then the transferred image information is displayed, as shown in FIG. 49, on the image display part of the LCD 3 in S69. Simultaneously, a message "This is read image. Specify an input rectangle with the touch pen." in the menu page together with the displayed input read image information as shown in FIG. 49.

Step S71: It is determined in S70 that two points in the image display part of the LCD 3, which display part now represents the input image information, have been specified with the touch pen 4, the following operation is executed. That is, an input rectangle (a frame defining the above-mentioned input area) is indicated in the image display part. The indicated input rectangle has two opposite corners (vertexes) respectively having locations identical to the above-mentioned specified two points. Thus, the area set has been performed.

Figure 50:
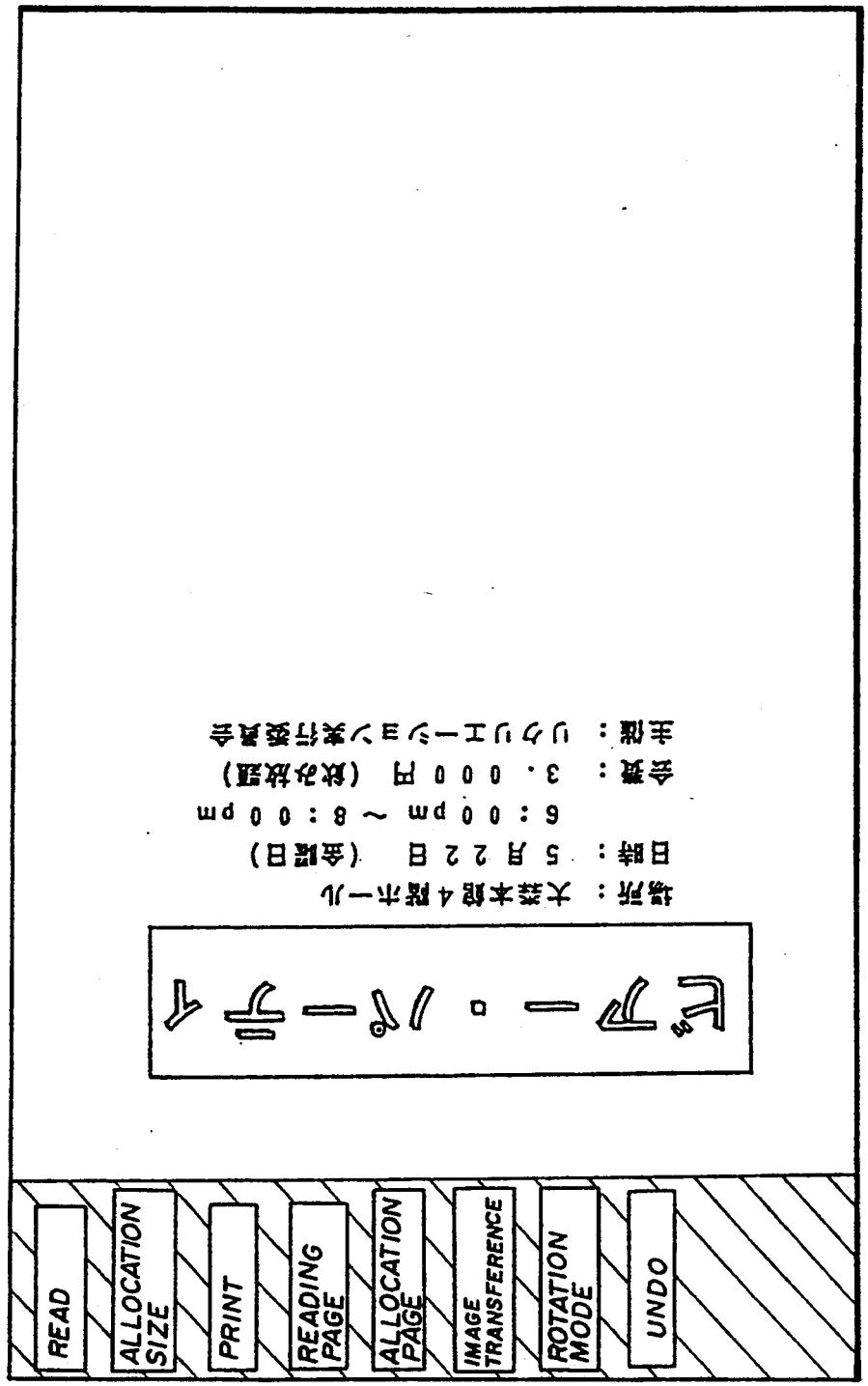

In the process example, the operator may specify a desired area in the input image displayed on the image display part of the LCD 3 as shown in FIG. 49, with the touch pen 4 as in S70. As a result, the corresponding input rectangle is then displayed on the image display part as in S71. In this example, the input rectangle is thus displayed as shown in FIG. 50. (This input rectangle defines the Japanese letters which may be read in the corresponding Roman letters "biaa paati" or may be translated into the corresponding English expression "beer party".)

Allocation Size Process

Figure 36:
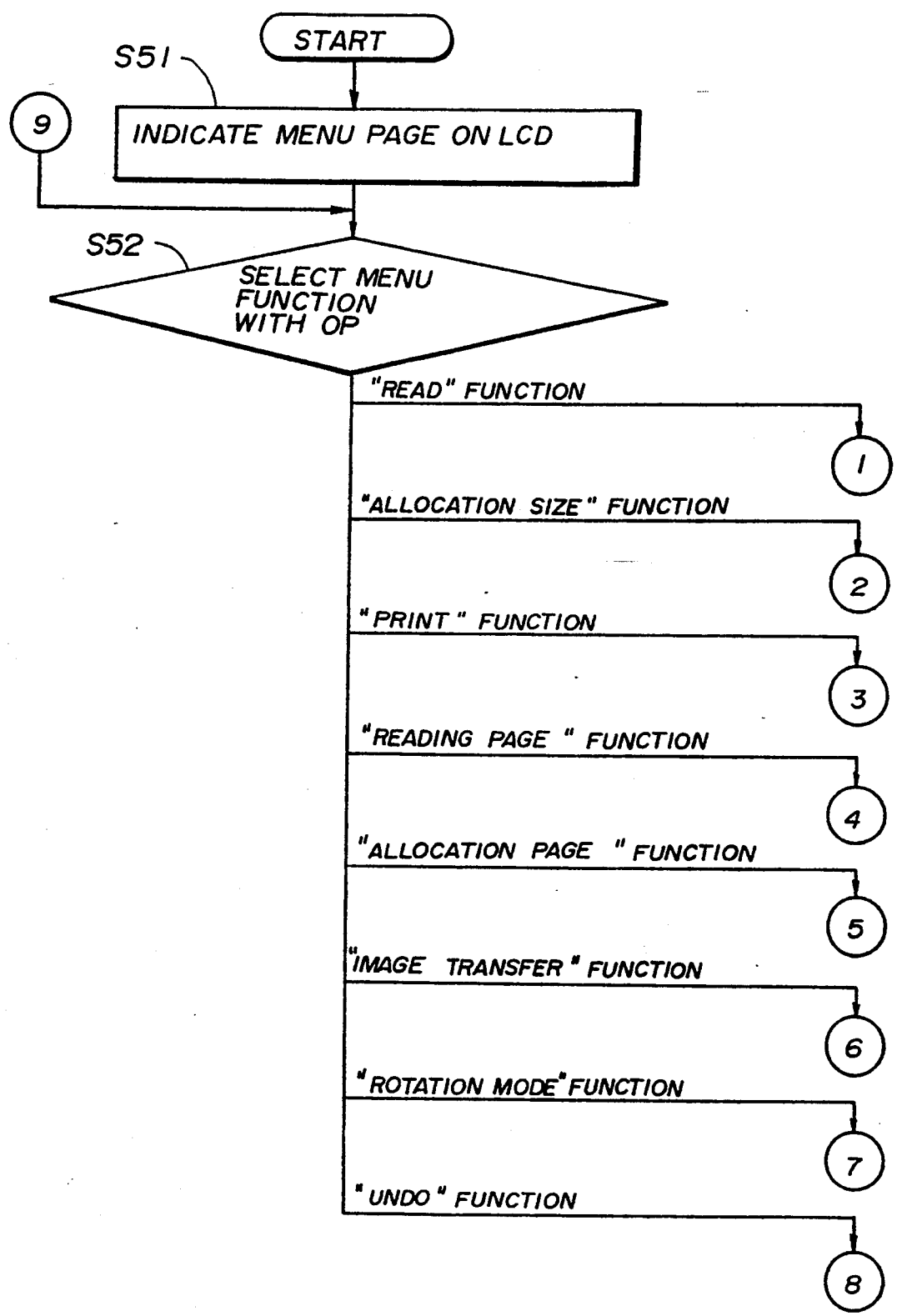
FIG. 36 shows an operation flow chart concerning a main process performed by a controller and an operation sequence performed by an operator in the apparatus shown in FIG. 35.
Figure 38:
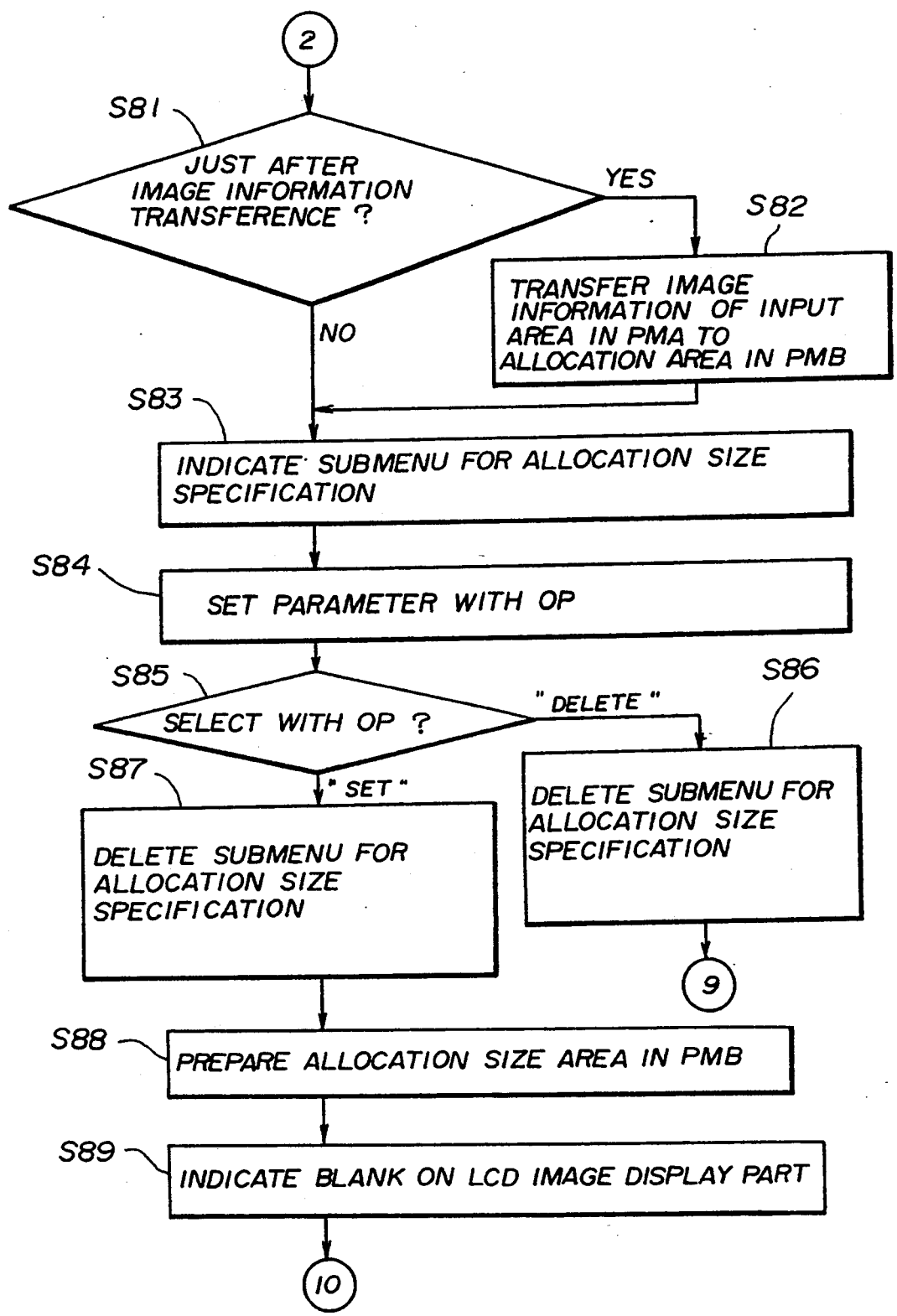
FIG. 38 shows an operation flow chart concerning an allocation size process performed by the controller and an operation sequence performed by the operator in the apparatus shown in FIG. 35.

In S52 in FIG. 36, if the button "allocation size" displayed in the menu page is specified with the touch pen 4, the process shown in FIG. 38 is started from S81.

Step S82: Similarly to the above-mentioned operation in S62, the input area of image information stored in the first page memory board (PMA) is transferred to the allocation area of the second page memory board (PMB) if it is determined in S81 that it is just after the time when the image information has been transferred.

Step S83: If it is determined in S81 that it is not just after the time when the image information has been transferred, a submenu for allocation-size specification is displayed on the image display part of the LCD 3. In this submenu, an appropriate allocation size may be selected from among "A3 vertical", "B4 vertical", "A4 vertical", "A4 horizontal", "B5 vertical" and "B5 horizontal".

Figure 51:
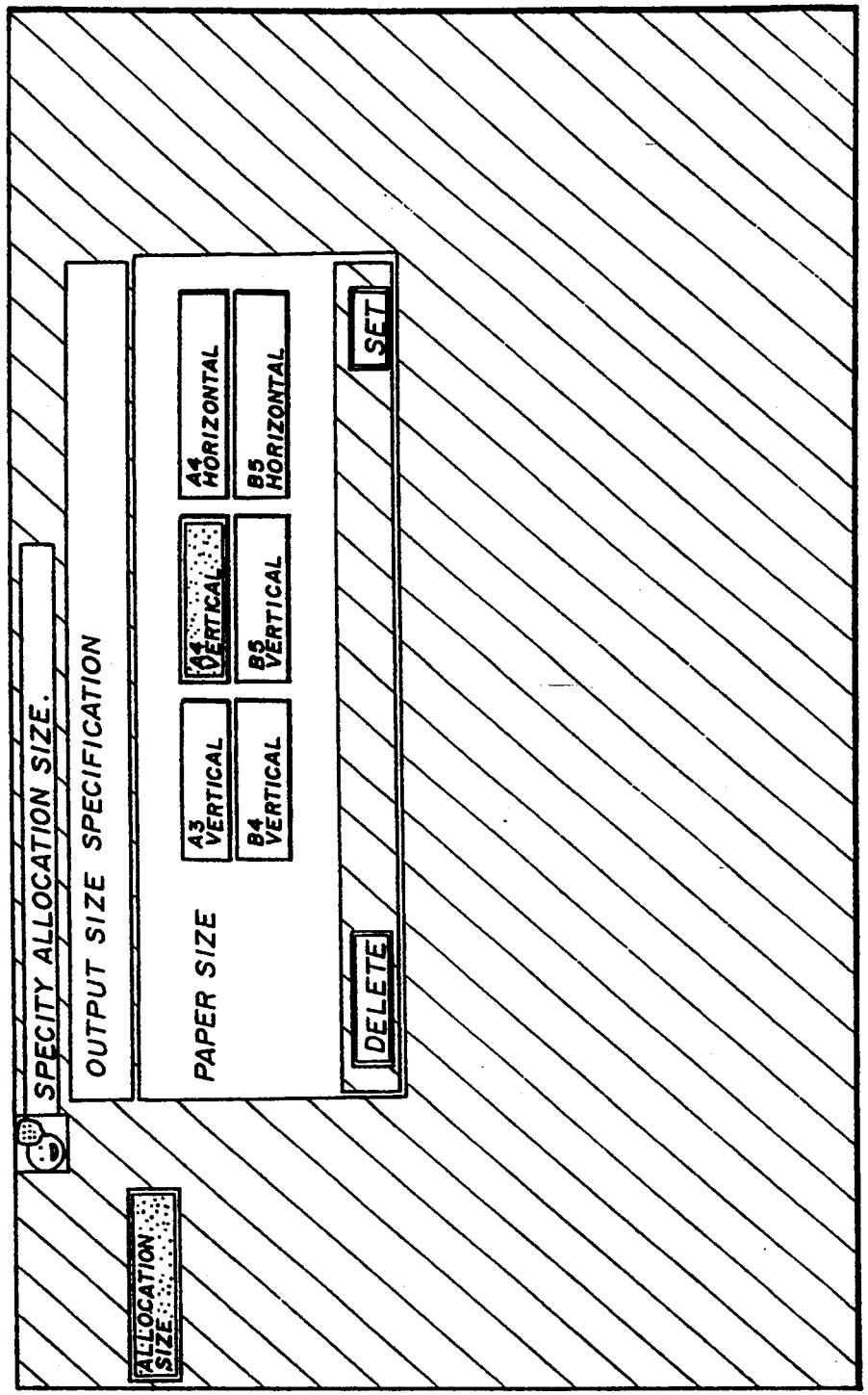

In the process example, the operator may specify the button "allocation size" in the menu page with the touch pen 4 in S52 of FIG. 36. As a result, the controller 20, as shown in FIG. 51, displays the allocation-size-specification submenu on the image display part together with a message "Specify an allocation size." in the menu page in S83 of FIG. 38. Here, a button "A4 vertical" corresponding to a default allocation size is in a reversed white-on-black state as shown in FIG. 51. The term "allocation size" may be referred to as "output size".

Then, the operator may specify another choice than the preset default choice "A4 vertical". As a result of this other choice, the selected button is then reversed so as to become in a reversed white-on-black state while the previously white-on-black reversed state button is reversed so as to becomes a normal black-on-white state (in S84 in FIG. 38).

Steps S86 and S87: If it is determined in S85 that the "set" or "delete" button has been specified with the touch pen 4, the displayed allocation-size-specification submenu is deleted from the image display part and the former page is then displayed thereon.

Step S88: The above-mentioned specified allocation size of an area, referred to as "allocation area" or "output area", is then prepared in the image buffer memory in the second page memory board 13.

Figure 45:
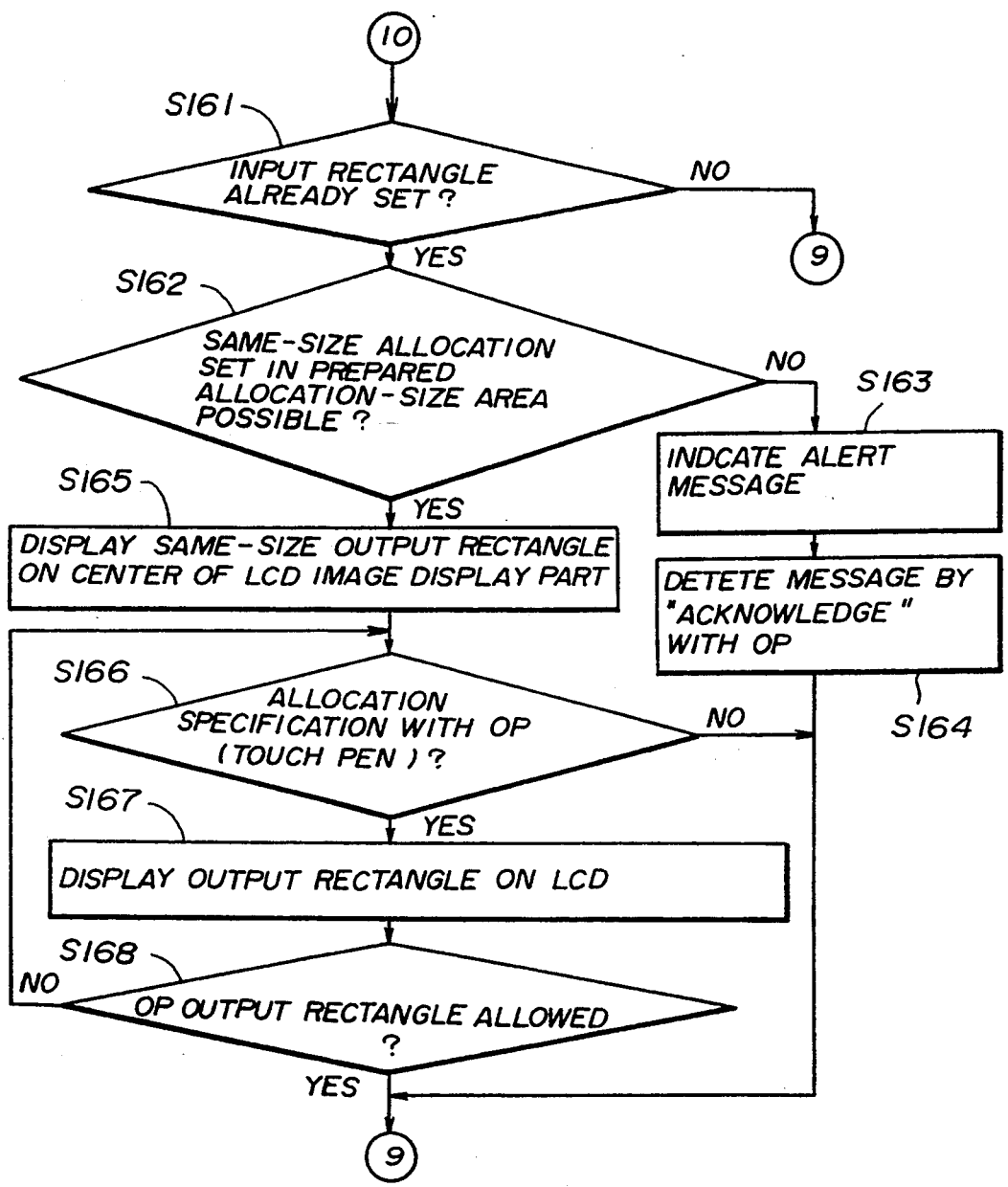
FIG. 45 shows an operation flow chart concerning another part of the allocation page process performed by the controller and an operation sequence performed by the operator in the apparatus shown in FIG. 35.

Step S89: Then, the entire size of the image display part on the LCD 3 is made blank and then S161 in FIG. 45 is executed.

In the process example, the operator may specify the button "set" at the bottom of the submenu. As a result of this specification being performed, the controller 20 deletes the allocation-size-specification submenu from the image display part as mentioned above in S87 of FIG. 38. Then, the controller 20 prepares the allocation-size area in the image buffer memory of the second page memory board 13 in S88 of FIG. 38. Then, blank is made in the entire image display part in S89.

Step S163: An alert message "The input rectangle is too large. Set it again (appropriately)." is displayed on the image display part of the LCD 3 if the following condition appears. The condition comprises both conditions simultaneously. The first condition is one where it is determined in S161 that the input rectangle has been already set. The second condition is one where it is determined in S162 that the specified input rectangle is larger than it is possible to allocate, and thus set, the size of the set input rectangle in the allocation-size area of image information in the image buffer memory in the second page memory board 13. The allocation-size area has been prepared in S88 as mentioned above. (Such a condition as the input rectangle is too large might occur, for example, if the allocation size were B5 vertical and simultaneously if the input rectangle were set as having a size of B5 horizontal. This is because the B5 horizontal area cannot be allocated "within" the B5 vertical area in this direction.)

Step S164: If the operator specifies a button "acknowledgement" with the touch pen 4, the displayed alert message is deleted from the image display part and the former page is then displayed thereon.

Step S165: An output rectangle having the same size as the size of the set input rectangle is then displayed in the center of the image display part of the LCD 3 if the following condition is fulfilled. The condition to be fulfilled comprises two conditions. The first condition is fulfilled if it is determined in S161 that the input rectangle has been already set. The second condition is fulfilled if it is determined in S162 that it is possible to allocate the input rectangle within the allocation-size area. (The above-mentioned "the same size of an output rectangle being displayed in the center of the image display part" is realized as follows. As a result of this realization, a dimensional relationship between the size of the image display part and the input rectangle is as if the input rectangle were cut out from the draft representing the input original image and the cut part of the sheet of paper were then put on another sheet of paper having a size of the allocation-size area. Here, this size of the allocation area corresponds to the size of the image display part.)

Figure 52:
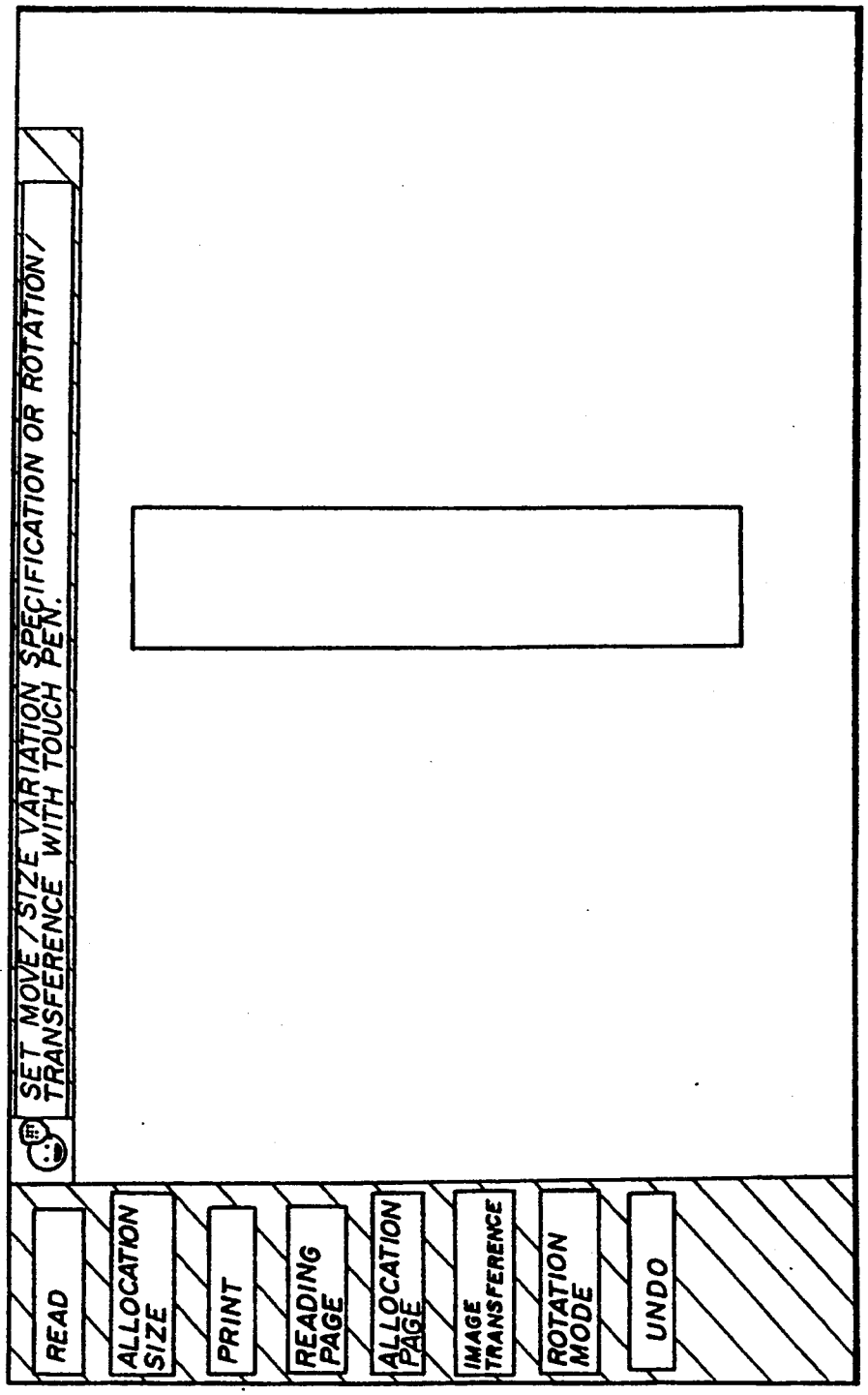

In the process example, the size of the input rectangle is converted so that the size of the input rectangle about the input image is changed into the size about the allocation-size area. The resulting indication is equivalent to the above-explained "the same size of an output rectangle being displayed in the center of the image display part". This is also equivalent to the before-mentioned indication in the actual size. Resulting size of input rectangle is, as shown in FIG. 52, displayed in the center of the image display part in S165 in FIG. 45. The displayed rectangle is used as "default output rectangle for allocation". Simultaneously, a message is displayed in the menu page together with the displayed default output rectangle. This message comprise "Set specification of move/size-variation or rotation/transfer with the touch pen.".

Step S167: It is possible to move the displayed output rectangle as follows. An edge of this rectangle is to be touched with the touch pen 4 and the touch pen 4 is drawn on the screen of the LCD 3 while the touch pen 4 is touching the edge. Then, the displayed output rectangle follows the drawn touch pen 4 and move accordingly in the image display part. Further, it is also possible to vary the size of the displayed output rectangle as follows. A corner or vertex of this rectangle is to be touched with the touch pen 4 and the touch pen 4 is drawn on the screen of the LCD 3 while the touch pen 4 is touching the edge. Then, the shape of the displayed output rectangle varies so that the resulting varied rectangle has two diagonally opposite vertexes, one which vertexes is fixed while the other follows the drawn touch pen 4. Thus, the vertical and horizontal dimensions of the rectangle may be respectively independently varied. As a result, the location and size of the output rectangle with or without the above-mentioned moving/size variation operations are determined. Thus, the allocation area (output area) onto which the set area (input area) of image information will be allocated has been specified. Further, a beep sound for alerting the operator should occur if this allocation were performed so that the allocation area exceeds the size of the image display part of the LCD 3. The beep sound is caused by the buzzer 21 through the SP-I/F 14.

Figure 53:
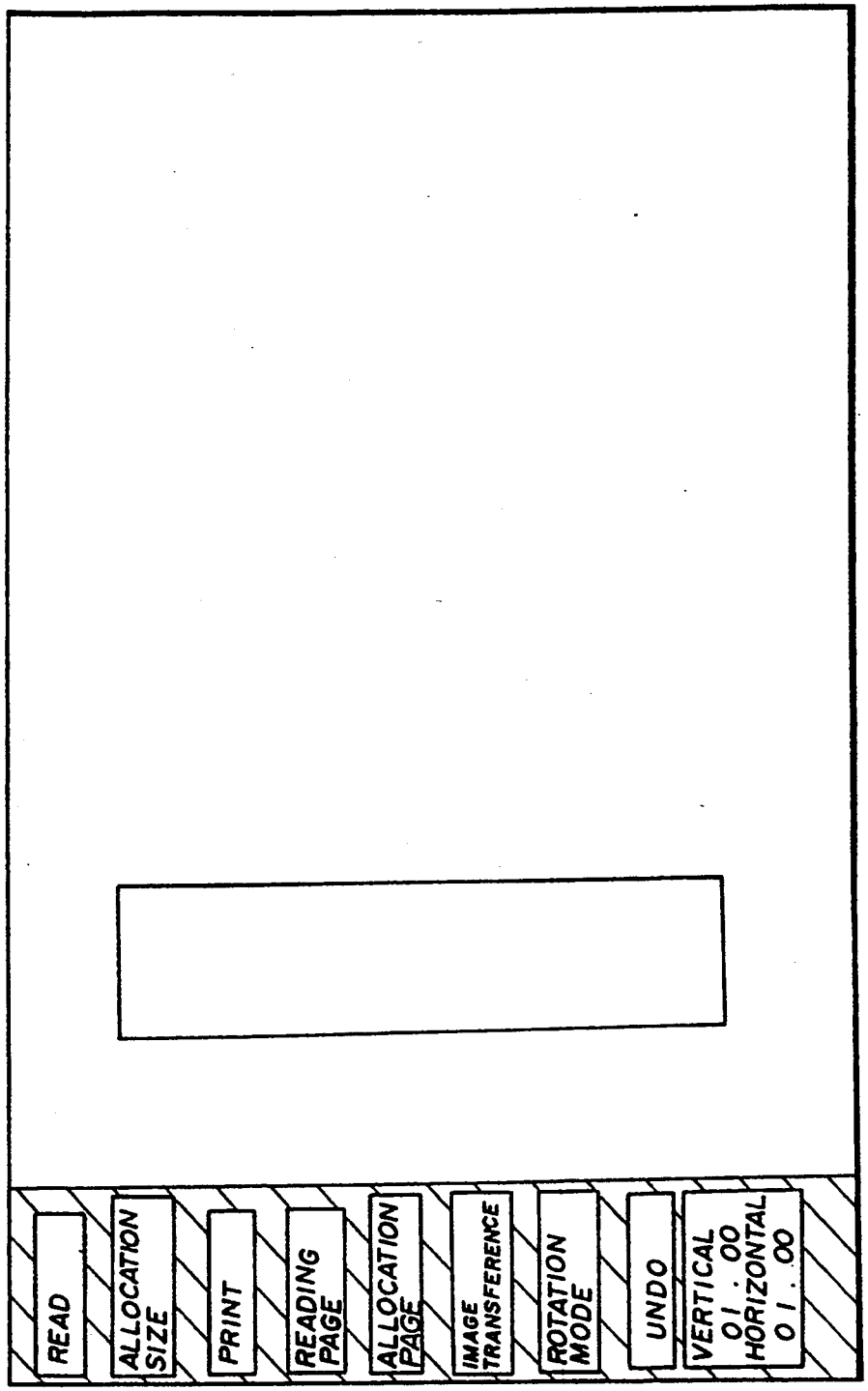

In the process example, the operator moves the output rectangle. The resulting moved rectangle is shown in FIG. 53. In this case, the rectangle has been moved leftward from the position shown in FIG. 52. Thus, in S166–S168, the allocation area is specified as mentioned above. Here, the menu page displayed together with the display of the rectangle includes the size-variation ratio (vertical 01.00, horizontal 01.00). This size-variation ratio is a ratio in size between the input area and the allocation area.

Image Transference Process

Figure 42:
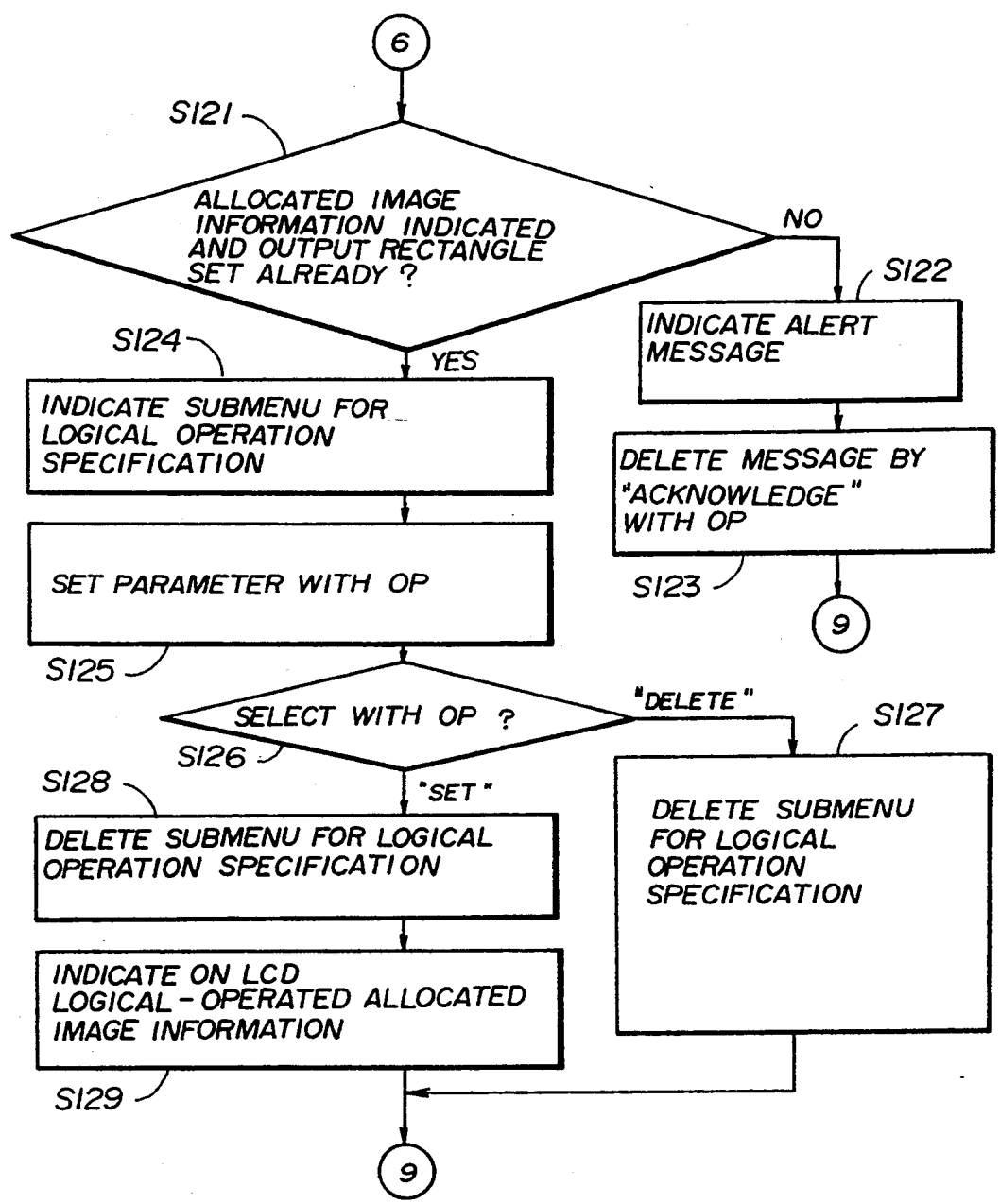
FIG. 42 shows an operation flow chart concerning an image transference process performed by the controller and an operation sequence performed by the operator in the apparatus shown in FIG. 35.

The button "image transfer" in the menu page of the LCD 3 is specified with the touch pen 4 in S52 of FIG. 36, the process shown in FIG. 42 is then started from S121.

Step S122: If it is determined in S121 that allocation image information is not realized and thus the corresponding image is displayed and/or the output rectangle has not been set yet, an alert message "An output rectangle is not displayed. Set or display it." is then displayed in the menu page of the LCD 3.

Step S123: Then, after a button "acknowledge" is specified with the touch pen 4, the displayed message is deleted and then the former page is displayed.

Step S124: If it is determined in S121 that allocation image information is realized and thus the corresponding image is displayed and the output rectangle has been already set, another submenu is then displayed. This other submenu is displayed on the image display part of the LCD 3. A desired logical operation from among a plurality of logical operations (16 kinds) may be specified, as indicated in the submenu. Each logical operations may be performed on image information defined with the input rectangle about the input image and defined with the output rectangle about the allocation image.

Steps S128 and S128: If either a button "set" or a button "delete" is specified with the touch pen 4, the former page is displayed after deletion of the logical-operation-specification submenu.

Step S129: The specified logical operation is then performed on image information defined with the input rectangle about the input image and defined with the output rectangle about the allocation image. Then, the resulting allocation image information is transferred to the video RAM of the LCD controller board 23 and the transferred information is then represented on the image display part of the LCD 3.

Figure 54:
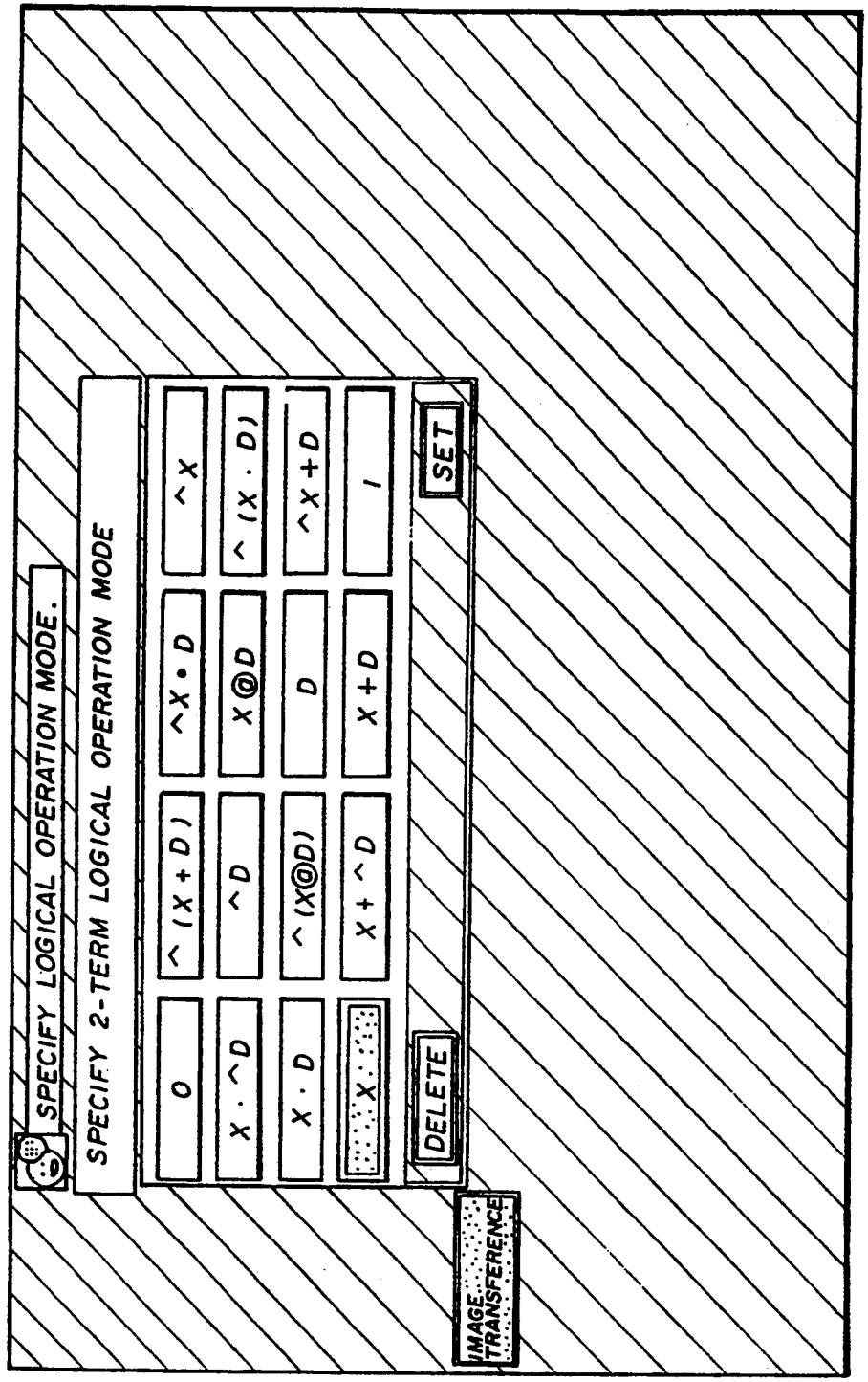

In the process example, if the operator specifies with the touch pen 4 the button "(image) transfer" in S52 of FIG. 36, the controller 20 operates as follows. The controller 20 displays the above-mentioned logical-operation-specification submenu in the image display part of the LCD 3 while the LCD 3 displays a message "Specify a logical operation mode." in the menu page, as shown in FIG. 54, in S124 of FIG. 42. Here, a default choice of the logical operations is "X" (overwriting), a button corresponding the choice being in a reversed white-only-black state.

Then, the operator may specify with the touch pen 4 a desired choice from among the 16 logical operations in S125 of FIG. 42. As a result of the touch-pen specification, the controller 20 reverses, as occasion demands, the button representing the specified choice while, as occasion demands, the previously reversed button is returned to the normal black-on-white state.

Figure 55:
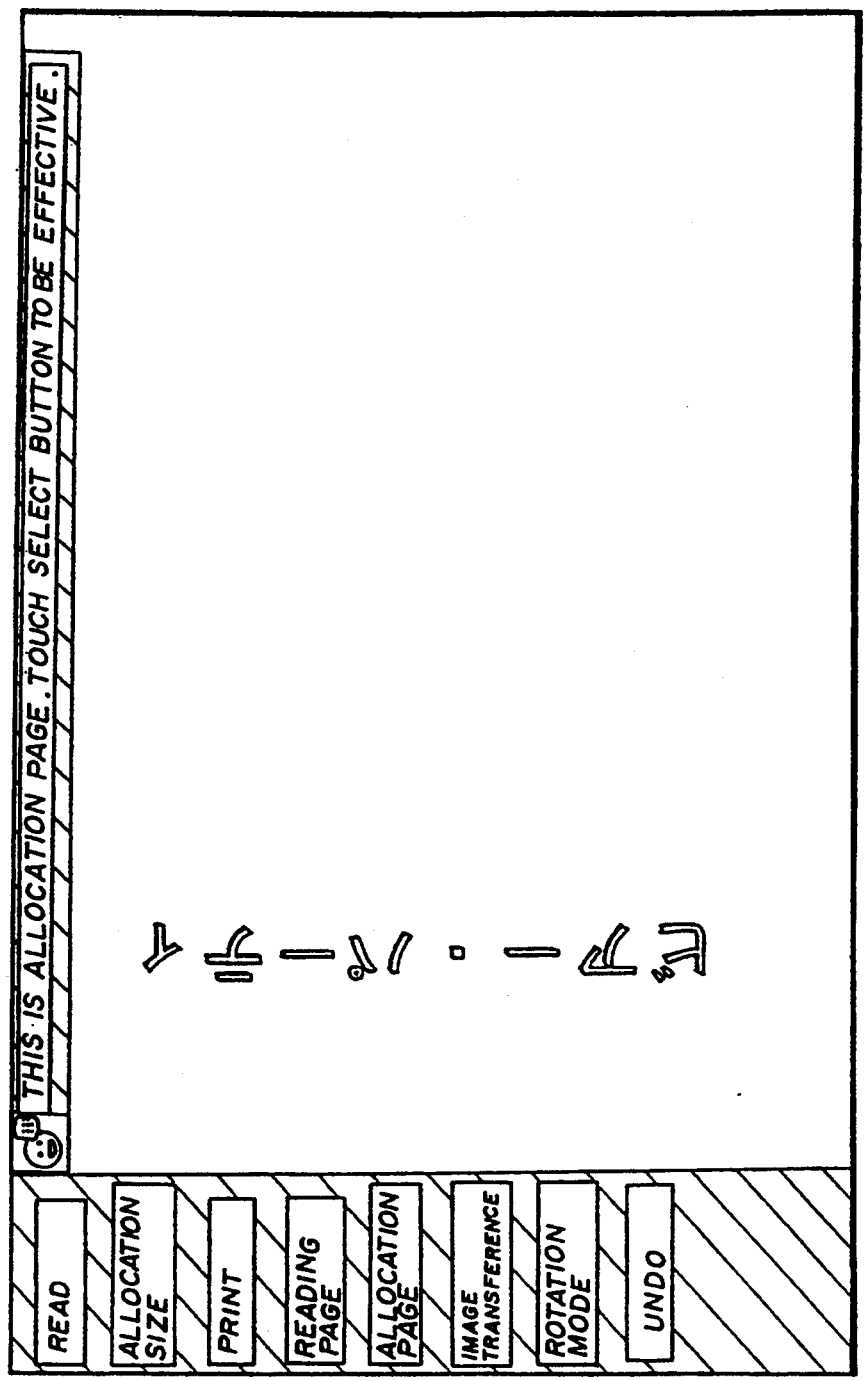
Figure 56:
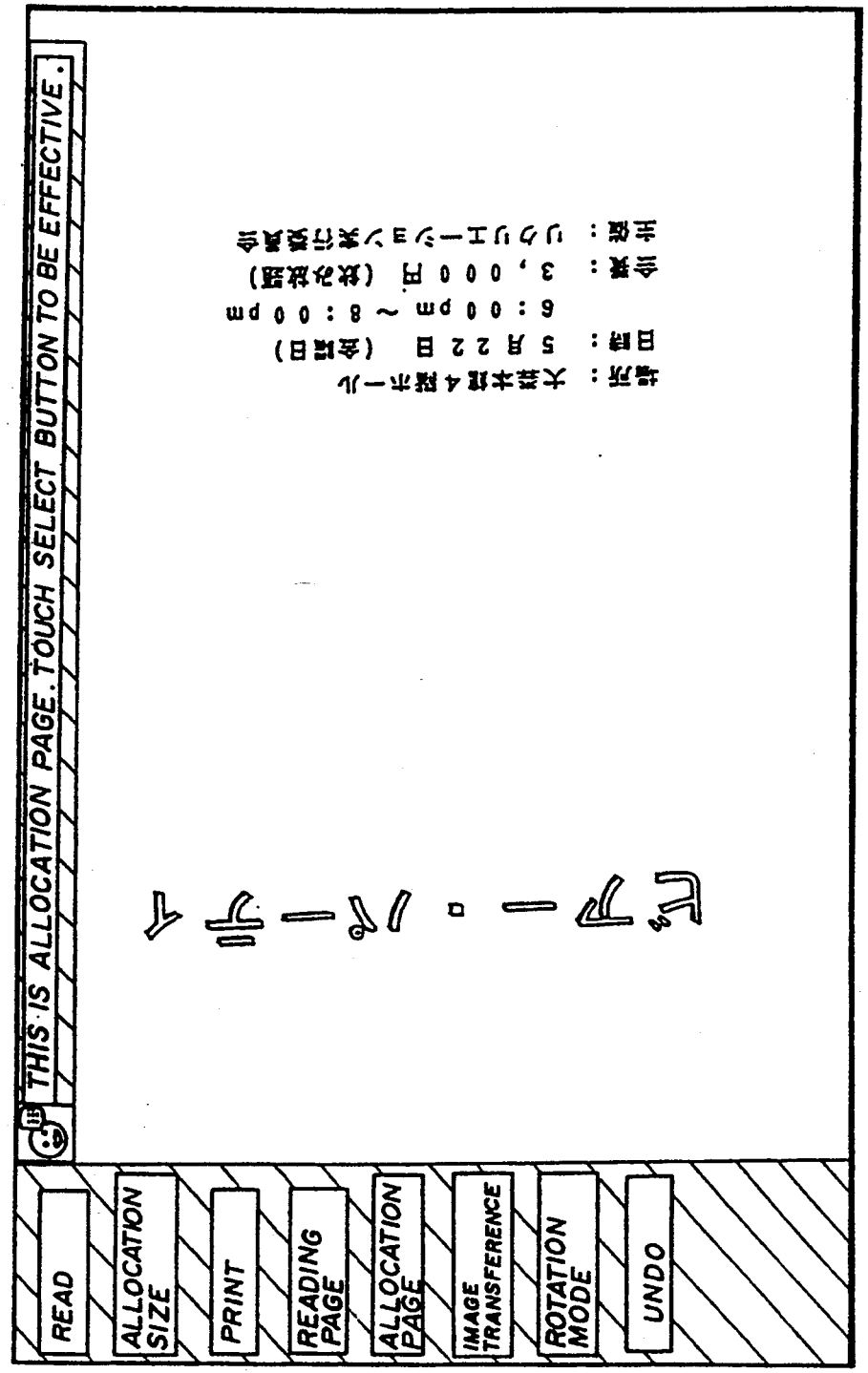

Then, after the operator specifies with the touch pen 4 the button "set" displayed at the bottom of the submenu on the LCD 3, the controller deletes the submenu from the image display part in S128 of FIG. 42. Then, the specified logical operation is performed, with the REC board 22, in S129 of FIG. 42. This performance is executed on image information defined with the input rectangle defining part from the input image and defined with the output rectangle defining part from the allocation image. Then, the resulting allocation image information is transferred to the video RAM of the LCD controller board 23 and the transferred information is then represented on the image display part of the LCD 3 as shown in FIG. 55 in S129 of FIG. 42. The controller deletes the displayed output rectangle for the allocation setting, before this display, and a message "This is allocation page. Touch a select button." is displayed as shown in FIG. 55.

Each of the above-mentioned 16 logical operations is a two-term logical operation. The 16 logical operations are as follows. Here, an image value representing the input area of image information, which area may have been varied in size, is referred to as X while an image value representing the allocation area is referred to as D. Then, image values resulting from the 16 logical operations performed on the image values X and D are as follow: "0", "^(X+D)", "^X·D", "^X", "X·^D", "^D", "X@D", "^(X·D)", "X·D", "^(X@D)", "D", "X+D", "X", "^X+^D", "X+D", "1". Here, the symbol "^" represents "inverse", the symbol "+" represents "OR" and the symbol "." represents "AND" and symbol "@" represents XOR (exclusive OR).

Then, if the operator determines that the extraction of the image information has not been appropriate as a result of the process performed until now so as to obtain a final image, then the "undo" button in the menu page of the LCD 3 may be specified with the touch pen 4. If the operator intends to also specify another input area, the "reading page" button in the menu page is to be specified. If the operator intends to input another original image, the "read" button is to be specified. If the operator hopes to print out the obtained final image, the "print" button is to be specified. These touch-pen specifications are performed in S52 of FIG. 36.

Reading Page Process

Figure 40:
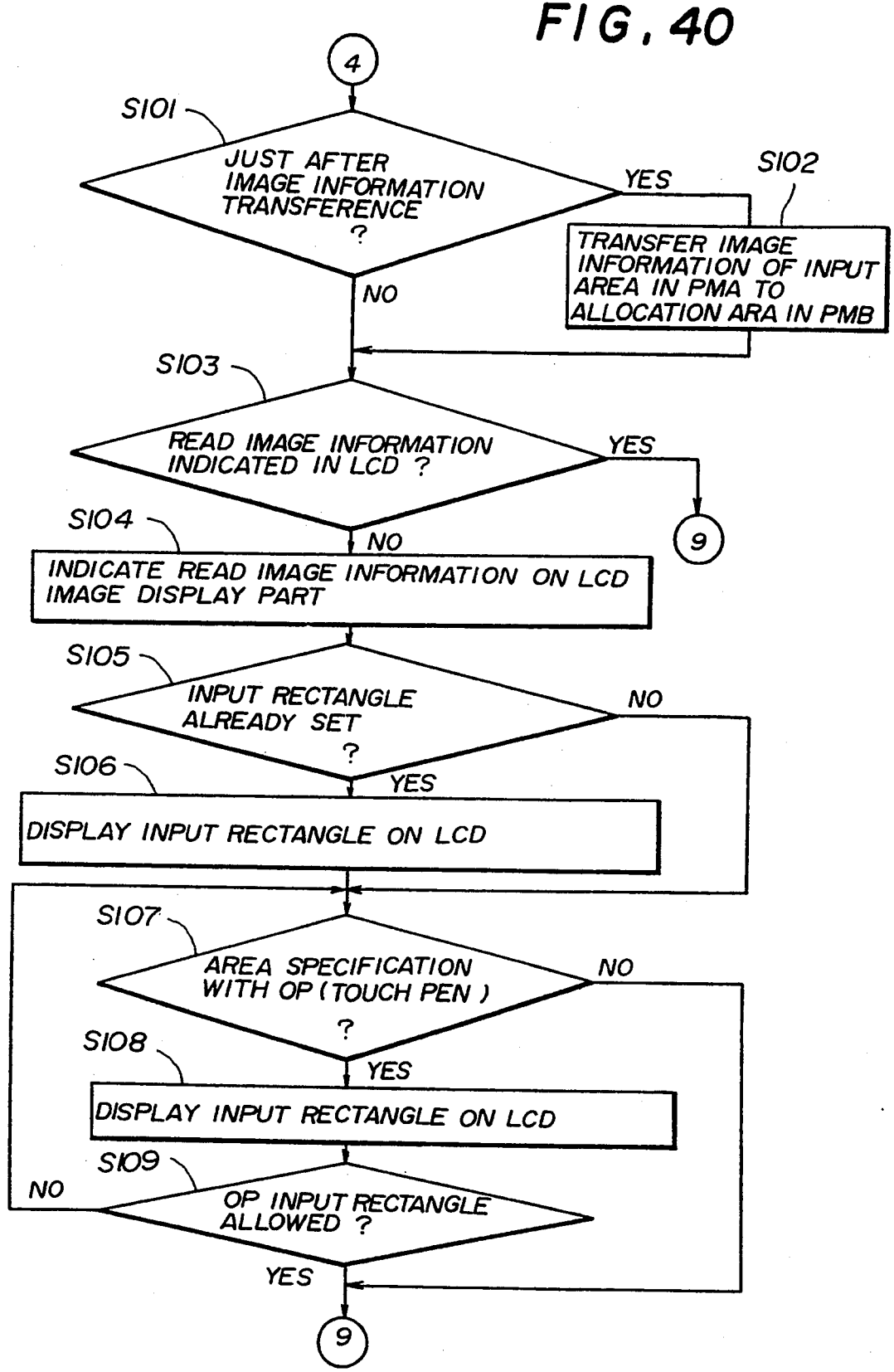
FIG. 40 shows an operation flow chart concerning a reading page process performed by the controller and an operation sequence performed by the operator in the apparatus shown in FIG. 35.

The button "reading page" in the menu page of the LCD 3 is specified with the touch pen 4 in S52 of FIG. 36, the process shown in FIG. 40 is then started from S101.

Step S102: The input area of image information stored in the first page memory board (PMA) is transferred to the allocation area prepared in the second page memory board (PMB). That is, if it is determined in S101 that it is just after the image information has been transferred, the process similar to the process of S62 is then executed.

Step S104: If it is determined in S103 that read image information is not displayed on the image display part of the LCD 3, the following operation is executed. With the REC board 22, read image information stored in the image buffer memory of the first page memory board 12 is transferred to the video RAM of the LCD controller board 23 so as to be represented on the image display part of the LCD 3.

Step S106: If it is determined in S105 that an input rectangle has been already set, the set input rectangle is then displayed on the image display part of the LCD 3.

Step S108: If it is determined in S107 that the touch pen 4 is used to specify two points in the image display part of the LCD 3, an input rectangle is displayed on the image display part, which input rectangle has two diagonally opposite corners or vertexes respectively coinciding with the specified two points as described above. This input rectangle is used to define an input area such as mentioned above. If an input rectangle has been already displayed, the currently displayed rectangle is deleted and then the new rectangle is displayed.

In the above process example, then, the operator intends to specify another input area. Then, the operator specifies with the touch pen 4 the button "reading page". As a result, the original image shown in FIG. 4 is again displayed on the image display part of the LCD 3. Then, the operator may appropriately repeat operations and processes similar to the above-mentioned ones for specifying an input area and allocating it in the allocation page. As a result of these operations and processes being performed, for example, an image shown in FIG. 56 may be obtained.

Then, the operator performs the determination in S52 of FIG. 36. The operator intends to use the other vertical-B5 original image shown in FIG. 5. Thus, the operator sets the original image in the scanner 2. Then, the operator specifies with the touch pen 4 the button "read" in the displayed menu page.

Here, it is the time just after the image information has been transferred, the controller 20, with the REC board 22, may vary the size of the image represented with the image information stored in the image buffer memory of the first page memory board 12. In this case, no size variation is needed. Then, the specified logical operation from among the 16 logical operations is performed on the image information, resulting from a size variation or without size variation being performed, and the output area of the image information stored in the image buffer memory of the second page memory board 13. Subsequently, the resulting image information is then written in this output area so as to update the output area of the image information, in S62 of FIG. 37.

Then, the reading-specification submenu is displayed on the image display part of the LCD 3 as shown in FIG. 48. Simultaneously, a message "Specify input parameter." as shown in FIG. 48, in S63 of FIG. 37.

Then, the operator specifies each parameter with the touch pen 4 being touched on the corresponding button. As a result, the controller 20, as occasion demands, reverses the state of the specified button to become a reversed white-on-black state while, if it is reversed, the previously reversed button is returned to the normal black-on-white state, in S64 of FIG. 37.

Then, after the operator determines all input parameters, the operator has to specify with the touch pen 4 the "set" button at the bottom of the submenu in S65 of FIG. 37. As a result, the controller 20 deletes the displayed submenu from the image display part in S67 of FIG. 37. Simultaneously, the controller 20 initiates the scanner 2 so as to make it read the set original image shown in FIG. 5. Then, the controller 20 receives the read image information and then writes it into the image buffer memory of the first page memory board 12 in S68 of FIG. 37.

Figure 57:
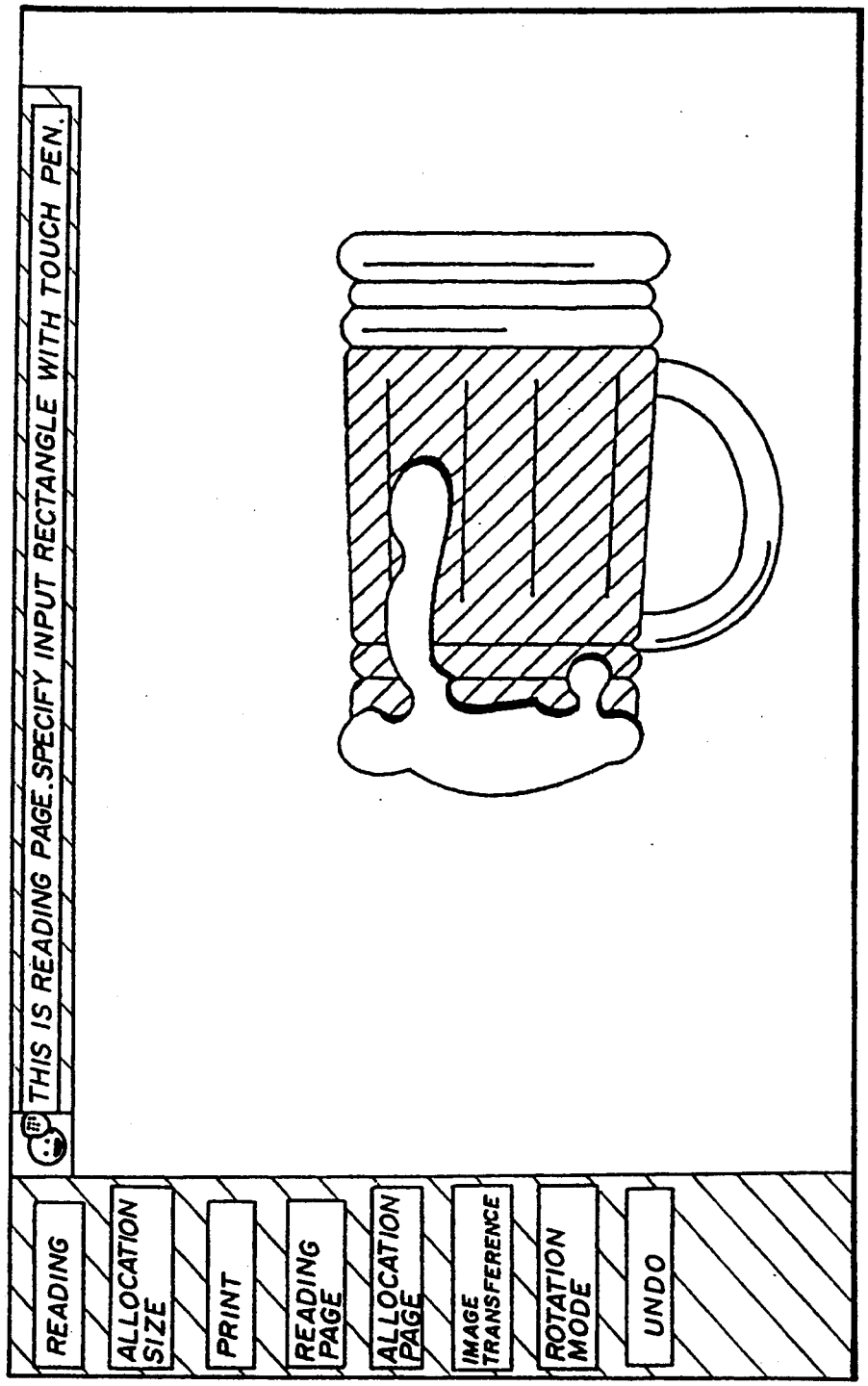

Then, with the REC board 22, the image information stored in the image buffer memory of the board 13 is transferred to the video RAM of the LCD controller board 23. Then, the transferred image information is represented on the image display part as shown in FIG. 57 in S69 of FIG. 37. Simultaneously, a message "This is read image. Specify an input rectangle with the touch pen." is displayed in the menu page.

Figure 58:
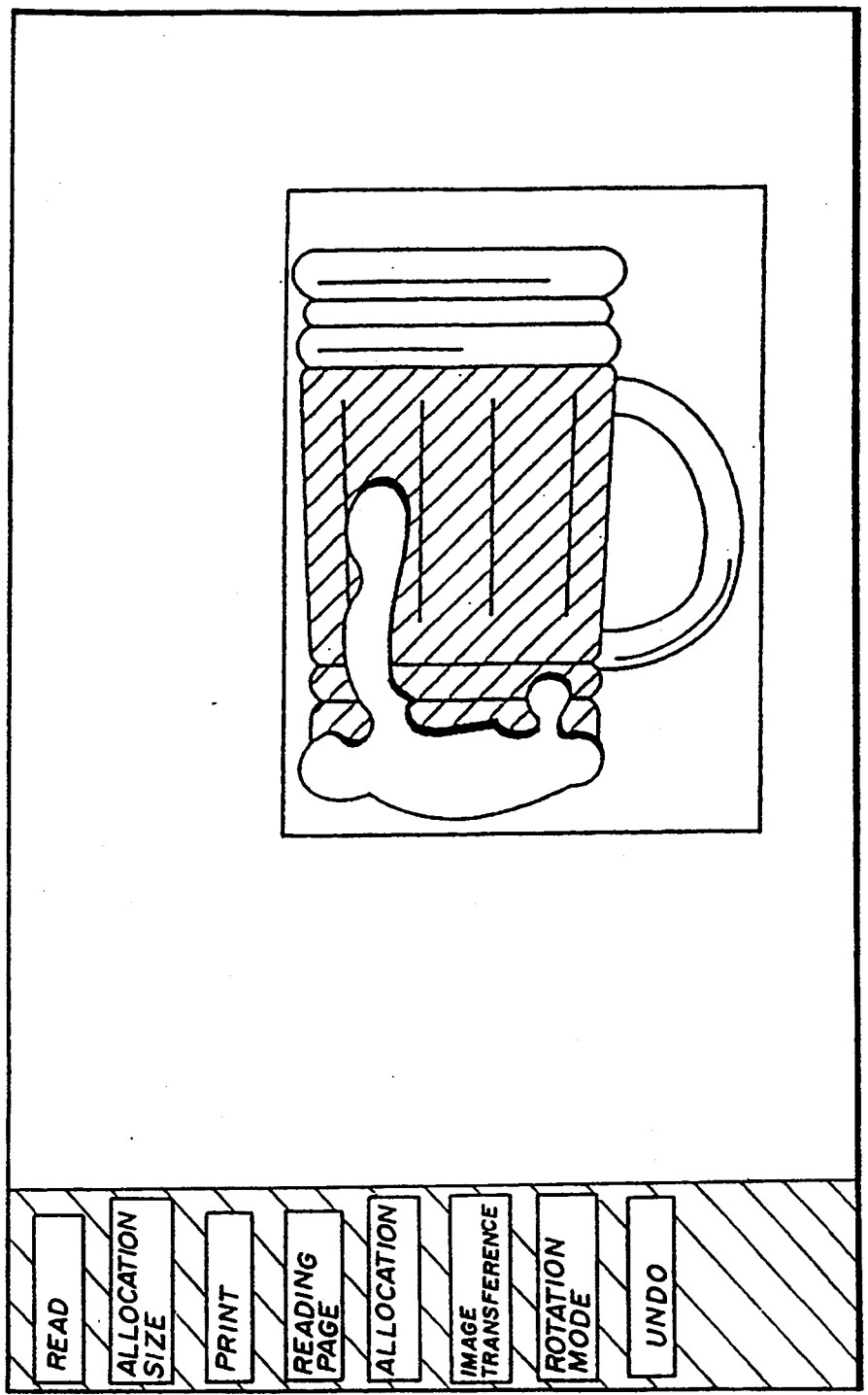

Then, the operator may specify a desired input area in the image represented on the image display part of the LCD 3 with the touch pen 4 in S70 of FIG. 37. As a result, the controller 20 display the input rectangle corresponding to the specified desired input area in S71 of FIG. 37. Here, the rectangle is displayed as shown in FIG. 58. This rectangle defines the picture of a mug filled with beer and this rectangle is added to the image displayed on the image display part as shown in FIG. 57.

Allocation Page Process

Figure 41:
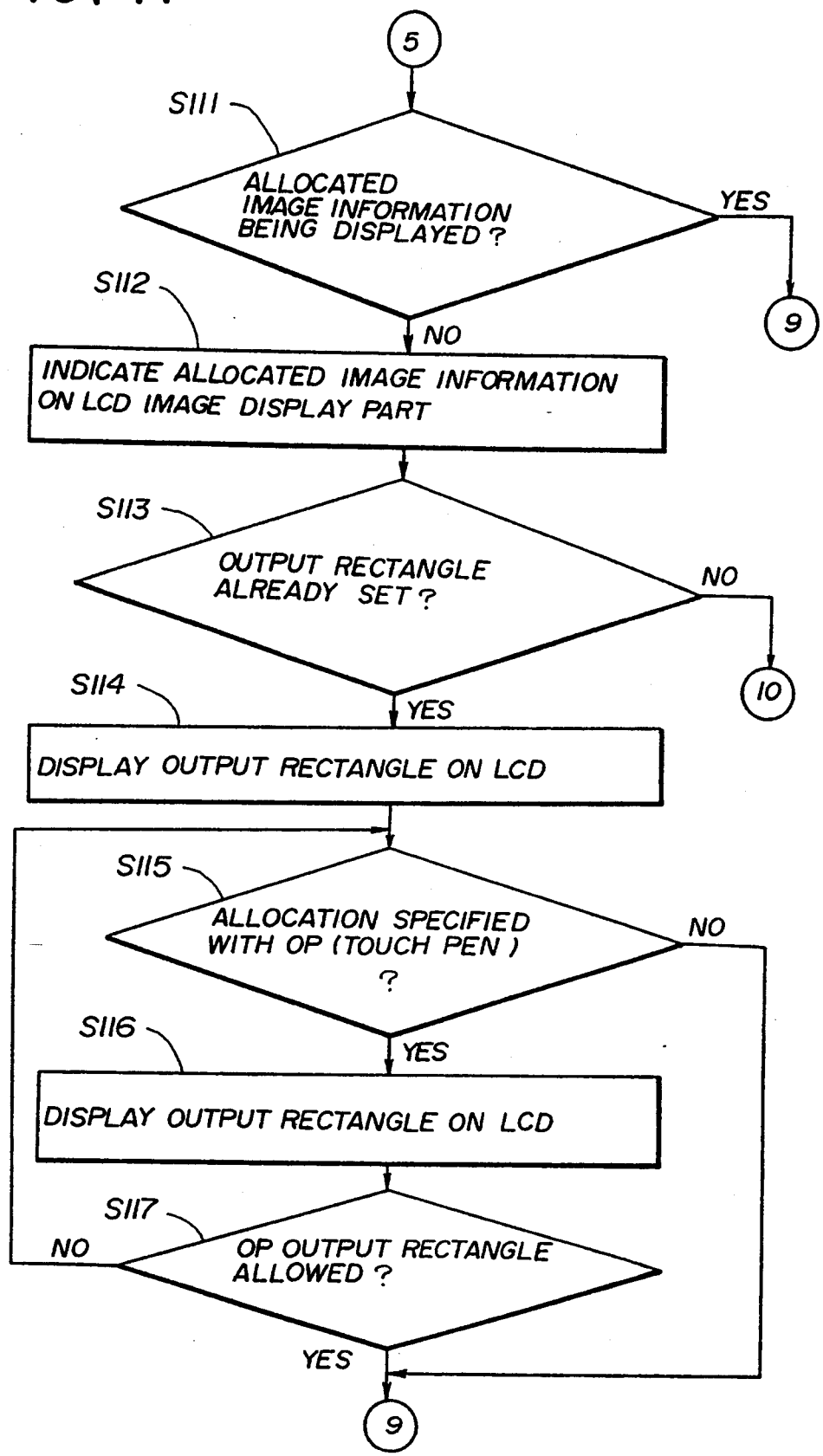
FIG. 41 shows an operation flow chart concerning a part of allocation page process performed by the controller and an operation sequence performed by the operator in the apparatus shown in FIG. 35.

The button "allocation page" in the menu page of the LCD 3 is specified with the touch pen 4 in S52 of FIG. 36, the process shown in FIG. 41 is then started from S111.

Step S112: If it is determined in S111 that allocation image information is not displayed on the image display part of the LCD 3, the following operation is then executed. Allocation image information stored in the image buffer memory of the second page memory board 13 is transferred to the video RAM of the LCD controller board 23 through the REC board 22. The transferred information is then displayed on the image display part.

Step S114: If it is determined in S113 that the output rectangle has been already set, the set output rectangle is displayed on the image display part of the LCD 3. If it is determined in S113 that the output rectangle has not been set yet, the process shown in FIG. 45 is then started.

Step S116: the output rectangle is displayed similarly to in S167.

Figure 59:
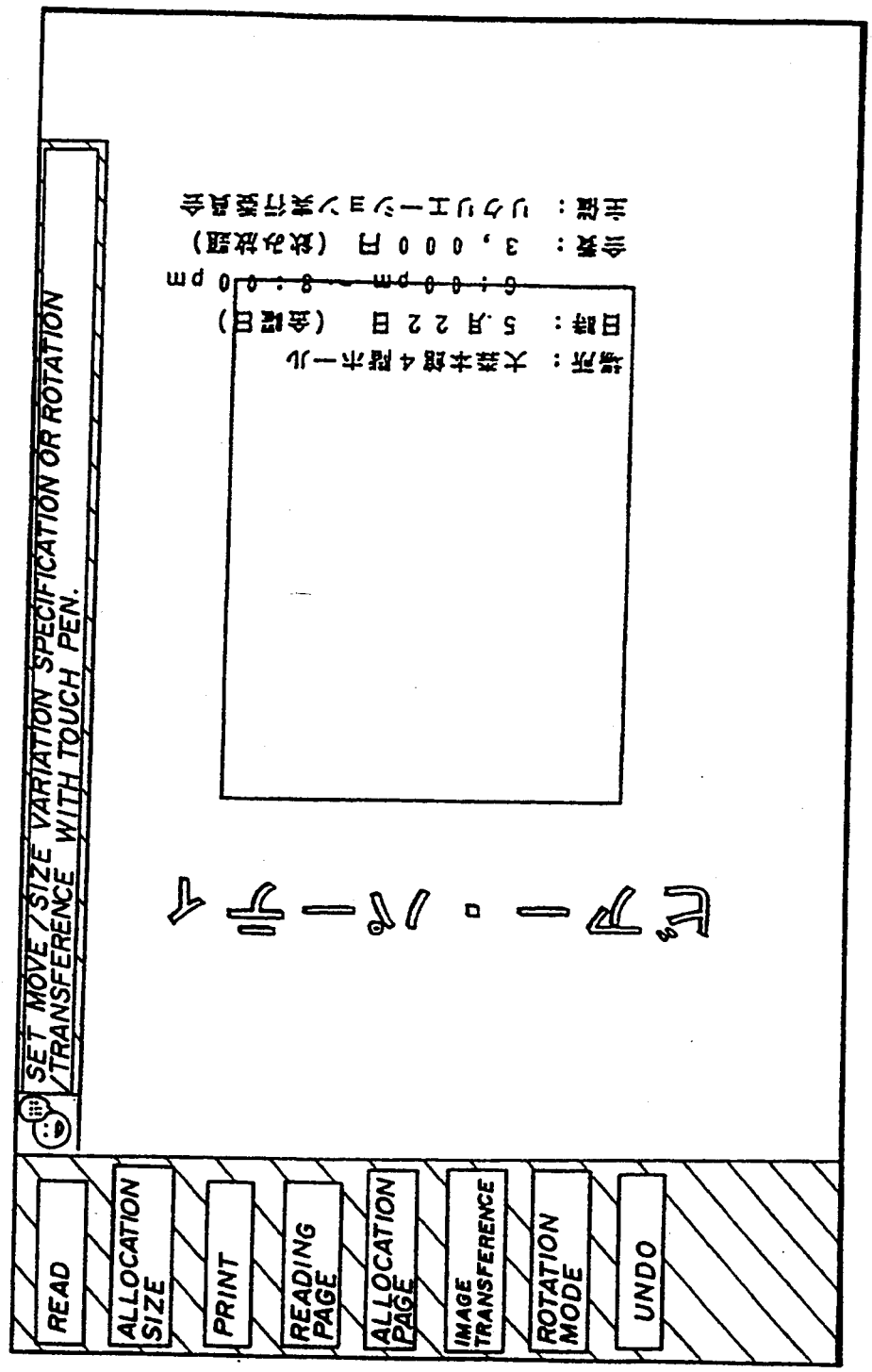

In the above process example, as a result of the operator specifying the button "allocation page" with the touch pen 4 in S52 of FIG. 36, the controller 20 then, with REC board 22, displays image in the image display part of the LCD 3 as shown in FIG. 59. That is, the allocation image information stored in the image buffer memory of the second page memory board 13 is represented in S112 of FIG. 41. Then, the controller 20 converts in size the input rectangle defining part from the read input image information. Thus, as a result of this size conversion or size variation, the size of the input rectangle appears as if the corresponding size of a fragment were cut out from the corresponding draft and the obtained fragment were then put on the size of sheet of paper, which size is identical in size to the allocation size. The resulting size of input rectangle is displayed in the center of the image display part in S165 in FIG. 45. The displayed rectangle is used as "default output rectangle for allocation". Simultaneously, a message is displayed in the menu page together with the displayed default output rectangle. This message is "Set specification of move/size-variation or rotation/transfer with the touch pen 4.".

Figure 60:
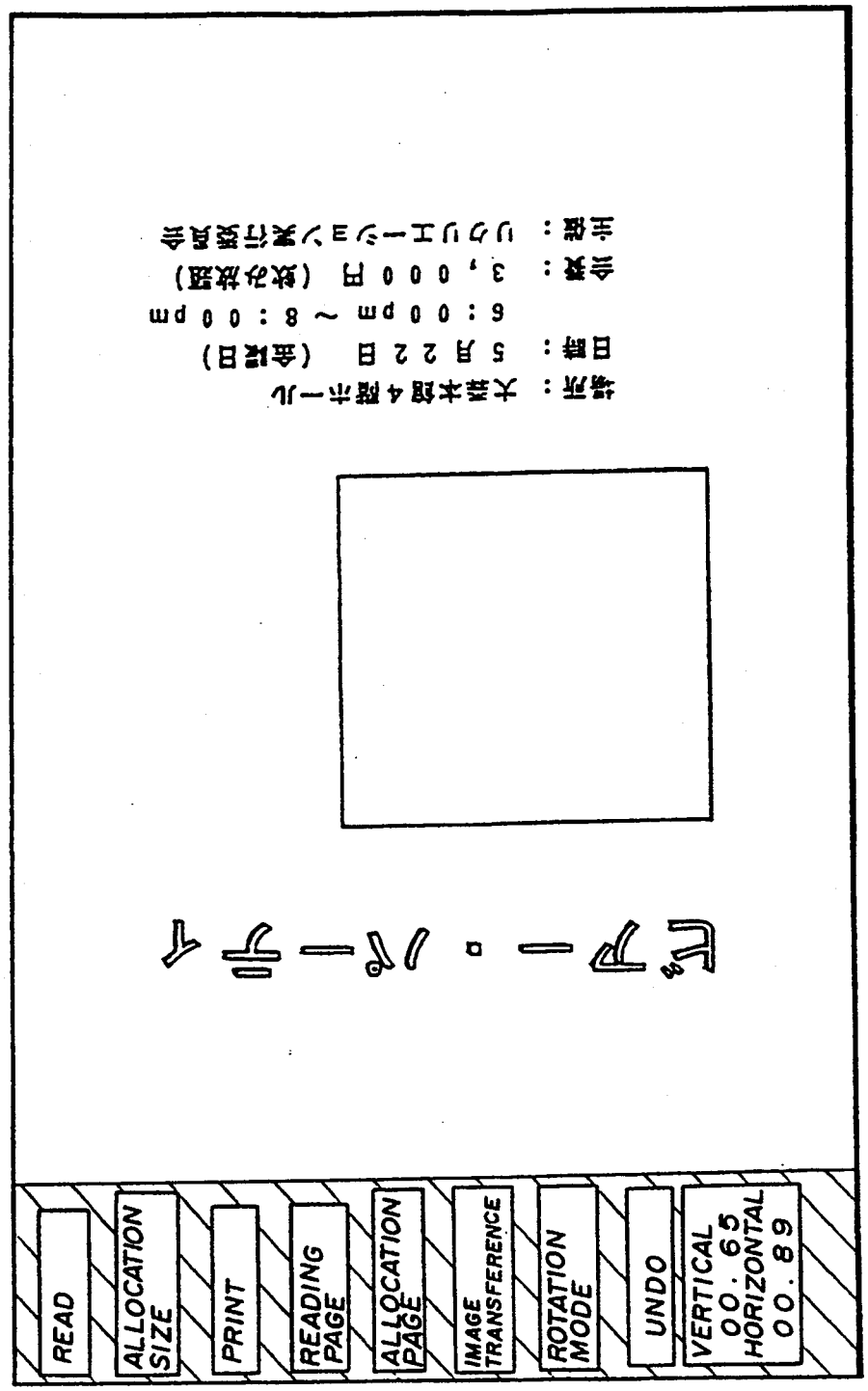

Then, the operator, as shown in FIG. 60, moves the displayed output rectangle, as mentioned above, and being repeated as follows. An edge of this rectangle is to be touched with the touch pen 4 and the touch pen 4 is dragged along the screen of the LCD 3 while the touch pen 4 is touching the edge. Then, the displayed output rectangle follows the drawn touch pen 4 and move accordingly in the image display part. Further, it is also possible to vary the size of the displayed output rectangle as follows. A corner or vertex of this rectangle is to be touched with the touch pen 4 and the touch pen 4 is drawn along the screen of the LCD 3 while the touch pen 4 is touching the edge. Then, the shape of the displayed output rectangle varies so that the resulting varied rectangle has two diagonally opposite vertexes, one which vertexes is fixed while the other follows the drawn touch pen 4. As a result, the location and size of the output rectangle with or without the above-mentioned moving/size variation operations are determined. Thus, the allocation area (output area) onto which the set area (input area) of image information will be allocated has been specified. These operations are in S166–168 of FIG. 45. Simultaneously, the menu page displayed together with the display of the rectangle includes the size-variation ratio (vertical 00.65, horizontal 00.89). This size-variation ratio is a ratio in size between the input area and the allocation area.

Then, as a result of the operator specifying the button "image transfer" in S52 of FIG. 36, the controller 20, as shown in FIG. 54, displays the logical-operation-specification submenu on the image display part of the LCD 3 in S124 of FIG. 42. Simultaneously, a message "Specify a logical operation mode" is displayed in the menu page. Here, a default choice of the logical operations is "X" (overwriting), a button corresponding the choice being in a reversed white-on-black state.

Figure 61:
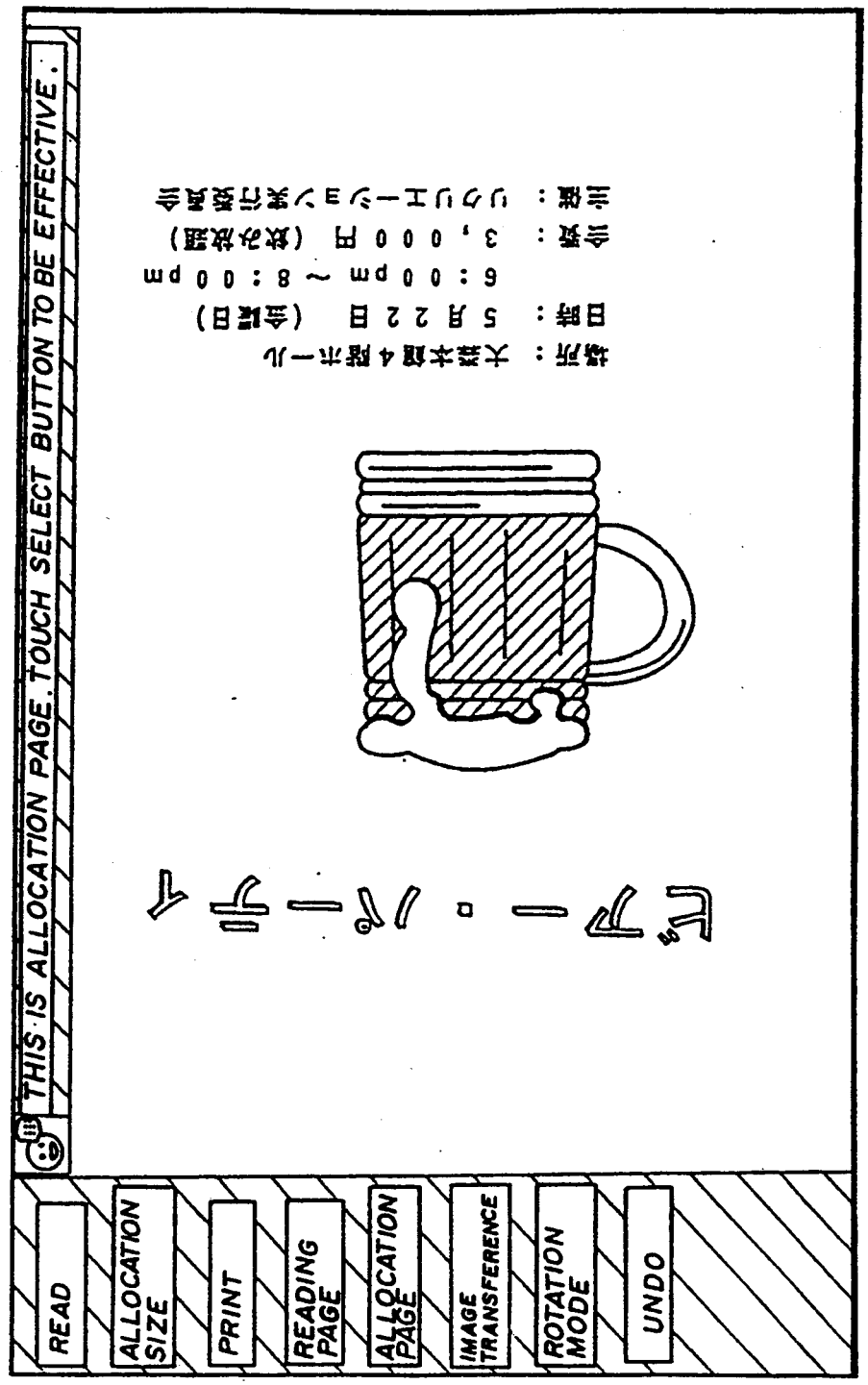

Then, as a result of the operator specifying "set" button at the bottom of the submenu with the touch pen 4, the controller 20 deletes the logical-operation-specification submenu from the image display part in S128 of FIG. 42. Then, the controller 20, with the REC board 22, varies in size the input rectangle (input area) of the read image information. Thus, the X-direction is multiplied by X2/X1 while the Y-direction is multiplied by Y2/Y1 in the input rectangle of image information. Then, the specified logical operation is performed on the size-varied image information and the output rectangle (or output area) of the allocation image information. Then the resulting allocation image information is transferred to the video RAM of the LCD controller board 23 and then displayed on the image display part of the LCD 3 as shown in FIG. 61 in S129 of FIG. 42. Here the controller deletes the displayed output rectangle for the allocation setting, before this display, and a message "This is allocation page. Touch a select button." is displayed as shown in FIG. 61.

Then the operator intends to specify another input area. Then the operator specifies with the touch pen 4 the button "reading page" in S52 of FIG. 36. Here it is the time just after the image information has been transferred. As a result the controller 20, with the REC board 22, varies the size of the input area of the input image represented with the image information stored in the image buffer memory of the first page memory board 12. Then the specified logical operation from among the 16 logical operations is performed on the image information, resulting from a size variation being performed, and the output area of the image information stored in the image buffer memory of the second page memory board 13. Subsequently the resulting image information is then written in this output area so as to update the output area of the image information, in S102 of FIG. 40.

Then the original image shown in FIG. 5 is again displayed as shown in FIG. 57 on the image display part of the LCD 3 in S104 of FIG. 40. Simultaneously, a message "This is read image. Specify an input rectangle with the touch pen." is displayed in the menu page.

Then, the operator specifies a desired input area in the image displayed on the image display part in S70 of FIG. 37 with the touch pen 4. As a result, the controller 20 displays the input rectangle corresponding to the specified input area in S71 of FIG. 37. Here, the input rectangle is again displayed as shown in FIG. 58.

Figure 62:
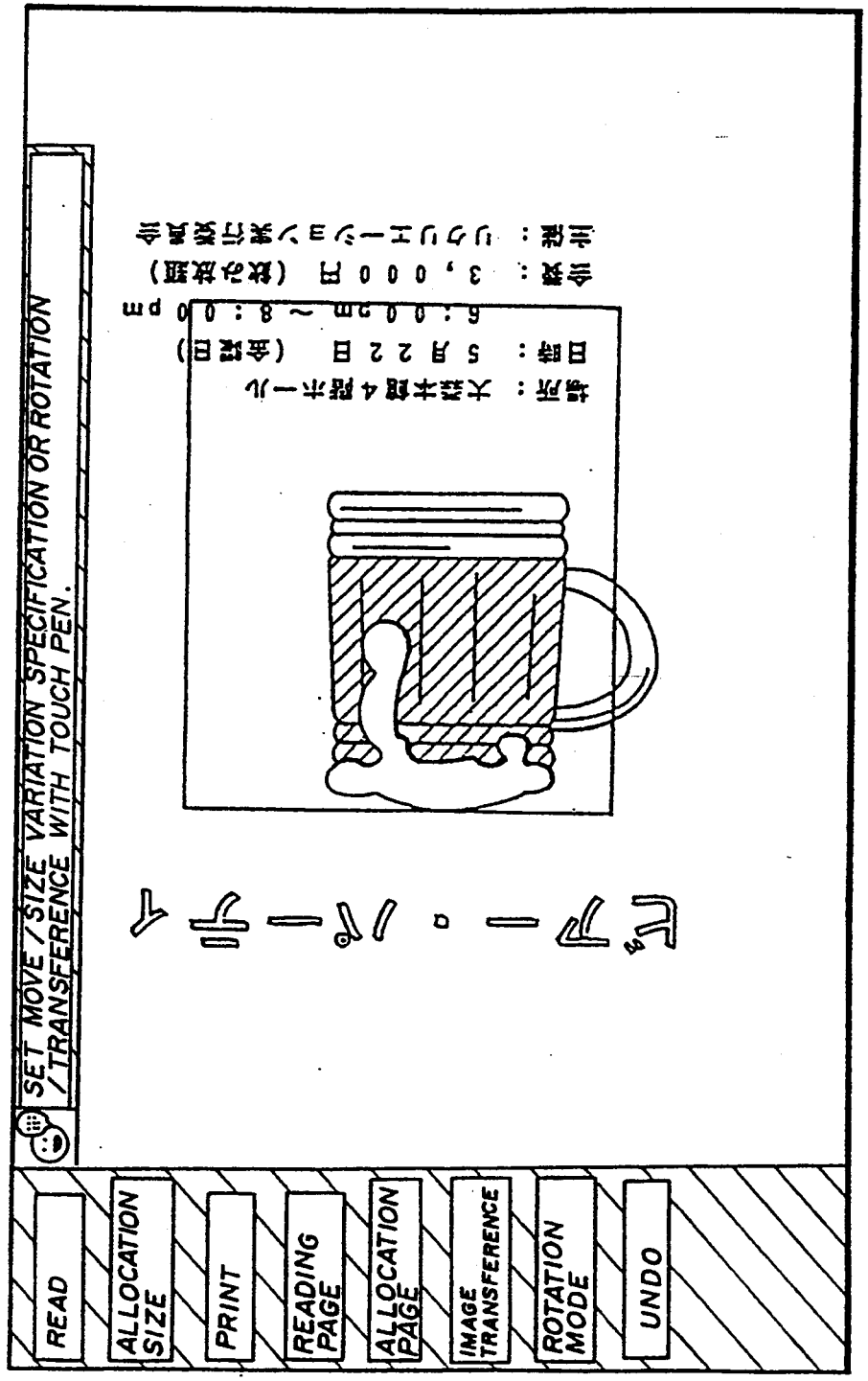

Then, the operator specifies the "allocation page" button in the menu page with the touch pen 4 in S52 of FIG. 36. As a result, the controller 20 displays an image in the image display part of the LCD as shown in FIG. 62.

That is, the allocation image information stored in the image buffer memory of the second page memory board 13 is represented in S112 of FIG. 41. Then, the controller 20 converts the input rectangle specified about the read input image information in size. Thus, as a result of this size conversion or size variation, the size of the input rectangle appears as if the corresponding size of a fragment were cut out from the corresponding draft and the obtained fragment were then put on the sheet of paper, which is identical in size to the size of the allocation. The resulting size of the input rectangle is displayed in the center of the image display part in S165 in FIG. 45. The displayed rectangle is used as "default output rectangle for allocation". Simultaneously, a message is displayed in the menu page together with the displayed default output rectangle. This message is "Set specification of move/size-variation or rotation/transfer with the touch pen 4.".

Rotation Mode Process

In S52 in FIG. 36, if the button "rotation mode" displayed in the menu page is specified with the touch pen 4, the process shown in FIG. 32 is started from S131.

Step S132: An alert message "An output rectangle is not displayed. Set or display it." is displayed on the image display part of the LCD 3 if it is determined in S131 that the allocation image information is not displayed and/or the output rectangle has not been set yet.

Step S133: After the button "acknowledgement" is specified with the touch pen 4, this alert message is deleted from the image display part and then the former page is displayed thereon.

Step S134: If it is determined in S131 that the allocation image information is displayed and the output rectangle has been already set, another submenu is then displayed on the image display part of the LCD 3. This other submenu is for rotation-mode specification. This submenu includes the following rotation-mode specifications: "no rotation", "90° rotation", "180° rotation", "270° rotation", "Y-axis reversal (the term "reversal" will mean "reflection", hereinafter and in the drawings)", "Y-axis reversal+90° rotation", "X-axis reversal" and "X-axis reversal+90° rotation". (The term "reversal" or "reflection" will be explained as follows. For example, "Y-axis reflection" means as follows. An image is changed as if the image is reflected by a mirror. As a result of this change, the right and left sides of the image are replaced with one another.)

Step S137 and S138: If it is determined in S136 that the button either "set" or "delete" is specified with the touch pen 4, the above-mentioned rotation-mode-specification submenu is deleted from the image display part and the former image is then displayed thereon.

Step S140: If it is determined in S139 that as a result of the specified rotation specification being performed, the resulting rectangle cannot be allocated into the allocation area having the allocation size, the following alert message is then displayed. This alert message is "The input rectangle is too large. Set again." and is displayed in the image display part of the LCD 3.

Step S141: After the button "acknowledgement" is specified with the touch pen 4, this alert message is deleted from the image display part and then the former page is displayed thereon.

Step S142: If it is determined in S139 that the resulting rectangle can be allocated into the allocation area having the allocation size, the resulting rectangle is then displayed as the output rectangle on the image display part of the LCD 3.

Step S144: Similar to S167, the output rectangle is displayed on the LCD 3.

Figure 63:
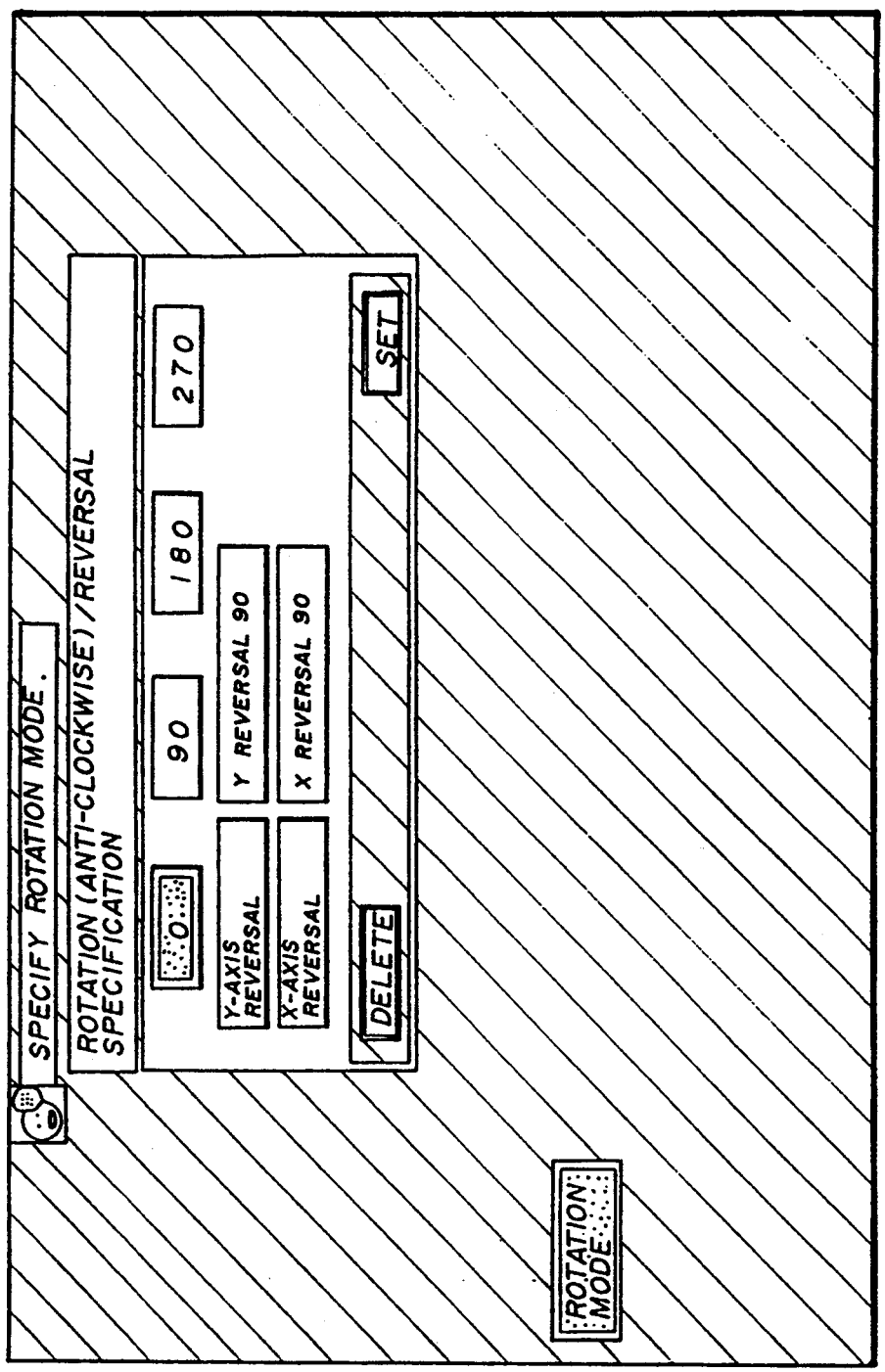

In the above actual process example, then the operator specifies the "rotation mode" button in of FIG. 36. As a result, the controller 20, as shown in FIG. 63, displays the rotation-mode-specification submenu in the image display part of the LCD 3 in S134 of FIG. 43. Simultaneously, a message "Specify a rotation mode." is displayed in the menu page. Here, a button representing "0" (no rotation) as a default choice is in the reversed white-on-black state.

Figure 43:
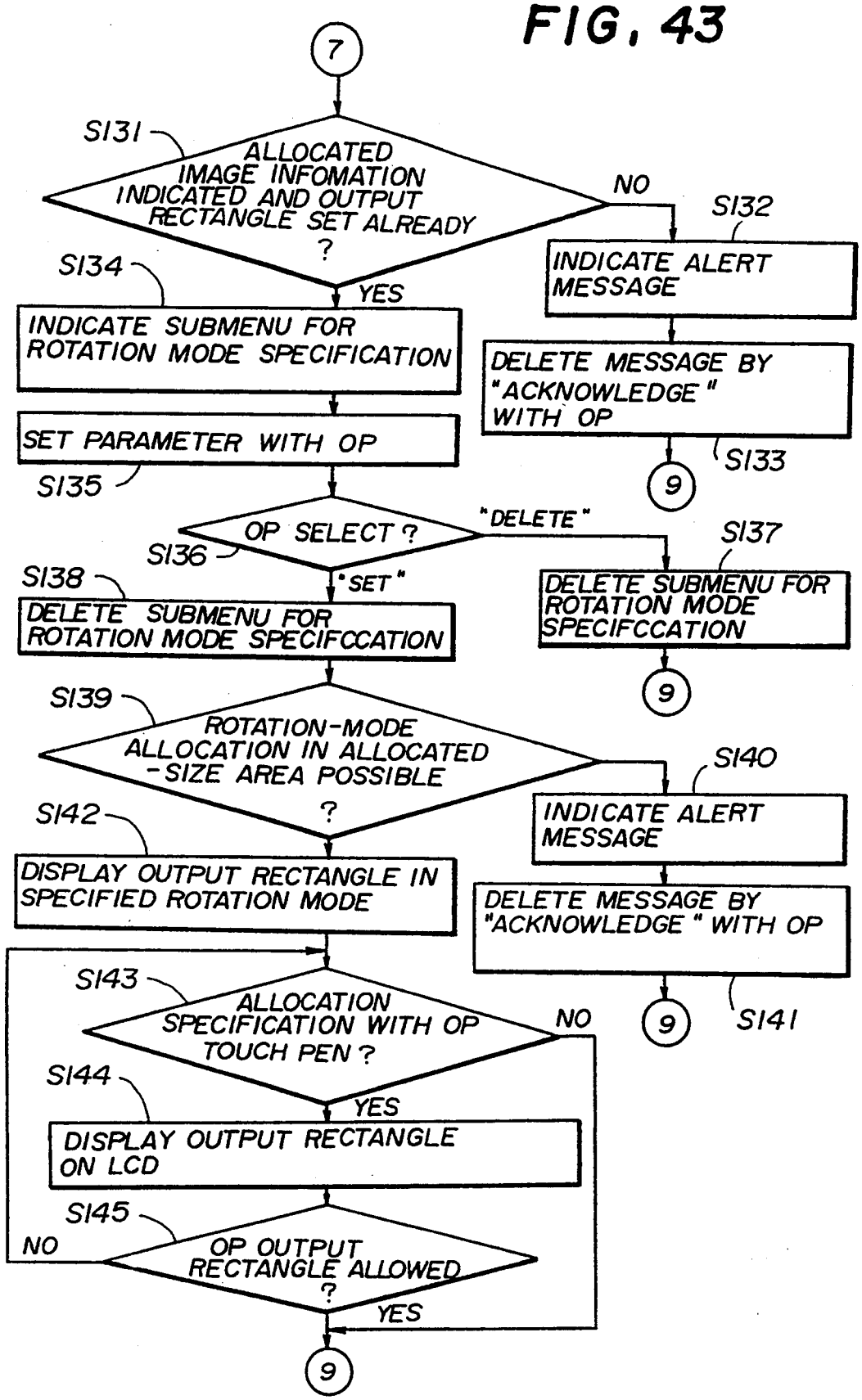
FIG. 43 shows an operation flow chart concerning a rotation mode process performed by the controller and an operation sequence performed by the operator in the apparatus shown in FIG. 35.

If the default choice is not desired, the operator then specifies a desired rotation mode with the touch pen 4 in S135 of FIG. 43. As a result, the controller 20 reverses the button representing the specified rotation-mode letters into the reversed white-on-black state while the previously reversed button is then returned to the normal black-on-white state. Here, the operator specifies the "90" (90° rotation).

Figure 64:
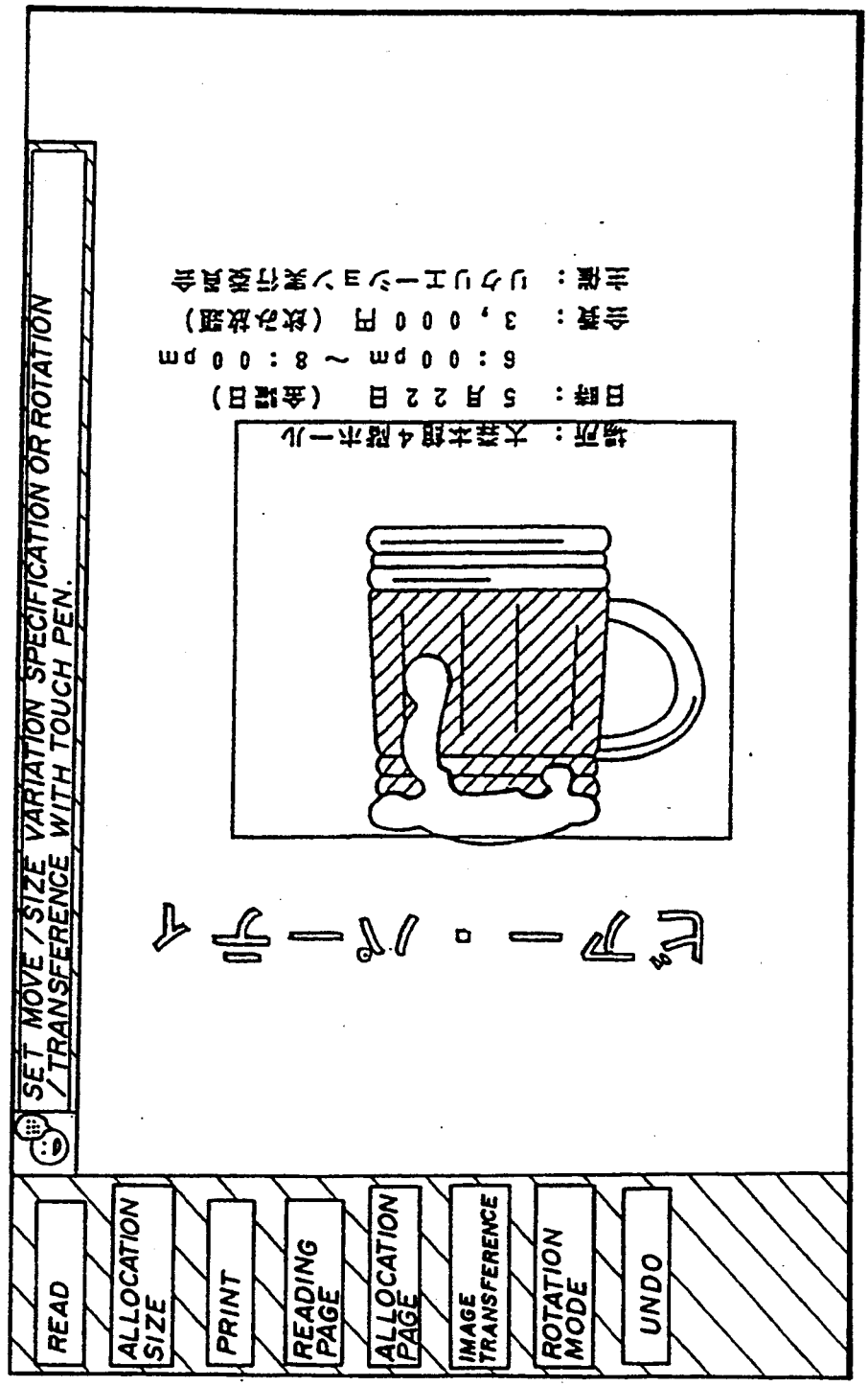

Then, as a result of the operator specifying with the touch pen 4 the button "set", the controller 20 deletes the rotation-mode-specification submenu from the image display part of the LCD 3 in S138 of FIG. 43. Then, the controller 20 displays, as shown in FIG. 64, the resulting output rectangle on image display part of the LCD 3 in S142 of FIG. 43. The resulting output rectangle is a rectangle obtained as a result of the specified rotation-mode specification being performed.

Figure 65:
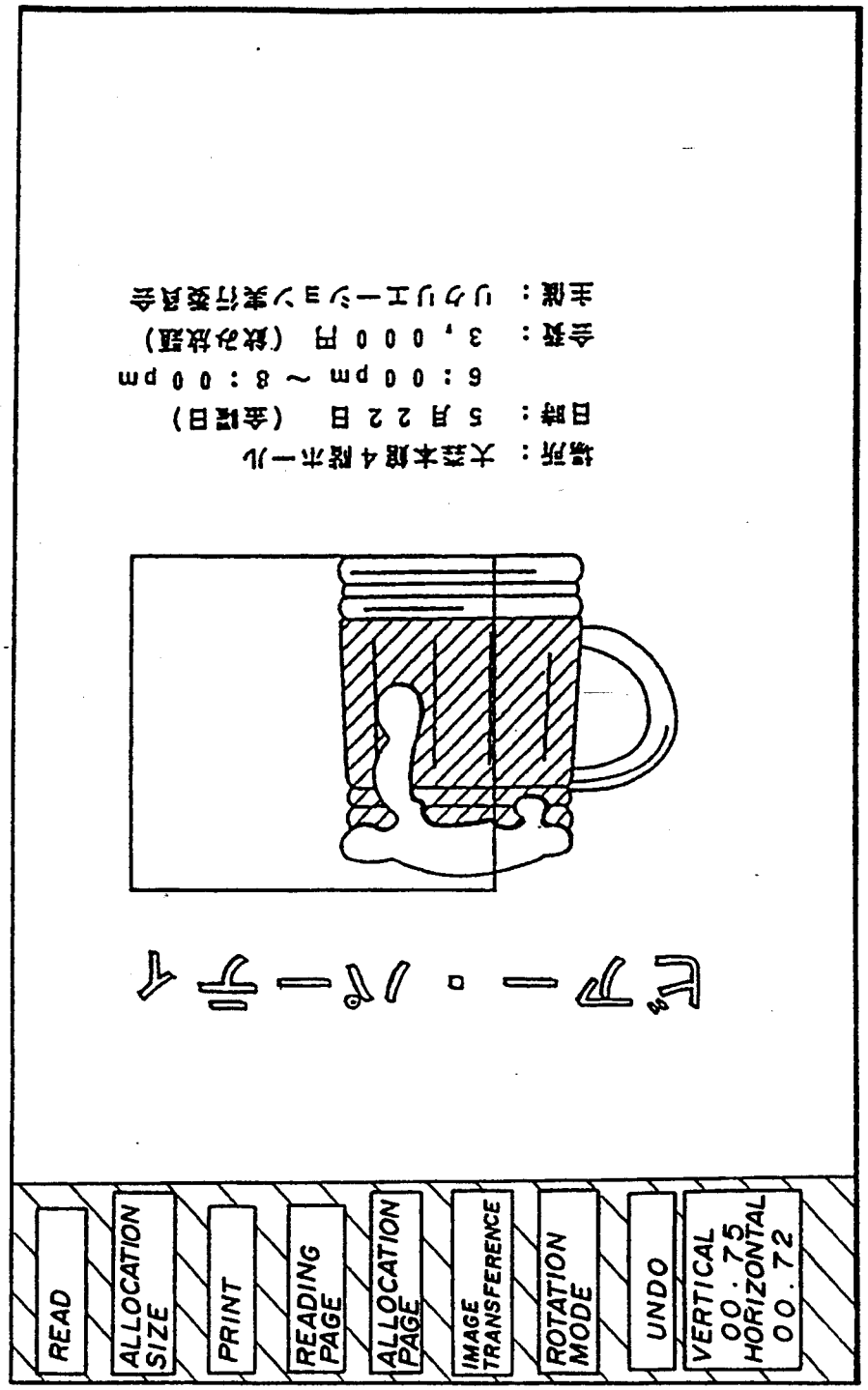

Then, the operator, as shown in FIG. 65, moves the displayed output rectangle, as mentioned above, and being repeated as follows. An edge of this rectangle is to be touched with the touch pen 4 and the touch pen 4 is drawn on the screen of the LCD 3 while the touch pen 4 is touching the edge. Then, the displayed output rectangle follows the drawn touch pen 4 and moves accordingly in the image display part. Further, it is also possible to vary the size of the displayed output rectangle as follows. A corner or vertex of this rectangle is to be touched with the touch pen 4 and the touch pen 4 is drawn on the screen of the LCD 3 while the touch pen 4 is touching the edge. Then, the shape of the displayed output rectangle varies so that the resulting varied rectangle has two diagonally opposite vertexes, one which vertexes is fixed while the other follows the dragged touch pen 4. As a result, the location and size of the output rectangle with or without the above-mentioned moving/size variation operations are determined. Thus, the allocation area (output area) onto which the set area (input area) of image information will be allocated has been specified. These operations are in S166–168 of FIG. 45. Here, simultaneously, the menu page displayed together with the display of the rectangle includes the size-variation ratio (vertical 00.75, horizontal 00.72). This size-variation ratio is a ratio in size between the input area and the allocation area.

Then, as a result of the operator specifying the button "image transfer" in S52 of FIG. 36, the controller 20, as shown in FIG. 54, displays the logical-operation-specification submenu on the image display part of the LCD 3 in S124 of FIG. 42. Simultaneously, a message "Specify a logical operation mode" is displayed in the menu page.

Then, the operator specifies the "X+D" (OR operations) button with the touch pen 4 in S125 of FIG. 42. As a result, the controller 20 reverses the specified button and the previously reversed button is reversed so as to become the normal black-on-white state.

Figure 66:
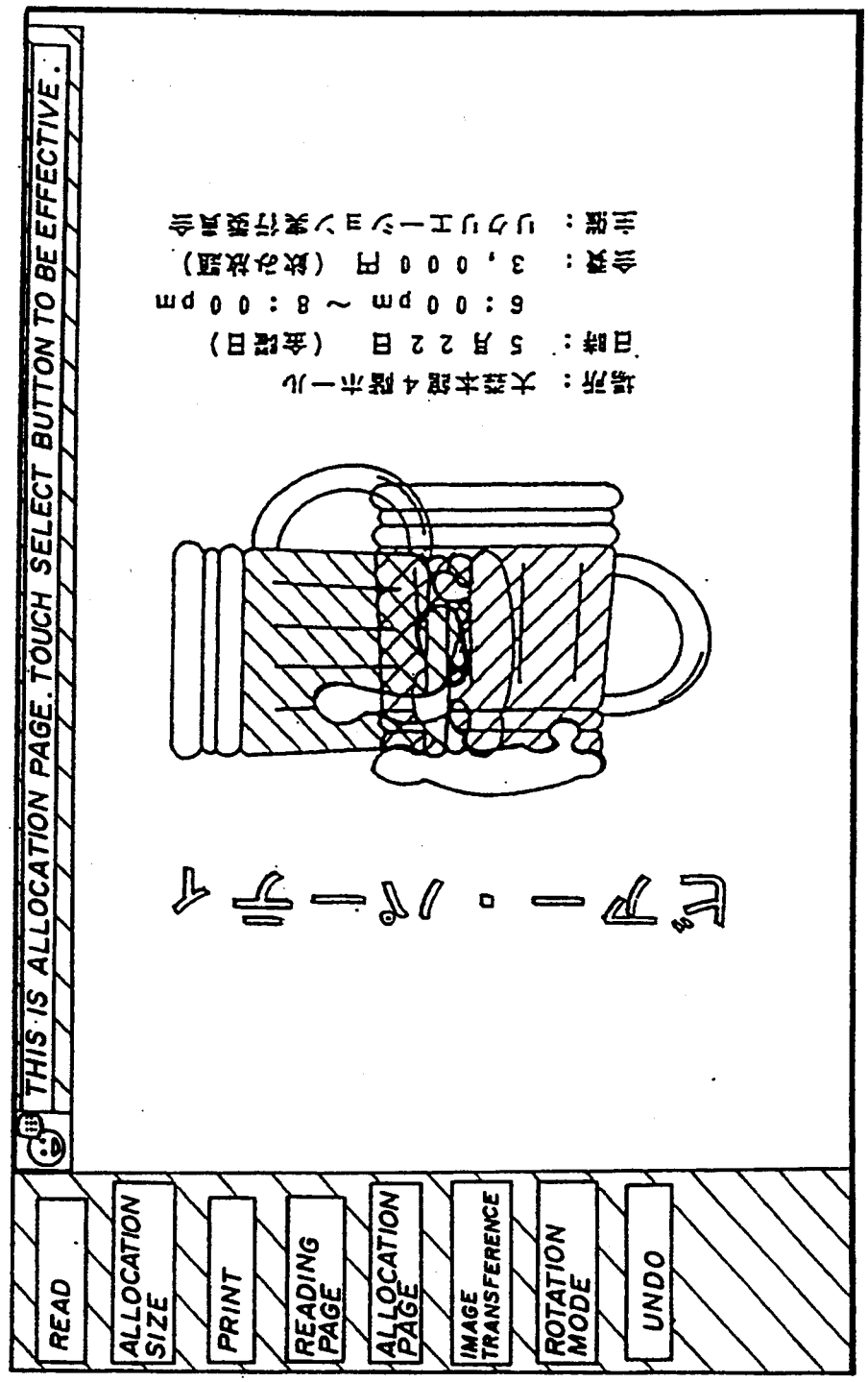

Then, as a result of the operator specifying "set" button at the bottom of the submenu with the touch pen 4, the controller 20 deletes the logical-operation-specification submenu from the image display part in S128 of FIG. 42. Then, the controller 20, with the REC board 22, performs the specified logical operation on the input rectangle of the read image information and the output rectangle of the allocation image information. Then, the resulting allocation image information is then transferred to the video RAM of the LCD controller board 23 and then displayed on the image display part of the LCD 3 as shown in FIG. 66 in S129 of FIG. 42. Here, the controller deletes the displayed output rectangle for the allocation setting, before this display, and a message "This is allocation page. Touch a select button." is displayed as shown in FIG. 66.

Undo Process

Figure 44:
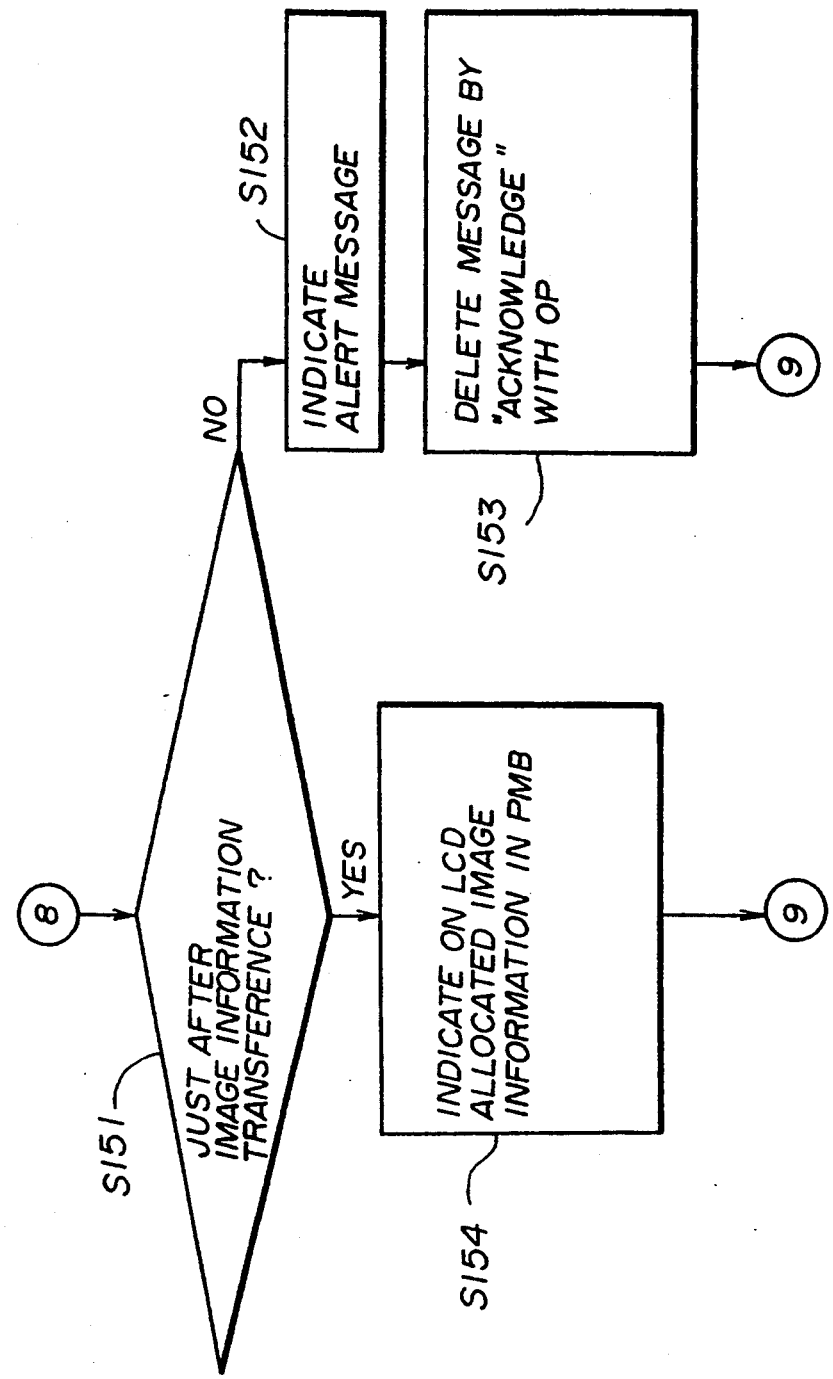
FIG. 44 shows an operation flow chart concerning a UNDO process performed by the controller and an operation sequence performed by the operator in the apparatus shown in FIG. 35.

In S52 in FIG. 36, if the button "undo" displayed in the menu page is specified with the touch pen 4, the process shown in FIG. 44 is started from S151.

Step S152: An alert message "Currently an undo function of an image transference is uneffective." is displayed on the image display part of the LCD 3 if it is determined in S151 that it is not the time just after the image information has been transferred.

Step S153: After the button "acknowledgement" is specified with the touch pen 4, this alert message is deleted from the image display part and then the former page is displayed thereon.

Step S154: If it is determined in S151 that it is the time just after the image information has been transferred, with the REC board 22, the allocation image information stored in the second page memory board 13 is transferred to the video RAM in the LCD controller board 23 and then the transferred image information is represented on the image display part of the LCD 3.

Figure 67:
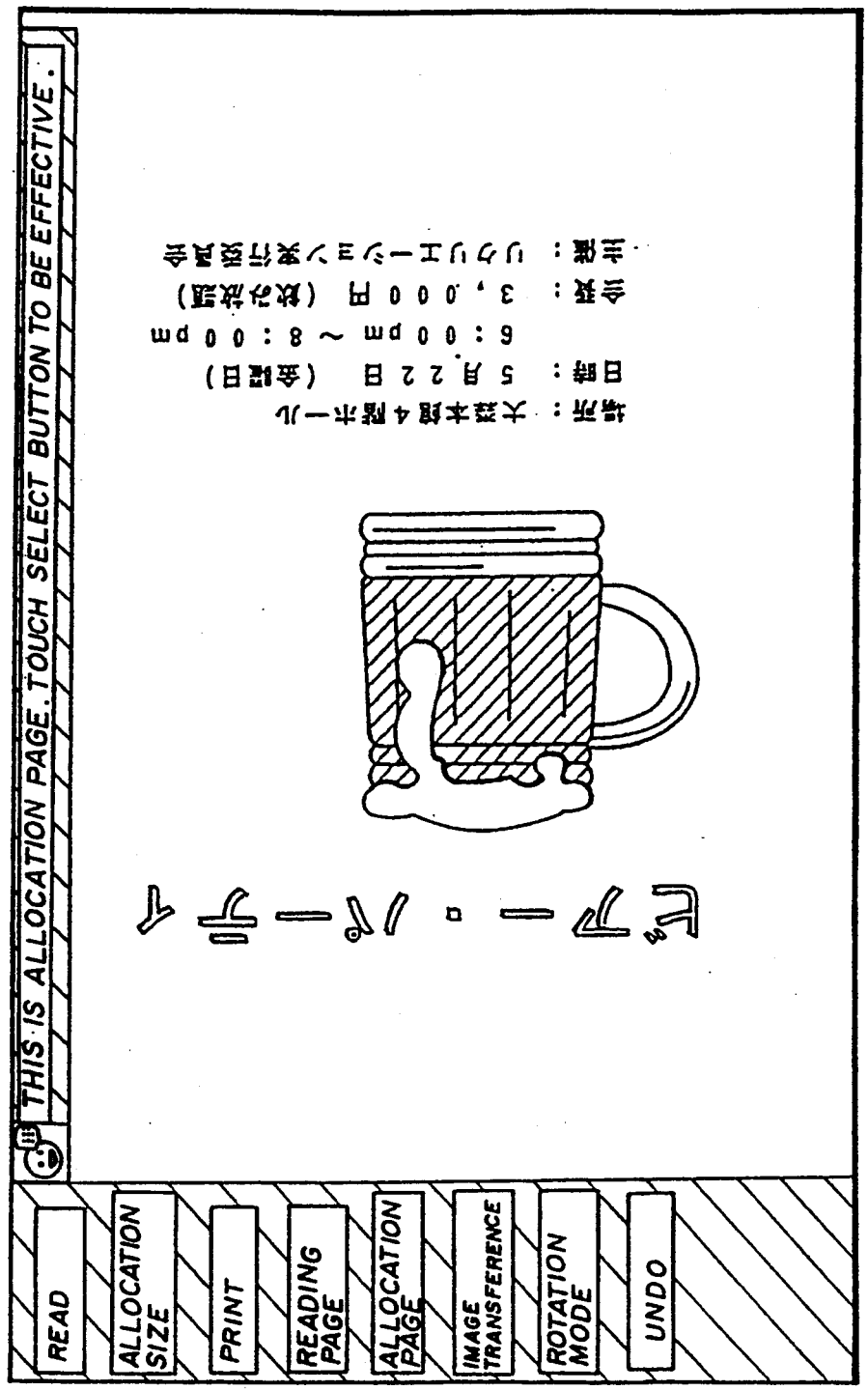

In the actual process example, then the operator determines that the image processing which has been performed is not appropriate. As a result, the operator specifies with the touch pen 4 the button "undo" in S52 of FIG. 36. Subsequently, the controller 20, with the REC board 22, transfers the allocation image information stored in the image buffer memory of the second page memory board 13 to the video RAM in the LCD controller board 23. Then, the controller 20 displays the transferred image information on the image display part of the LCD 3 as shown in FIG. 67 in S154 of FIG. 44.

The operator hopes trying again the area allocation. As a result, the operator specifies the button "reading page" with the touch pen 4 in S52 of FIG. 36. Here, because it is not the time just after the image information has been transferred, the controller 20 again displays, on the image display part of the LCD 3, the original image shown in FIG. 5 as shown in FIG. 57 in S104 of FIG. 40. Simultaneously, a message "This is a read image or a reading page. Specify an input rectangle with the touch pen." is indicated in the menu page.

Then, the operator specifies with the touch pen 4 a desired input area in the image displayed on the image display part of the LCD 3 in S52 of FIG. 36. As a result, the controller 20 displays the input rectangle corresponding to the specified input area in S71 of FIG. 37. Here, the input rectangle is displayed as shown in FIG. 58.

Figure 68:
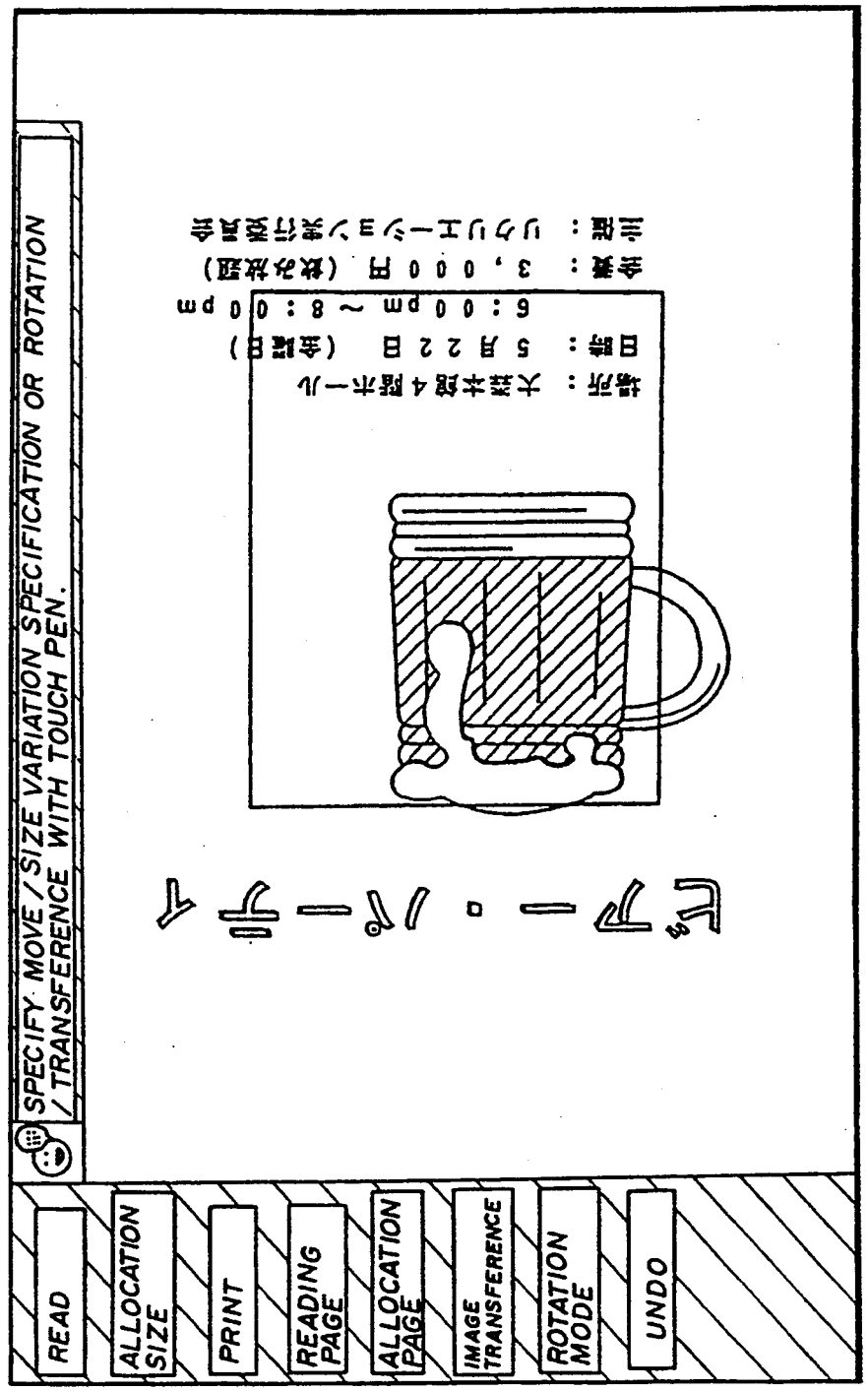

Then, the operator specifies the "allocation page" button in the menu page with the touch pen 4 in S52 of FIG. 36. As a result, the controller 20 displays an image in the image display part of the LCD 3 as shown in FIG. 68 in S112 of FIG. 41. Then, the controller 20 converts the input rectangle specified about the read input image information in size. Thus, as a result of this size conversion or size variation, the size of the input rectangle appears as if the corresponding size of a fragment were cut out from the corresponding draft and the obtained fragment were then put on the size of sheet of paper, which is identical in size to the size of the allocation. The resulting size of input rectangle is displayed in the center of the image display part in S165 in FIG. 45. The displayed rectangle is used as a default output rectangle for allocation. Simultaneously, a message is displayed in the menu page together with the displayed default output rectangle. This message is "Set specification of move/size-variation or rotation/transfer with the touch pen 4.".

Then the operator specifies the "rotation mode" button in the menu page of the LCD 3 with the touch pen 4 in S52 of FIG. 36. As a result, the controller 20, as shown in FIG. 63, displays the rotation-mode-specification submenu in the image display part of the LCD 3 in S134 of FIG. 43. Simultaneously, a message "Specify a rotation mode." is displayed in the menu page.

If the default choice is not desired, the operator then specifies a desired rotation mode with the touch pen 4 in S135 of FIG. 43. As a result, the controller 20 reverses the button representing the specified rotation-mode letters into the reversed white-on-black state while the previously reversed button is then returned to the normal black-on-white state. Here, the operator specifies the "Y-axis reversal" as the rotation mode. (There, the reversal (reflection) operation is made to be included in the rotation mode for the sake of simplification.)

Then, as a result of the operator specifying with the touch pen 4 the button "set", the controller 20 deletes the rotation-mode-specification submenu from the image display part of the LCD 3 in S138 of FIG. 43. Then, the controller 20 displays, as shown in FIG. 64, the resulting output rectangle on the image display part of the LCD 3 in S142 of FIG. 43. The resulting output rectangle is a rectangle obtained as a result of the specified rotation-mode specification being performed.

Figure 69:
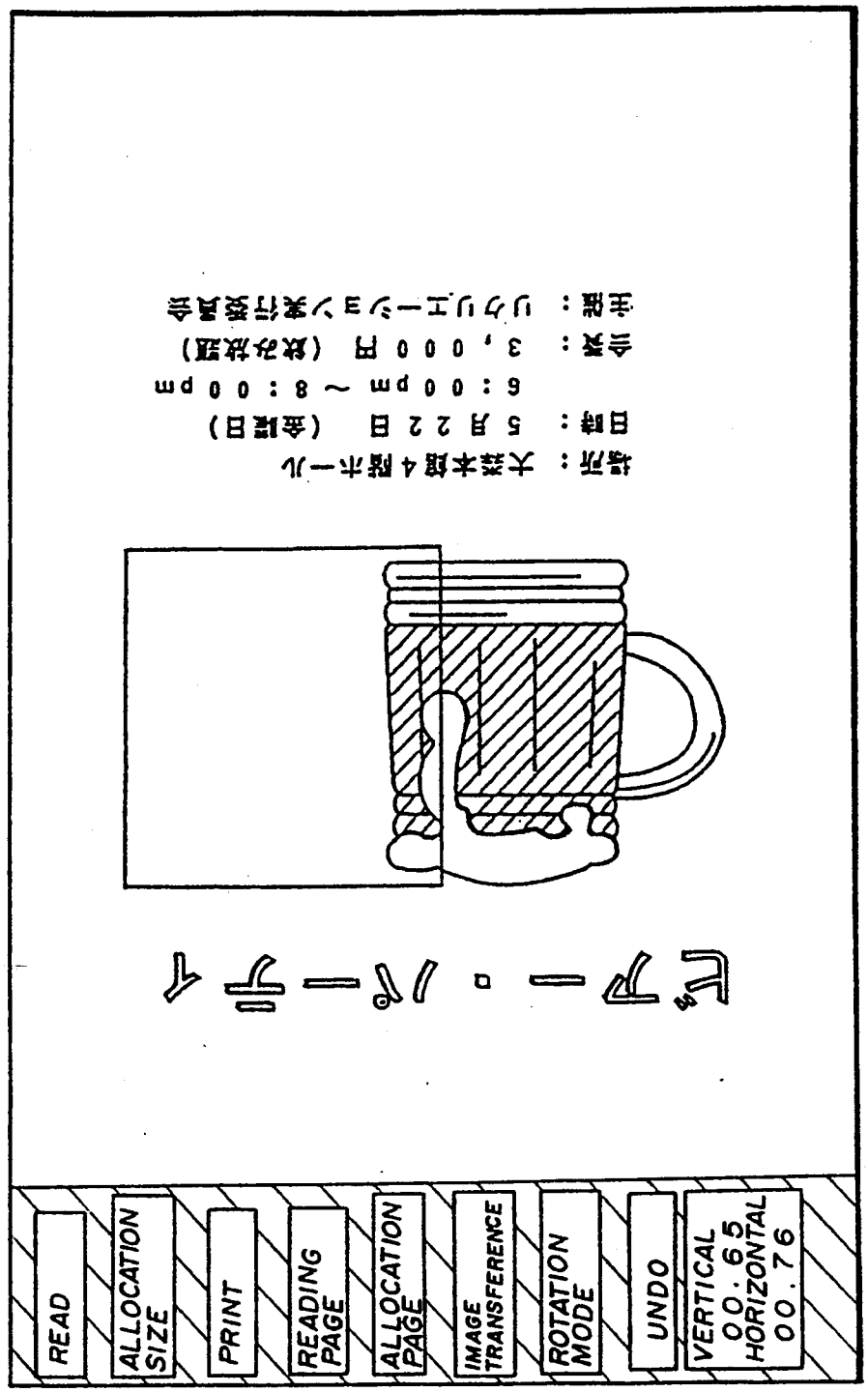

Then, the operator, as shown in FIG. 69, moves the displayed output rectangle, as mentioned above, and being repeated as follows. An edge of this rectangle is to be touched with the touch pen 4 and the touch pen 4 is dragged along the screen of the LCD 3 while the touch pen 4 is touching the edge. Then, the displayed output rectangle follows the dragged touch pen 4 and move accordingly in the image display part. Further, it is also possible to vary the size of the displayed output rectangle as follows. A corner or vertex of this rectangle is to be touched with the touch pen 4 and the touch pen 4 is dragged along the screen of the LCD 3 while the touch pen 4 is touching the edge. Then, the shape of the displayed output rectangle varies so that the resulting varied rectangle has two diagonally opposite vertexes, one which vertexes is fixed while the other follows the dragged touch pen 4. As a result, the location and size of the output rectangle with or without the above-mentioned moving/size variation operations are determined. Thus, the allocation area (output area) onto which the set area (input area) of image information will be allocated has been specified. These operations are in S166–168 of FIG. 45. Here, simultaneously, the menu page displayed together with the display of the rectangle includes the size-variation ratio (vertical 00.65, horizontal 00.76). This size-variation ratio is a ratio in size between the input area and the allocation area.

Then, as a result of the operator specifying the button "image transfer" in S52 of FIG. 36, the controller 20, as shown in FIG. 54, displays the logical-operation-specification submenu on the image display part of the LCD 3 in S124 of FIG. 42. Simultaneously, a message "Specify a logical operation mode" is displayed in the menu page.

Then, the operator specifies the "X@D" (XOR operations) button with the touch pen 4 in S125 of FIG. 42. As a result, the controller 20 reverses the specified button and the previously reversed button is reversed so as to become the normal black-on-white state.

Figure 70:
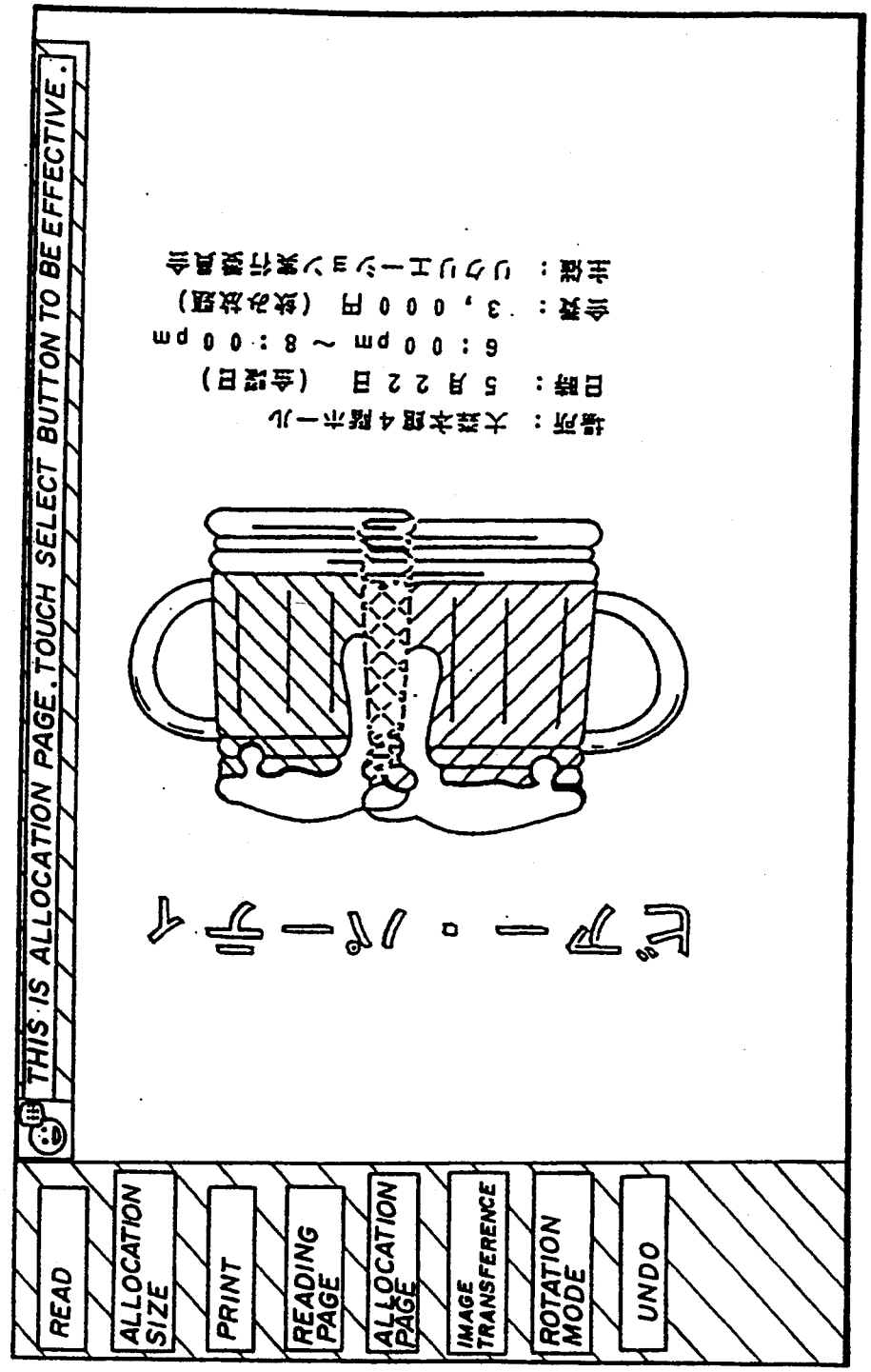

Then, as a result of the operator specifying "set" button at the bottom of the submenu with the touch pen 4, the controller 20 deletes the logical-operation-specification submenu from the image display part in S128 of FIG. 42. Then, the controller 20, with the REC board 22, performs the specified logical operation on the input rectangle of the read image information and the output rectangle of the allocation image information. Then, the resulting allocation image information is then transferred to the video RAM of the LCD controller board 23 and then displayed on the image display part of the LCD 3 as shown in FIG. 70 in S129 of FIG. 42. Here, the controller deletes the displayed output rectangle for the allocation setting, before this display, and a message "This is allocation page. Touch a select button." is displayed as shown in FIG. 70.

Printing Process

Figure 39:
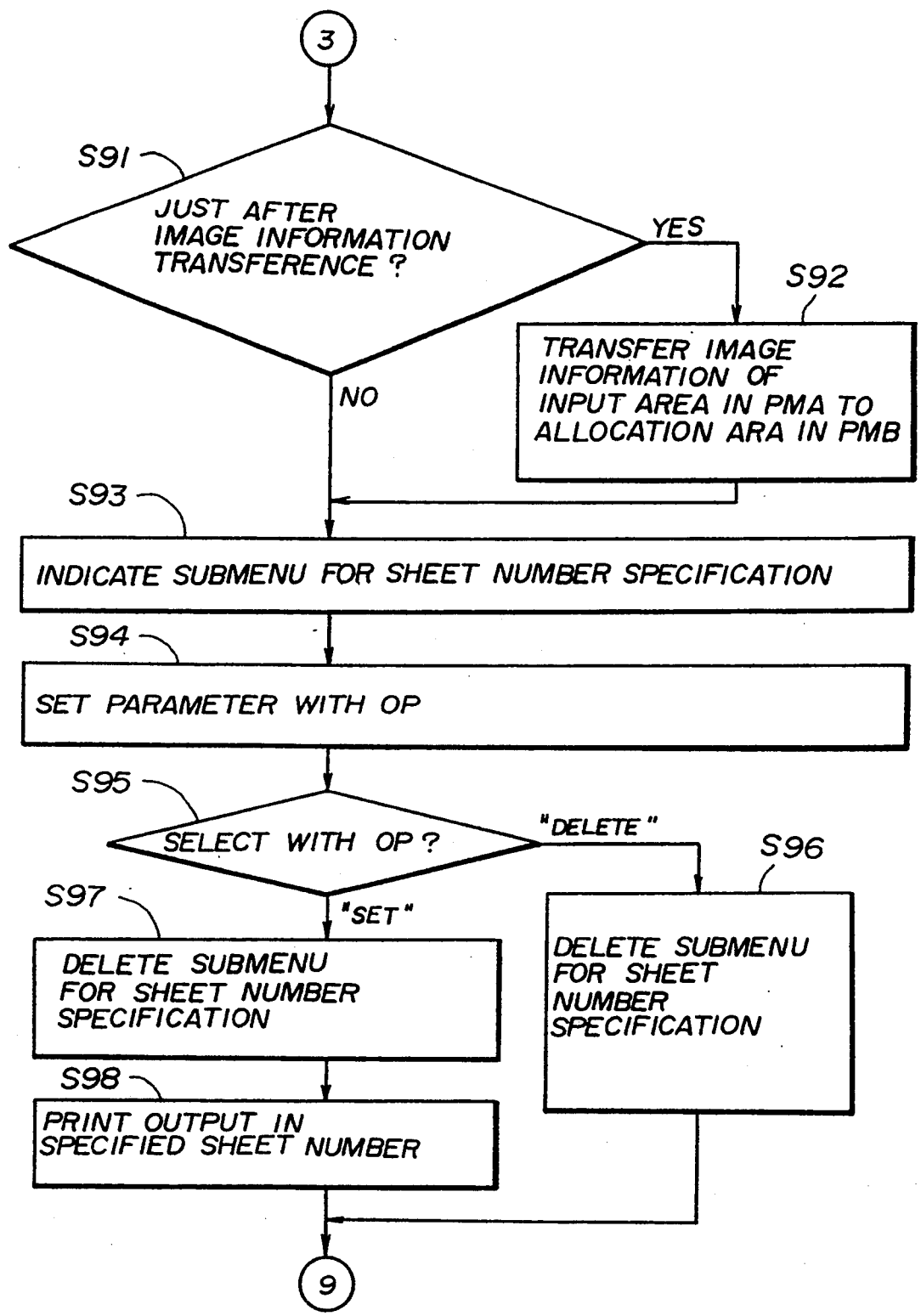
FIG. 39 shows an operation flow chart concerning a print process performed by the controller and an operation sequence performed by the operator in the apparatus shown in FIG. 35.

The button "print" in the menu page of the LCD 3 is specified with the touch pen 4 in S52 of FIG. 36, the process shown in FIG. 39 is then started from S91.

Step S92: The input area of image information stored in the first page memory board (PMA) is transferred to the allocation area prepared in the second page memory board (PMB). That is, if it is determined in S91 that it is just after the image information has been transferred, the process similar to the process of S62 is then executed.

Step S93: If it is determined in S91 that it is not just after the image information has been transferred, another submenu is then displayed on the image display part of the LCD 3. In this other submenu, choices for specification of how many sheets of hard copies is needed. In the submenu, the sheet number may be specified from among numbers 1–99. Simultaneously, a message "Specify printing sheet number for the read image." is displayed in the image display part for the read image information while another message "Specify printing sheet number for the allocated image." is displayed in the image display part for the allocated image information.

Steps S96, S97: If it is determined in S95 that the touch pen 4 is used for specifying the button either "set" or "delete", the sheet-number-specification submenu is deleted from the image display part and the former image is displayed thereon.

Step S98: If the read image information is displayed on the image display part of the LCD 3, the read image information stored in the image buffer memory of the first page memory board 12 is sent to the printer 5. As a result, the sent image information is then represented as a number of hard copies. The number of hard copies has been specified as mentioned above and this representing process for making the hard copies is executed in a specified reading size such as mentioned above. If the allocated image information is displayed on the image display part of the LCD 3, the allocated image information stored in the image buffer memory of the second page memory board 13 is sent to the printer 5. As a result, the sent image information is then represented as a number of hard copies. The number of hard copies has been specified as mentioned above and this representing process for making the hard copies is executed in a specified allocation size such as mentioned above.

In the above actual example, then the desired final image has been obtained. As a result, the operator specifies the "print" button with the touch pen 4 in S52 of FIG. 36. Here, it is the time just after the image information has been transferred. As a result, the controller 20, with the REC board 22, varies the size of the input area of the input image represented with the image information stored in the image buffer memory of the first page memory board 12. Then, the specified logical operation from among the 16 logical operations is performed on the image information, which image information results from a size variation being performed thereon, and the output area of the image information being stored in the image buffer memory of the second page memory board 13. Subsequently, the resulting image information is then written in this output area so as to update the output area of the image information, in S92 of FIG. 39.

Figure 71:
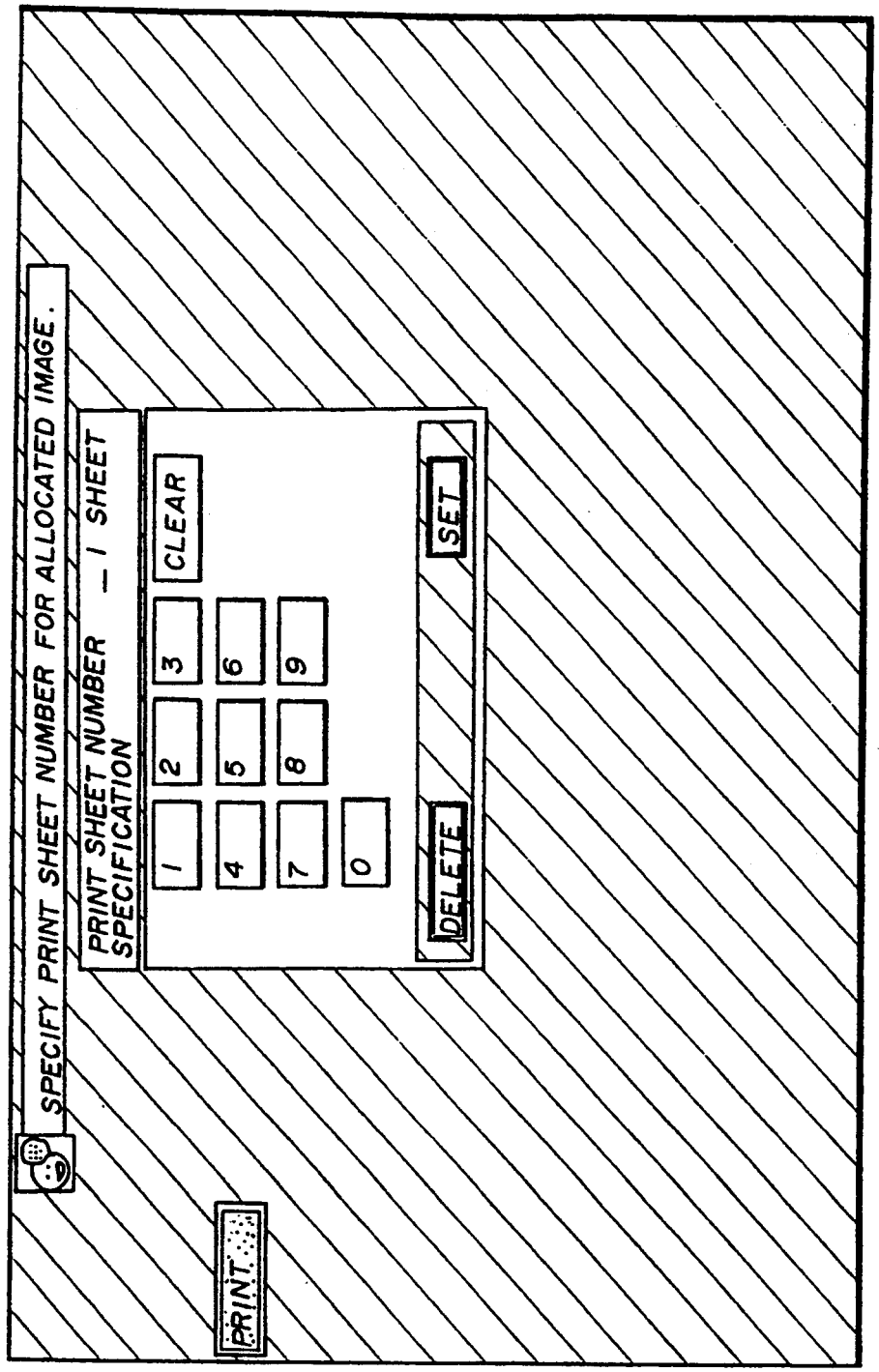

Then, as shown in FIG. 71, the sheet-number-specification submenu is displayed on the image display part of the LCD 3 in S93 of FIG. 39. Simultaneously, a message "Specify printing sheet number for the allocated image." is displayed in the menu page. "1 sheet" is preset as a default choice for the printing sheet-number.

Figure 46:
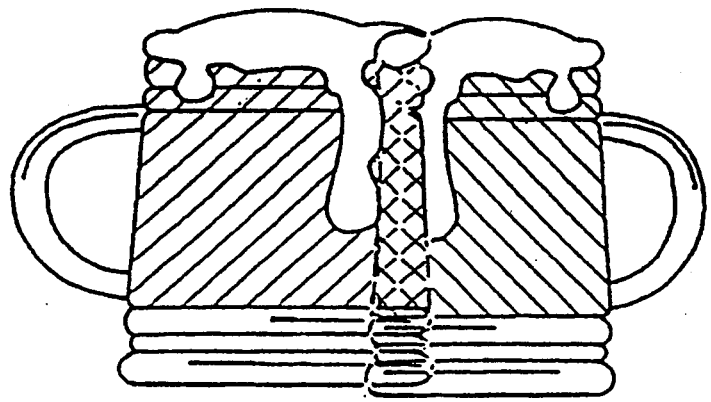
FIG. 46 shows another example of the finished image realized as a result of printing out thereof as a result of processing the original images shown in FIGS. 4 and 5 in the apparatus shown in FIG. 35.

Then, after the operator specifies a desired printing sheet number with the touch pen 4 in S94 of FIG. 39, the operator specifies the "set" button. As a result, the controller 20 deletes the sheet-number-specification submenu from the image display part of the LCD 3 in S97 of FIG. 39. Then, the controller 20 sends the allocated image information stored in the image buffer memory of the second page memory board 13 to the printer 5. As a result, the specified sheet numbered hard copies of the final image are printed out in the specified allocation size. In this case, the hard copy representing the final image as shown in FIG. 46 has a size of vertical A4.

If the operator hopes to do further processing such as adding image information representing another original image, appropriate operations and processes similar to the above-mentioned ones may be performed for the other image information.

Figure 72:
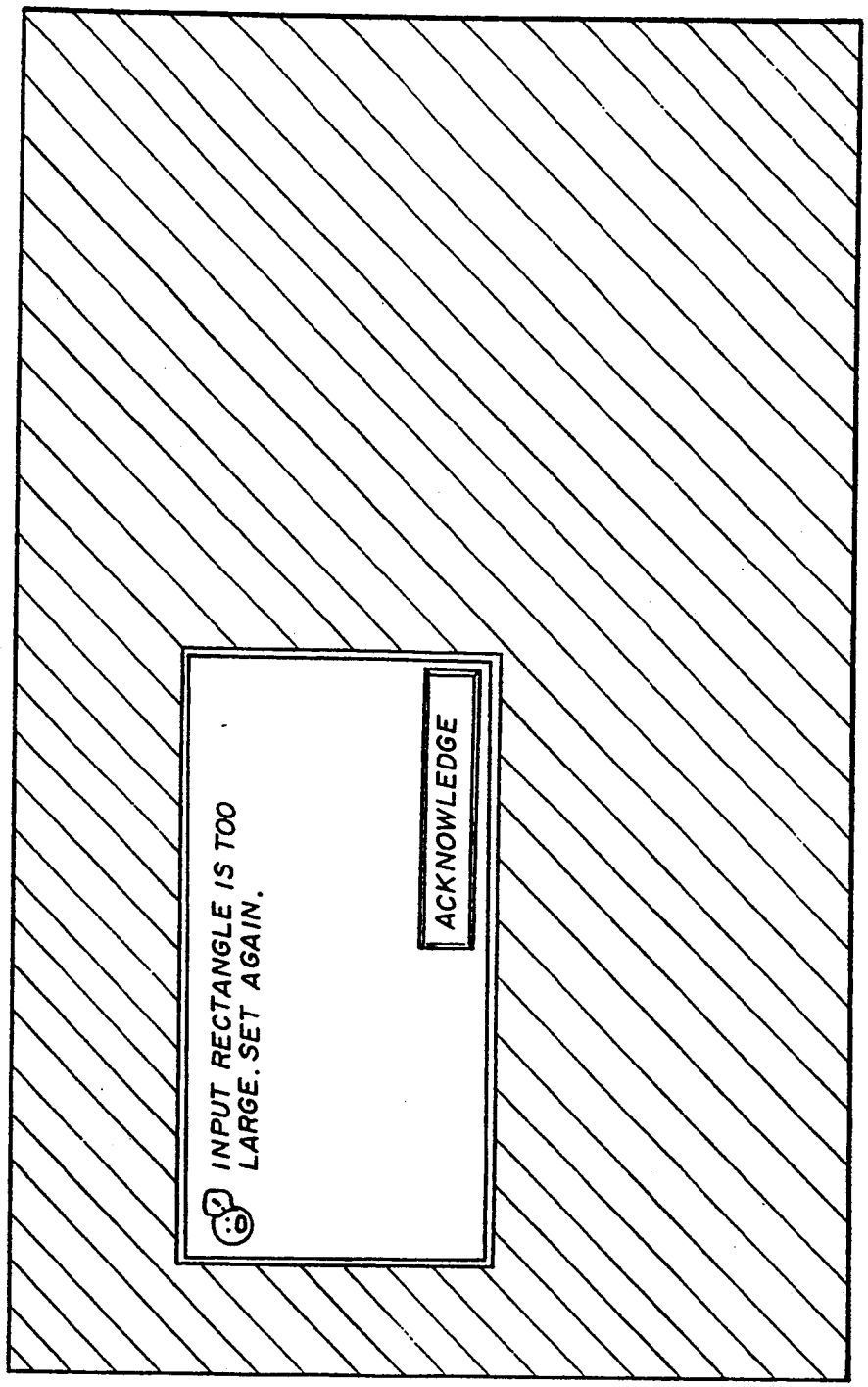
Figure 73:
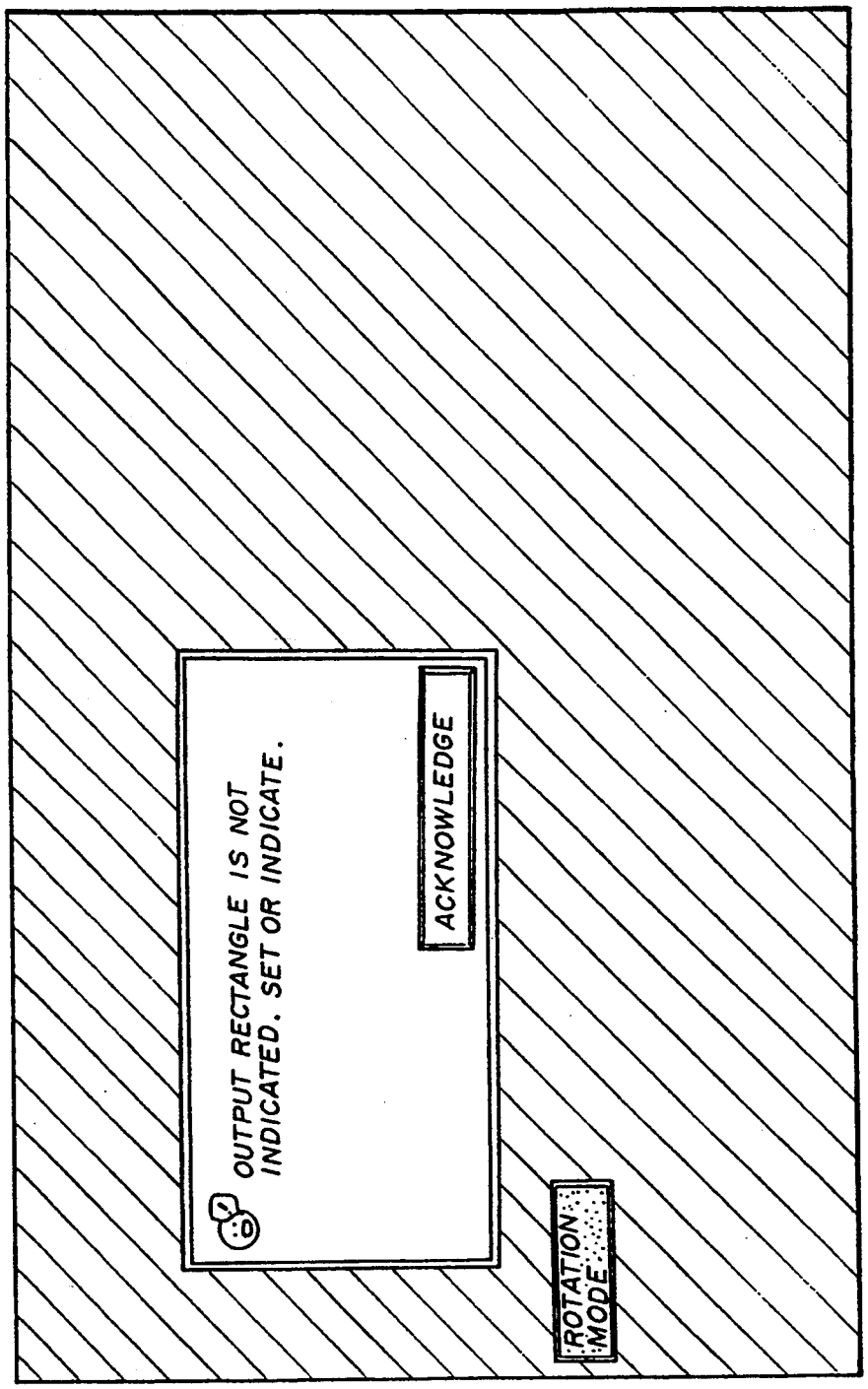
Figure 74:
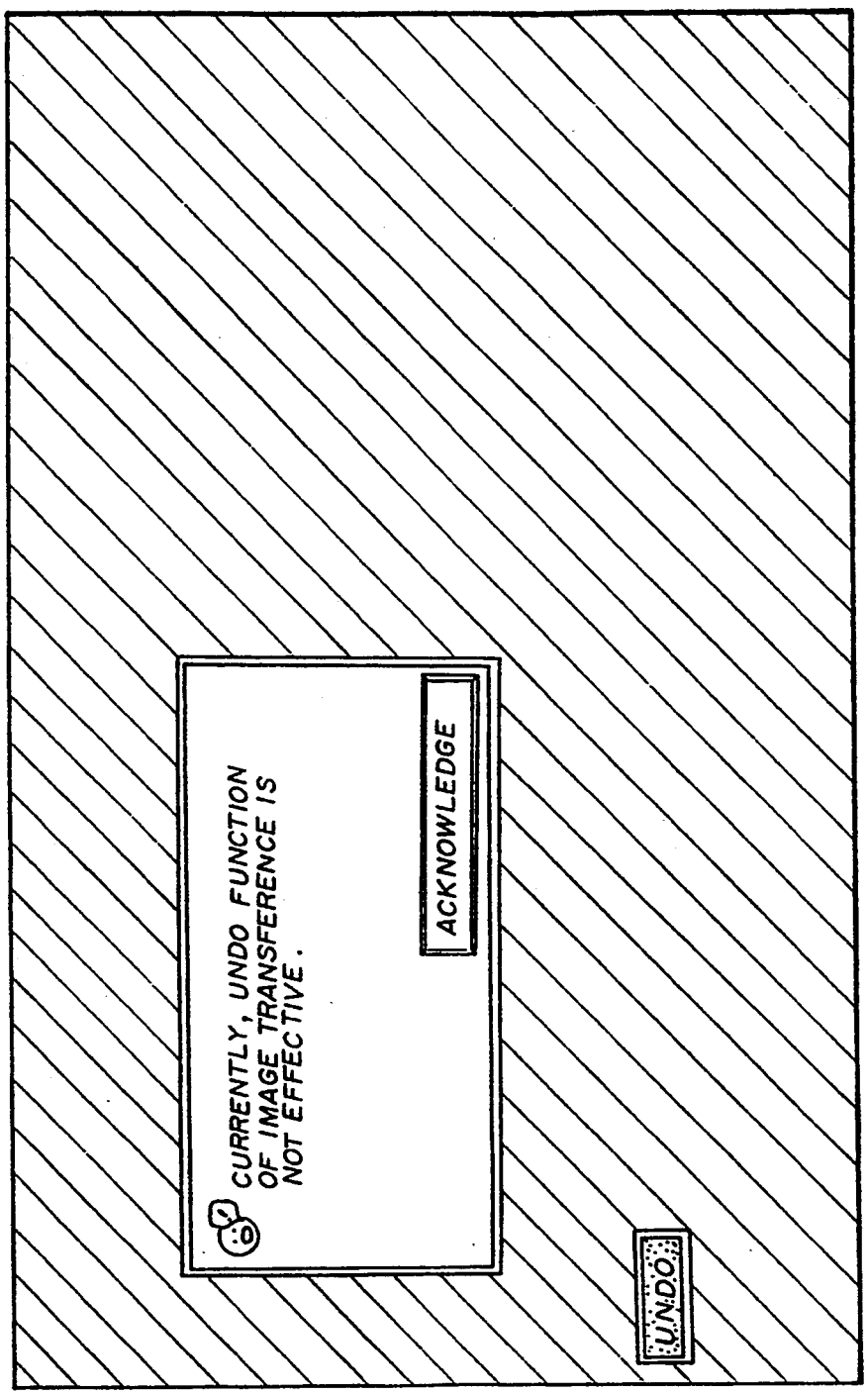
Figure 75:
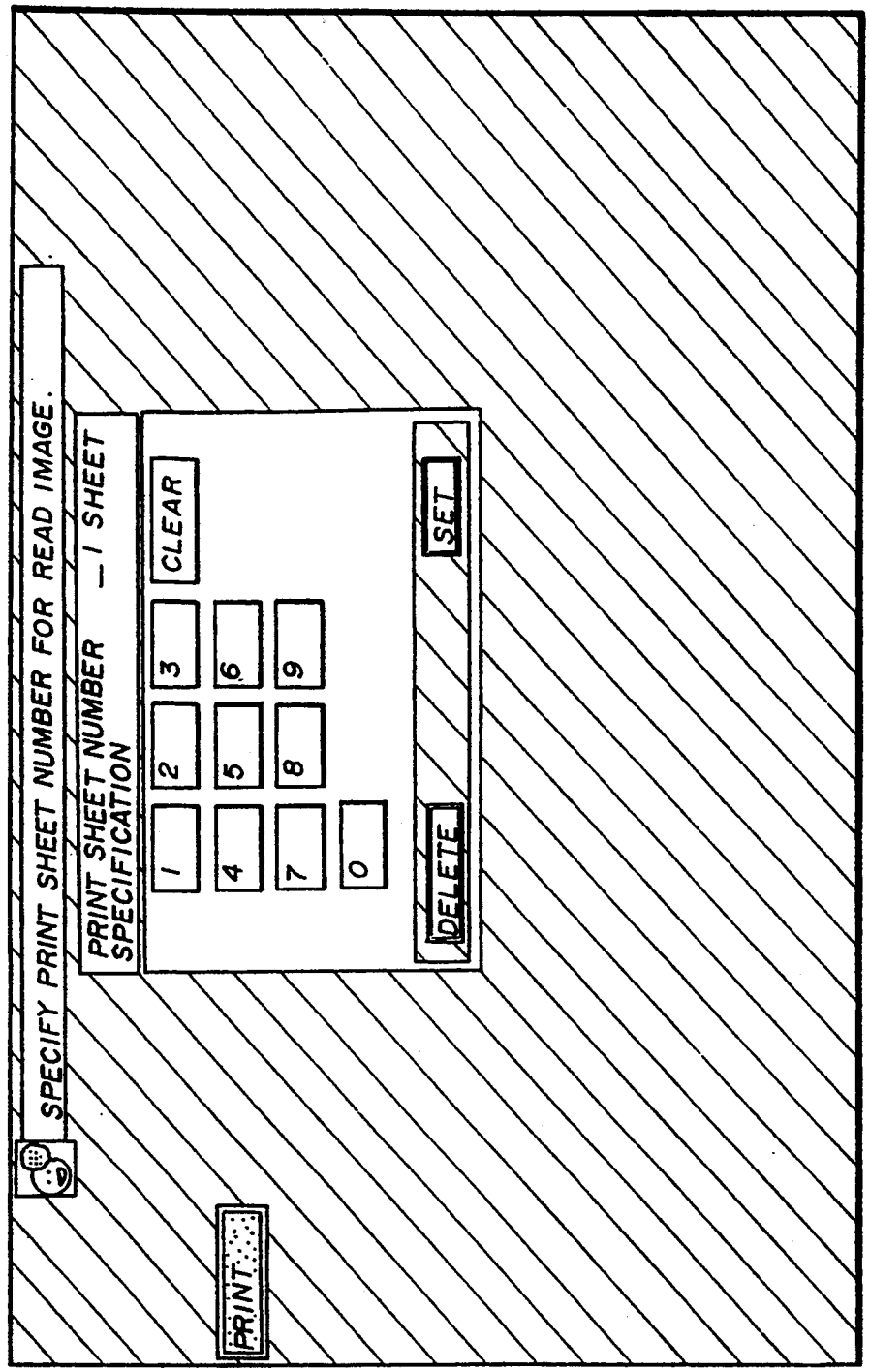

FIGS. 72–74 respectively illustrate display examples of the various alert messages and FIG. 75 illustrates a display example of the printing-sheet-number-specification submenu and associated message while read image information is displayed on the image display part of the LCD 3.

Then, an image processing apparatus according to a fourth embodiment of the present invention will now be described. A hardware construction of this image processing apparatus according to the fourth embodiment is similar to that of the third embodiment of the present invention described above with reference to FIG. 35. Thus, FIG. 35 will now be referred to again.

Processes preformed by the controller 20 and sequences of operations performed by an operator will now be described with reference to FIGS. 76–88. Here, a code "OP" represents an operator.

Further, together with the description of the above processes, a process example will be alternately described with reference to FIGS.90–123. In this process example, the above processes are used to obtain a final image shown in FIG. 89 as a hard copy thereof from the original images shown in FIGS. 4 and 5. The original image shown in FIG. 4 is represented on the vertical A4 size sheet of paper while the original image shown in FIG. 5 is represented on the vertical B5 (The edge rectangles respectively shown in FIGS. 4 and 5 respectively indicate outer edges of the sheets of paper.)

Main Process

Step S161 (in FIG. 76): After an operator switches a power of the image processing apparatus on, the menu page is then displayed on the screen of the LCD 3, which page including various-function select buttons: "read", "allocation size", "print", "reading page" and "allocation page".

Figure 89:
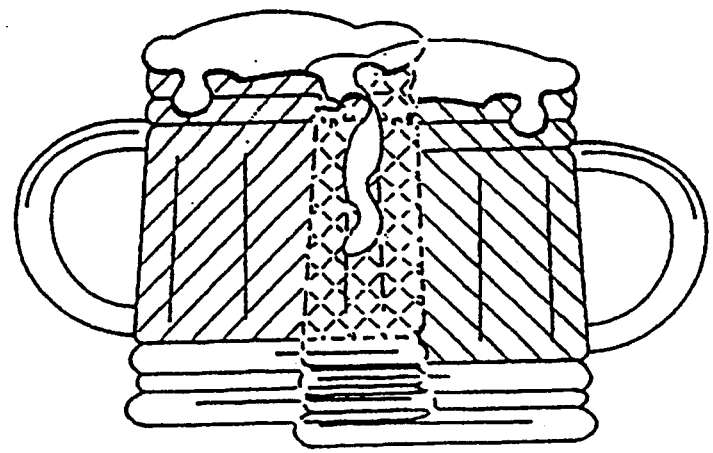
FIG. 89 shows another example of the finished image realized as a result of printing out thereof as a result of processing the original images shown in FIGS. 4 and 5 in the apparatus according the fourth embodiment of the present invention.
Figure 90:
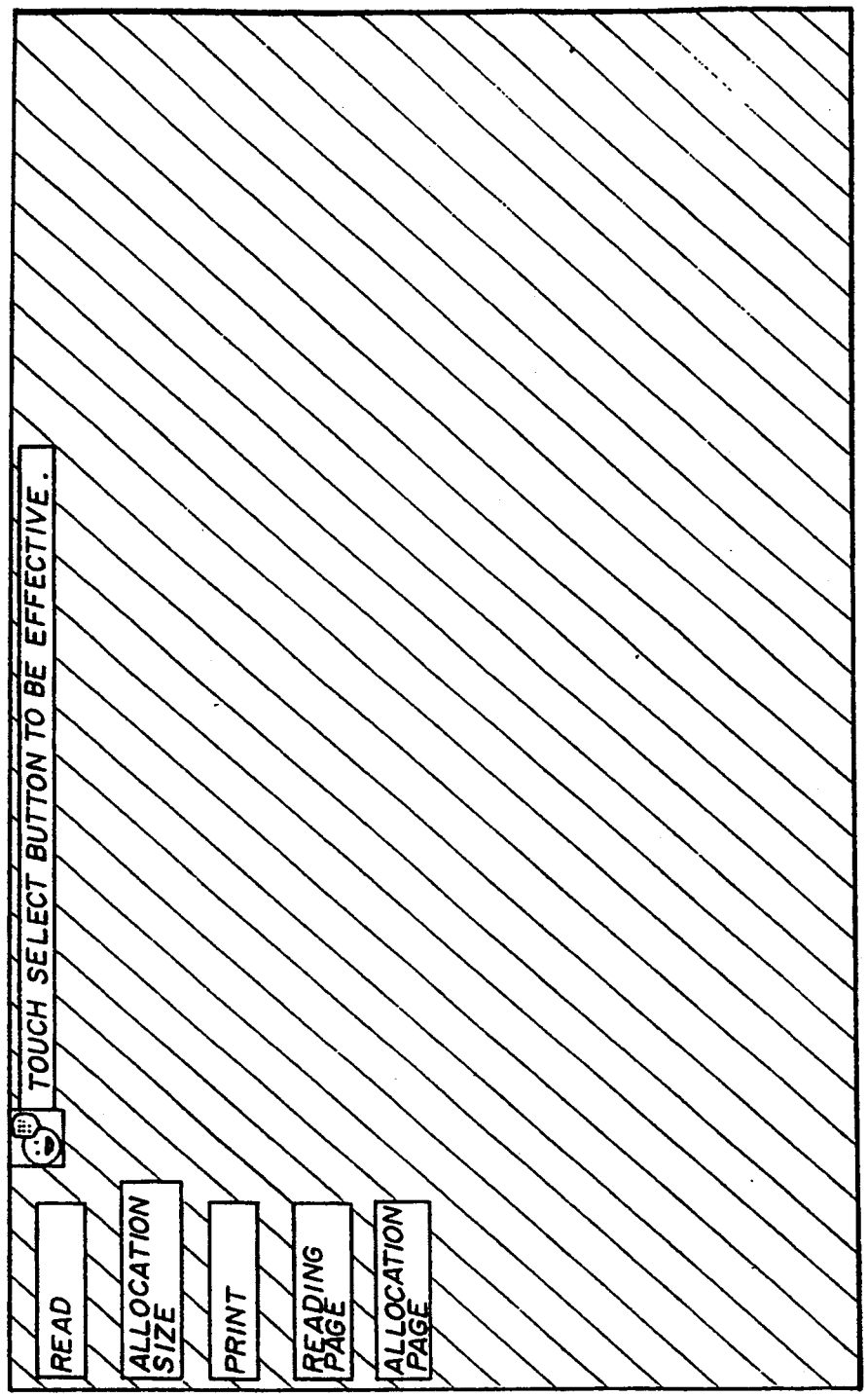

In the above-mentioned process example, by the switching on of the image processing apparatus, the controller 20 indicates, as shown in FIG. 89, on the screen of the LCD 3, the above-mentioned menu page which also includes a message "Touch a select button to be effective.".

Reading Process

Figure 77:
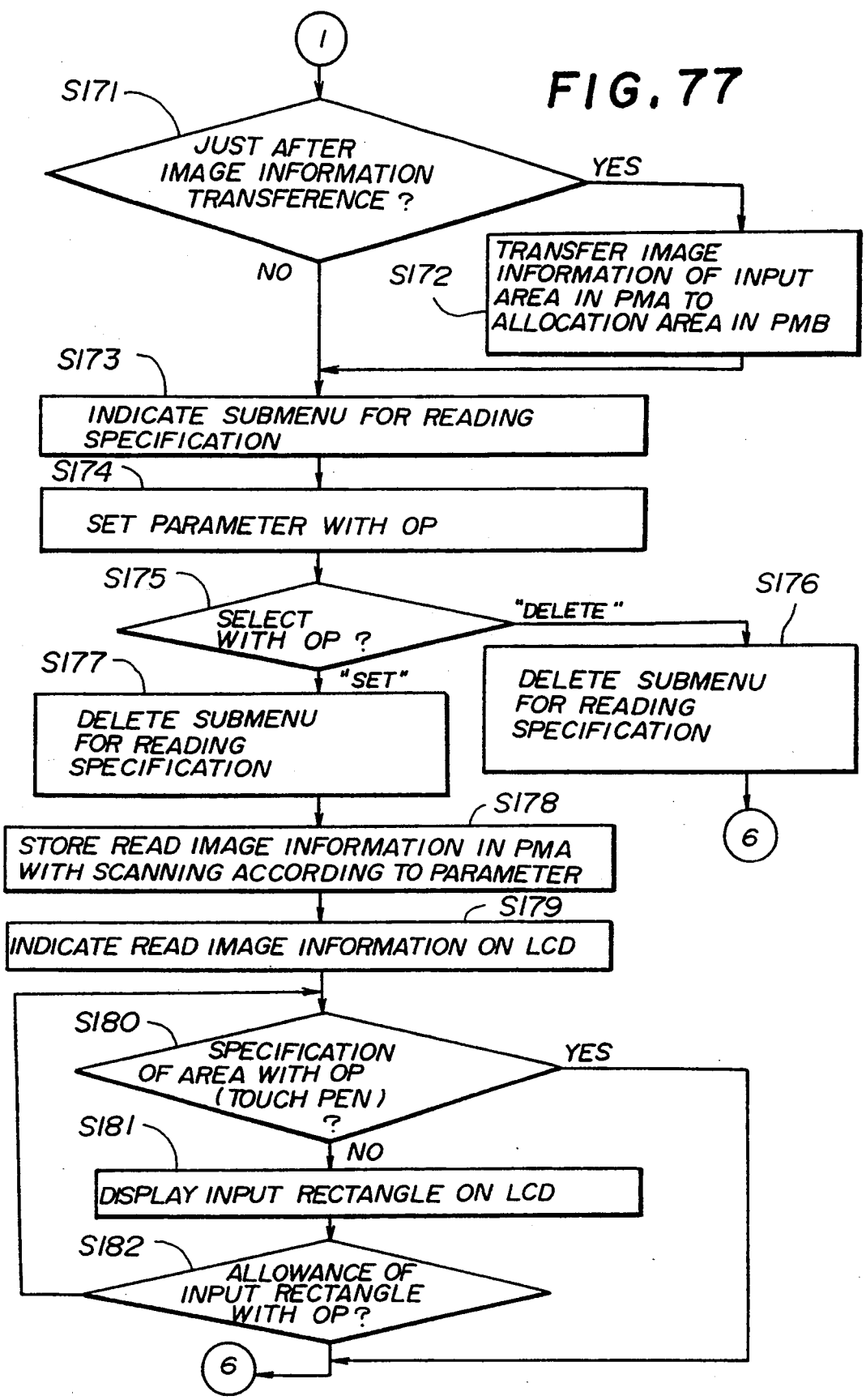
FIG. 77 shows an operation flow chart concerning a reading process performed by the controller and an operation sequence performed by the operator in the apparatus according to the fourth embodiment of the present invention.

A main menu function may be specified in S162 by the operator with the touch pen 4 being touched on the displayed button, from among the above-mentioned buttons displayed in the menu page, to be specified. As a result, the corresponding process from among the processes respectively shown in FIGS. 77–81 is executed. For example, if the operator specifies the button "read", the process shown in FIG. 77 is started from S171.

Step S172: If it is determined in S171 that it is just after the time when image information has been transferred, the operation described below is executed. Here, there is an area defined with an input rectangle (described below) from image information stored in the image buffer memory in the first page memory board 12. This area will be referred to as "input area" The lengths in the X- and Y-directions of the image represented with the input area of image information are respectively referred to as X1 and Y1. Further, there is an area defined with an output rectangle (described below) in image information stored in the image buffer memory in the second page memory board 13. This area will be referred to as "output area" or "allocation area". The lengths in the X- and Y-directions of the image represented with the allocation area of image information are respectively referred to as X2 and Y2.

The above-mentioned operation is as follows. The REC board 22 varies the size of the image information in the above-mentioned input area in the image buffer memory of the first page memory board 12. In this size variation, if the rotation-mode specification comprises either "no rotation" or "180° rotation", the length in the X-direction is multiplied by X2/X1 while the length in the Y-direction is multiplied by Y2/Y1. On the other hand, if the rotation-mode specification comprises either "90° rotation" or "270° rotation", the length in the X-direction is multiplied by X2/Y1 while the length in the Y-direction is multiplied by Y2/X1. Further, the REC board 22 performs, in the specified rotation mode, the specified logical operation between the size-varied image information and the allocation area of the image information stored in the image buffer memory in the second page memory board 13. Then, the REC board 22 writes the resulting image information into the same allocation area so as to update the allocation area of image information.

Step S173: If it is determined in S171 that it is not just after the time when image information has been transferred, the operation described below is executed. A submenu for reading specification is then displayed on the image display part of the LCD 3. In this submenu, each of the following parameters is to be specified from among the corresponding available selections: "reading density", "draft type", "paper size" and "fixed size-variation".

In the above process example, the operator may set the draft representing the image of vertical A4 size shown in FIG. 4 in the scanner 4. Then, the operator may specify the button "read" in the displayed menu page with the touch pen 4 (as in S162 in FIG. 76). As a result, the controller 20 displays the above-mentioned submenu for reading specification with a message "Specify input parameters." as shown in FIG. 91 (as in S173 in FIG. 77).

Default selections such as mentioned above are preset for each the parameters among the parameters "reading density", "draft type", "paper size" and "fixed size-variation". Similarly to the previously mentioned style, buttons corresponding to the preset choice are in the reversed white-on-black states.

Then, the operator may specify another choice with the touch pen 4 for each parameter. As a result of the other specification, the controller 20 then changes the display manner of the button corresponding to the then-specified choice. As a result, the button becomes in the reversed white-on-black state while the button corresponding to the preset choice is then retuned to the normal display state, that is, the normal black-on-white state (as in S174 in FIG. 77).

In S175, if it is determined that either "set" or "delete" button is specified with the touch pen 4, the displayed submenu for the reading specification is then deleted and then the former page is displayed again, in S176 and S177.

Step S178: Then, the scanner 2, according to the above-mentioned specified parameters, scans the set draft so as to read the corresponding original image. Then, the read image information is written into the image buffer memory in the first page memory board 12 (PMA) as input image information.

Step S179: Then, the REC board 22 transfers the read input image information stored in the image buffer memory in the board 12 to the video RAM in the LCD controller board 23. As a result, the transferred image information is then represented on the image display part of the LCD 3.

In the process example, after the operator determines the all parameters and thus specifies with the touch pen 4 the displayed "set" button in S175 in FIG. 77, the controller 20 deletes the reading-specification submenu from the screen in S177. Then, the controller 2 initiates the scanner 2 so as to make the scanner 2 start reading the original image information represented on the set draft shown in FIG. 4 so as to output the corresponding image information.

Figure 92:
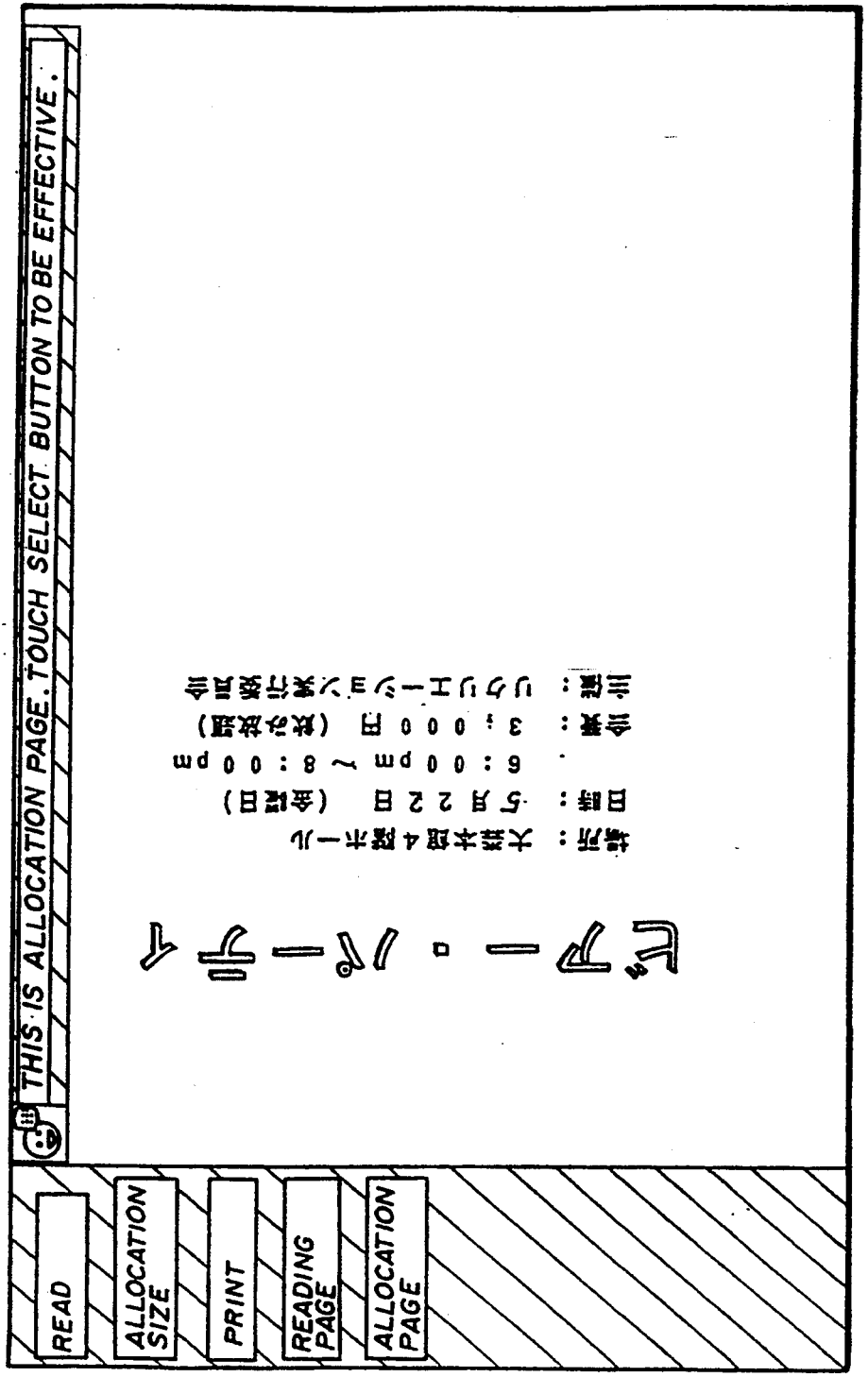

Then, the read input image information is written into the image buffer memory of the board 12 in S178. Then, the REC board 22 transfers the stored image information to the video RAM of the board 23. Then the transferred image information is displayed, as shown in FIG. 92, on the image display part of the LCD 3 in S179. Simultaneously, a message "This is read image. Specify an input rectangle with the touch pen." in the menu page together with the displayed input read image information as shown in FIG. 49.

Step S181: It is determined in S180 that two points in the image display part of the LCD 3, which display part now represents the input image information, have been specified with the touch pen 4, and the following operation is executed. An input rectangle (a frame defining the above-mentioned input area) is indicated in the image display part. The indicated input rectangle has two opposite corners (vertexes) respectively having locations identical to the above-mentioned specified two points. Thus, the area set has been performed.

Figure 93:
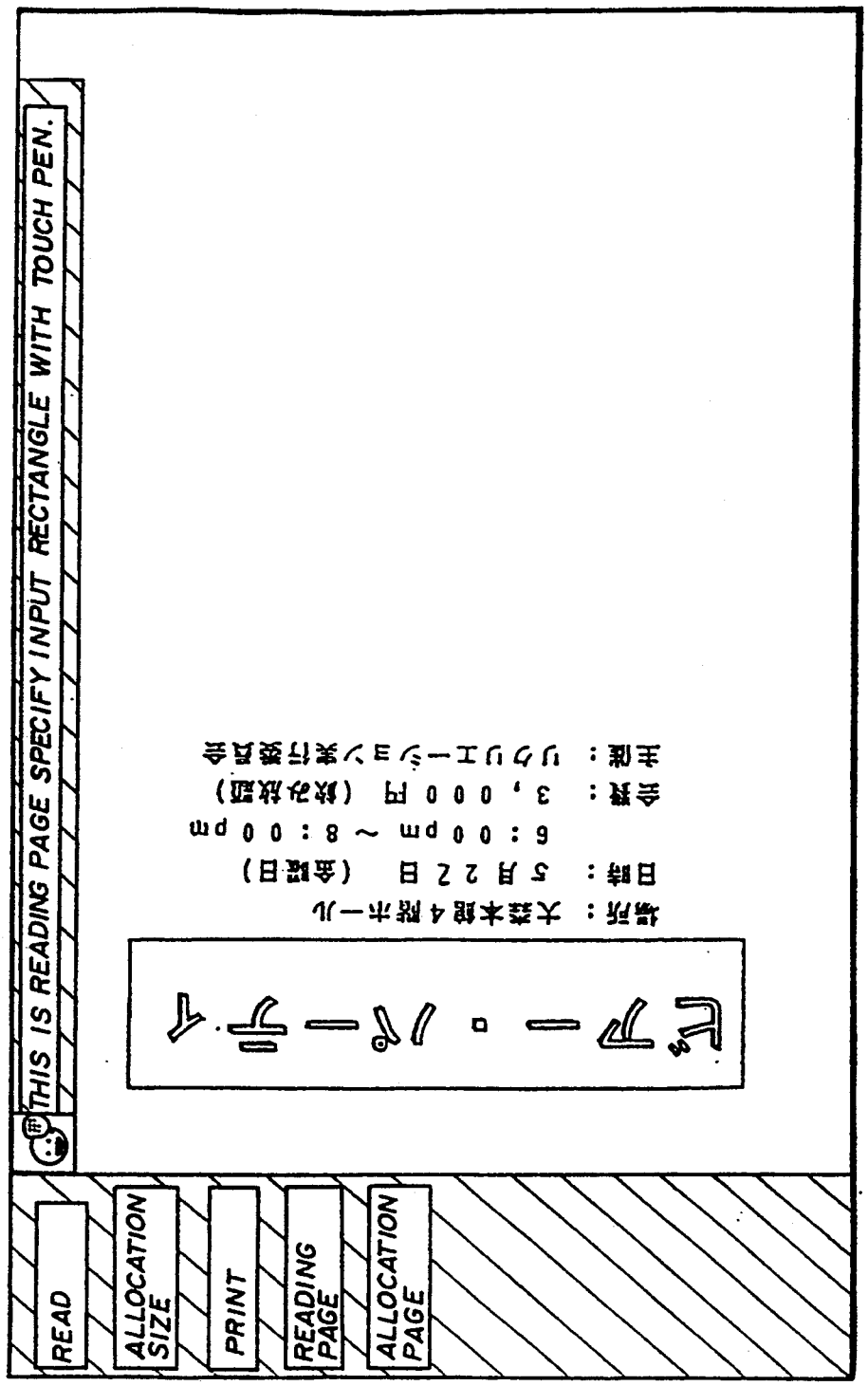

In the process example, the operator may specify a desired area in the input image displayed on the image display part of the LCD 3 as shown in FIG. 92, with the touch pen 4 as in S180. As a result, the corresponding input rectangle is then displayed on the image display part as in S181. In this example, the input rectangle is thus displayed as shown in FIG. 93. (This input rectangle defines the Japanese letters which may be read in the corresponding Roman letters "biaa paati" or may be translated into the corresponding English expression "beer party".)

Allocation Size Process

Figure 78:
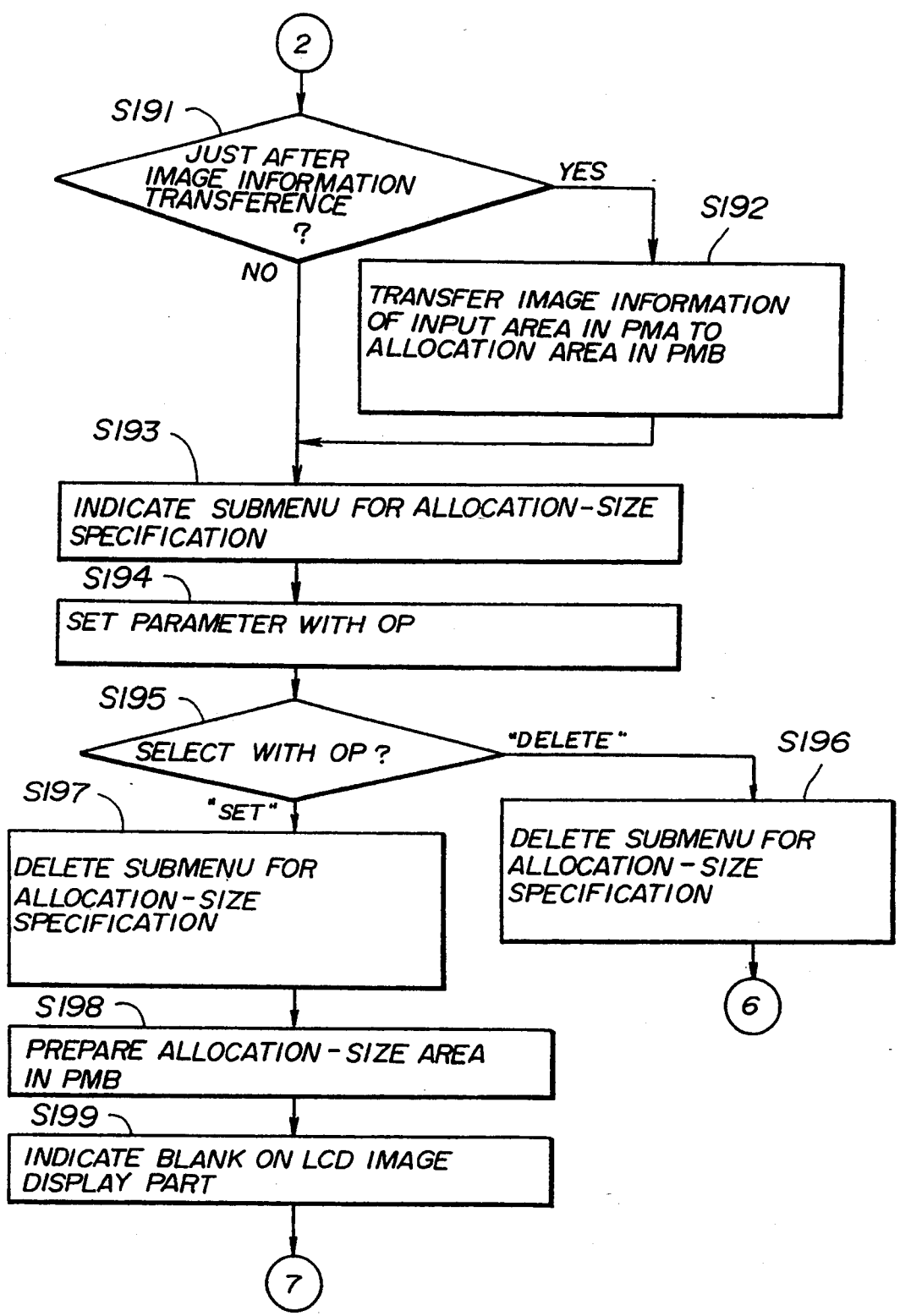
FIG. 78 shows an operation flow chart concerning an allocation size process performed by the controller and an operation sequence performed by the operator in the apparatus according to the fourth embodiment of the present invention.

In S52 in FIG. 36, if the button "allocation size" displayed in the menu page is specified with the touch pen 4, the process shown in FIG. 78 is started from S191.

Step S192: Similarly to the above-mentioned operation in S172, the input area of image information stored in the first page memory board (PMA) is transferred to the allocation area of the second page memory board (PMB) if it is determined in S191 that it is just after the time when the image information has been transferred.

Step S193: If it is determined in S191 that it is not just after the time when the image information has been transferred, a submenu for allocation-size specification is displayed on the image display part of the LCD 3. In this submenu, an appropriate allocation size may be selected from among "A3 vertical", "B4 vertical", "A4 vertical", "A4 horizontal", "B5 vertical" and "B5 horizontal".

Figure 76:
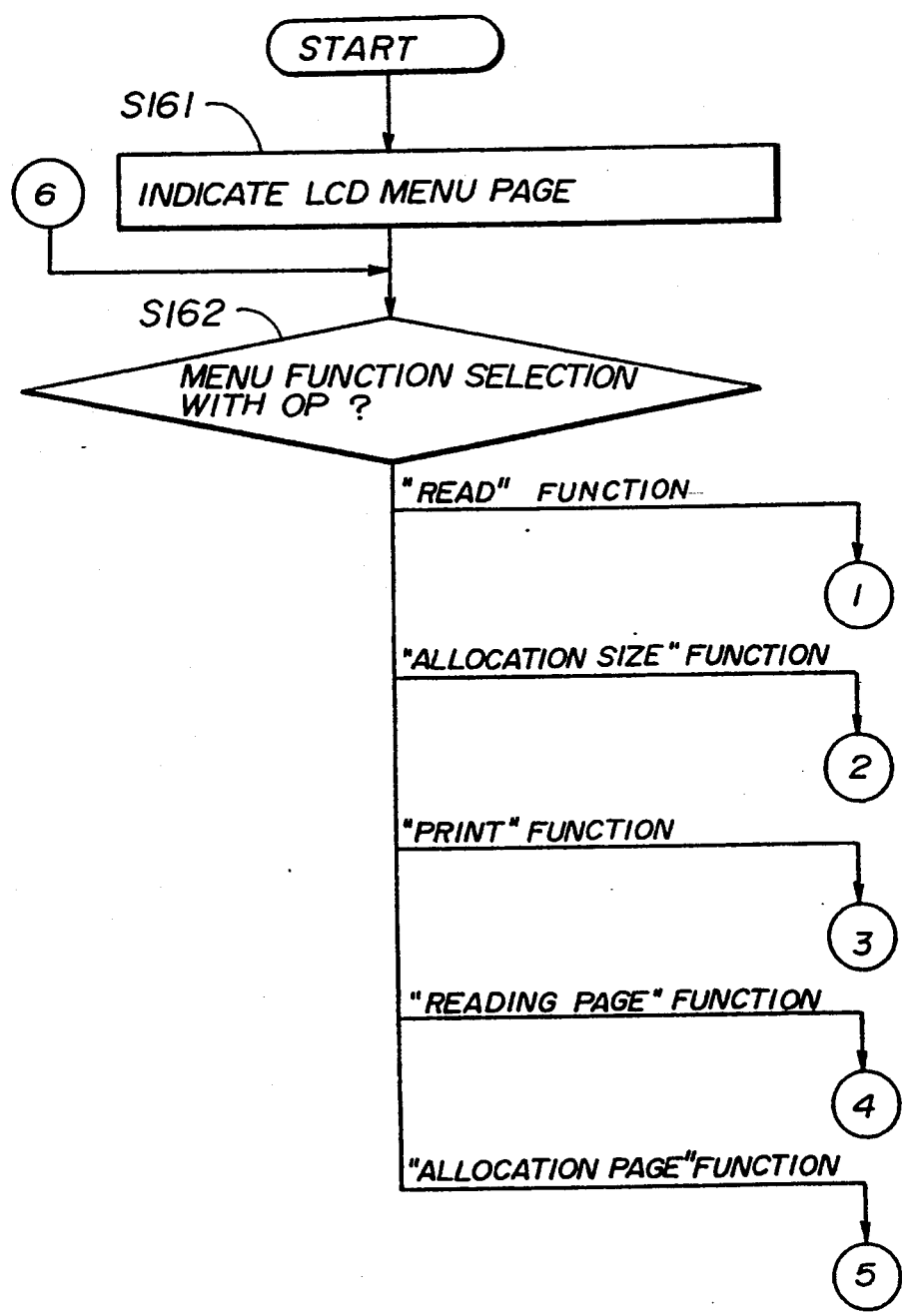
FIG. 76 shows an operation flow chart concerning a main process performed by a controller and an operation sequence performed by an operator in the image processing apparatus according to a fourth embodiment of the present invention.
Figure 94:
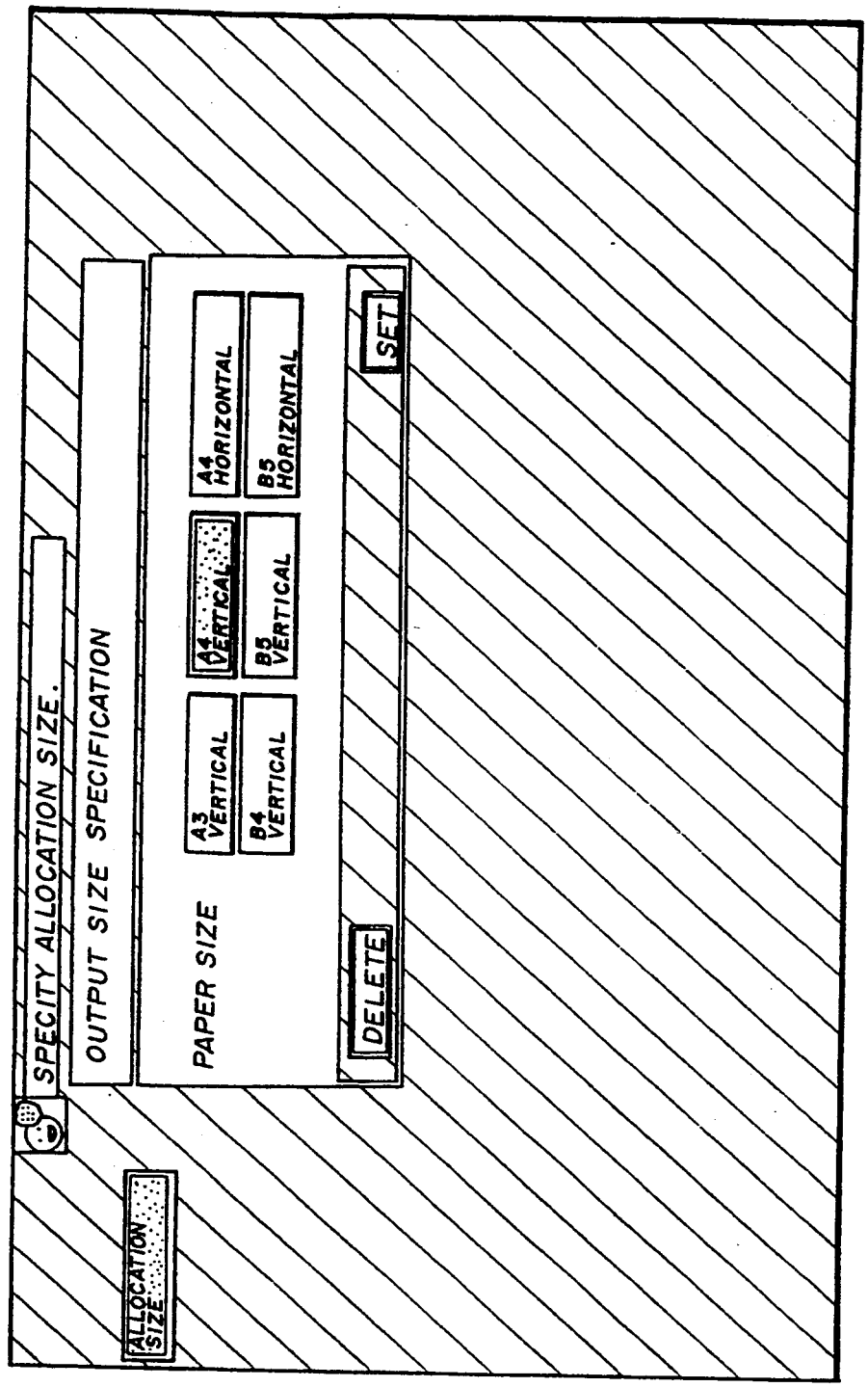

In the process example, the operator may specify the button "allocation size" in the menu page with the touch pen 4 in S162 of FIG. 76. As a result, the controller 20, as shown in FIG. 94, displays the allocation-size-specification submenu on the image display part together with a message "Specify an allocation size." in the menu page, as in S193 of FIG. 78. Here, a button "A4 vertical" corresponding to a default allocation size is in a reversed white-on-black state as shown in FIG. 94. The term "allocation size" may be referred to as "output size".

Then, the operator may specify another choice than the preset default choice "A4 vertical". As a result of another choice, then-selected button is then reversed so as to become in a reversed white-on-black state while the previously reversed white-on-back state button is reversed so as to becomes a normal black-on-white state (in S194 in FIG. 78).

Steps S196 and S197: If it is determined in S195 that the "set" or "delete" button has been specified with the touch pen 4, the displayed allocation-size-specification submenu is deleted from the image display part and the former page is then displayed thereon.

Step S198: The above-mentioned specified allocation size of an area is then prepared in the image buffer memory in the second page memory board (PMB) 13.

Step S199: Then, the entire size of the image display part on the LCD 3 is made blank.

In the process example, the operator may specify the button "set" at the bottom of the submenu in S195 of FIG. 78. As a result of this specification being performed, the controller 20 deletes the allocation-size-specification submenu from the image display part as mentioned above in S197 of FIG. 78. Then, the controller 20 prepares the allocation-size area in the image buffer memory of the second page memory board 13 in S198 of FIG. 78. Then, the entire image display part in S199 is made blank.

Step S233: An alert message "The input rectangle is too large. Set it again (appropriately)." is displayed on the image display part of the LCD 3 if the following condition occurs. The condition comprises both conditions simultaneously. The first condition is one where it is determined in S231 that the input rectangle has been already set. The second condition is one where it is determined in S232 that the specified input rectangle is larger than that for allocation and thus for setting the size of the set input rectangle in the allocation-size area of image information in the image buffer memory in the second page memory board 13. The allocation-size area has been prepared in S198 as mentioned above. (Such a condition as the input rectangle is too large might occur, for example, if the allocation size were B5 vertical and simultaneously if the input rectangle were set as having a size of B5 horizontal. This is because the B5 horizontal area cannot be allocated "within" the B5 vertical area in this direction.)

Step S234: If the operator specifies a button "acknowledgement" with the touch pen 4, the displayed alert message is deleted from the image display part and the former page is then displayed thereon.

Step S235: An output rectangle having the same size as the size of the set input rectangle is then displayed in the center of the image display part of the LCD 3 if the following condition is fulfilled. The condition to be fulfilled comprises two conditions. The first condition is fulfilled if it is determined in S231 that the input rectangle has been already set. The second condition is fulfilled if it is determined in S232 that it is possible to allocate the input rectangle within the allocation-size area. (The same size of an output rectangle being displayed in the center of the image display part is realized as follows. As a result of this realization, a dimensional relationship between the size of the image display part and the input rectangle is as if the input rectangle were cut out from the draft representing the input original image and the cut part of the sheet of paper were then put on another sheet of paper having a size of the allocation-size area. Here, this size of the allocation area corresponds to the size of the image display part.)

Figure 95:
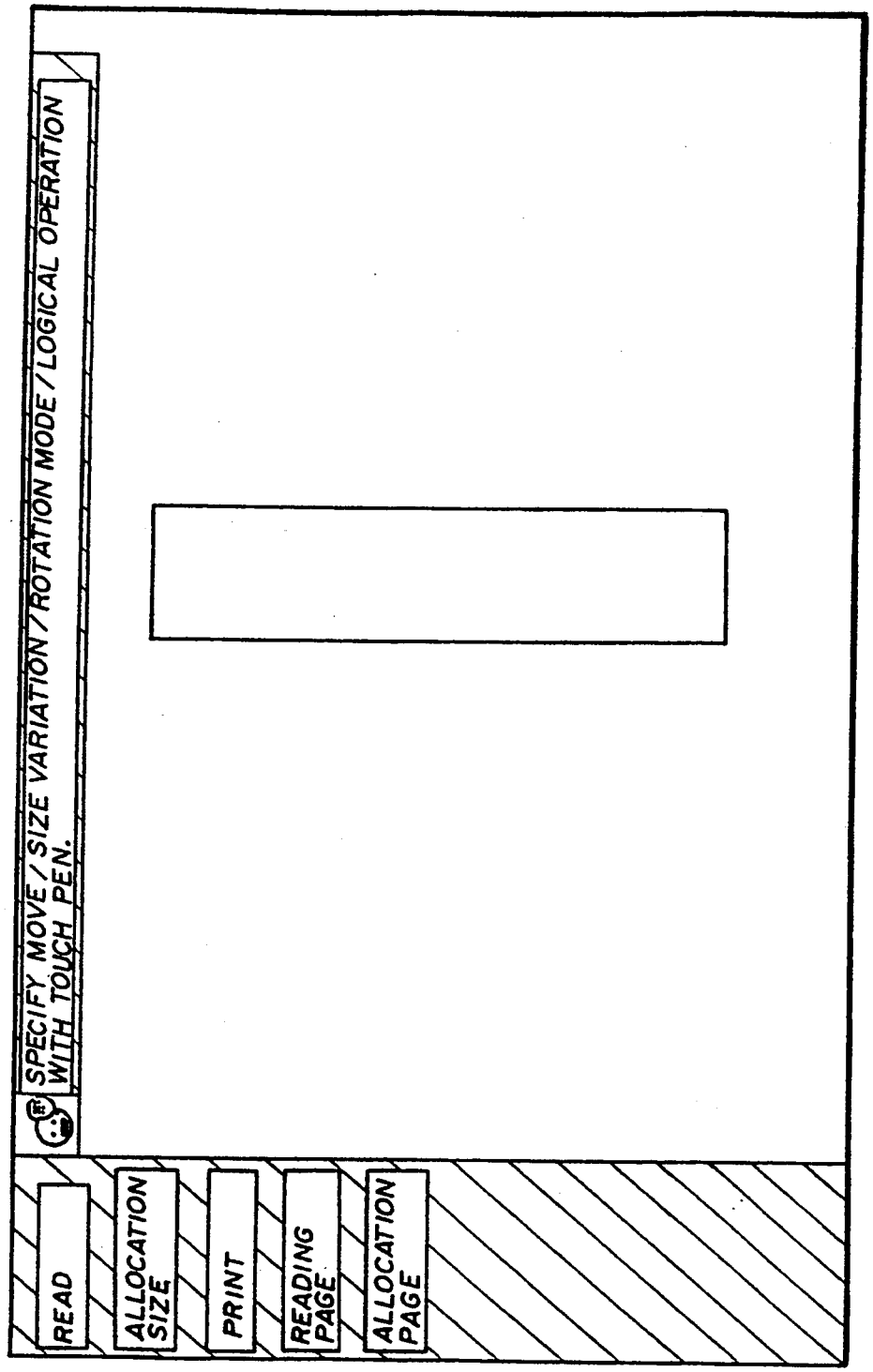

In the process example, the size of the input rectangle is converted so that the size of the input rectangle defining part from the input image is changed into the size corresponding to the allocation-size area. The resulting indication is equal to the above-explained "the same size of an output rectangle being displayed in the center of the image display part". This is also equal to the beforementioned indication of the actual size. The resulting size of the input rectangle is, as shown in FIG. 95, displayed in the center of the image display part in S235 in FIG. 82. The displayed rectangle is used as "default output rectangle for allocation". Simultaneously, a message is displayed in the menu page together with the displayed default output rectangle. This message is "Set specification of move/size-variation/rotation mode/logical operation with the touch pen.".

Figure 96:
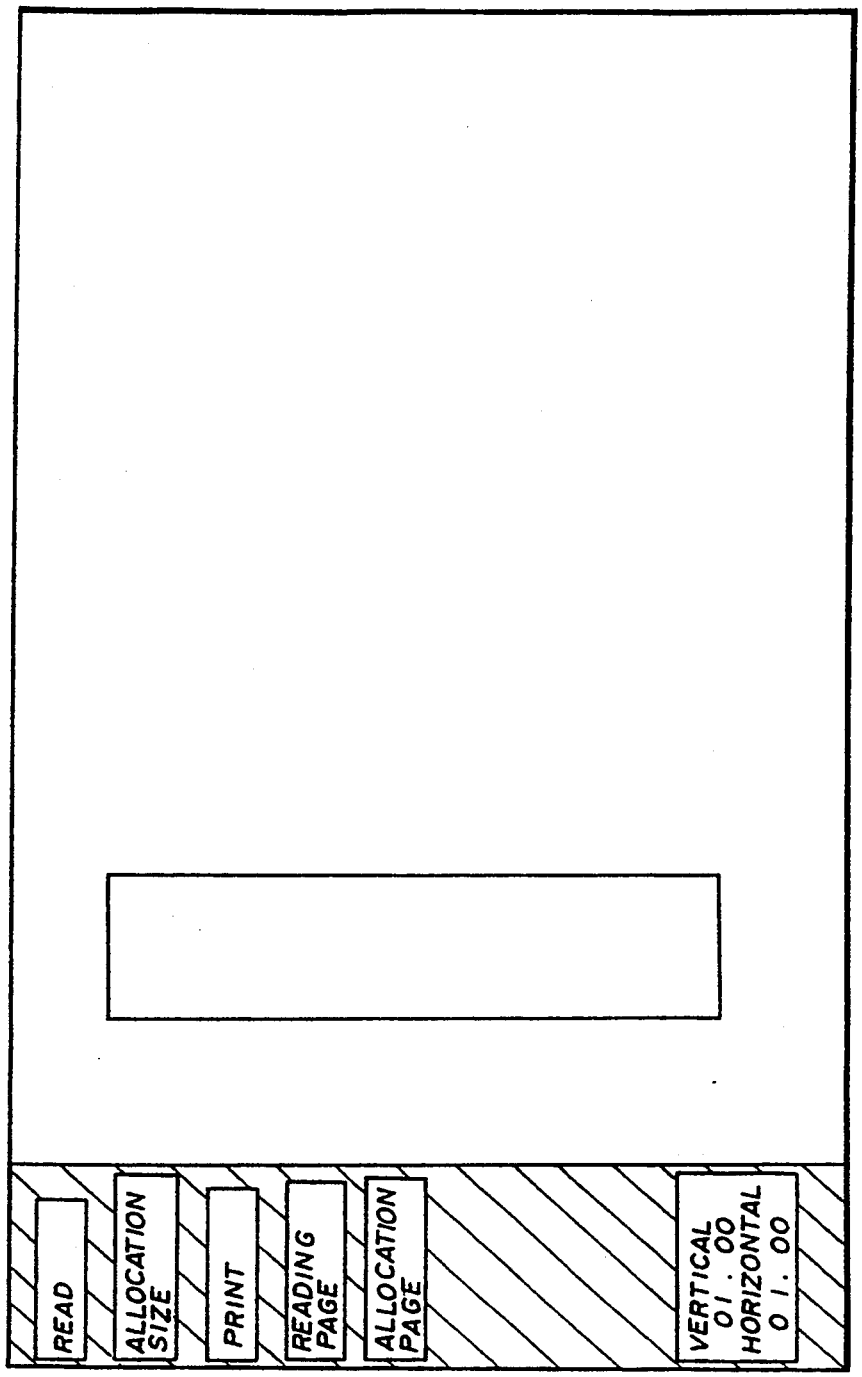

In the process example, the operator moves the output rectangle to a desired position by dragging the touch pen 4 while the touch pen 4 is in contact with an edge of the output rectangle. The resulting moved rectangle is shown in FIG. 96. In this case, the rectangle has been moved leftward from the position shown in FIG. 95. Thus, in S335 of FIG. 81 and in S241–S243 of FIG. 83, the allocation area is specified as mentioned above. Here, the menu page displayed together with the display of the rectangle includes the size-variation ratio (vertical 01.00, horizontal 01.00). This size-variation ratio is a ratio in size between the input area and the allocation area.

Step S225: The operator may specify any editing specification from among "move", "size variation", "rotation mode", and "logical operation". This specification is executed by causing the touch pen 4 to come in contact with the output rectangle displayed on the image display part of the LCD 3, or by drawing an appropriate symbol on the display of the LCD 3.

Figure 81:
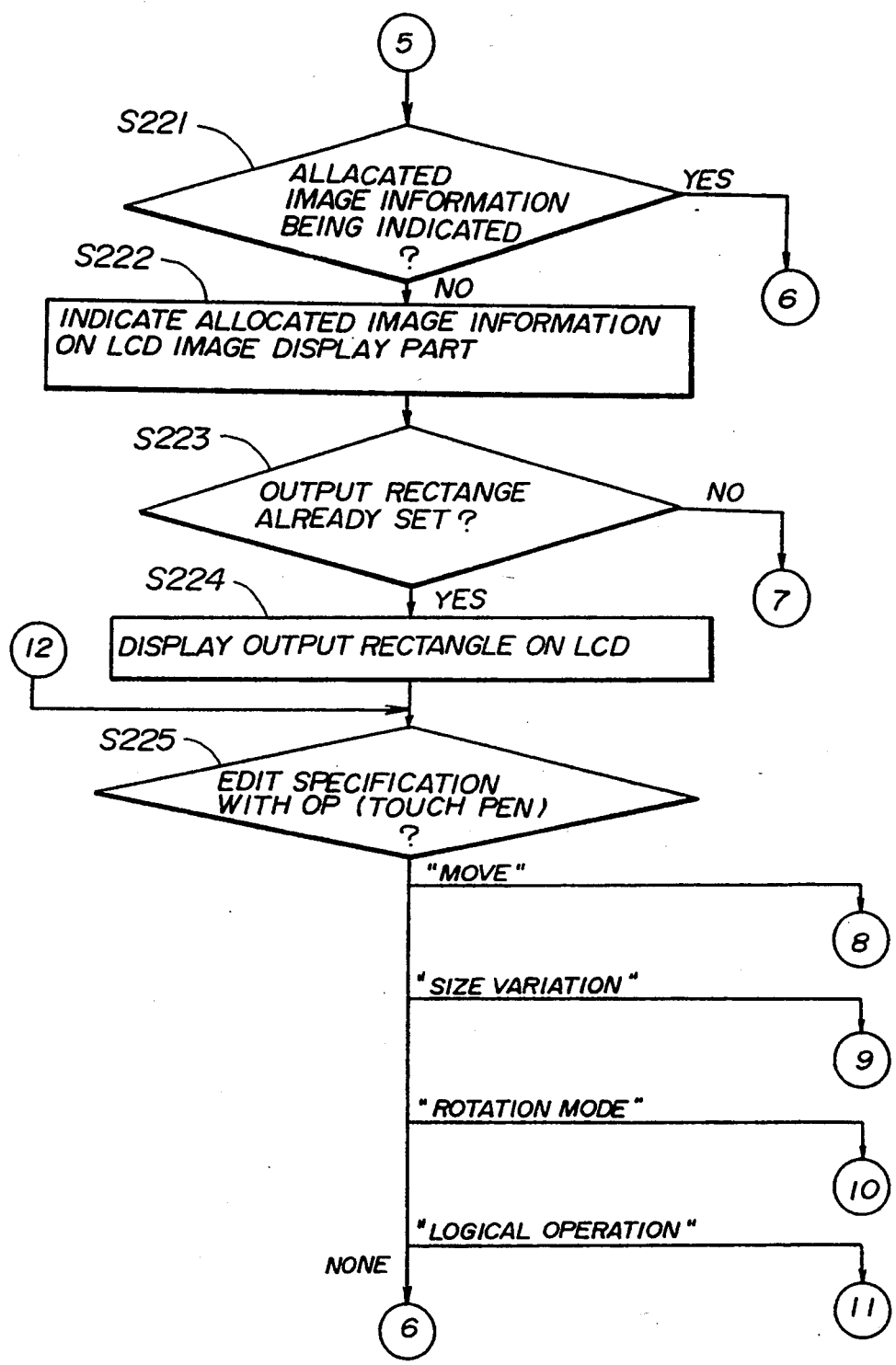
FIG. 81 shows an operation flow chart concerning a part of allocation page process performed by the controller and an operation sequence performed by the operator in the apparatus according to the fourth embodiment of the present invention.
Figure 97:
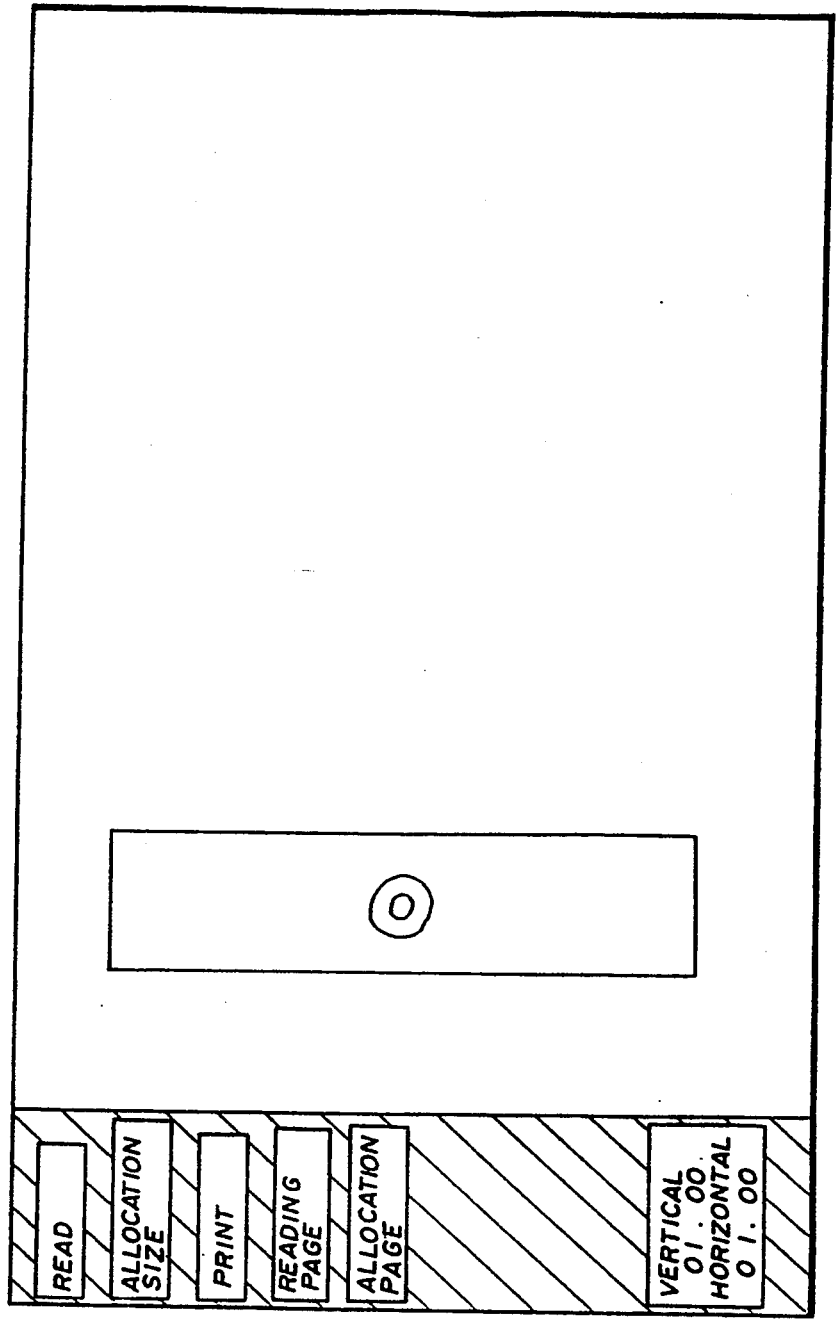
Figure 98:
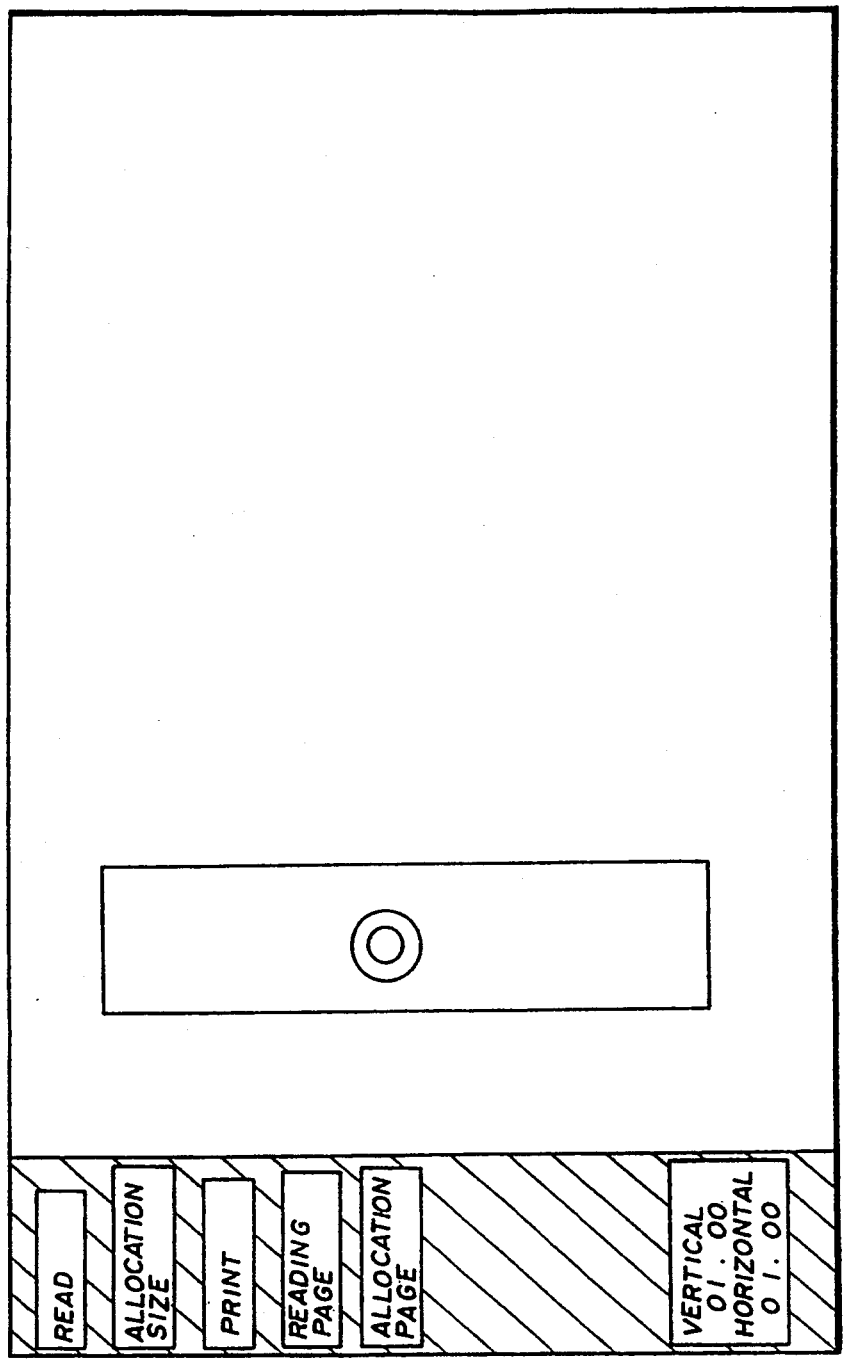

In the process example, then, the operator draws, with the touch pen 4, as shown in FIG. 97, a symbol at the center of the output rectangle displayed on the LCD 3, in S225 of FIG. 81. This symbol has a shape of approximate concentric double circles and is used to specify a logical operation "overwrite" (please refer to FIG. 122). Then, the controller 20 reads this specification performed by the operator. If the controller 20 reads the specification appropriately, the controller 20 displays the graphic of the specified symbol corresponding to the logical operation "overwrite" at the center of the output rectangle displayed on the LCD 3. This displaying is kept for a predetermined time in S325 of FIG. 33. FIG. 122 indicates relationships between the various logical operations including the operation "overwrite" and the corresponding symbols to be specified by the operator with the touch pen 4. Those symbols are used to perform the corresponding logical operations in accordance with the relationship shown in FIG. 122.

Figure 99:
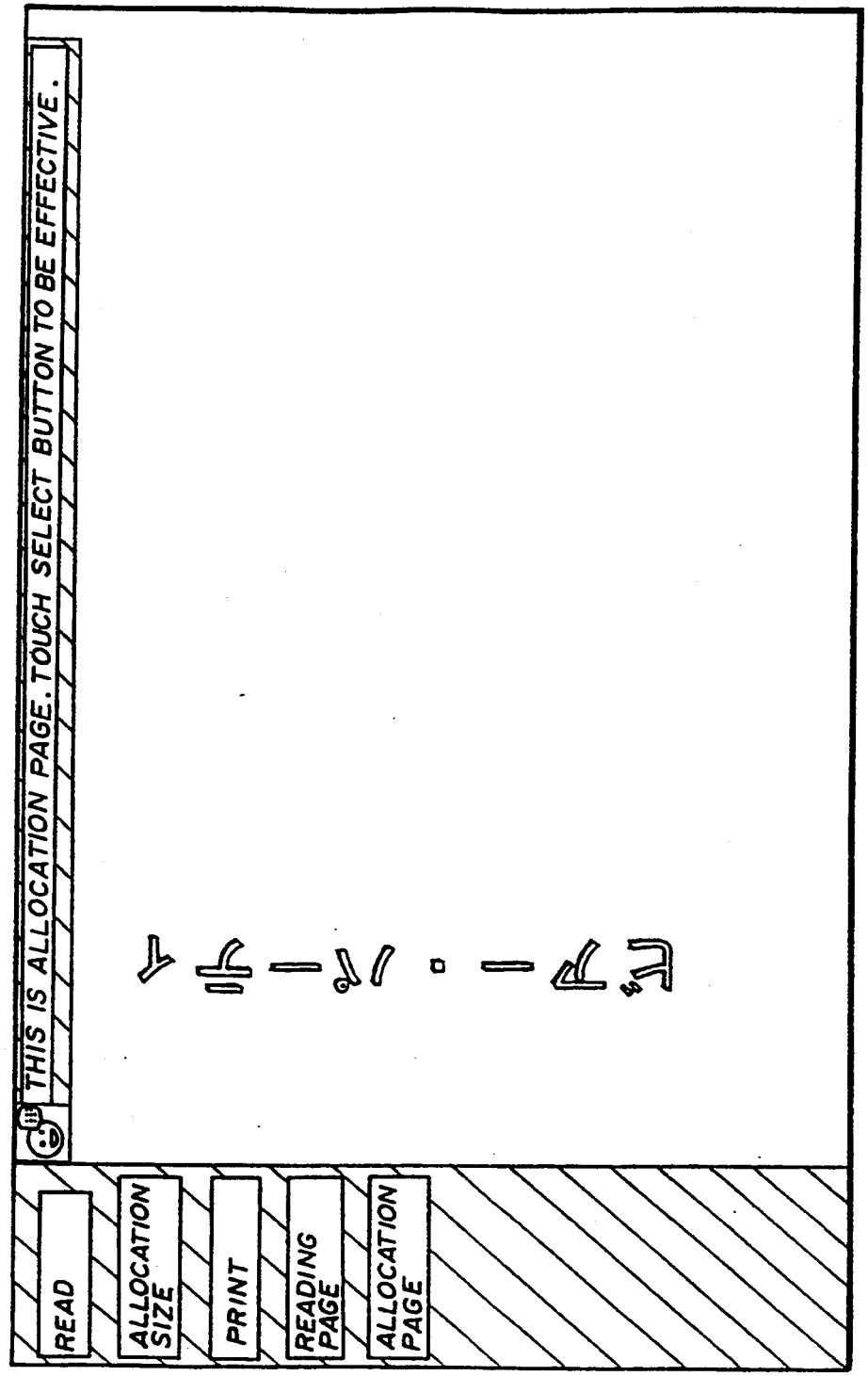
Figure 100:
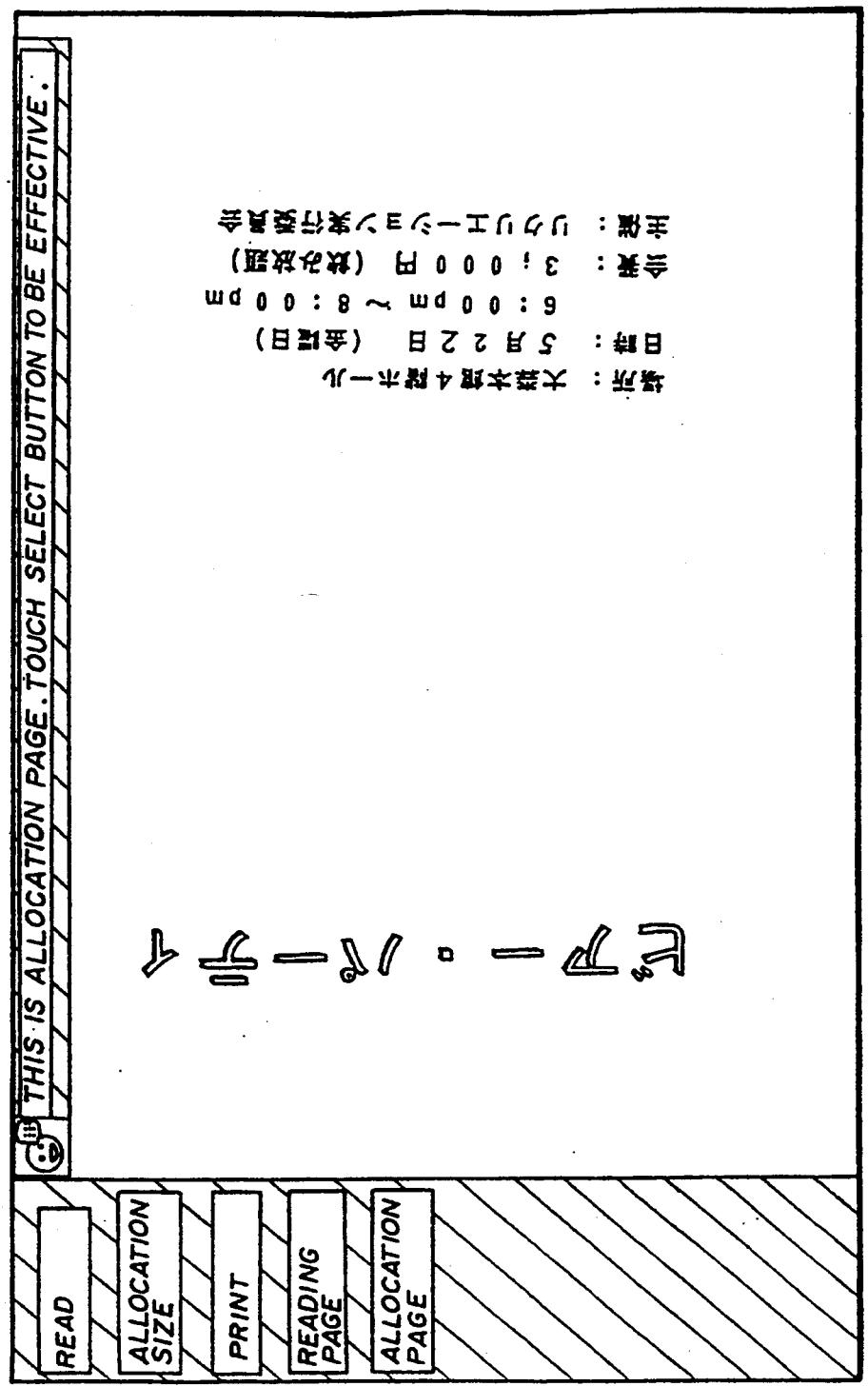

Then, through the REC board 22, the specified logical operation is performed on the image information representing the image defined by the input rectangle in the reading page and the image information representing the image defined by the output rectangle in the allocation page. The result of the performance of the logical operations, that is, the allocated image information is then transferred to the video RAM in the LCD controller board 23. Then, the transferred image information is used to display the corresponding image on the image display part of the LCD 3 as shown in FIG. 99, in S271 of FIG. 86. In this display, the output rectangle for allocation setting is deleted and a message "This is allocation page. Touch select button." is displayed.

Figure 86:
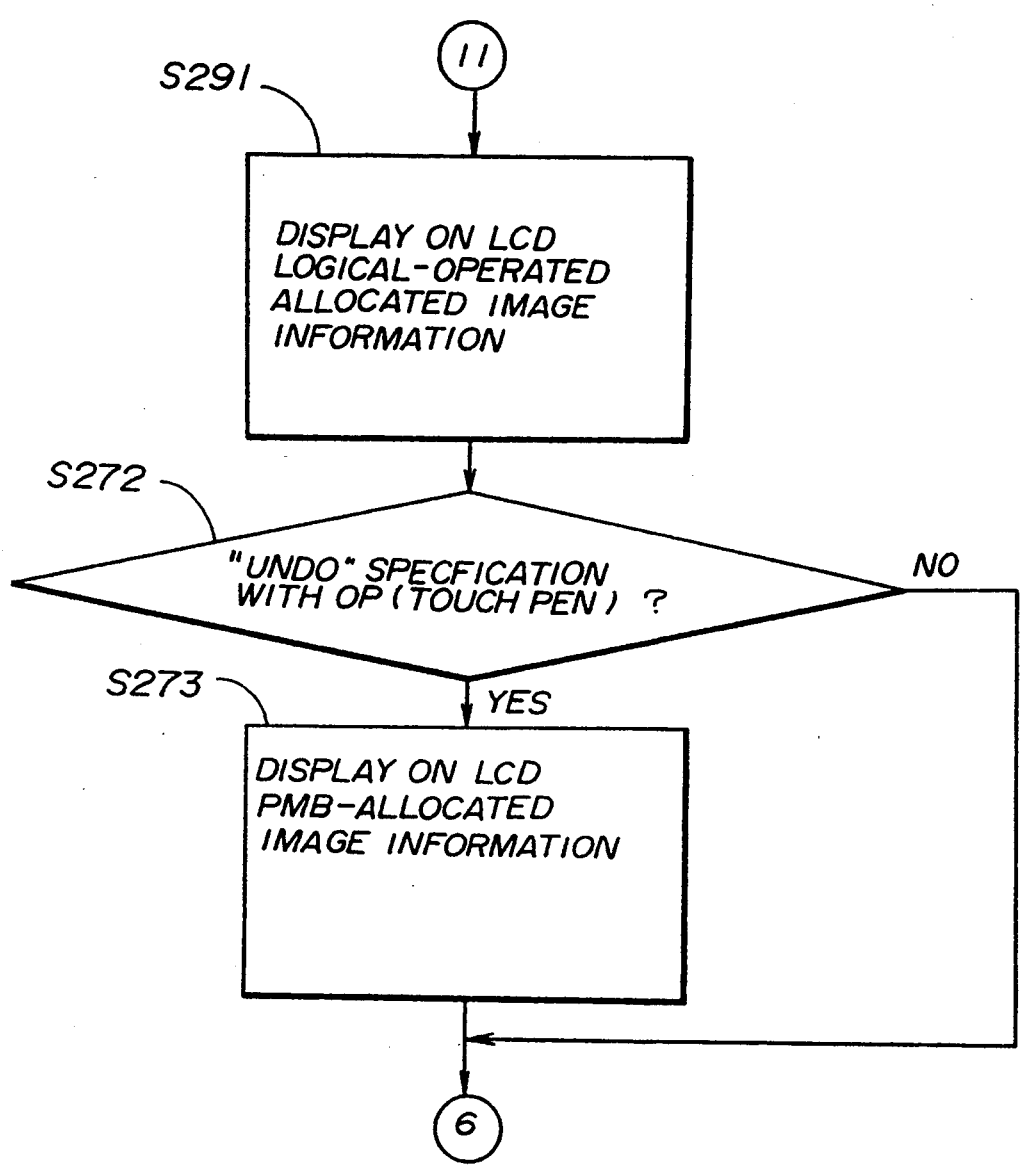
FIG. 86 shows an operation flow chart concerning another part of the image editing process performed by the controller and an operation sequence performed by the operator in the apparatus according to the fourth embodiment of the present invention.
Figures 123A, 123B:
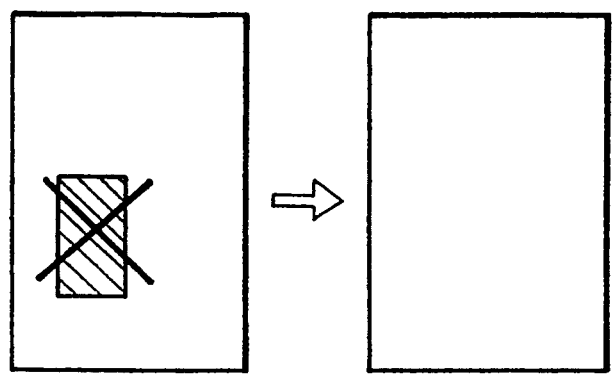
FIGS. 123A and 123B show a method of an UNDO specification, in the apparatus according the fourth embodiment of the present invention, by means of a touch pen in a case where UNDO operation may be performed.

If the extracted or transferred image includes an inappropriate element, the operator may draw, with the touch pen 4, a symbol, in S272 of FIG. 86, so as to cancel the corresponding image extraction or transference. (This extracted or transferred image is, for example, the letters displayed on the left side of the image display part of the LCD 3 as shown in FIG. 99. In this example, the letters comprise "Katakana" letters, that belong to one kind of the Japanese letters, "biaa paati" as mentioned above.) The symbol to be drawn indicates specification "undo" and has a shape of an approximate X-letter. This symbol is to be drawn on the inappropriate extracted or transferred area displayed on the image display part as shown in FIG. 123A. In FIG. 123A, the inappropriate extracted or transferred area is indicated as the hatched area. As a result, the controller 20 deletes the specified area and returns the image display part so as to display the original image as shown in FIG. 123B.

Further, any of the following operations may be performed by the operator with the touch pen 4 as an occasion demands, in S162 of FIG. 76. If another area is to be extracted from the input image, the operator may specify the "reading page" button in the menu page. If another original image is to be read, the operator may specify the "read" button in the menu page. If the final image obtained is to be printed out, the operator may specify the "print" button in the menu page.

Reading Page Process

Figure 80:
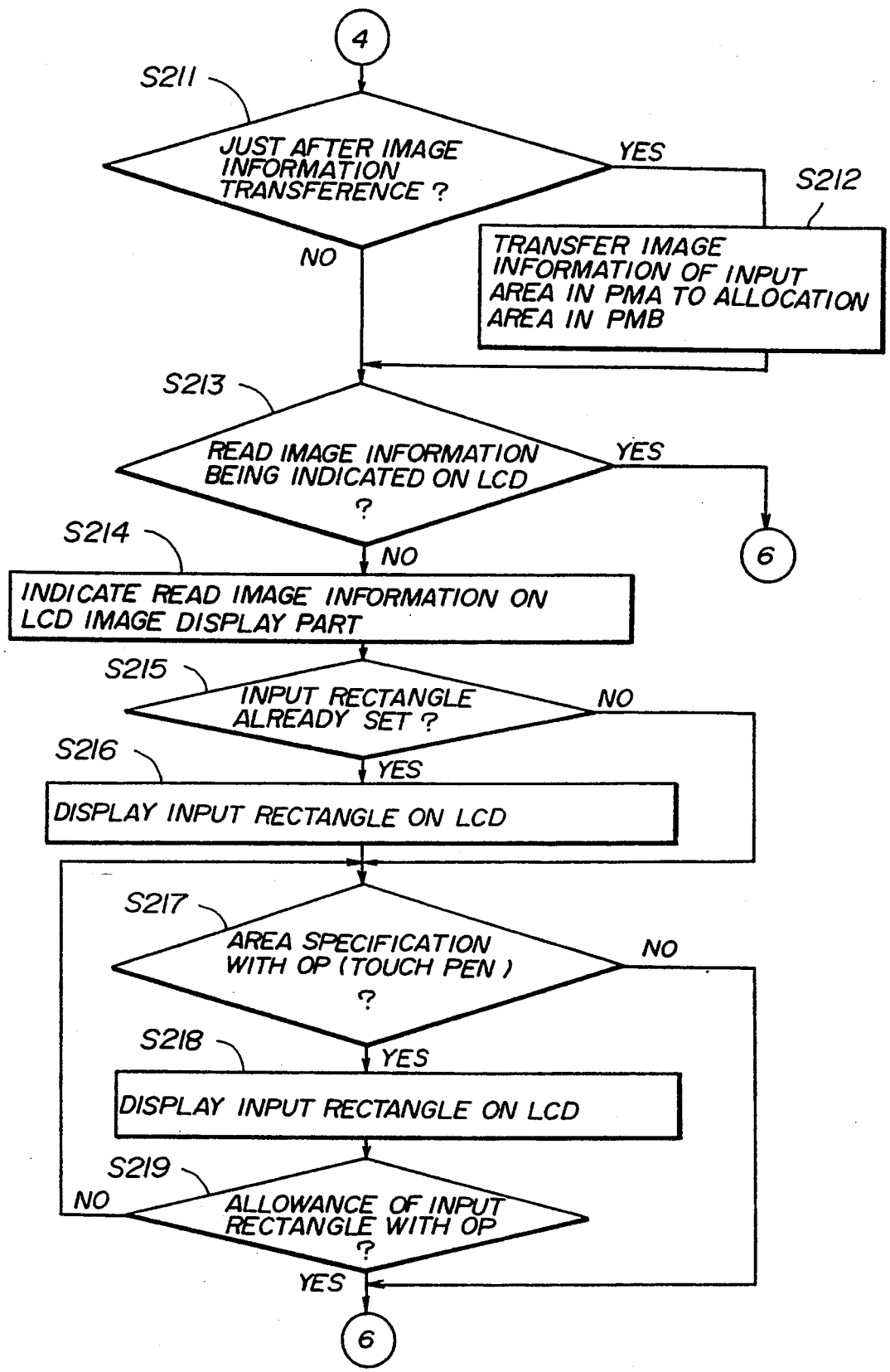
FIG. 80 shows an operation flow chart concerning a reading page process performed by the controller and an operation sequence performed by the operator in the apparatus according to the fourth embodiment of the present invention.

The button "reading page" in the menu page of the LCD 3 is specified with the touch pen 4 in S162 of FIG. 76, the reading-page process shown in FIG. 80 is then started from S211.

Step S212: The input area of image information stored in the first page memory board (PMA) is transferred to the allocation area prepared in the second page memory board (PMB). That is, if it is determined in S211 that it is just after the image information has been transferred, the process similar to the process of S172 is then executed.

Step S214: If it is determined in S213 that read image information is not displayed on the image display part of the LCD 3, the following operation is executed. With the REC board 22, the read image information stored in the image buffer memory of the first page memory board 12 is transferred to the video RAM of the LCD controller board 23 so as to be represented on the image display part of the LCD 3.

Step S216: If it is determined in S215 that the input rectangle has been already set, the set input rectangle is then displayed on the image display part of the LCD 3.

Step S218: If it is determined in S217 that the touch pen 4 is used to specify two points in the image display part of the LCD 3, the input rectangle is displayed on the image display part, the vertexes of which input rectangle include two diagonally opposite vertexes or corners respectively coinciding with the specified two points as described above. This input rectangle is used to define an input area such as mentioned above. If an input rectangle has been already displayed, the currently displayed rectangle is deleted and then the new rectangle is displayed.

In the above process example, then, the operator intends to specify another input area. Then, the operator specifies with the touch pen 4 the button "reading page". As a result, the original image shown in FIG. 4 is again displayed on the image display part of the LCD 3. Then, the operator may appropriately repeat operations and processes similar to the above-mentioned ones for specifying an input area and allocating it in the allocation page. As a result of these operations and processes being performed, for example, an image shown in FIG. 100 may be obtained.

Then, the operator performs the determination in S162 of FIG. 76. The operator intends to use the other vertical-B5 original image shown in FIG. 5. Thus, the operator sets the corresponding draft, on which the original image is represented, in the scanner 2. Then, the operator specifies with the touch pen 4 the button "read" in the displayed menu page, in S162 of FIG. 76.

Here, it is the time just after the image information has been transferred. Consequently the controller 20, with the REC board 22, may vary the size of the image represented with the input area of the image information stored in the image buffer memory of the first page memory board 12. In this case, no size variation is needed. Then, the specified logical operation from among the 16 logical operations is performed on the image information, resulting from a size variation or without size variation being performed, and the output area of the image information stored in the image buffer memory of the second page memory board 13. Subsequently, the resulting image information is then written in this output area so as to update the output area of the image information, in S172 of FIG. 77.

Then, the reading-specification submenu is displayed on the image display part of the LCD 3 as shown in FIG. 91. Simultaneously, a message "Specify input parameter." as shown in FIG. 91, in S77 of FIG. 173.

Then, the operator specifies each parameter with the touch pen 4 being touched on the corresponding button. As a result, the controller 20, as occasion demands, reverses the state of the specified button to become a reversed white-on-black state while, if it is reversed, the previously reversed button is returned to the normal black-on-white state, in S174 of FIG. 77.

Then, after the operator determines all input parameters, the operator has to specify with the touch pen 4 the "set" button at the bottom of the submenu in S175 of FIG. 77. As a result, the controller 20 deletes the displayed submenu from the image display part in S177 of FIG. 77. Simultaneously, the controller 20 initiates the scanner 2 so as to make it read the original image on the set draft shown in FIG. 5. Then, the controller 20 receives the read image information and then writes it into the image buffer memory of the first page memory board 12 in S178 of FIG. 77.

Figure 101:
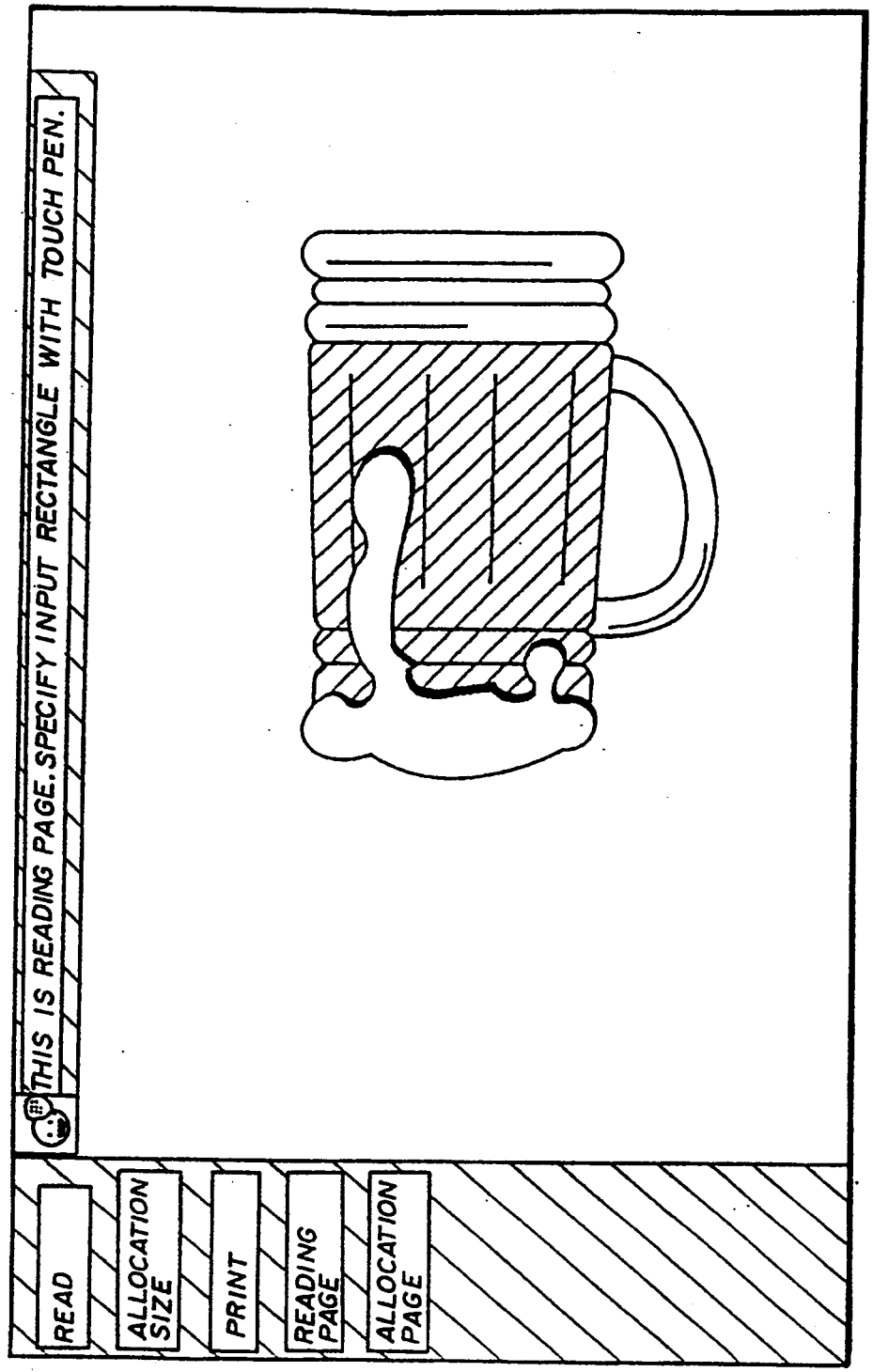

Then, with the REC board 22, the image information stored in the image buffer memory of the board is transferred to the video RAM of the LCD controller board 23. Then, the transferred image information is represented on the image display part as shown in FIG. 101, in S179 of FIG. 77. Simultaneously, a message "This is read image. Specify an input rectangle with the touch pen." is displayed in the menu page.

Figure 102:
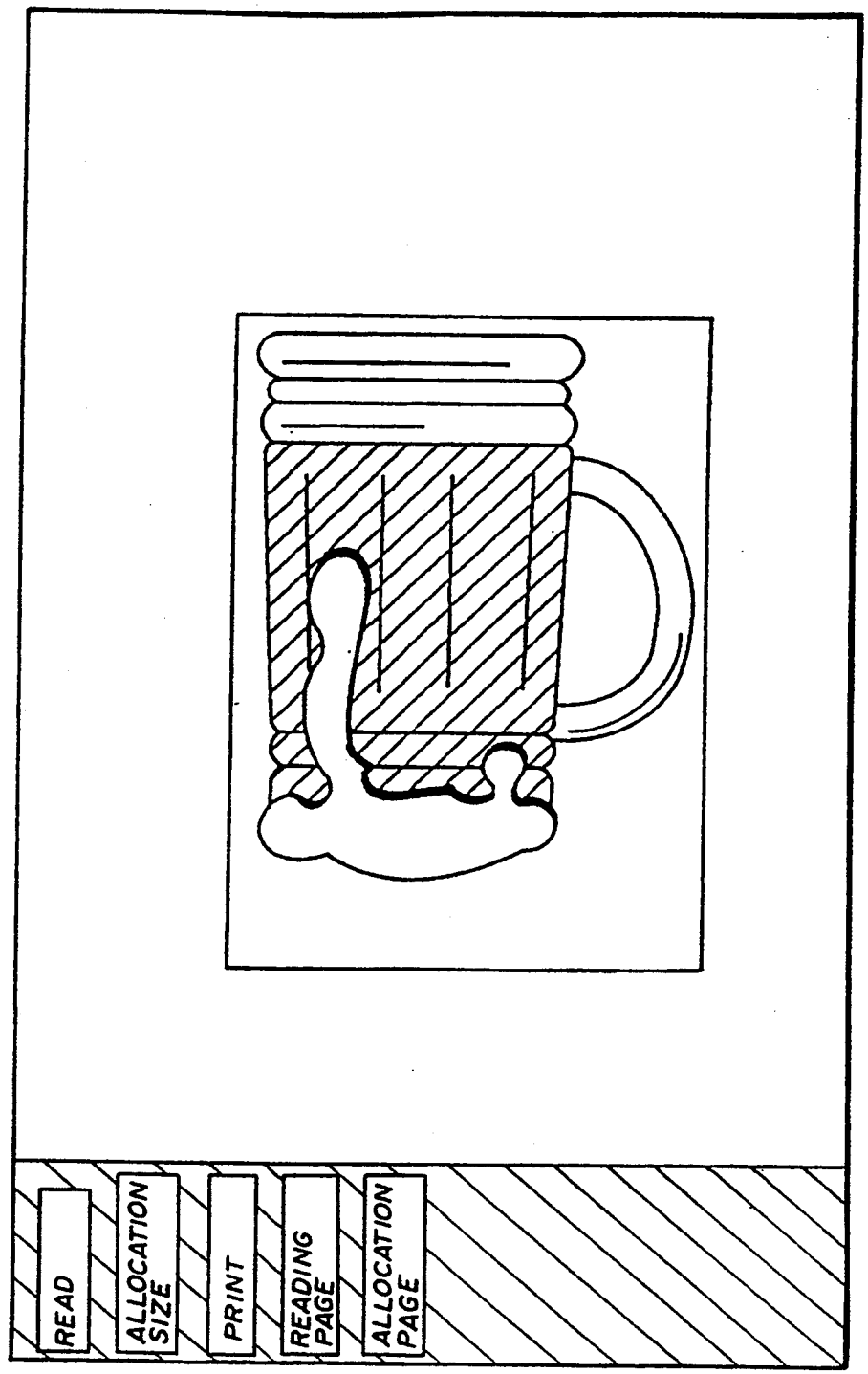

Then, the operator may specify a desired input area in the image represented on the image display part of the LCD 3 with the touch pen 4 in S180 of FIG. 77. As a result, the controller 20 displays the input rectangle corresponding to the specified desired input area in S181 of FIG. 77. Here, the rectangle is displayed as shown in FIG. 102. This rectangle defines the picture of a mug filled with beer and this rectangle is added to the image displayed on the image display part as shown in FIG. 101.

Allocation Page Process

The button "allocation page" in the menu page of the LCD 3 is specified with the touch pen 4 in S162 of FIG. 76, the allocation-page process shown in FIG. 81 is then started from S221.

Step S222: If it is determined in S221 that allocation image information is not displayed on the image display part of the LCD 3, the following operation is then executed. Allocation image information stored in the image buffer memory of the second page memory board 13 is transferred to the video RAM of the LCD controller board 23 through the REC board 22. The transferred information is then displayed on the image display part of the LCD 3. If it is determined in S221 that allocation image information is displayed, S162 of FIG. 76 is then executed.

Figure 82:
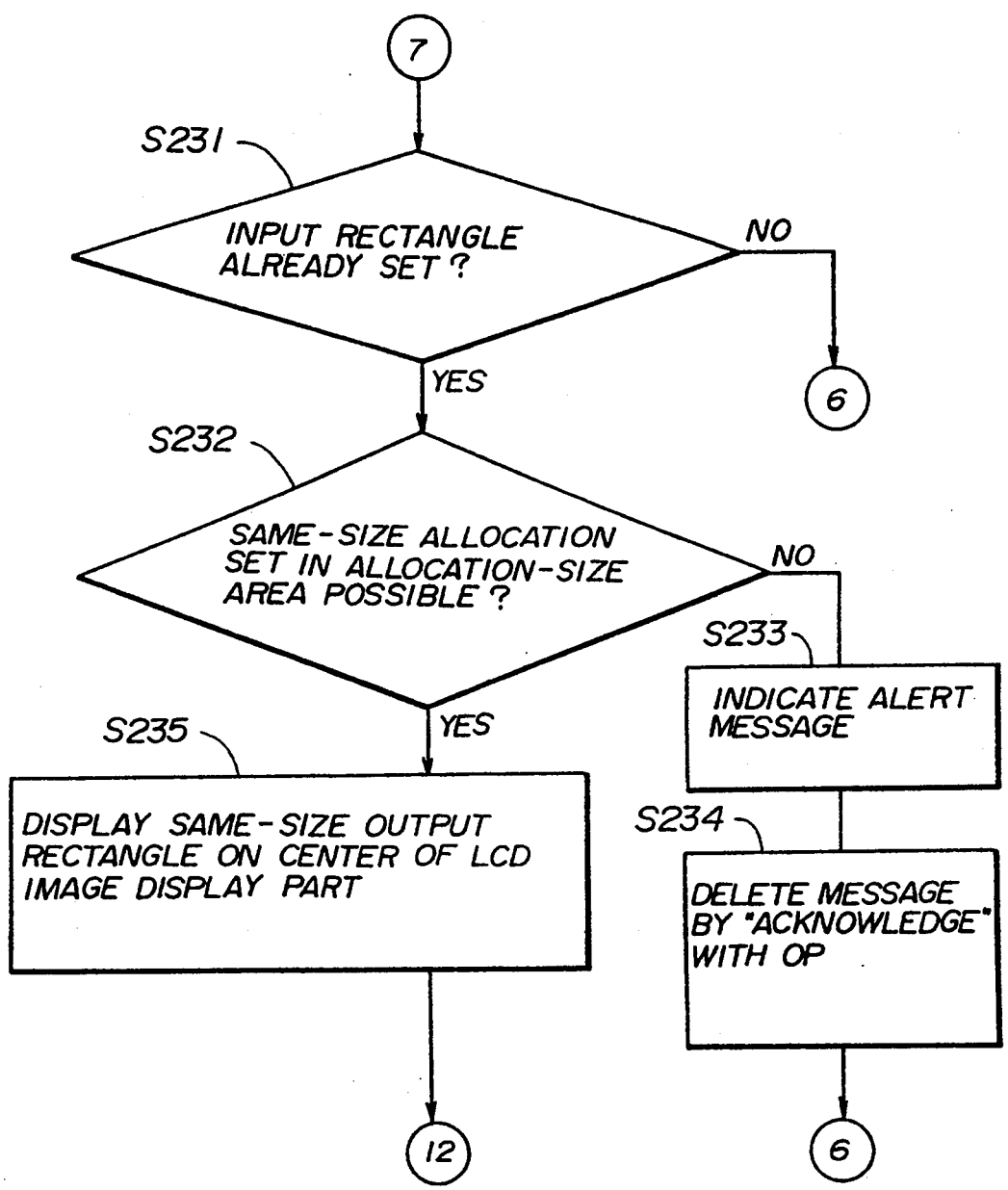
FIG. 82 shows an operation flow chart concerning a part of an image editing process performed by the controller and an operation sequence performed by the operator in the apparatus according to the fourth embodiment of the present invention.

Step S224: If it is determined in S223 that the output rectangle has already been set, the set output rectangle is displayed on the image display part of the LCD 3. If it is determined in S223 that the output rectangle has not been set yet, the process shown in S231 of FIG. 82 is then executed so as to set the output rectangle.

Step S225: The operator may specify any editing specification from among "move", "size variation", "rotation mode", and "logical operation".

Figure 103:
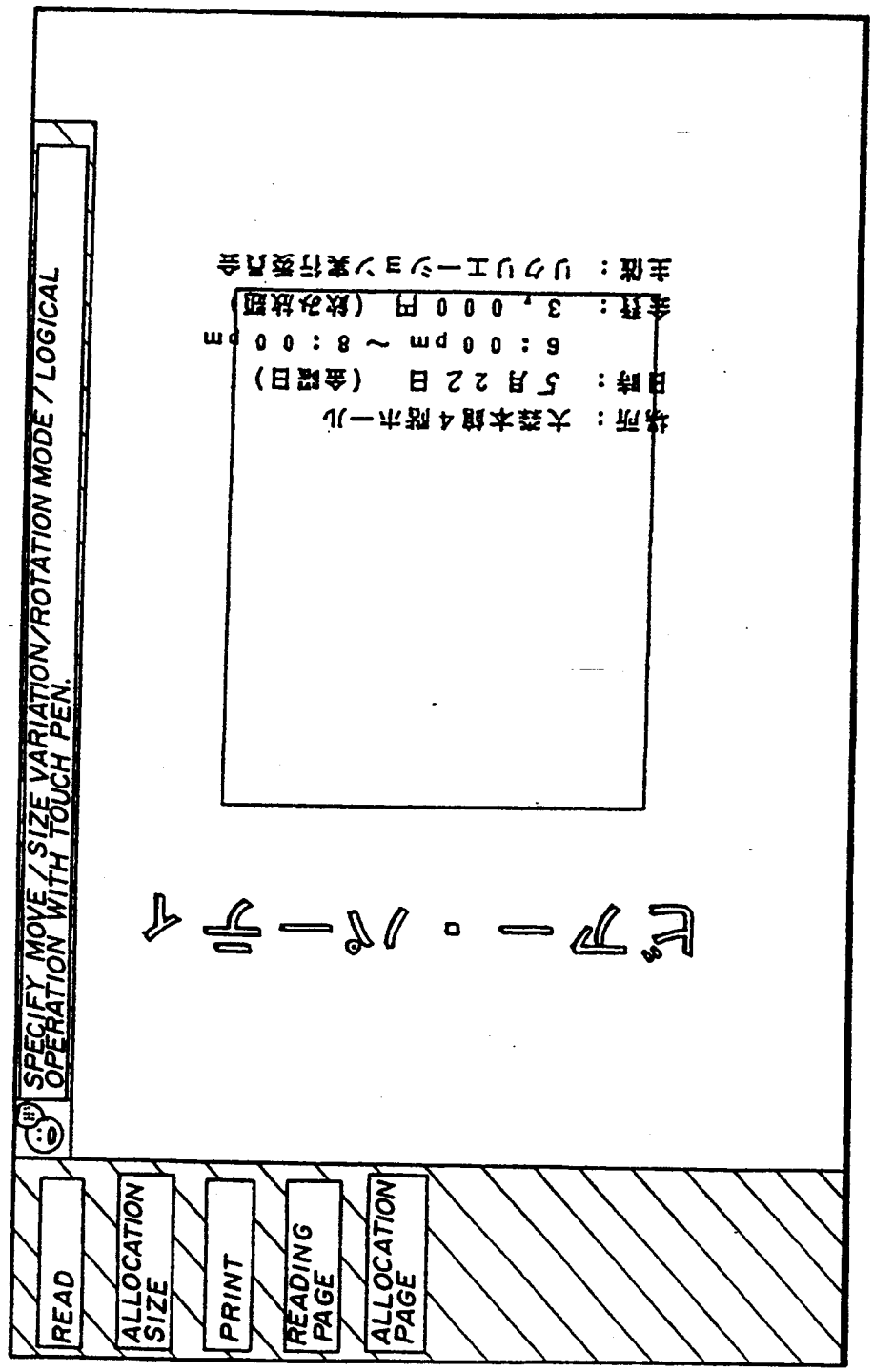

In the above process example, as a result of the operator specifying the button "allocation page" with the touch pen 4 in S162 of FIG. 76, the controller 20 then, with REC board 22, displays an image in the image display part of the LCD 3 as shown in FIG. 103. That is, the allocation image information stored in the image buffer memory of the second page memory board 13 is represented in S222 of FIG. 81. Then, the controller 20 converts the input rectangle specified about the read input image information in size. Thus, as a result of this size conversion or size variation, the size of the input rectangle appears as if the corresponding size of a fragment were cut out from the corresponding draft and the obtained fragment were then put on the size of sheet of paper, which is identical in size to the size of the allocation. The resulting size of the input rectangle is displayed in the center of the image display part, in S235 in FIG. 82. The displayed rectangle is used as "default output rectangle for allocation". Simultaneously, a message is displayed in the menu page together with the displayed default output rectangle. This message is "Set move/size-variation/rotation/logical operation, with the touch pen.".

Figure 104:
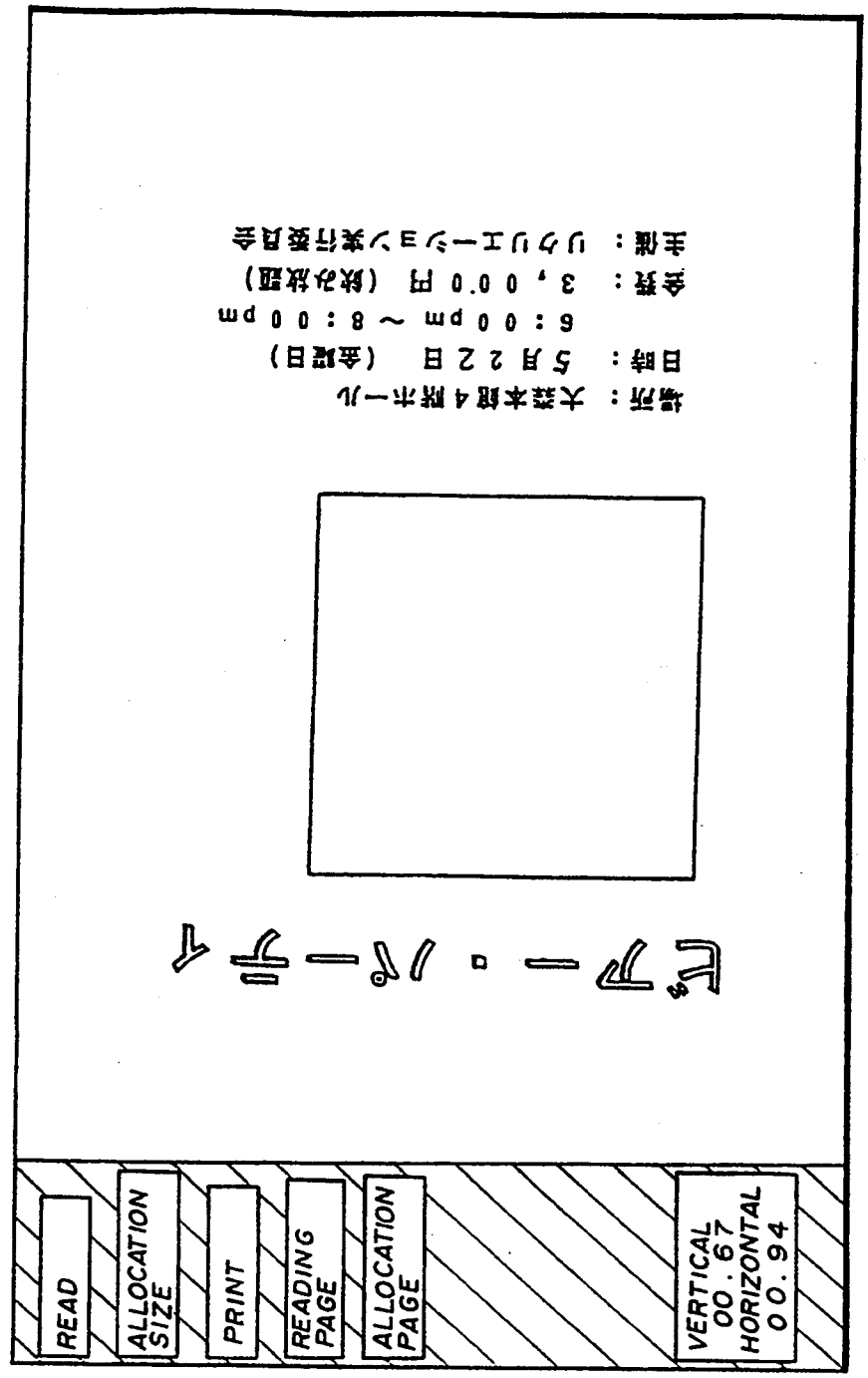

Then, the operator, as shown in FIG. 104, moves leftward and reduces the size of the displayed output rectangle, as mentioned above, the description will be repeated as follows. An edge of this rectangle is to be touched with the touch pen 4 and the touch pen 4 is dragged along the screen of the LCD 3 while the touch pen 4 is touching the edge. Then, the displayed output rectangle follows the dragged touch pen 4 and move accordingly in the image display part. Further, it is also possible to vary the size of the displayed output rectangle as follows. A corner or vertex of this rectangle is to be touched with the touch pen 4 and the touch pen 4 is dragged along the screen of the LCD 3 while the touch pen 4 is touching the edge. Then, the shape of the displayed output rectangle varies so that the vertexes of the resulting varied rectangle include two diagonally opposite vertexes or corners, one of which diagonally opposite vertexes is fixed while the other follows the dragged touch pen 4. As a result, the location and size of the output rectangle with or without the above-mentioned moving/size variation operations are determined. Thus, the allocation area (output area) onto which the set area (input area) of image information will be allocated has been specified. These operations are in S225 in FIG. 81 and S251-253 of FIG. 84. Simultaneously, the menu page displayed together with the display of the rectangle includes the size-variation ratio (vertical 00.67, horizontal 00.94). This size-variation ratio is a ratio in size between the input area and the allocation area.

Image Editing Process

Through an editing specification by the operator with the touch pen 4, any of the processes "move", "size variation", "rotation mode" and "logical operation" respectively shown in FIGS. 83–86 may be executed.

Figure 83:
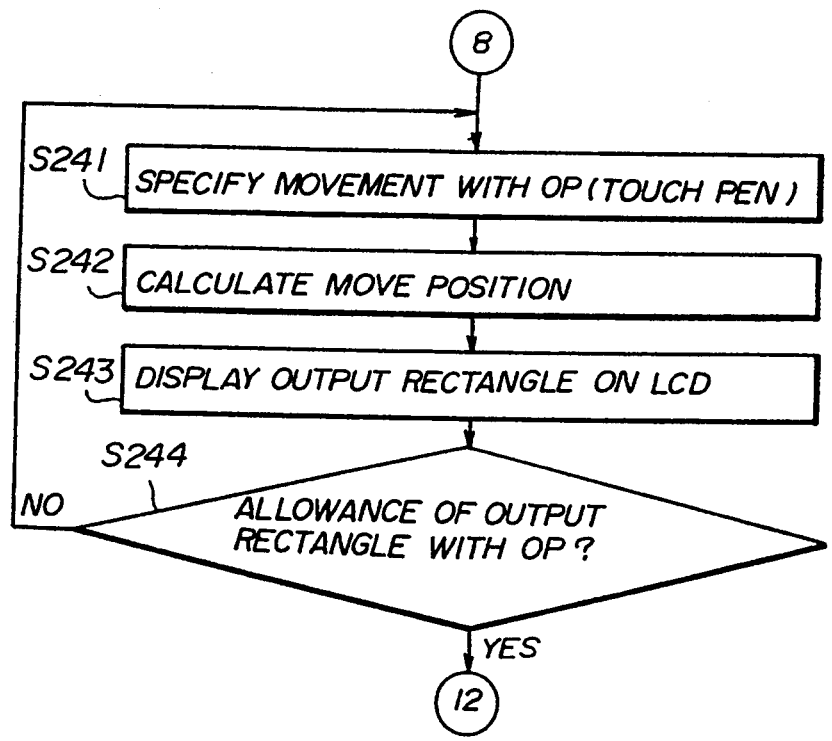
FIG. 83 shows an operation flow chart concerning another part of the image editing process performed by the controller and an operation sequence performed by the operator in the apparatus according to the fourth embodiment of the present invention.

(1) "Move" process (FIG. 83)

Step S241: An input coordinate is specified with the touch pen 4 so as to move a first output rectangle according to the specified input coordinate.

Step S242: Using the specified input coordinate, coordinates associated with another second output rectangle are calculated. If the second output rectangle has a size which exceeds the size of the image display part of the LCD 3, beep sound is caused with the buzzer 21 through the SP-I/F 14.

Step S243: The first output rectangle already displayed on the image display part of the LCD 3 is deleted and then the above-mentioned second output rectangle is displayed thereon.

Figure 84:
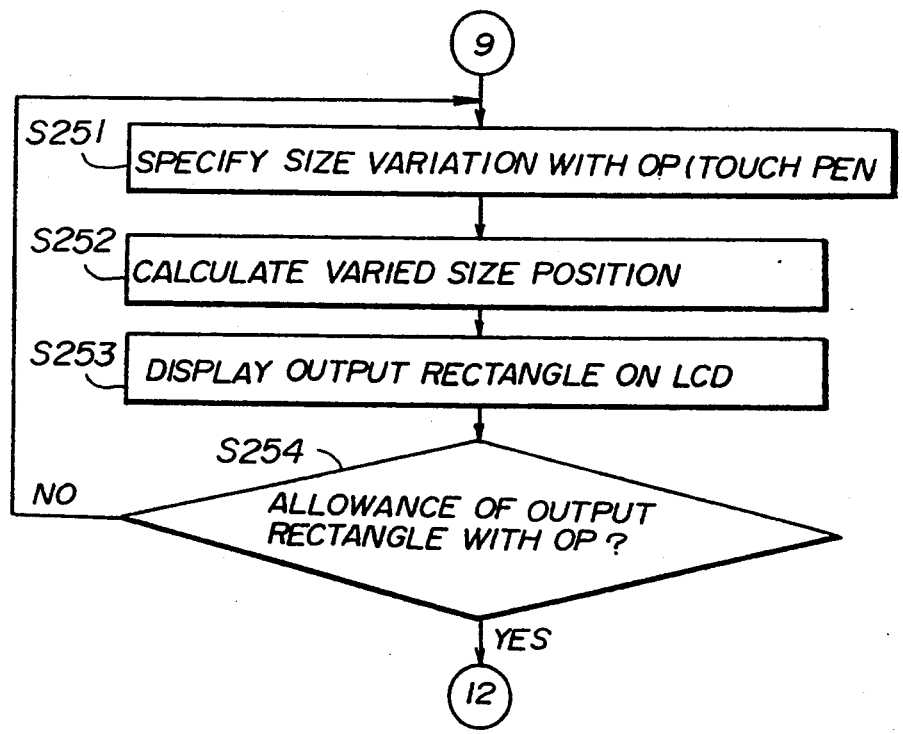
FIG. 84 shows an operation flow chart concerning another part of the image editing process performed by the controller and an operation sequence performed by the operator in the apparatus according to the fourth embodiment of the present invention.

(2) "Size variation" process (FIG. 84)

Step S251: An input coordinate is specified with the touch pen 4 so as to vary a size of a first output rectangle according to the specified input coordinate.

Step S252: Using the specified input coordinate, coordinates associated with second output rectangle are calculated. If the second output rectangle has a size exceeds the size of the image display part of the LCD 3, beep sound is caused with the buzzer 21 through the SP-I/F 14.

Step S253: The first output rectangle already displayed on the image display part of the LCD 3 is deleted and then the above-mentioned second output rectangle is displayed thereon.

Figure 85:
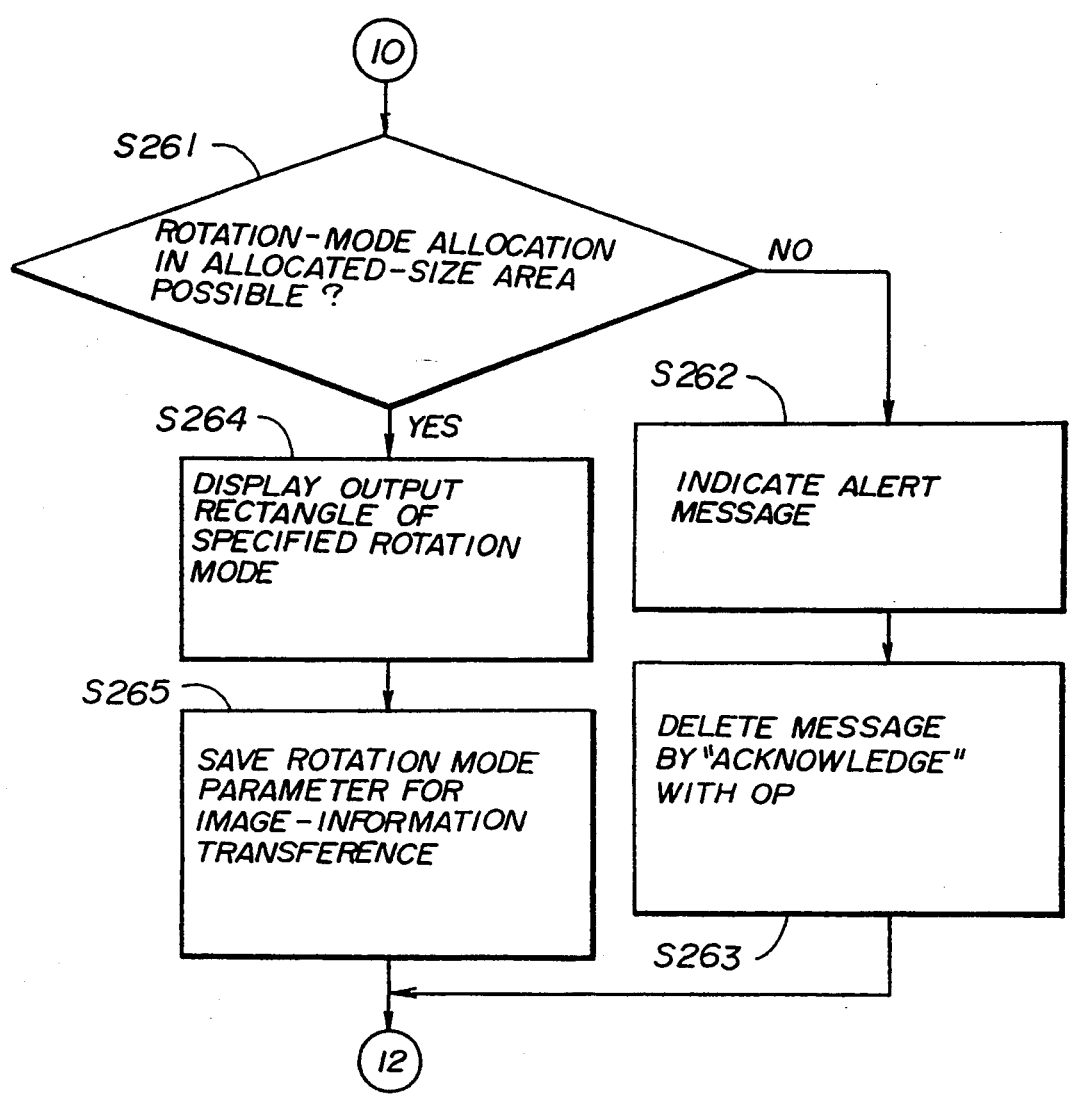
FIG. 85 shows an operation flow chart concerning another part of the image editing process performed by the controller and an operation sequence performed by the operator in the apparatus according to the fourth embodiment of the present invention.

(3) "Rotation mode" process (FIG. 85)

Step S262: An alert message "Input rectangle is too large. Set again." is displayed on the image display part of the LCD 3 if it is determined in S261 that it is not possible to perform the rotation-mode allocation.

Step S263: After the button "acknowledgement" is specified with the touch pen 4, this alert message is deleted from the image display part and then the former page is displayed thereon.

Step S264: If it is determined in S261 that it is possible to perform the rotation-mode allocation, the following operation is executed. That is, the first output rectangle which is currently displayed on the image display part of the LCD 3 is deleted and second output rectangle is displayed thereon. The second output rectangle results from the specified "rotation mode" operation. The above-mentioned deletion and then displaying the second output rectangle is executed if any of the following "rotation modes" is specified. That is, "90° rotation", "270° rotation", "Y-axis reversal+90° rotation", and "X-axis reversal+90° rotation".

Step S265: A rotation-mode parameter or parameters (such as those respectively associated with data: "90°", "180°", "270°", "0°", "Y-axis rotation", as shown in FIG. 63) are saved so as to use it or them for image-information transference which is executed when a logical operation is specified.

(4) "Logical operation" process (FIG. 86)

Step S271: Through the REC board 22, the specified logical operation is performed on the following two packets of image information. One packet of image information comprises that information representing the image defined by the input rectangle in the reading page. The other packet of image information comprises that information representing the image defined by the output rectangle in the allocation page. The allocation image information resulting from this performance of the logical operation is then transferred to the video RAM in the LCD controller board 23. The transferred image information is then used to display the corresponding image on the image display part of the LCD 3. In this display, there is a purpose to display the allocation image information so as to spread the corresponding image so as to fill the frame of the output rectangle. To achieve this purpose, the above-mentioned transference to the video RAM in the LCD controller board 23 is executed as follows. That is, the transferred image information is written to the video RAM so that the corresponding image is varied in its size. In this size variation, the vertical and horizontal dimensions may be varied independently as mentioned above.

Step S273: If the "undo" operation is specified with the touch pen 4, the display of the allocation image information resulting from the performance of the logical operation which has been performed just before is deleted. Then, the allocation image information on which the above logical operation had not been performed is to be displayed. For this purpose, the allocation image information stored in the image buffer memory (PMB) in the second page memory board 13 is transferred to the video RAM in the LCD controller board 23. In this transference, the transferred image information is written in the video RAM so that the size of the corresponding image is reduced. This size reduction is performed so as to control the relevant pixel density and size for transferring the relevant data between the page memory board and the LCD 3. Then the corresponding image is displayed on the image display part of the LCD 3.

Figure 87:
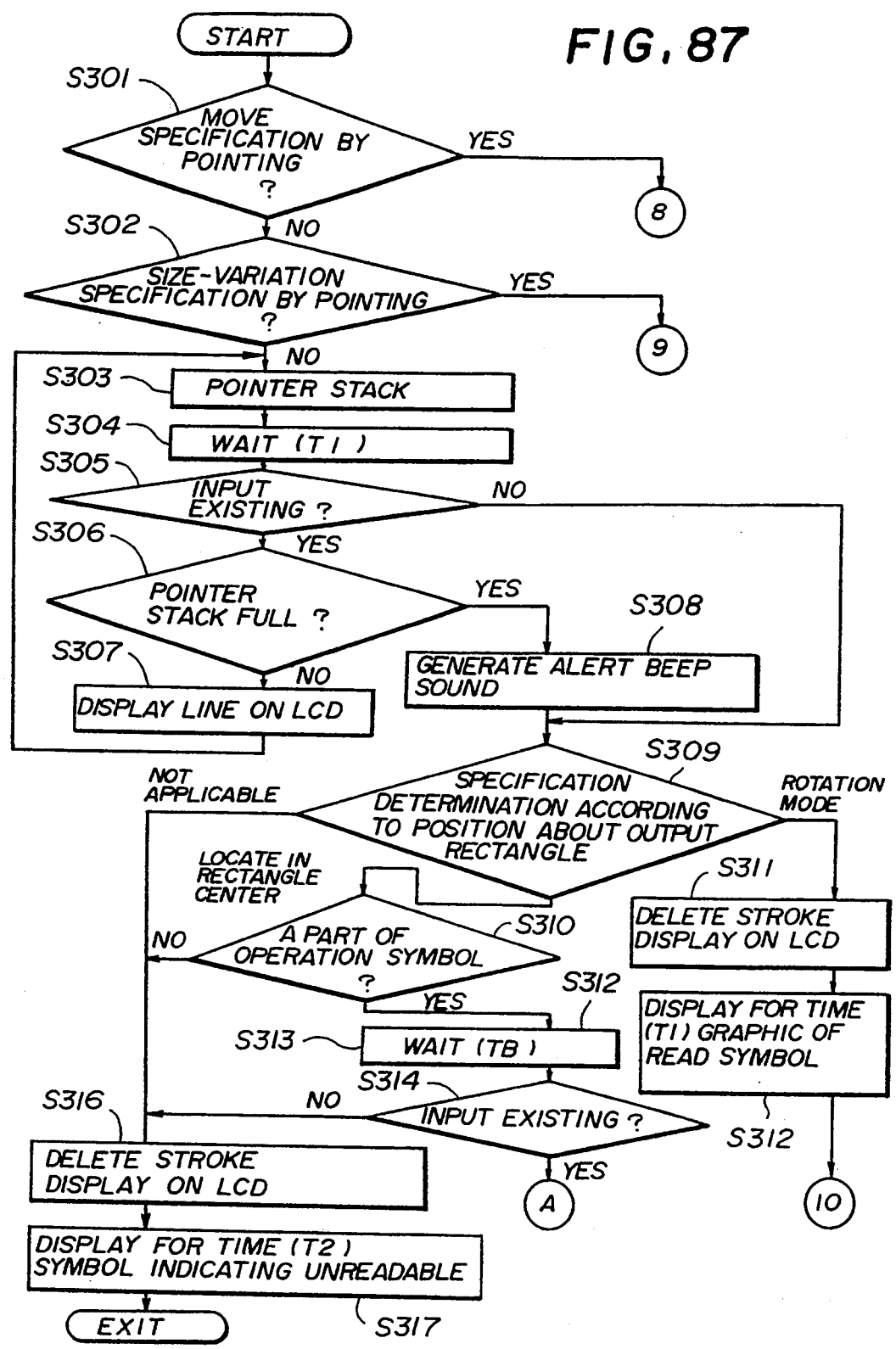
FIG. 87 shows an operation flow chart concerning a former half of a concrete process in a case where the operator performs editing specification in the operation flow chart shown in FIG. 81, which process is performed by the controller.
Figure 88:
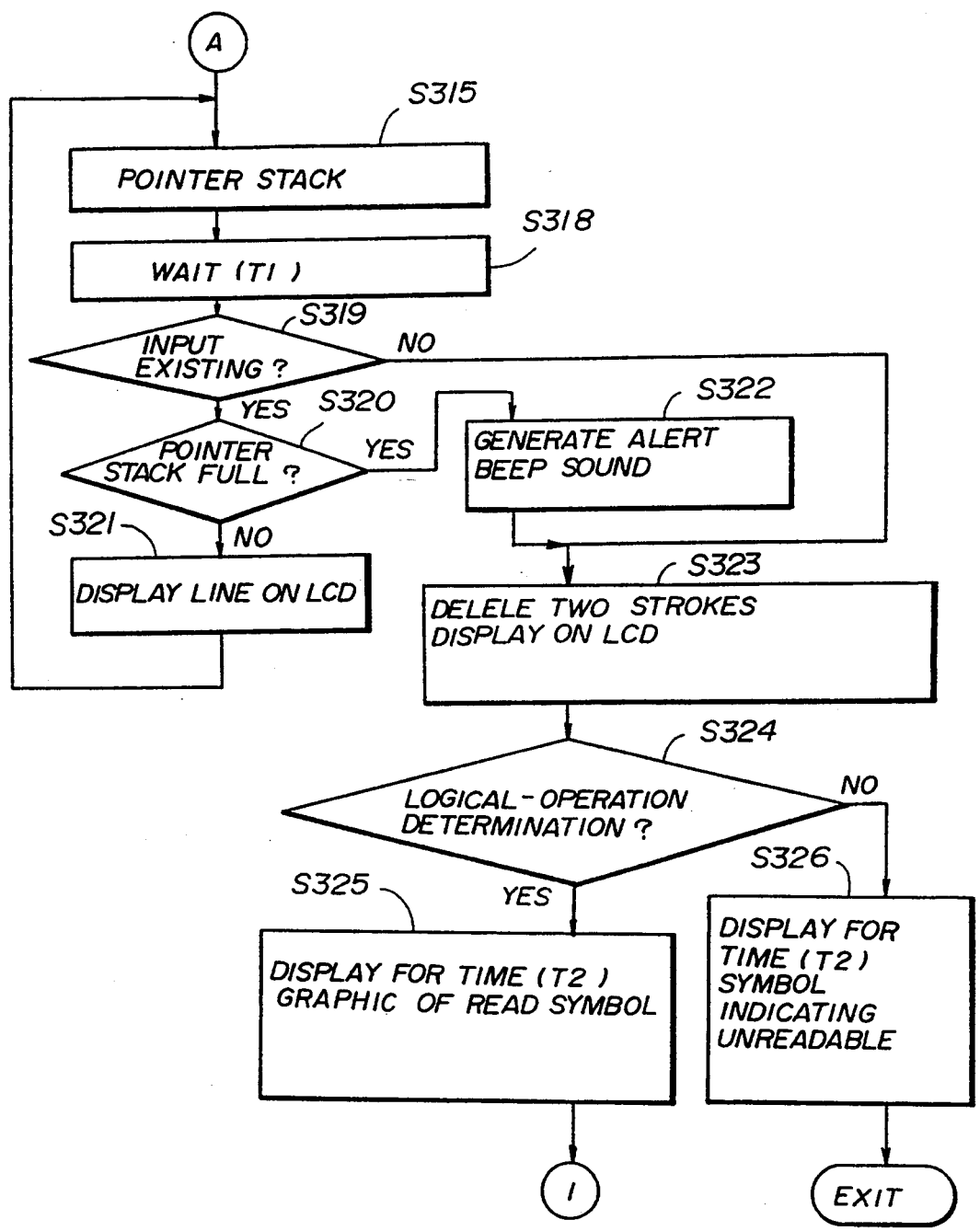
FIG. 88 shows an operation flow chart concerning a latter half of the concrete process mentioned in FIG. 87.

Then, with reference to the operation flow charts shown in FIGS. 87 and 88, processes to be executed by the controller 20 when the operator specifies (in S225 of FIG. 81) any of the editing operations will now be described. This specification is performed with the touch pen 4.

Step S301: The input coordinate specified by the operator with the touch pen 4 may coincide with the position on an edge, excepting the vertexes of the displayed output rectangle. (This coincidence includes a condition where the input-coordinate position is slightly different from the edge and this difference is within the predetermined error δ.) In this case, This specification is read as "move" operation. Accordingly, the process indicated with S241–S244 of FIG. 83 is then executed.

Step S302: The input coordinate specified by the operator with the touch pen 4 may coincide with the position on a vertex of the displayed output rectangle. (This coincidence includes a condition where the input-coordinate position is slightly different from the vertex and this difference is within the predetermined error δ.) In this case, This specification is read as "size-variation" operation. Accordingly, the process indicated with S251–S254 of FIG. 84 is then executed.

Step S303: The input coordinate (pointer) specified with the touch pen 4 is stacked.

Step S304: A successive specification of the input coordinate is waited for. Such a successive specification may be realized by continuous touching of the touch pen 4 on the screen. This waiting is executed for a predetermined time T1.

Step S305: It is determined whether or not such a successive specification is performed.

Step S306: If such a successive specification has been performed, it is determined whether or not a stack area is full. There, the stack area comprises, for example, a memory provided in the controller 20.

Step S307: If a vacant space exists in the stack area, a line is displayed on the image display part of the LCD 3. This line displayed connects between the successively specified two-point input coordinates. That is, the line is drawn with the touch pen 4.

Step S308: A beep sound for alerting is generated if there is no vacant space in the stack area.

Step S309: It is determined whether or not a position where one stroke of the displayed line exists occupies equal to or more than x % of a position associated with a specification symbol (operation symbol). The stroke of the line has been drawn for the output rectangle.

Step S310: The position associated with the stroke may exist at the center of the output rectangle. If so, it is determined whether or not the stroke of the line approximates, in an approximation degree equal to or more than y %, a part of specification (operation) symbols (a shape of any of a horizontal line, a vertical line, a 45° oblique line and a circle).

Step S311: If it is determined that the position associated with the stroke of the drawn line corresponds to a drawing associated with a symbol for "rotation mode" operation, the displayed or drawn stroke of the line is deleted from the screen.

Step S312: A graphic representing the determined symbol for "rotation mode" is then displayed on the screen for a predetermined time T2 and then S261 of FIG. 85 is executed.

Step S313: If it is determined that the one stroke of the drawn line corresponds to a part of the specification (operation) symbols, another second stroke of a drawn line is waited for a predetermined time T3.

Step S314: It is determined whether or not the other second stroke of the drawn line is input.

Step S315 (FIG. 88): If the second stroke of the line is input, the corresponding coordinates specified with the touch pen 4 are stacked.

Step S316: If no second stroke of the line is input, the stroke of line currently displayed on the image display part of the LCD 3 is then deleted.

Step S317: A graphic representing a symbol is then displayed on the image display part for a predetermined time T2. This displayed symbol indicates that it is not possible to read the drawing which has been performed with the touch pen 4.

Step S318 (FIG. 88 hereinafter) A successive specification of an input coordinate is waited for a predetermined time T1. Such a successive specification is realized by continuous touching of the touch pen 4 on the screen.

Step S319: It is determined whether or not such a successive specification of an input coordinate is performed.

Step S320: If such a successive specification is performed, it is determined whether or not a stack area is full.

Step S321: If there is a vacant space in the stack area, a line is displayed on the image display part of the LCD 3. The line displayed connects between two positions specified by the successive specifications of the input coordinates.

Step S322: If there is no vacant space in the stack area, a beep sound for alerting is generated.

Step S323: The two stroke of the drawn lines which are currently displayed are deleted.

Step S324: It is determined whether or not the second stroke of the line occupies equal to or more than z % of an operation symbol. This determination is executed according to the position associated with the second stroke of line and the shape of the second stroke of line and the relationship between the first stroke of the line and the second stroke of the line. This determination results in a determination whether or not the two strokes of lines correspond to any of logical-operation symbols.

Step S325: If it is determined that the two strokes of lines correspond to one of the logical-operation symbol, a graphic representing the determined logical-operation symbol is displayed on the image display part of the LCD 3 for a predetermined time T2.

Step S326: If it is determined that the two strokes of lines cannot be read as any of the logical-operation symbols, a graphics representing a symbol is then displayed on the image display part for a predetermined time T2. This displayed symbol indicates that it is not possible to read the drawing which has been performed with the touch pen 4. Then, the process shown in FIG. 86 is executed.

Figure 105:
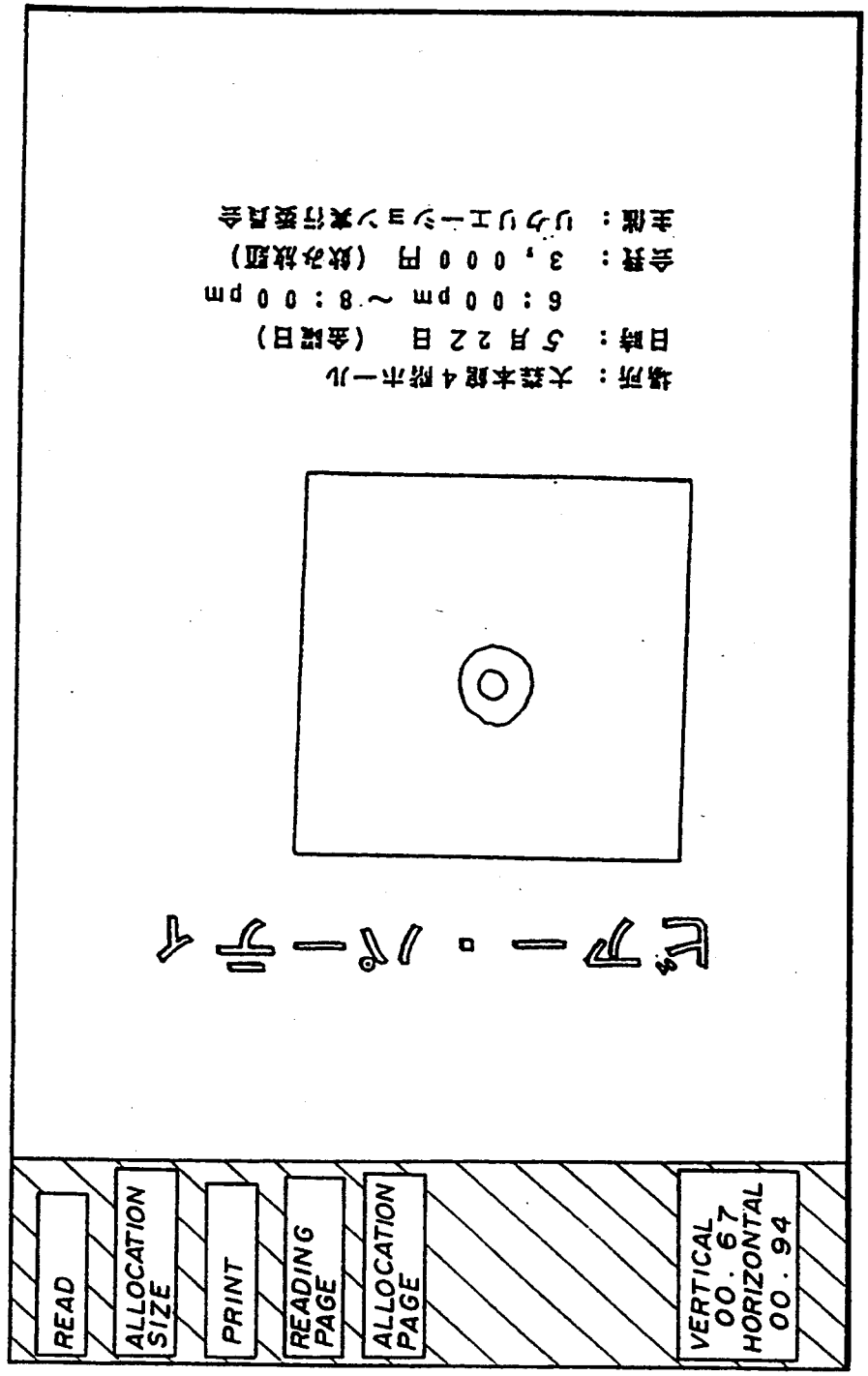

In the actual process example, then the operator draws a double-circle at the center of the output rectangle with the touch pen 4 as shown in FIG. 105, in S225 of FIG. 81. This drawing is executed on the image display part of the LCD 3. This double-circle drawing indicates the logical operation "overwrite". Subsequently, the controller 20 reads the drawing as the "overwrite" logical operation. Thus, the controller 20 displays for a predetermined time a graphic representing the symbol corresponding to the drawn double-circle symbol (please refer to the corresponding symbol shown in FIG. 122) for specifying the "overwrite"logical operation, in S315 of FIG. 88.

Figure 106:
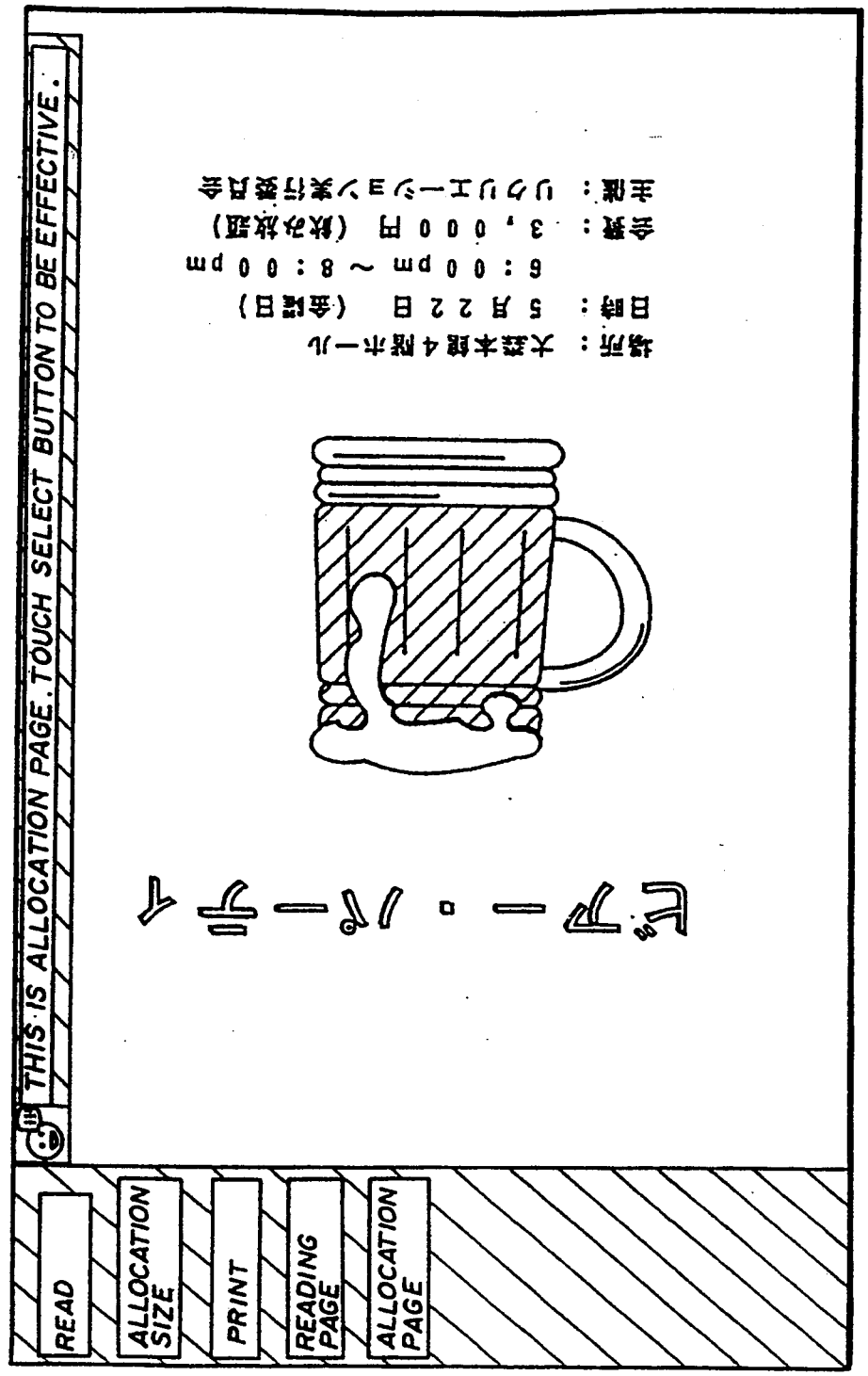

The lengths in the X- and Y-directions of the image defined by the input rectangle (input area) in the reading page are respectively referred to as X1 and Y1. Further, the lengths in the X- and Y-directions of the image defined by the allocation rectangle (allocation area) in the allocation page are respectively referred to as X2 and Y2. Then, the controller 20, with the REC board 22, varies in size the input rectangle (input area) of the read image information. Thus, the X-direction is multiplied by X2/X1 while the Y-direction is multiplied by Y2/Y1 in the input rectangle of image information. Then, the specified logical operation is performed on the size-varied image information and the output rectangle (or output area) of the allocation image information. Then, the resulting allocation image information is then transferred to the video RAM of the LCD controller board 23 and then displayed on the image display part of the LCD 3 as shown in FIG. 106, in S271 of FIG. 86. Here, the controller deletes the displayed output rectangle for the allocation setting, before this display, and a message "This is allocation page. Touch a select button." is displayed as shown in FIG. 106.

Then, the operator intends to specify another input area. Then, the operator specifies with the touch pen 4 the button "reading page" in S162 of FIG. 76. Here, it is the time just after the image information has been transferred. As a result, the controller 20, with the REC board 23, varies the size of the input area of the input image represented with the image information stored in the image buffer memory of the first page memory board 12. Then, the specified logical operation from among the 16 logical operations is performed on the image information, which information results from a size variation being performed thereto, and the output area of the image information stored in the image buffer memory of the second page memory board 13. Then, the resulting image information is written in this output area so as to update the output area of the image information, in S172 of FIG. 77.

Then, the original image shown in FIG. 5 is again displayed as shown in FIG. 101 on the image display part of the LCD 3 in S214 of FIG. 80. Simultaneously, a message "This is read image. Specify an input rectangle with the touch pen." is displayed in the menu page.

Then, the operator specifies a desired input area in the image displayed on the image display part in S180 of FIG. 77 with the touch pen 4. As a result, the controller 20 displays the input rectangle corresponding to the specified input area in S181 of FIG. 77. Here, the input rectangle is again displayed as shown in FIG. 102.

Figure 107:
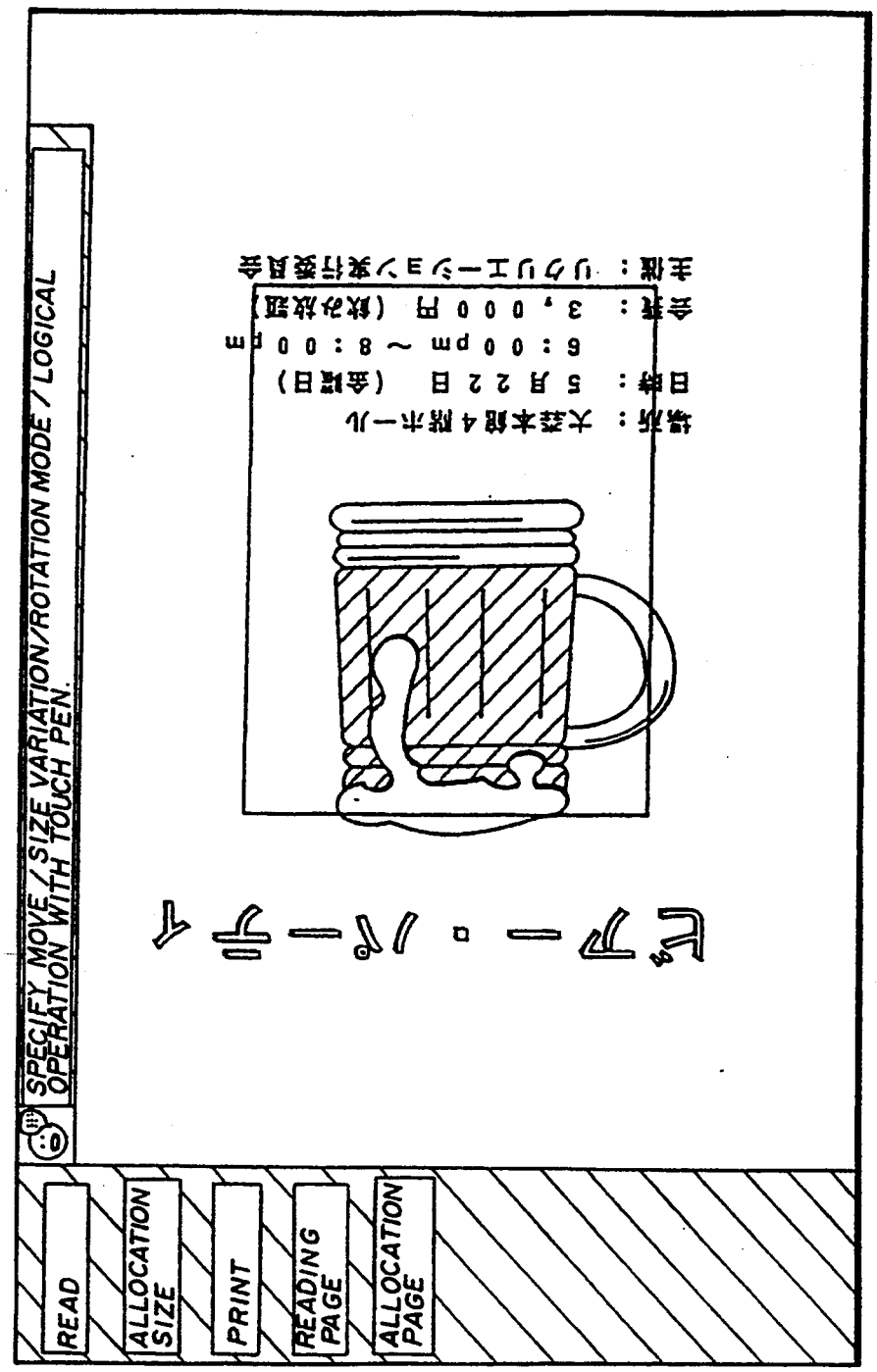

Then, the operator specifies the "allocation page" button in the menu page with the touch pen 4 in S162 of FIG. 76. As a result, the controller 20 represents the allocation image information in the image display part of the LCD 3 as shown in FIG. 107, in S222 of FIG. 81. Simultaneously, the controller 20 converts in size the input rectangle specified for the read input image information. As a result of this size conversion or size variation, the size of the input rectangle becomes as if the corresponding size of a fragment were cut out from the corresponding draft and the obtained fragment were then put on the size of sheet of paper, which is identical in size to the size of the allocation. The resulting size of input rectangle is displayed in the center of the image display part in S235 in FIG. 82. The displayed rectangle is used as "default output rectangle for allocation". Simultaneously, a message is displayed in the menu page together with the displayed default output rectangle. This message is "Set specification of move/size variation/rotation/logical operation with the touch pen.".

Figure 108:
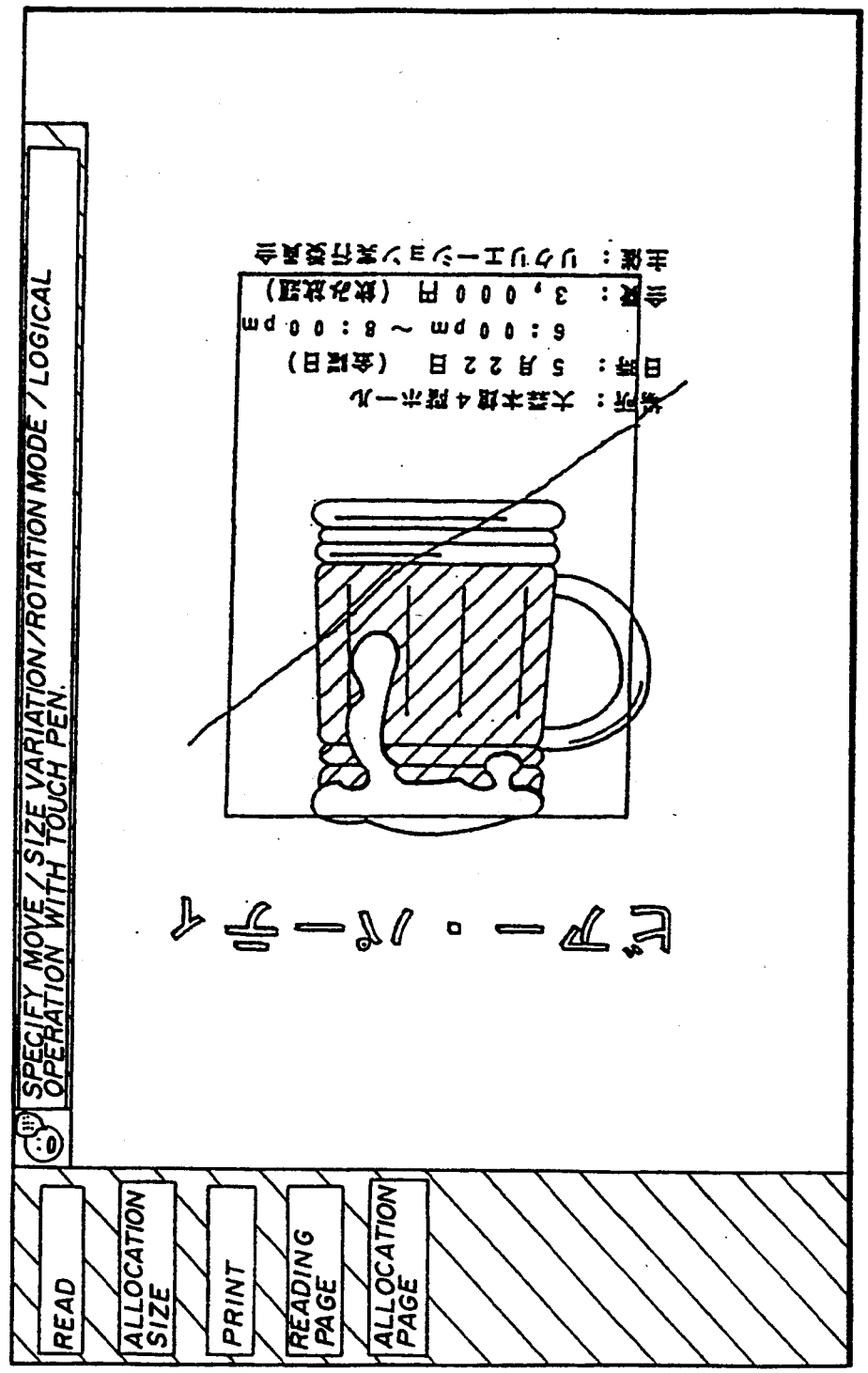
Figure 109:
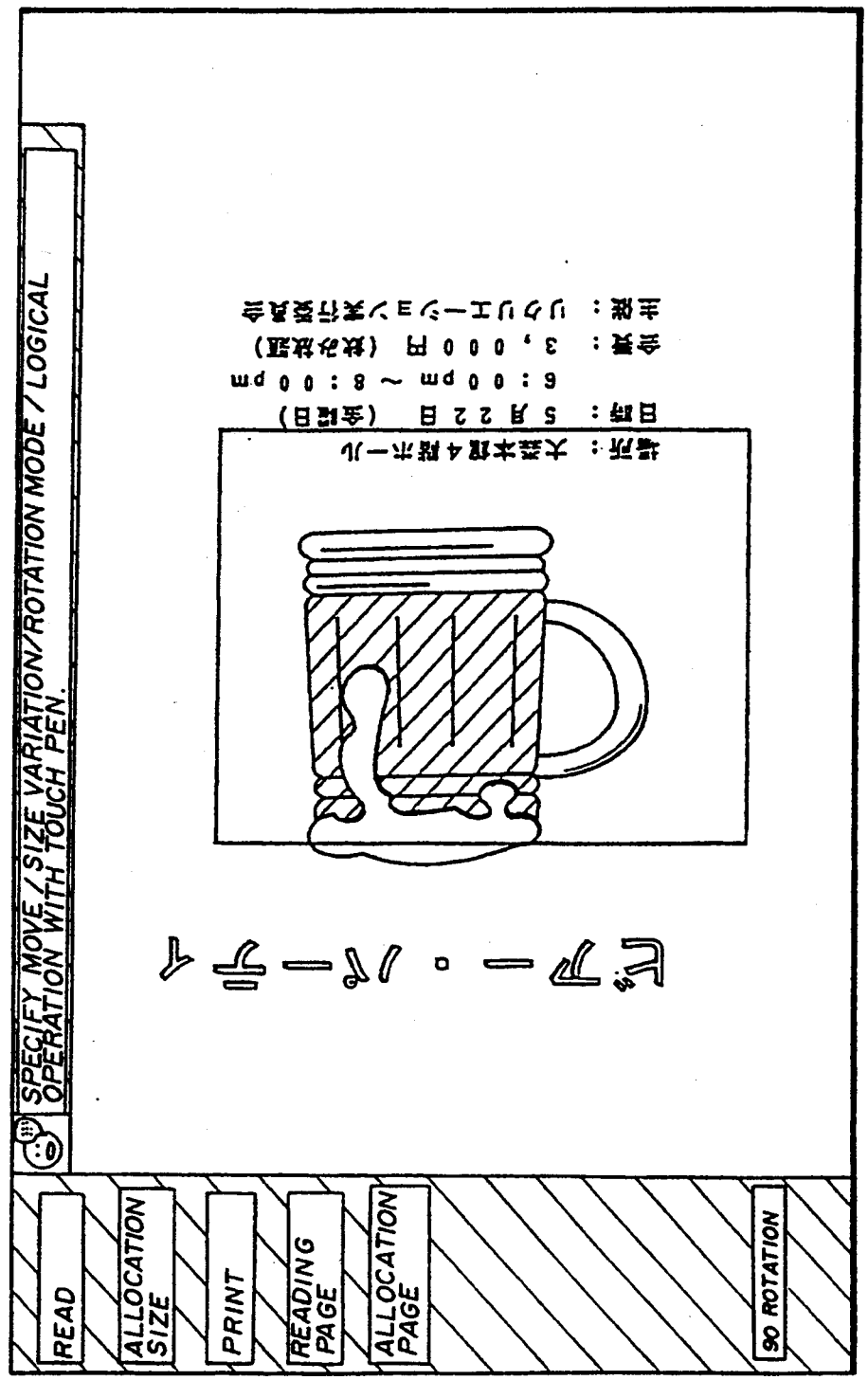
Figure 110:
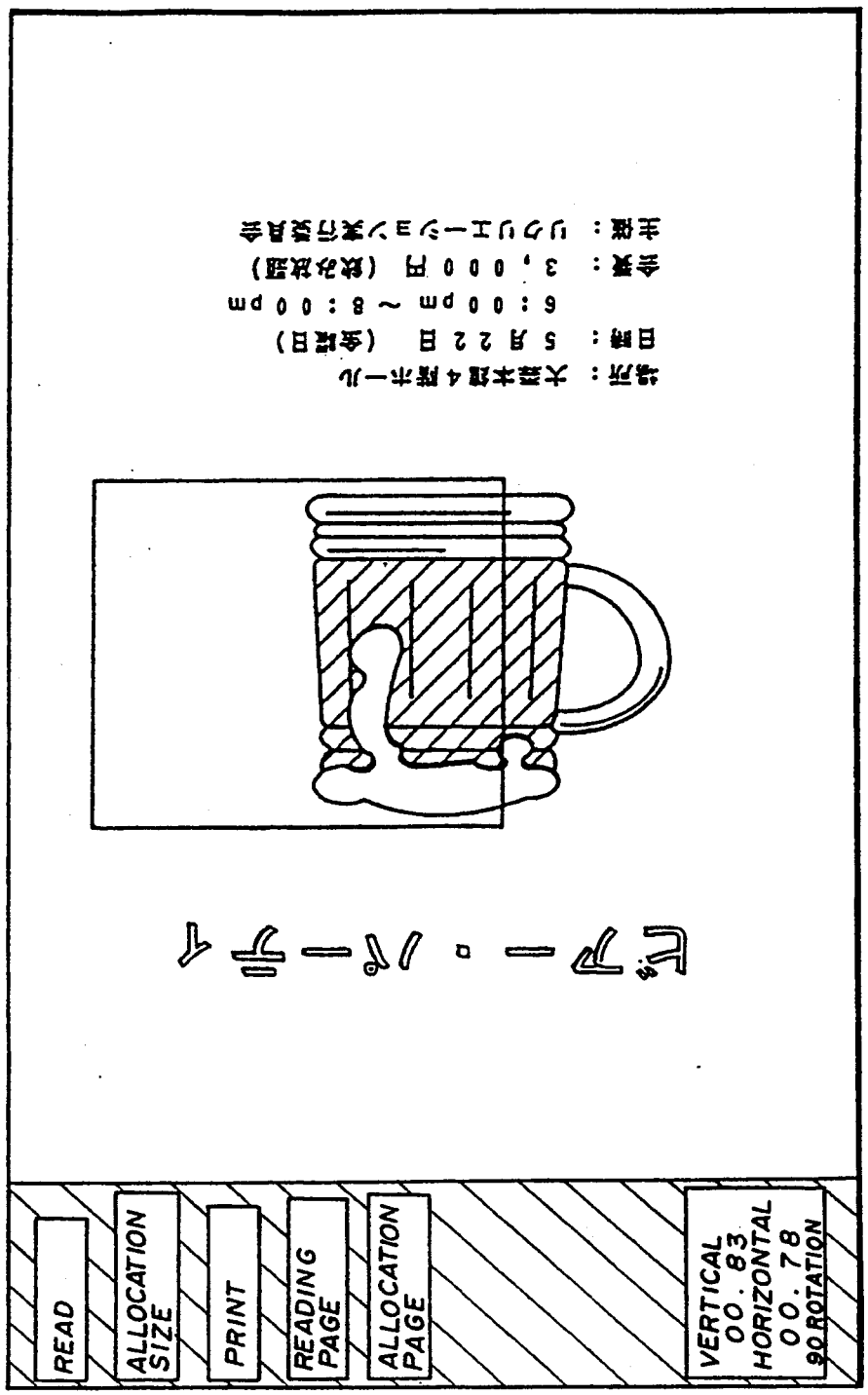

Then the operator draws with the touch pen 4 a symbol on the output rectangle displayed on the image display part of the LCD 3 as shown in FIG. 108, in S225 of FIG. 81. This symbol indicates a "90° rotation" operation. As a result, the controller 20 reads the drawn symbol as the specification for the "90° rotation" operation. Thus, the controller 20 displays a graphic representing the corresponding symbol for the "90° rotation" operation for a predetermined time in S312 of FIG. 87. Further, the controller 20, as shown in FIG. 109, displays, on the image display part, the output rectangle on which the specified "90° rotation" operation was performed in S264 of FIG. 85. (In FIG. 108, the output rectangle has a horizontally long shape while the output rectangle has a vertically long shape in FIG. 109. The output rectangle indicated in FIGS. 108 and 109 is respectively indicated at the right side of the Japanese "Katakana" letters "biaa paati" such as mentioned above and indicated to approximately surround the mug containing beer.) FIG. 121 shows relationships between various rotation mode operations and methods for specifying the corresponding rotation mode operations. The methods respectively comprise corresponding symbols to be drawn with the touch pen 4.

Then, the operator, as shown in FIG. 65, moves to a desired position and/or varies in size in a desired scale the displayed output rectangle, as mentioned above, and the description will now be repeated as follows. An edge of this rectangle is to be touched with the touch pen 4 and the touch pen 4 is dragged along the screen of the LCD 3 while the touch pen 4 is touching the edge. Then, the displayed output rectangle follows the dragged touch pen 4 and move accordingly in the image display part. Further, it is also possible to vary the size of the displayed output rectangle as follows. A corner or vertex of this rectangle is to be touched with the touch pen 4 and the touch pen 4 is dragged along the screen of the LCD 3 while the touch pen 4 is touching the edge. Then, the shape of the displayed output rectangle varies so that the resulting varied rectangle has two diagonally opposite vertexes, one which vertexes is fixed while the other follows the dragged touch pen 4. As a result, the location and size of the output rectangle with or without the above-mentioned moving/size variation operations are determined. Thus, the allocation area (output area) onto which the set area (input area) of the image will be allocated has been specified. These operations are in S225 of FIG. 81, S241–S243 of FIG. 83 and S251–S253 of FIG. 84.

Figure 111:
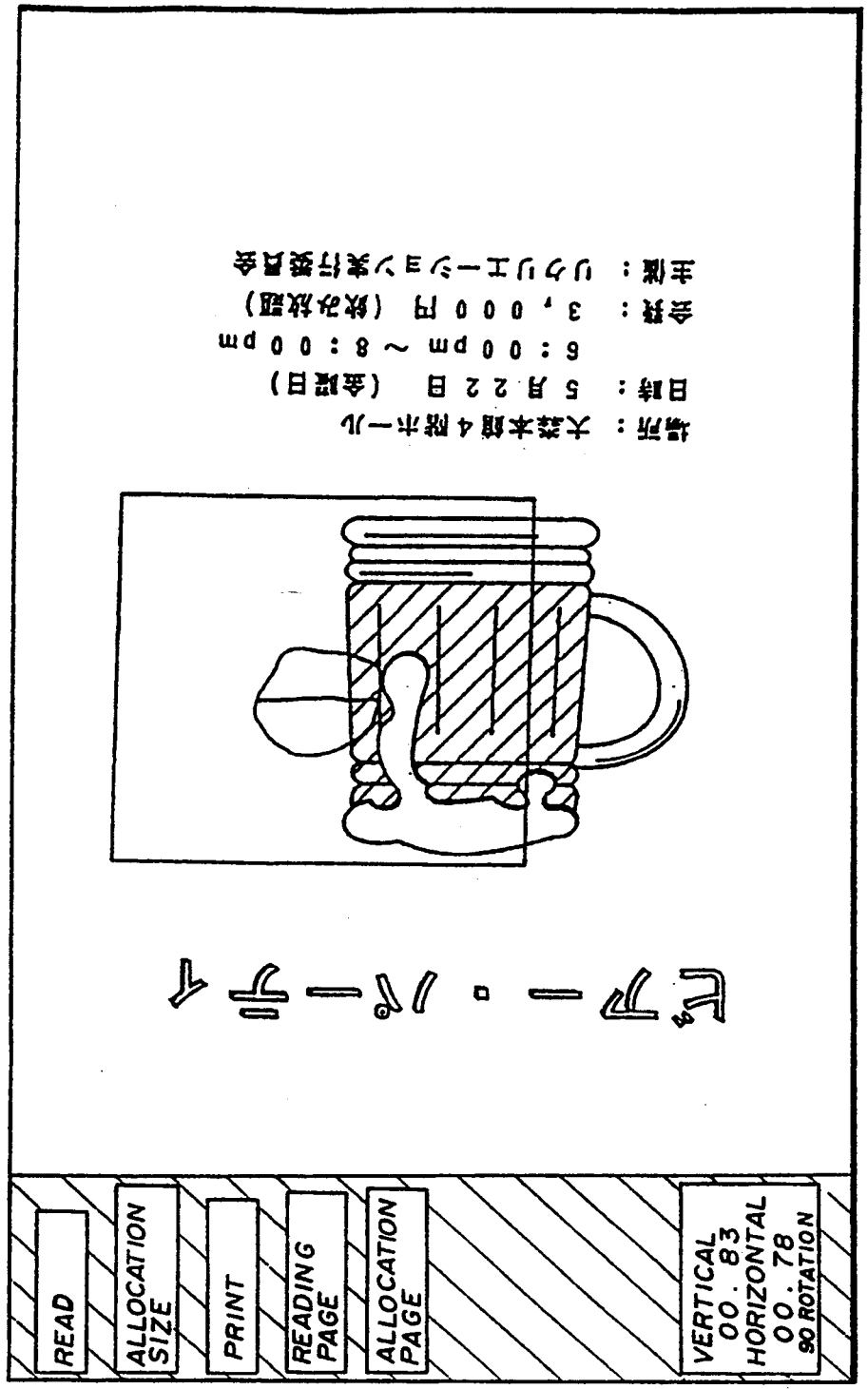

Then, the operator draws a vertical line across a circle at the center of the output rectangle with the touch pen 4 as shown in FIG. 111, in S225 of FIG. 81. This drawing is executed on the image display part of the LCD 3. This vertical-line-across-circle drawing indicates the logical operation "OR write" as shown in FIG. 122. Subsequently, the controller 20 reads the drawing as the "OR write" logical operation. Thus, the controller 20 displays for a predetermined time a graphic representing the symbol corresponding to the drawn vertical-line-across-circle symbol for specifying the "OR write" logical operation, in S325 of FIG. 87.

Figure 112:
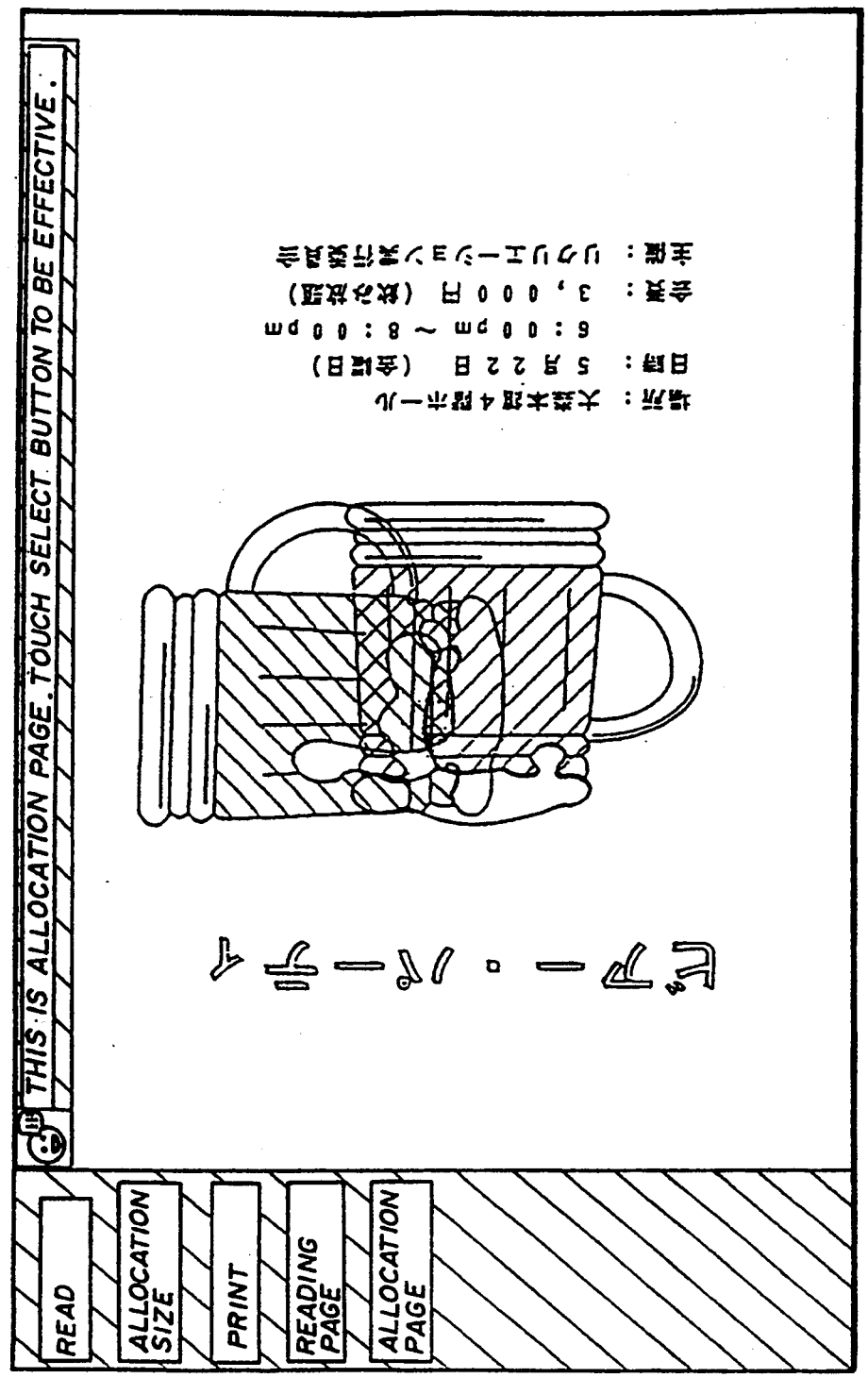

Then, the controller 20, with the REC board 22, performs the specified logical operation on the image information within the input rectangle in the reading page and the image information within the output rectangle in the allocation page. Then, the resulting allocation image information is then transferred to the video RAM of the LCD controller board 23 and then displayed on the image display part of the LCD 3 as shown in FIG. 112, in S271 of FIG. 86. Here, the controller deletes the displayed output rectangle for the allocation setting, before this display, and a message "This is allocation page. Touch a select button." is displayed as shown in FIG. 112.

Figure 113:
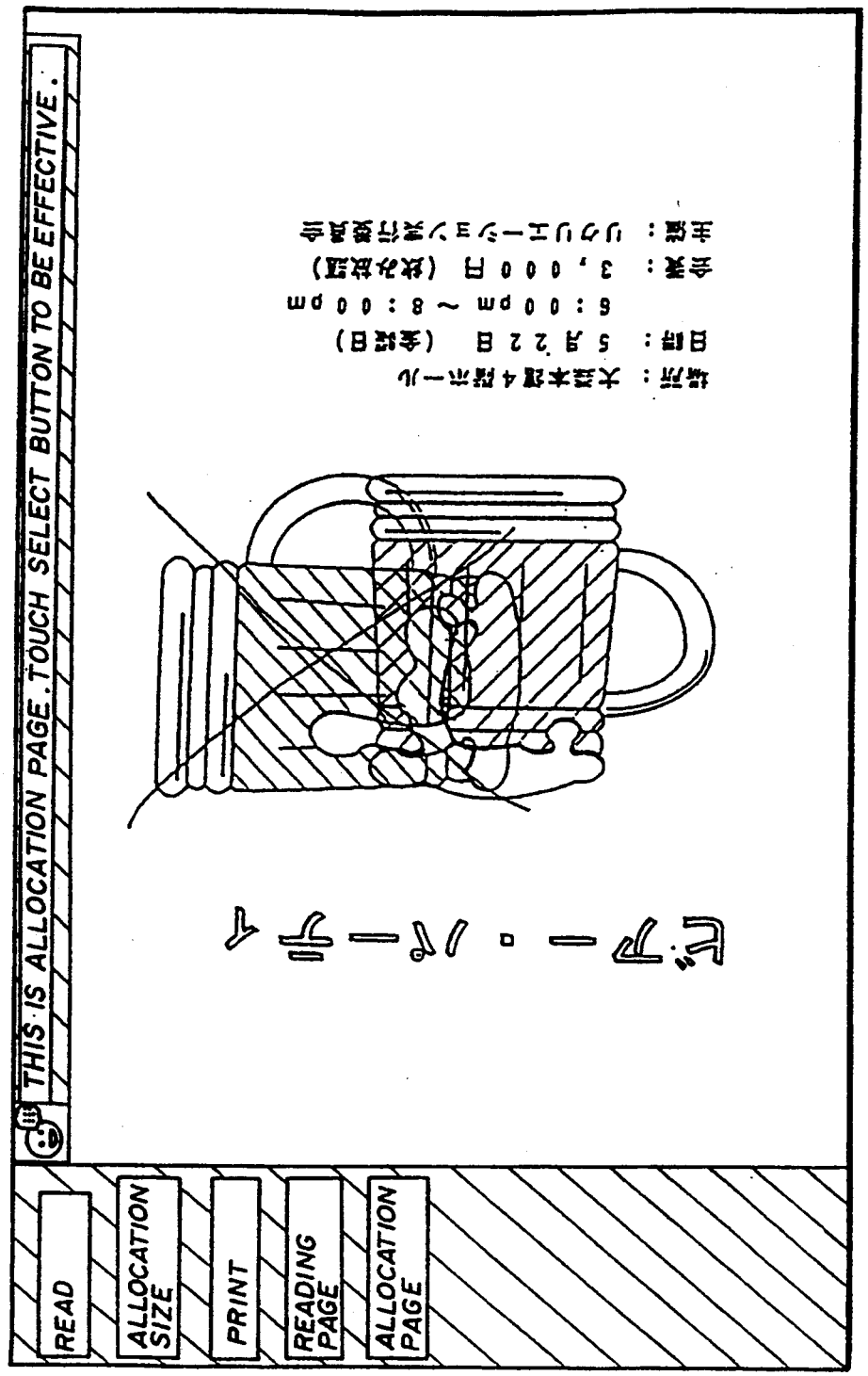

If the extracted or transferred image includes inappropriate element, the operator may draw, as shown in FIG. 113, with the touch pen 4, a symbol, in S272 of FIG. 86, so as to cancel the corresponding image extraction or transference. (This extracted or transferred image is, in FIG. 112 or 113, the image representing one of the mugs respectively containing beer, which mug is indicated so that the bottom thereof faces upward.) The symbol to be drawn indicates specification "undo" and has a shape of an approximate X-letter as mentioned above. Subsequently, the controller 20 reads the drawn symbol appropriately. Then, the controller 20, through the REC board 22, transfers the allocation image information stored in the image buffer memory in the second page memory board 13 to the video RAM in the LCD controller board 23. Then, the transferred image information is represented on the image display part of the LCD 3, as shown in FIG. 106, in S273 of FIG. 86. Thus, the original image is recovered.

Here, the operator intends to execute an area allocation operation again. Thus, the button "reading page" in the menu page displayed on the LCD 3 is specified with the touch pen 4 in S162 of FIG. 76. Subsequently, the controller 20, because it is not the time just after the image information has been transferred, performs the following operation. That is, the controller 20 again represents, as shown in FIG. 101, the read image information shown in FIG. 5 on the image display part of the LCD 3, in S214 of FIG. 80. Simultaneously, a message "This is reading page. Specify input rectangle with touch pen." is displayed together.

The operator, then, specifies, with the touch pen 4, a desired area in the image displayed on the image display part in S180 of FIG. 77. As a result, the controller 20 displays on the image display part the input rectangle corresponding to the specified desired area in S181 of FIG. 77. Here, the input rectangle which is approximately filled with the mug containing beer is displayed as shown in FIG. 102.

Figure 114:
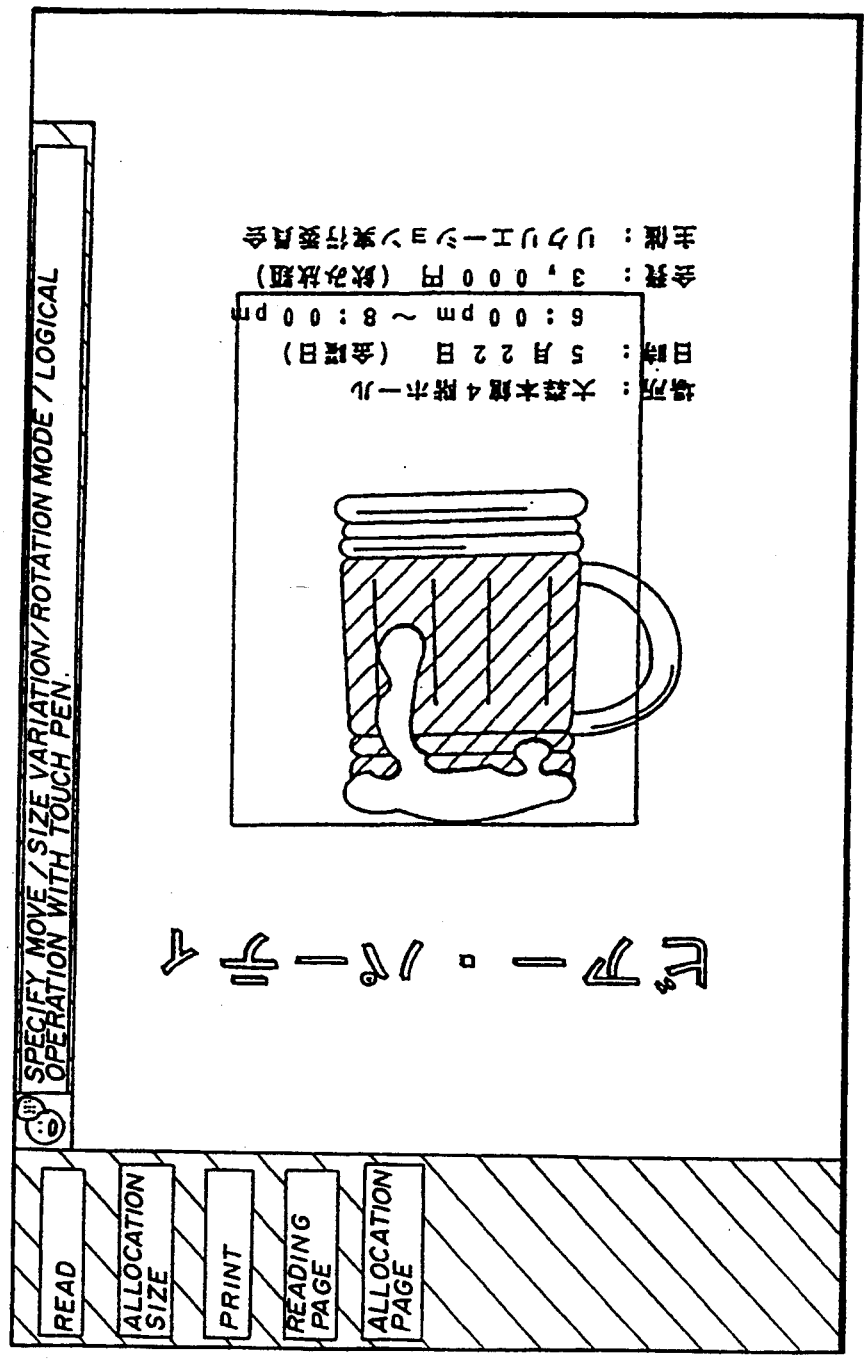

Then, the operator specifies the "allocation page" button in the menu page with the touch pen 4 in S162 of FIG. 76. As a result, the controller 20 displays an image in the image display part of the LCD 3 as shown in FIG. 114, in S222 of FIG. 81. Then, the controller 20 converts the input rectangle specified for the read input image information in size. Thus, as a result of this size conversion or size variation, the size of the input rectangle appears as if the corresponding size of a fragment were cut out from the corresponding draft and the obtained fragment were then put on the size of sheet of paper, which is identical in size to the size of the allocation. The resulting size of input rectangle is displayed in the center of the image display part in S235 in FIG. 82. The displayed rectangle is used as a default output rectangle for allocation. Simultaneously, a message is displayed in the menu page together with the displayed default output rectangle. This message comprise "Set specification of move/size variation/rotation/logical operation with the touch pen.".

Figure 115:
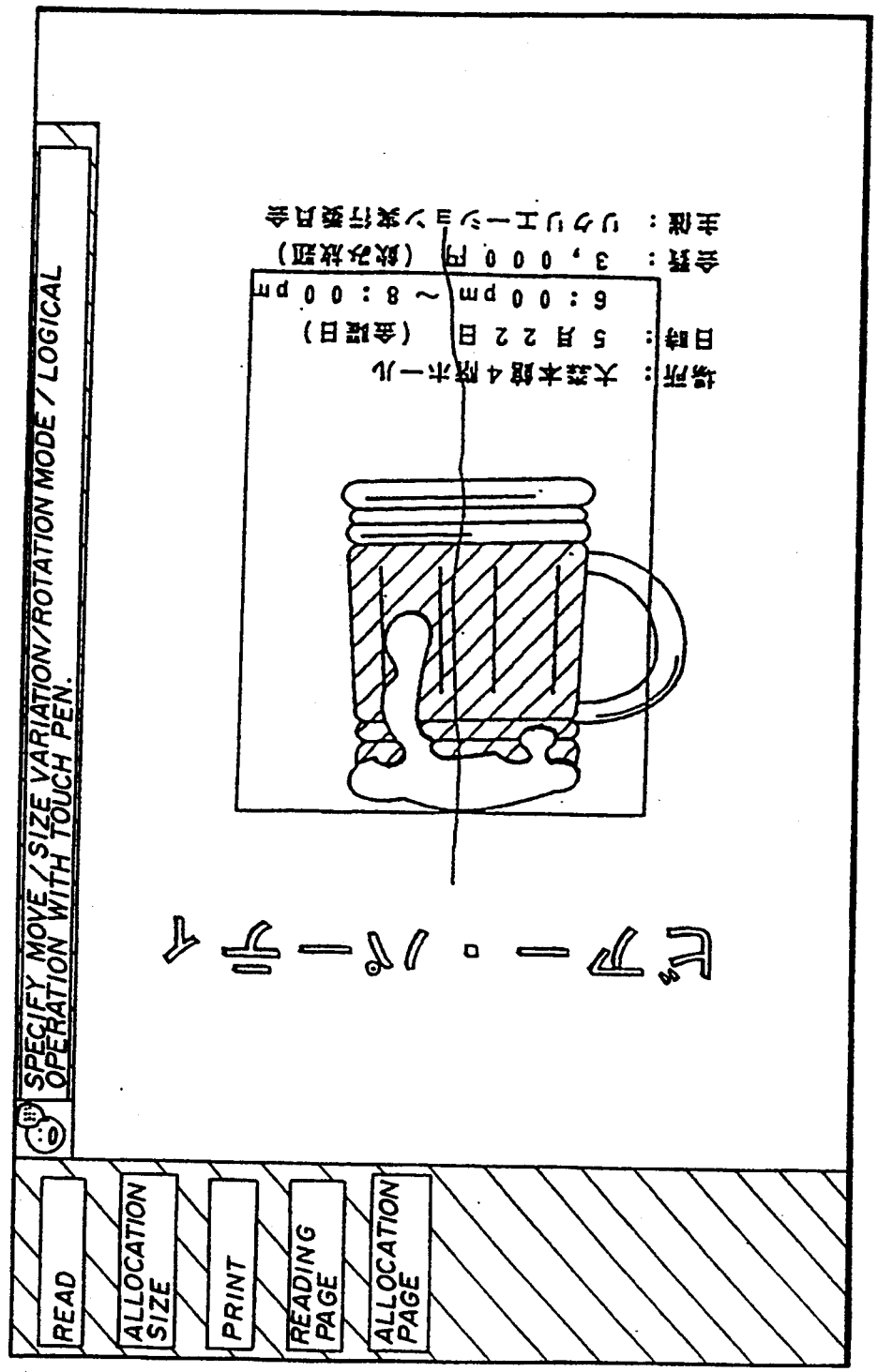
Figure 116:
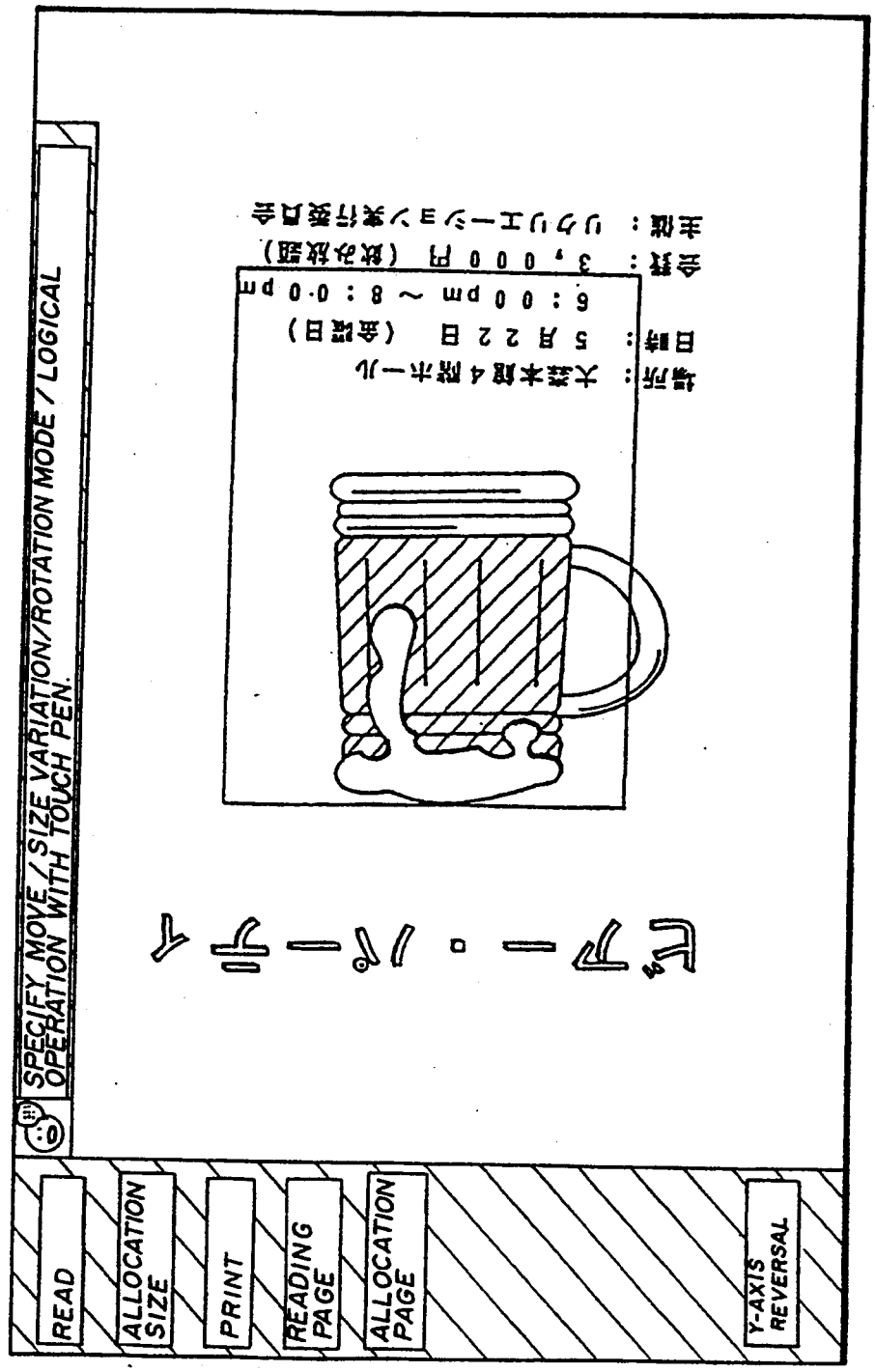

Then, the operator draws a horizontal line across the output rectangle with the touch pen 4 as shown in FIG. 115, in S225 of FIG. 81. This drawing is executed on the image display part of the LCD 3. This horizontal-line drawing indicates the rotation mode operation "Y-axis reversal" as shown in FIG. 121. Subsequently, the controller 20 reads the drawing as the "Y-axis reversal" rotation mode operation. Thus, the controller 20 displays for a predetermined time a graphic representing the symbol corresponding to the drawn horizontal-line symbol for specifying the "Y-axis reversal" rotation mode operation, in S312 of FIG. 87. Then, the specified-rotation-mode performed output rectangle is displayed as shown in FIG. 116, in S264 of FIG. 85. (In this case, because the specified rotation mode comprises "Y-axis reversal", the output rectangles are identical to each other between before and after the performance of the rotation mode operation.)

Figure 117:
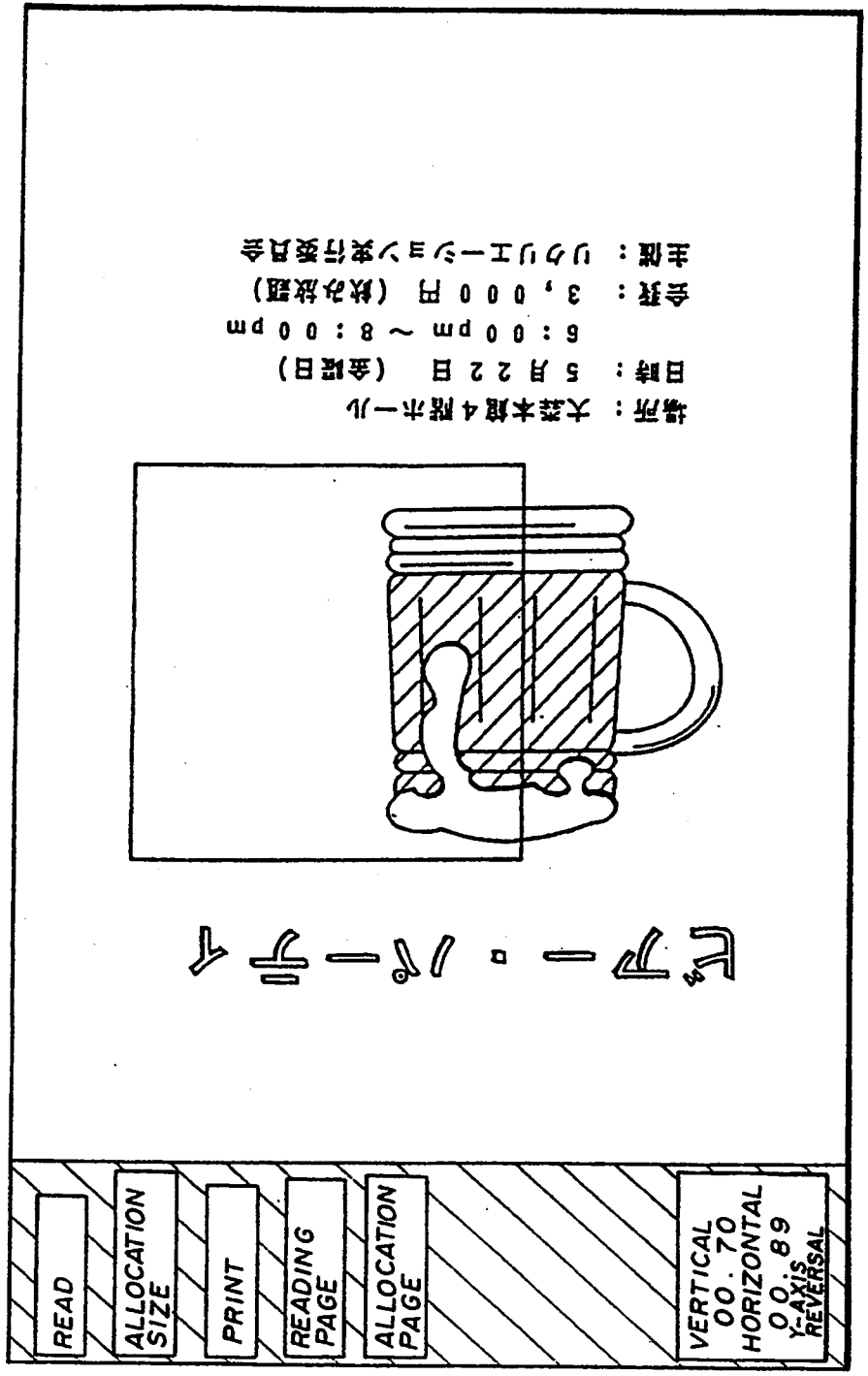

Then, the operator, as shown in FIG. 117, moves to a desired position and varies in size and/or shape in desired scales the displayed output rectangle, as mentioned above, and the description will now be repeated as follows. An edge of this rectangle is to be touched with the touch pen 4 and the touch pen 4 is dragged along the screen of the LCD 3 while the touch pen 4 is touching the edge. Then, the displayed output rectangle follows the dragged touch pen 4 and move accordingly in the image display part. Further, it is also possible to vary the size of the displayed output rectangle as follows. A corner or vertex of this rectangle is to be touched with the touch pen 4 and the touch pen 4 is dragged on the screen of the LCD 3 while the touch pen 4 is touching the edge. Then, the shape of the displayed output rectangle varies so that the resulting varied rectangle has two diagonally opposite vertexes, one which vertexes is fixed while the other follows the dragged touch pen 4. As a result, the location and size of the output rectangle with or without the above-mentioned moving/size variation operations are determined. Thus, the allocation area (output area) onto which the set area (input area) of the image will be allocated has been specified. These operations are in S225 of FIG. 81, S241-S243 of FIG. 83 and S251-S253 of FIG. 84. Simultaneously, the menu page displayed together with the display of the rectangle includes the size-variation ratio (vertical 00.70, horizontal 00.89). This size-variation ratio is a ratio in size between the input area and the allocation area. Simultaneously, the letters indicating the performed reversal mode (in this case, "Y-axis reversal") is also displayed.

Figure 118:
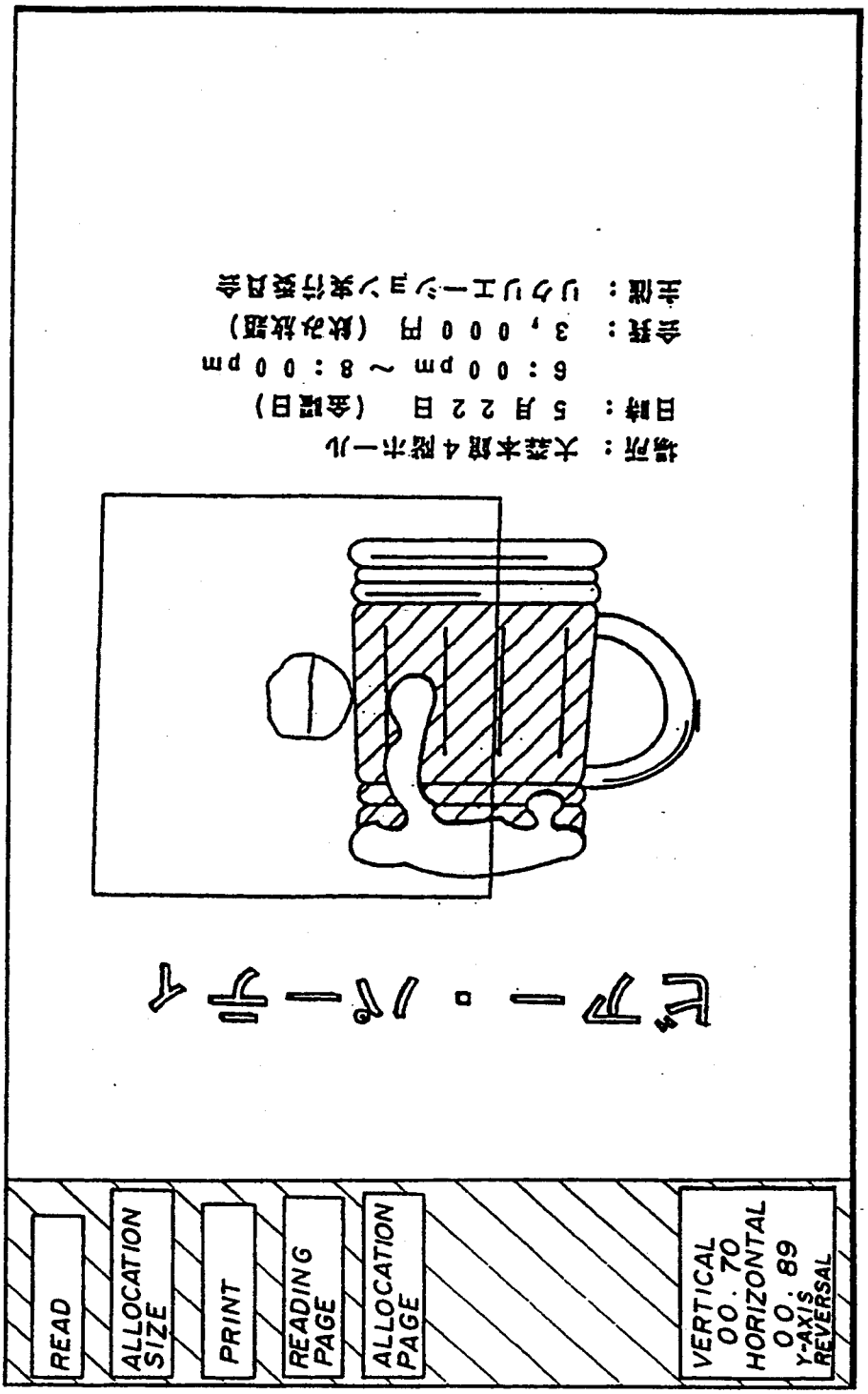

Then, the operator draws a horizontal line across a circle at the center of the output rectangle with the touch pen 4 as shown in FIG. 118, in S225 of FIG. 81. This drawing is executed on the image display part of the LCD 3. This horizontal-line-across-circle drawing indicates the logical operation "EXOR write" as shown in FIG. 122. Subsequently, the controller 20 reads the drawing as the "EXOR write" logical operation. Thus, the controller 20 displays for a predetermined time a graphic representing the symbol corresponding to the drawn horizontal-line-across-circle symbol for specifying the "EXOR write" logical operation, in S325 of FIG. 87.

Figure 119:
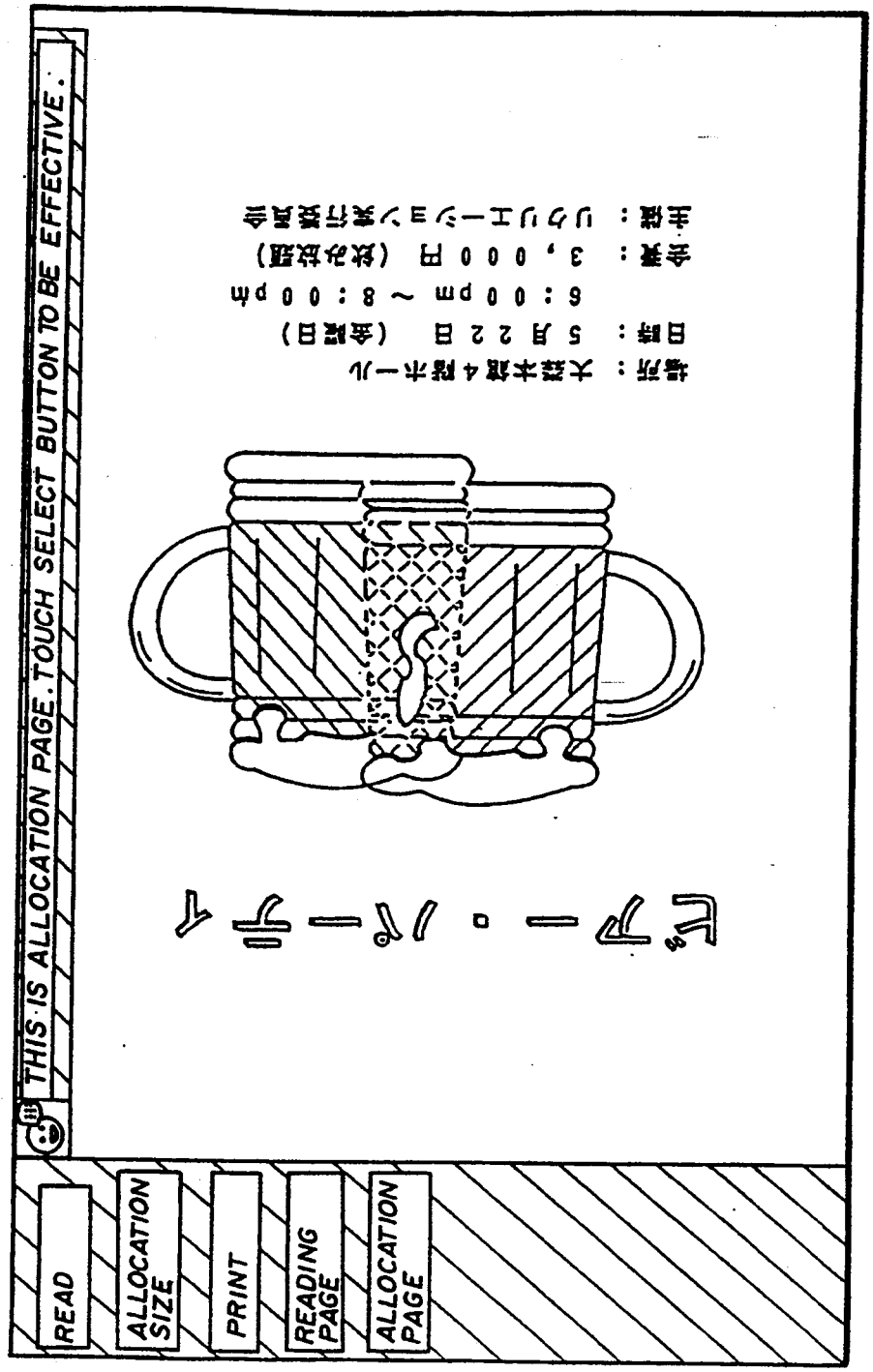

Then, the controller 20, with the REC board 22, performs the specified logical operation on the image information within the input rectangle in the reading page and the image information within the output rectangle in the allocation page. Then, the resulting allocation image information is then transferred to the video RAM of the LCD controller board 23 and then displayed on the image display part of the LCD 3 as shown in FIG. 119, in S271 of FIG. 86. (In FIG. 119, two mugs are indicated. The top mug has a handle extending upward therefrom while the bottom mug has a handle extending downward therefrom. Further, both the mugs duplicate each other partially.) Here, the controller deletes the displayed output rectangle for the allocation setting, before this display, and a message "This is allocation page. Touch a select button." is displayed as shown in FIG. 112.

Printing Process

Figure 79:
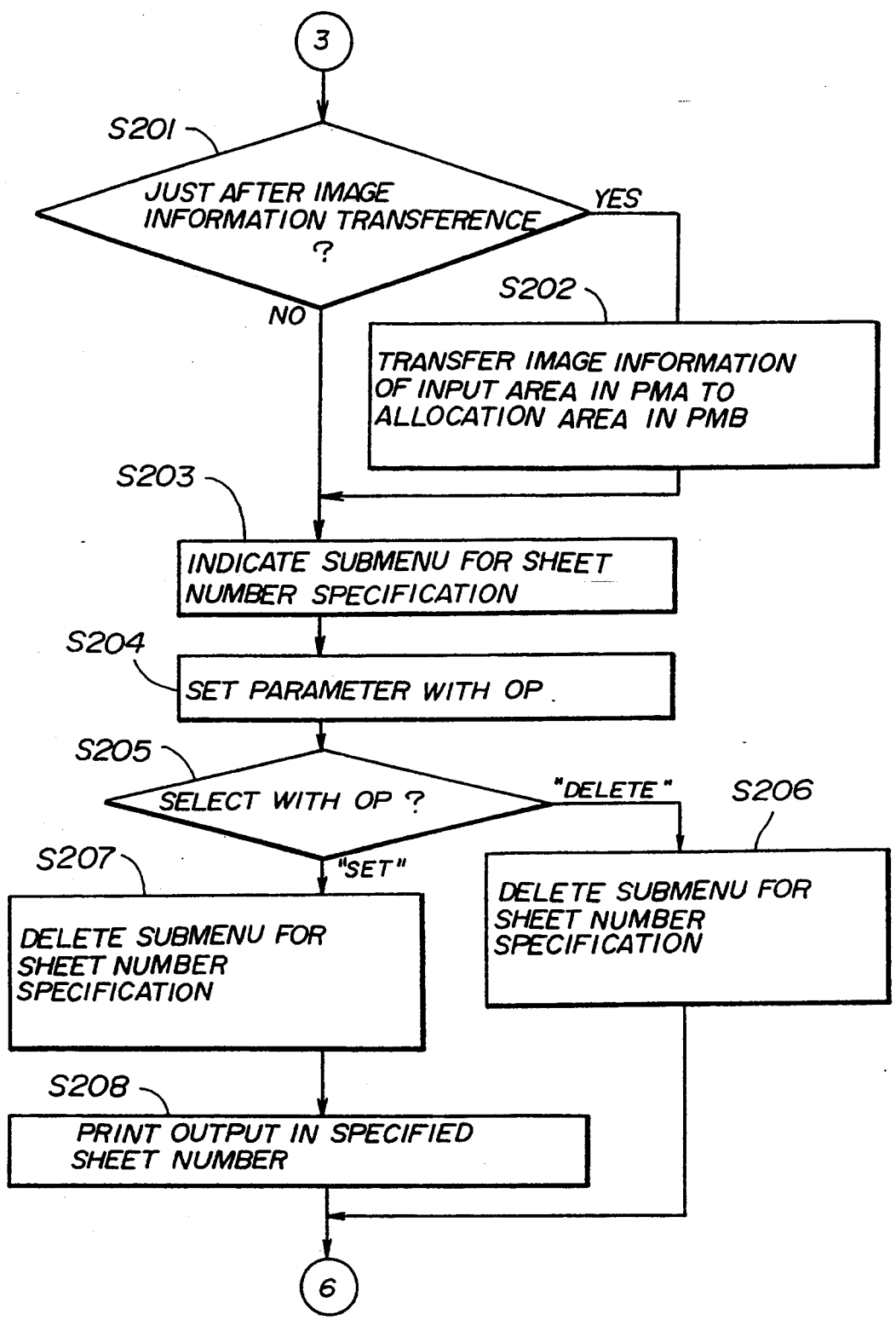
FIG. 79 shows an operation flow chart concerning a print process performed by the controller and an operation sequence performed by the operator in the apparatus according to the fourth embodiment of the present invention.

The button "print" in the menu page of the LCD 3 is specified with the touch pen 4 in S162 of FIG. 76, the process shown in FIG. 79 is then started from S201.

Step S202: The input area of image information stored in the first page memory board (PMA) is transferred to the allocation area prepared in the second page memory board (PMB). That is, if it is determined in S201 that the time is just after the image information has been transferred, the process similar to the process of S172 is then executed.

Step S203: If it is determined in S201 that it is not just after the image information has been transferred, another submenu is then displayed on the image display part of the LCD 3. In this other submenu, a choice for specifying how many sheets of hard copies is needed. In the submenu, the sheet number may be specified from among numbers 1–99. Simultaneously, a message "Specify printing sheet number for the read image." is displayed in the image display part for the read image information while another message "Specify printing sheet number for the allocated image." is displayed in the image display part for the allocated image information.

Steps S206, S207: If it is determined in S205 that the touch pen 4 is used for specifying the button either "set" or "delete", the sheet-number-specification submenu is deleted from the image display part and the former image is displayed thereon.

Step S208: If the read image information is represented on the image display part of the LCD 3, the read image information stored in the image buffer memory of the first page memory board 12 is sent to the printer 5. As a result, the sent image information is then represented as a number of hard copies. The number of hard copies has been specified as mentioned above and this generation of the hard copies is executed in a specified reading size such as mentioned above. If the allocated image information is displayed on the image display part of the LCD 3, the allocated image information stored in the image buffer memory of the second page memory board 13 is sent to the printer 5. As a result, the sent image information is then represented as a number of hard copies. The number of hard copies has been specified as mentioned above and this representation as the hard copies is executed in a specified allocation size such as mentioned above.

In the above actual example, then the desired final image has been obtained. As a result, the operator specifies the "print" button with the touch pen 4 in S162 of FIG. 76. Here, it is the time just after the image information has been transferred. As a result, the controller 20, with the REC board 22, varies the size of the input area of the input image represented with the image information stored in the image buffer memory of the first page memory board 12. Then, the specified logical operation from among the 16 logical operations is performed on the image information, resulting from a size variation (which may include shape variation) being performed, and the output area of the image information stored in the image buffer memory of the second page memory board 13. Subsequently, the resulting image information is then written in this output area so as to update the output area of the image information, in S202 of FIG. 79.

Figure 120:
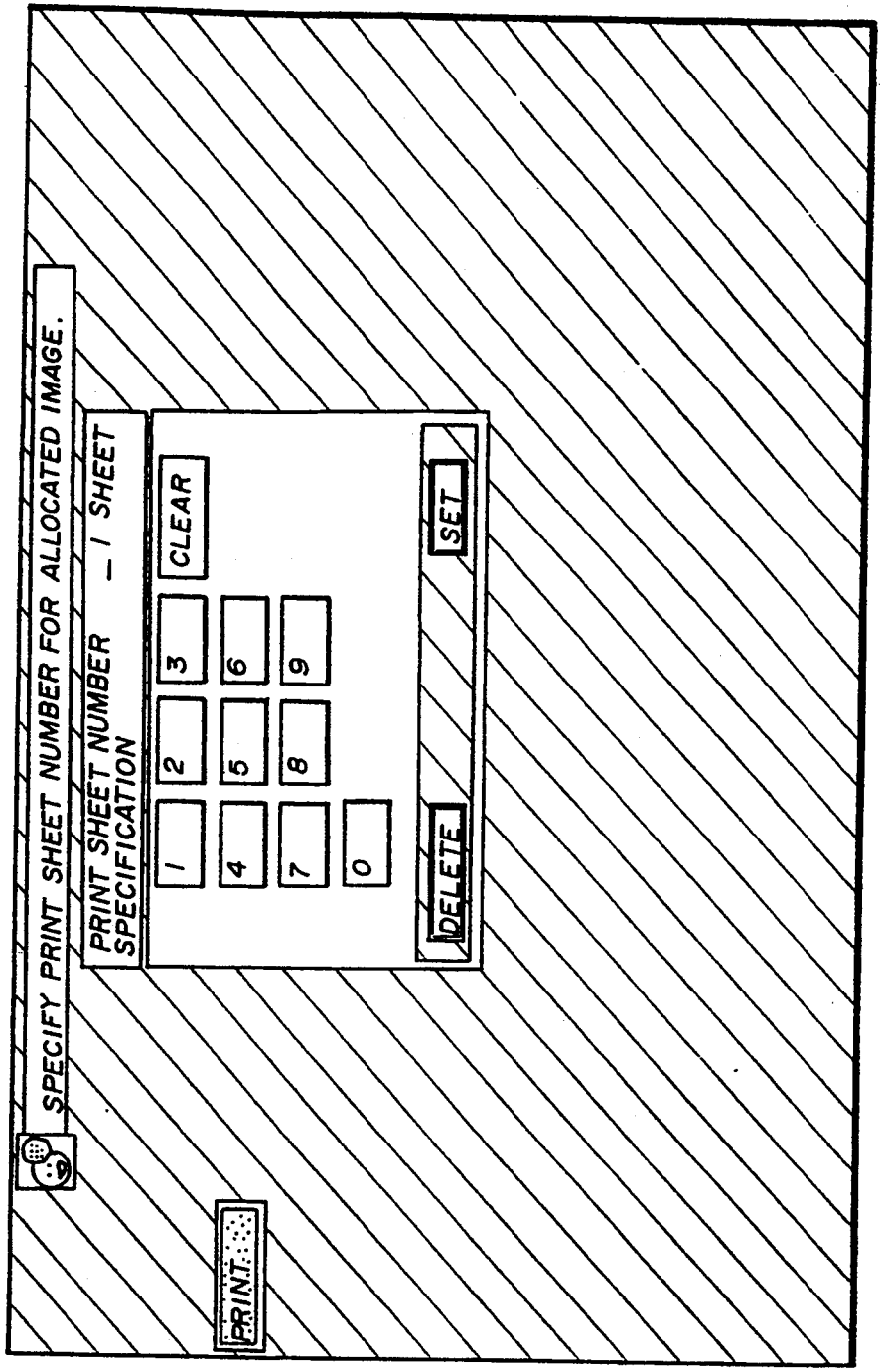

Then, as shown in FIG. 120, the sheet-number-specification submenu is displayed on the image display part of the LCD 3 in S203 of FIG. 79. Simultaneously, a message "Specify printing sheet number (number of printed sheets) for the allocated image." is displayed in the menu page. "1 sheet" is preset as a default choice for the printing sheet-number.

Then, after the operator specifies a desired printing sheet number with the touch pen 4 in S204 of FIG. 79, the operator specifies the "set" button. As a result, the controller 20 deletes the sheet-number-specification submenu from the image display part of the LCD 3 in S207 of FIG. 79. Then, the controller 20 sends the allocated image information stored in the image buffer memory of the second page memory board 13 to the printer 5. As a result, the specified sheet numbered hard copies of the final image are printed out in the specified allocation size. In this case, the hard copy representing the final image as shown in FIG. 89 has a size and orientation of A4 vertical.

If the operator hopes to do further processing such as adding image information representing another original image, appropriate operations and processes similar to the above-mentioned ones may be performed for the other image information.

Further, the present invention is not limited to the above described embodiments, and variations and modifications may be made without departing from the scope of the present invention.

What is claimed is:

1. An image processing apparatus comprising:
   a) an image reading means for reading a plurality of original images so as to provide corresponding image information;
   b) input size specifying means for specifying input sizes according to which said image reading means respectively reads said plurality of original images so that resulting image information represents the input sizes of said plurality of original images, wherein said input sizes may be identical to one another;
   c) first storing means for storing the resulting image information therein;
   d) first image indicating means for indicating the image represented by the resulting image information stored in said first storing means;
   e) image processing means for appropriately processing the resulting image information stored in said first storing means so as to create finished image information representing at least one finished image;
   f) output size specifying means for specifying an output size according to which said image processing means processes said resulting image information so that said finished image has said output size;
   g) second storing means for storing said finished image information representing said finished image therein;
   h) second image indicating means for indicating said finished image using corresponding finished image information stored in said second storing means;
   i) recording means for recording said finished image information representing said finished image on a recording medium after extracting said finished image information from said second storing means;
   j) extracting area specifying means for specifying, as an input image area, a part of the image indicated by said first image indicating means, so that a corresponding part of image information stored in said first storing means is accordingly specified as an input image information area;

k) allocation manner specifying means for specifying an allocation manner in which the input image information area is allocated in a storage area associated with said second storing means, said allocation manner specifying means including:
   1) means for indicating, on the image indicated by said second image indicating means, an actual size of the input image area on the finished image, wherein indicating the actual size of the input image area on the finished image means that a dimensional relationship between the size of the input image area indicated on the finished image and the size of the finished image is as if the input image area were cut from the original image represented on a sheet of paper so as to form a cut part of the sheet of paper, and said cut part of the sheet of paper were then put on the finished image represented on another sheet of paper; and
   2) means for specifying movement or size variation for said input image area in said indicated image; and l) image information transferring means for transferring said input image information area to an allocation area in said storage area associate with said second storing means.

2. The image processing apparatus according to claim 1, wherein said extracting area specifying means includes:
   means for varying the size of the image represented by the resulting image information and indicated by said first image indicating means where the size variation is performed about a fixed point.

3. The image processing apparatus according to claim 1, wherein said extracting area specifying means includes:
   means for varying the size of the finished image indicated by said image second indicating means where the size variation is performed about a fixed point.

4. The image processing apparatus according to claim 1, wherein said image information transferring means includes:
   resolution converter means for performing, on the image represented by the corresponding image information to be transferred thereby, at least one of size variation, movement, rotation and reflection.

5. The image processing apparatus according to claim 1, wherein said image information transferring means comprises logical operation means for performing, before transferring, logical operation on the input image information area and other image information stored in said allocation area.

6. The image processing apparatus according to claim 1, wherein said allocation manner specifying means comprises means for performing rotation or reflection on the input image area as the allocation manner.

7. The image processing apparatus according to claim 1, further comprising means for indicating a scale of size variation, according to in which rate the input image area is performed size variation according to the allocation manner.

8. The image processing apparatus according to claim 1, further comprising means for giving notice when the allocation area exceeds a predetermined area, wherein the excess may occur as a result of a process being performed on the input image area according to the allocation manner, wherein said performed process may comprise movement, size variation, rotation or reflection.

9. The image processing apparatus according to claim 1, further comprising:
   means for giving notice when the allocation area exceeds the storage area associated with the second storing means;
   wherein an excess, resulting when the allocation area exceeds the storage area associated with the second storing means, may occur as a result of a process being performed on the input image area according to the allocation manner, the process including allocating the input image area on the center of said finished image.

10. The image processing apparatus according to claim 1, further comprising means for canceling the processing executed with said image processing means.

11. The image processing apparatus according to claim 1, wherein said recording means further comprises means for recording the image information stored in said first storing means.

12. The image processing system apparatus according to claim 1, further comprising:
   specification inputting means for inputting a specification concerning at least one of said input size specifying means, output size specifying means, and image processing means, wherein:
   1) an input device is used to draw a symbol; and
   2) said drawn symbol is then read as said specification.

13. The image processing apparatus according to claim 12, wherein said specification inputting means includes:
   means for reading the symbol, as the specification, drawn on the image represented by the corresponding image information stored in the allocation area;
   wherein the reading is executed by referring to at least a position, a shape and a number of drawn strokes of said drawn symbol.

14. The image processing apparatus according to claim 12, wherein said specification inputting means displays a symbol corresponding to the symbol drawn therewith in a case where said specification inputting means could read said drawn symbol; and
   wherein in a case where said specification inputting means could not read said drawn symbol, said specification inputting means gives notice indicating the unreadableness.

15. An image processing apparatus, comprising:
   a) an image reading means for reading a plurality of original images so as to provide input image information respectively corresponding to the original images;
   b) a printer for printing a finished image in final form;
   c) a controller, including:
      1) a first page memory for storing first image information corresponding to the input image information;
      2) a second page memory for storing second image information;
      3) a frame memory for storing finished image information; and
      4) a processor, the processor including:

i) means for processing and selectively passing the first image information from the first page memory and storing processed first image information as the second image information in the second page memory; and ii) means for passing the second image information from the second page memory to form the finished image information in the frame memory; and iii) means for transferring the finished image information from the frame memory to at least the printer;

d) a display device, coupled to the frame memory via the transferring means; and e) an image indicating device, associated with the display device, the image indicating device constituting:

1) means for specifying on the display device, input sizes by which the image reading means reads the original images;

2) means for specifying on the display device, output sizes of image areas in the second frame memory; and 3) means for indicating on the display device, finished images made of image information in the frame memory derived from the second image information from the second page memory, the finished images including a composition of images derived from the first image information which are of sizes determined by the input size specifying means, the finished images having sizes determined by the output size specifying means.

* * * * *